US012673848B2

(12) United States Patent
Glasgow et al.

(10) Patent No.: US 12,673,848 B2
(45) Date of Patent: Jul. 7, 2026

(54) STAIR LIFT SYSTEMS AND METHODS FOR ASSEMBLING, INSTALLING, AND USING SUCH SYSTEMS

(71) Applicant: Leaf Home Safety Solutions, Hudson, OH (US)

(72) Inventors: Braden Glasgow, Elyria, OH (US); Thomas Victor Czerny, Streetsboro, OH (US); Michael Gori, Norton, OH (US); Ningguan Li, Beachwood, OH (US); RuQing Liu, Cuyahoga Falls, OH (US); Jason Crowell, Akron, OH (US)

(73) Assignee: Leaf Home Safety Solutions, Hudson, OH (US)

( * ) Notice: Subject to any disclaimer, the term of this patent is extended or adjusted under 35 U.S.C. 154(b) by 148 days.

(21) Appl. No.: 18/620,227

(22) Filed: Mar. 28, 2024

(65) Prior Publication Data

US 2024/0417218 A1 Dec. 19, 2024

Related U.S. Application Data

(60) Provisional application No. 63/492,921, filed on Mar. 29, 2023.

(51) Int. Cl.
*B66B 9/08* (2006.01)

(52) U.S. Cl.
CPC .................................. *B66B 9/0815* (2013.01)

(58) Field of Classification Search
CPC ........ B66B 9/08; B66B 9/0815; B66B 9/0846
See application file for complete search history.

(56) References Cited

U.S. PATENT DOCUMENTS

| | | | | | |
|---|---|---|---|---|---|
| 3,012,634 | A * | 12/1961 | Stelzer | B66B 9/08 187/262 |
| 5,066,834 | A * | 11/1991 | Richter | B62D 65/18 191/40 |
| 10,836,607 | B2 * | 11/2020 | Woodhams | B66B 9/0846 |
| 12,478,524 | B2 * | 11/2025 | Matheny | A61G 5/061 |

(Continued)

FOREIGN PATENT DOCUMENTS

| | | | | |
|---|---|---|---|---|
| EP | 3153453 A1 * | 4/2017 | B66B 9/0846 |
| FR | 2995294 A1 * | 3/2014 | B66B 9/0846 |
| WO | WO-2021005352 A1 * | 1/2021 | B66B 9/0846 |

*Primary Examiner* — Michael A Riegelman
(74) *Attorney, Agent, or Firm* — Benesch Friedlander Coplan & Aronoff LLP

(57) ABSTRACT

Disclosed herein are embodiments of stair lift systems arranged such that a number of configurable subcomponents can be assembled to form a wide variety of stair lift systems that meet the spatial, dimensional, and physical arrangement of an equally wide variety of pre-existing stairways and staircases in residential and commercial settings. Each embodiment of a stair lift system is highly configurable, can generally be installed in one session, and provides enhanced and additional functionality as compared to prior art stair lift systems. A stair lift system generally comprises a modular and configurable rail assembly, a plurality of modular and configurable post assemblies for securing the rail assembly to the pre-existing staircase, and a chair that engages with and traverses the modular rail assembly to move a user up and down the staircase.

14 Claims, 184 Drawing Sheets

(56) References Cited

U.S. PATENT DOCUMENTS

| | | | | |
|---|---|---|---|---|
| 2008/0093176 A1* | 4/2008 | Rosenthal | B66B 9/083 | |
| | | | 187/241 | |
| 2015/0059965 A1* | 3/2015 | Geurts | F16L 9/22 | |
| | | | 156/196 | |
| 2016/0236906 A1* | 8/2016 | Horton | B66B 9/0846 | |
| 2016/0304318 A1* | 10/2016 | McGill | B66B 9/0846 | |
| 2019/0112157 A1* | 4/2019 | Woodhams | B66B 9/0846 | |
| 2020/0307959 A1* | 10/2020 | Felis | B66B 9/08 | |
| 2024/0417218 A1* | 12/2024 | Glasgow | B66B 9/0815 | |

* cited by examiner

SECTION B-B
SCALE 1 : 1

Levelers at the bottom of the foot are adjusted from the top with a flat blade screw driver.

Note: The threads on the levelers are 1/2"-20. The hole at the center measures more than 1/4".

STAIR LIFT SYSTEMS AND METHODS FOR ASSEMBLING, INSTALLING, AND USING SUCH SYSTEMS

CROSS-REFERENCE TO RELATED APPLICATIONS

The present application claims priority to U.S. provisional application Ser. No. 63/492,921, titled "Stair Lift Systems and Methods for Assembling, Installing, and Using such Systems," filed Mar. 29, 2023, which is fully hereby incorporated by reference herein.

FIELD OF INVENTION

The present disclosure generally relates to stair lift systems comprising configurable subcomponents and methods for assembling such subcomponents into a stair lift system, installing such stair lift systems, and using such stair lift systems. More specifically, the present disclosure relates to stair lift systems comprising in a first embodiment, a modular rail assembly; a series of modular posts to support the modular rail assembly; and a chair arranged to engage and traverse the modular rail assembly, where the modular rail assembly comprising a number of customizable subcomponents arranged to be assembled in a variety of configurations to accommodate varying requirements of disparate pre-existing curved stairways and staircases without the need for the manufacture of customized components or systems; in a second embodiment, modular rail assemblies with novel cross-sectional profiles, novel drive mechanisms, and a chair arranged to engage and traverse the modular rail assemblies, where the modular rail assemblies comprise a number of customizable subcomponents arranged to be assembled in a variety of configurations to accommodate varying requirements of disparate pre-existing straight stairways and staircases without the need for the manufacture of customized components or systems.

BACKGROUND

In recent years, the requirements and demands of the residential home remodeling and home improvement markets have evolved to include a broader demographic and an ever-growing variety of services. Traditionally, most consumers justified the cost of remodeling a home because remodeling increases the value of the home, repairs defects to the home, improves energy efficiency, and/or updates the aesthetic styling and amenities of the home. However, with the increased aging of the world's population, particularly in industrialized countries, more and more consumers are remodeling homes to satisfy aging consumers' desires to safely remain in their homes longer despite physical limitations that come with aging. The same can be said for younger consumers that either through injury or disease have physical limitations. The general trend is that consumers want to remain independent and in their familiar home environment as long as possible. In addition to the understandable desire to continue to live independently, the cost of in-home care, assisted living facilities, and other such alternatives often provide an economic incentive for aging consumers to remodel their residential homes to safely accommodate consumers with physical limitations.

As noted, today's older consumers are more independent and commonly choose to remain in their residential home much longer than prior generations. In one estimate, the number of Americans over the age of 65 will increase from 54 million in 2020 to 80 million in 2040, which includes a more than doubling of Americans over the age of 85 from 7 million to 15 million. This growth in the number of aging Americans has a proportional effect on the number of homeowners over the age of 65. In the last decade, the number of homeowners over the age of 65 has increased by 9 million, and it is expected that this number will grow by an additional 19.3 million persons in the next decade. As the population ages, many more home remodeling projects will focus on making the home safer for aging, particularly those with mobility imitations, that desire to remain in their homes. Even today, 45% of consumers cite making a home safer and more useable for an aging resident as one of the reasons for remodeling a home. This percentage is sure to grow in the coming years.

While there are often many projects required to make a home safe and efficient for an aging resident, transforming a two or more-story home into a space that is accessible for those with mobility issues may be of utmost importance. For any aging person to remain in his or her residential home, rather than moving to a single-story dwelling or foregoing the additional living space above or below the ground floor, it is important to facilitate movement between a first and second floor of the home or the first floor and basement of the home. One method of accommodating this need is to install a stair lift system that allows a user to sit in a chair and be transported up a staircase using a complicated stair rail system. In most cases, the stair rail system is custom-built for each homeowner's unique staircase. Often custom-built stair rail systems are required because of the wide variety and variations of staircases that can be found in homes. These variations are driven by many factors such as the age of a home, architecture style of a home, and local or regional home builder preferences, practices, and regulations. This often results in long lead times and delays between a consumer contacting a stair lift provider and the successful installation in the stair lift in the consumer's home. Between the first contact and the successful installation, the stair lift provider must visit the home, take a number of measurements, provide an estimate and quote to the consumer, the manufacturer must custom make the stair lift system, and the stair lift provider must install the stair lift system in the customer's home. And if any component of the customized system is not manufactured specifically to the custom specifications or there is an error in the initial measurements, there may need to be reworking or remanufacturing of such components. Such a process may last several weeks or even several months, which results in the consumer remaining confined to one floor of the home or remaining confined to an assisted living facility until that multi-step process is completed.

The long process of custom designing and building a traditional stair lift system can last several weeks or even several months, which becomes an even more apparent problem when a consumer's quality of life is degraded because of the inability to access the full extent of their home. Further, in certain situations, a consumer is unable to be released from a hospital, nursing home, or other care-giving facility without having the proper stair lift system in their home so that they can safety navigate their independent living situation. Often, a consumer does not realize they need a stair lift system until an occurrence of a debilitating event, such as a fall for example. Once such a debilitating event occurs the consumer needs an adequate stair lift system nearly immediately. The consumer does not have several weeks or several months to wait for a custom stair lift system to be built and installed. In essence, the consumer is at the mercy of the current slow and error prone ordering and installation processes.

Therefore, it is desirable to develop a more efficient approach to the design, fabrication, delivery, and installation of stair lift systems that offers flexibility and variability in configuration and arrangement so as to require a short period of time between the placement of a consumer order for a stair lift system and the installation of that system in a consumer's home. Such an efficient approach is needed to meet the market's demands for installing stair lift systems in a wide variety of stairways and staircases configurations at a reasonable cost without unnecessarily extending the overall project schedule. The stair lift systems described and disclosed herein meets all of the requirements of the evolving home remodeling and improvement market as well as the evolving needs of aging in place consumers.

SUMMARY

Disclosed herein are embodiments of newly designed and engineered stair lift systems, arranged such that a number of configurable subcomponents can be assembled to form a wide variety of stair lift systems that meet the spatial, dimensional, and physical arrangement of an equally wide variety of pre-existing stairways and staircases in residential and commercial settings. Each embodiment of these newly engineered stair lift systems is highly configurable, can generally be installed in one session, and provides enhanced and additional functionality as compared to prior art stair lift systems. These newly designed systems generally comprise a modular and configurable rail assembly, a plurality of modular and configurable post assemblies for securing the rail assembly to the pre-existing staircase, and a chair that engages with and traverses the modular rail assembly to move a user up and down the staircase.

The plurality of modular post assemblies are typically each secured to one side of a tread of the staircase and spaced apart so that the modular post assemblies are periodically positioned from the bottom of the staircase to the top of the stair case. Each modular post assembly is arranged to extend vertically from the side of the tread so that it does not interfere with the general pathway from the bottom of the staircase to the top of the staircase. Because the modular rail assembly is secured to the plurality of modular post assemblies, the rail assembly is also positioned near the side of the staircase, extends from the bottom of the staircase to the top of the staircase, and does not interfere with the general pathway from the bottom of the staircase to the top of the staircase.

The modular rail assembly includes two rail subassemblies, an upper rail subassembly and a lower rail subassembly, where the two rail subassemblies are generally positioned parallel to each other and follow the path of the staircase along the length of the rail assembly. In one embodiment each rail subassembly includes at least one straight section and optionally at least one curved or corner section, which is designed to accommodate a change in direction of a staircase. This is to say that the modular rail assembly can follow the path of a staircase that includes a ninety degree turn or a one hundred eighty degree turn or any other variation of turn in the staircase. The chair is arranged to engage with the two rail subassemblies and traverse the modular rail assembly to move a user between the bottom and top of the staircase.

In one embodiment, the modular rail assembly includes a plurality of engageable disks that are positioned proximate to each other to form a corner rail segment. Such corner rail segments provide the type of modularity that accommodates a variety of staircase configurations. Each disc includes a protrusion on a first side and a slot on a second, opposite side. The protrusion and slot are designed such that the protrusion slides into and engages the slot to secure the pair of discs together and restrain rotation or other movement of the discs relative to one another. The first side and second side of each disc are set such that planes passing along the first side and second side are positioned at an angle to one another. In one specific example, the planes are set at a five degree angle to each other. Thus as a plurality of discs are assembled to form a corner rail segment, the degree of bend of the corner segment will be determined by the number of discs used. The greater the number of discs used, the greater the degree of bend of the corner rail segment.

The corner rail segment further includes a coupling component on each end of the corner rail segment that completes the corner rail segment. Such coupling components includes either a protrusion or a slot on one side, to facilitate engagement with an adjacent disc, and a collar on the opposite side that facilitates coupling the corner rail segment to an adjacent component of the modular rail assembly, such as a straight rail segment. Furthermore, the discs and coupling components can each include an aperture that is arranged to align when the corner rails segment is assembled. Such alignment of apertures form a channel through the corner rail segment that accommodates a cable used to further secure and stabilize the corner rail segment. In another embodiment, the cable can be used to secure and stabilize all the components of a rail subassembly.

In an embodiment of a stair lift system designed for installation in existing straight stairways and staircases, the system includes a chair assembly, a chassis assembly, and a straight rail assembly. The straight rail assembly is secured to the treads of the staircase and the system is installed without the use of multiple rail assemblies. The chair assembly is secured to the straight rail assembly by the chassis. The straight rail can include one of a number of novel profiles and the stair lift system includes a novel drive mechanism. In one embodiment, the chassis includes a friction drive system that interfaces with the rail to propel the chair along the rail. In another embodiment, the chassis includes a rack and pinion drive system that interfaces with the rail to propel the chair along the rail.

The stair lift system can further include a sensor used to determine the direction of travel, speed, and position of the chair in real time and an emergency braking assembly that stops movement of the chair to facilitate safe use of the stair lift system. The stair lift system can further include automated mechanisms for deploying and retracting a footrest coupled to the chair, swiveling the chair to assist users in safely mounting and dismounting the chair, controlling the speed and direction of the chair, and monitoring the health and charge level of an onboard battery and charging the battery as required for effective operation of the stair lift system. The stair lift system can further include a mechanism for fine tuning the rotational position of the chair relative the ground such that during installation or after prolonged use, the chair can be adjusted so that it is level and plum to the ground.

BRIEF DESCRIPTION OF THE DRAWINGS

In the accompanying drawings, structures are illustrated that, together with the detailed description provided below, describe example embodiments of the disclosed apparatus and methods. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

Figure 173:
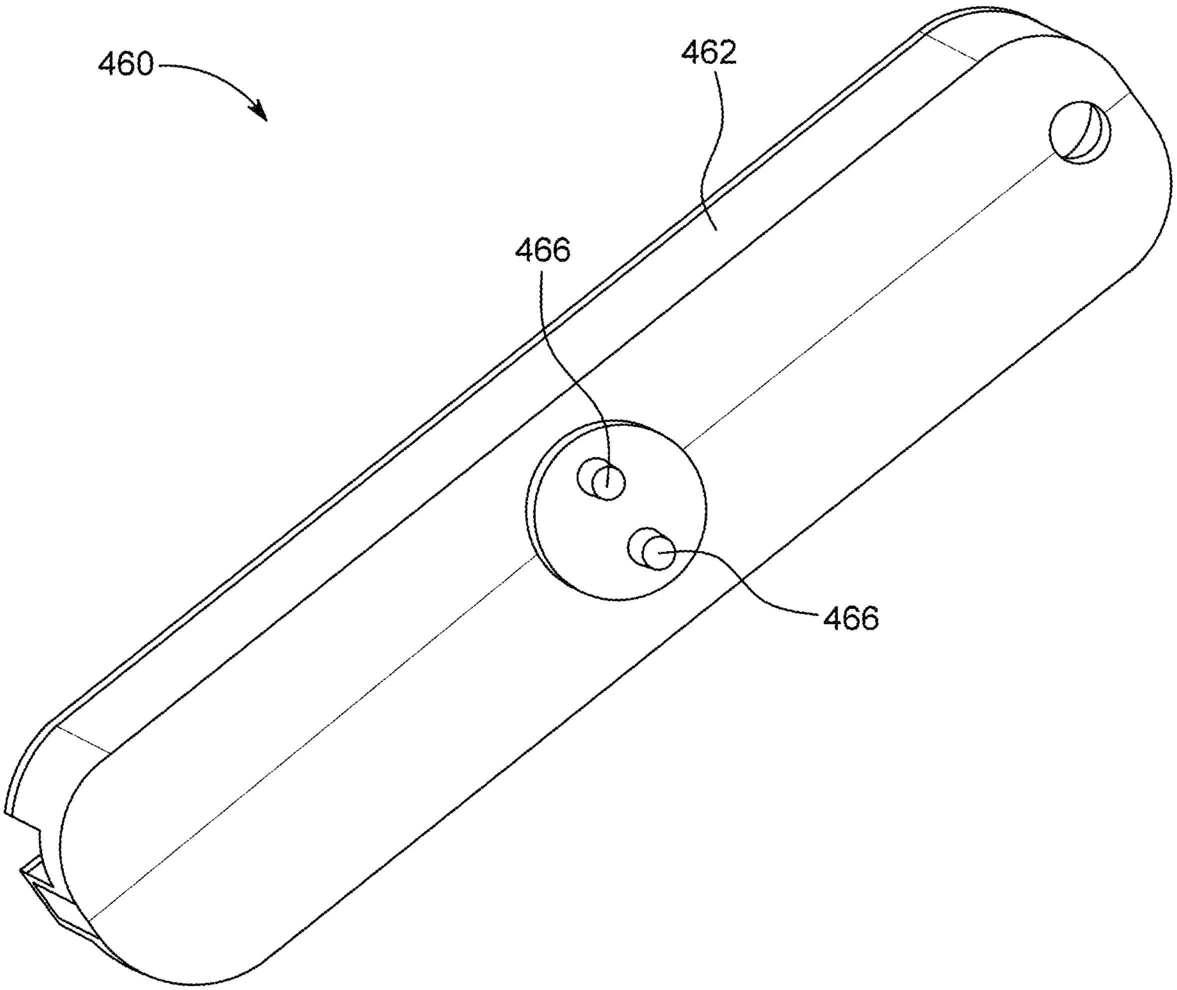

FIG. 173 schematically illustrates another perspective view of the charging pad.

Figure 174:
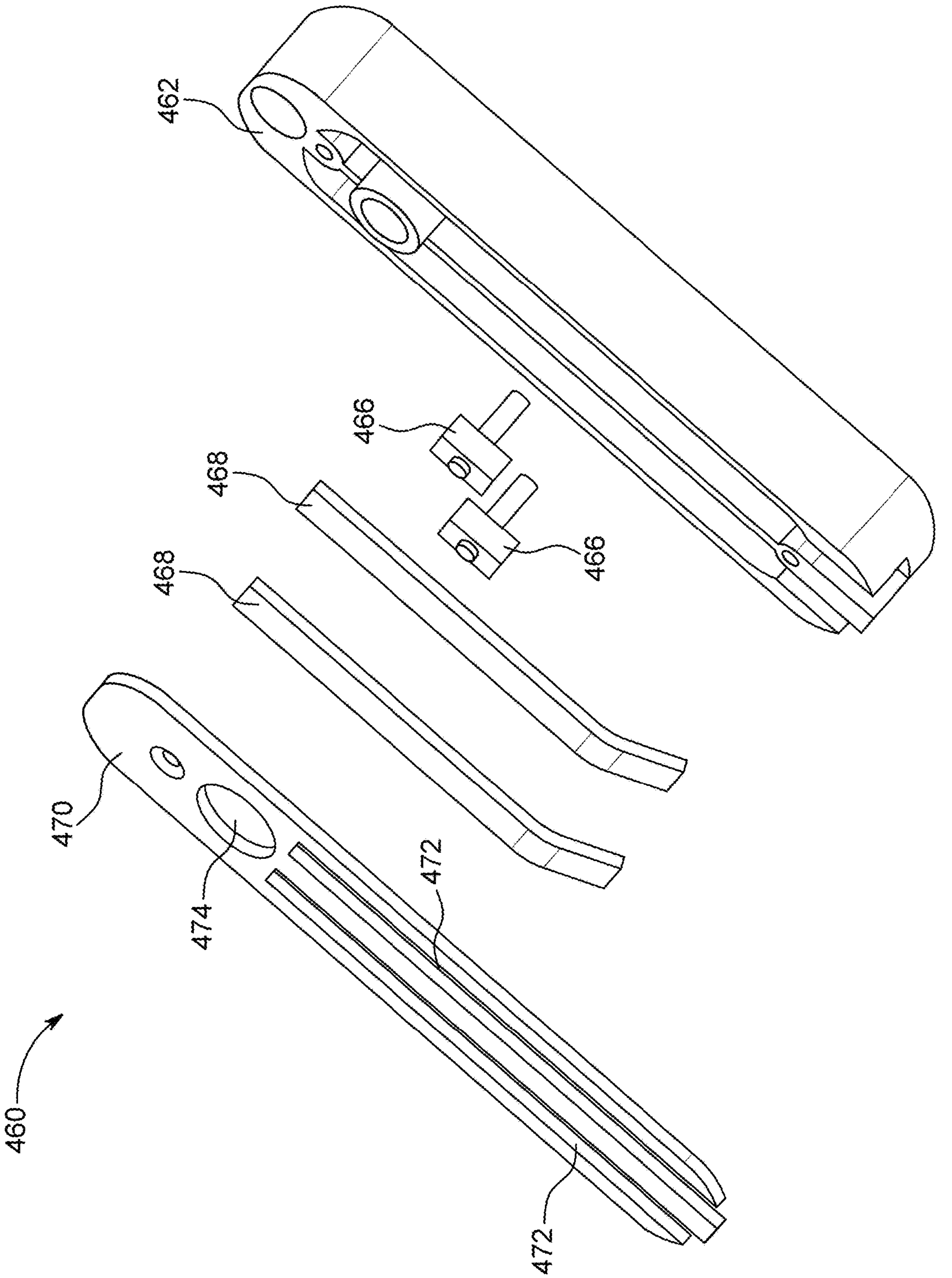

FIG. 174 schematically illustrates an exploded view of the charging pad.

Figure 175:
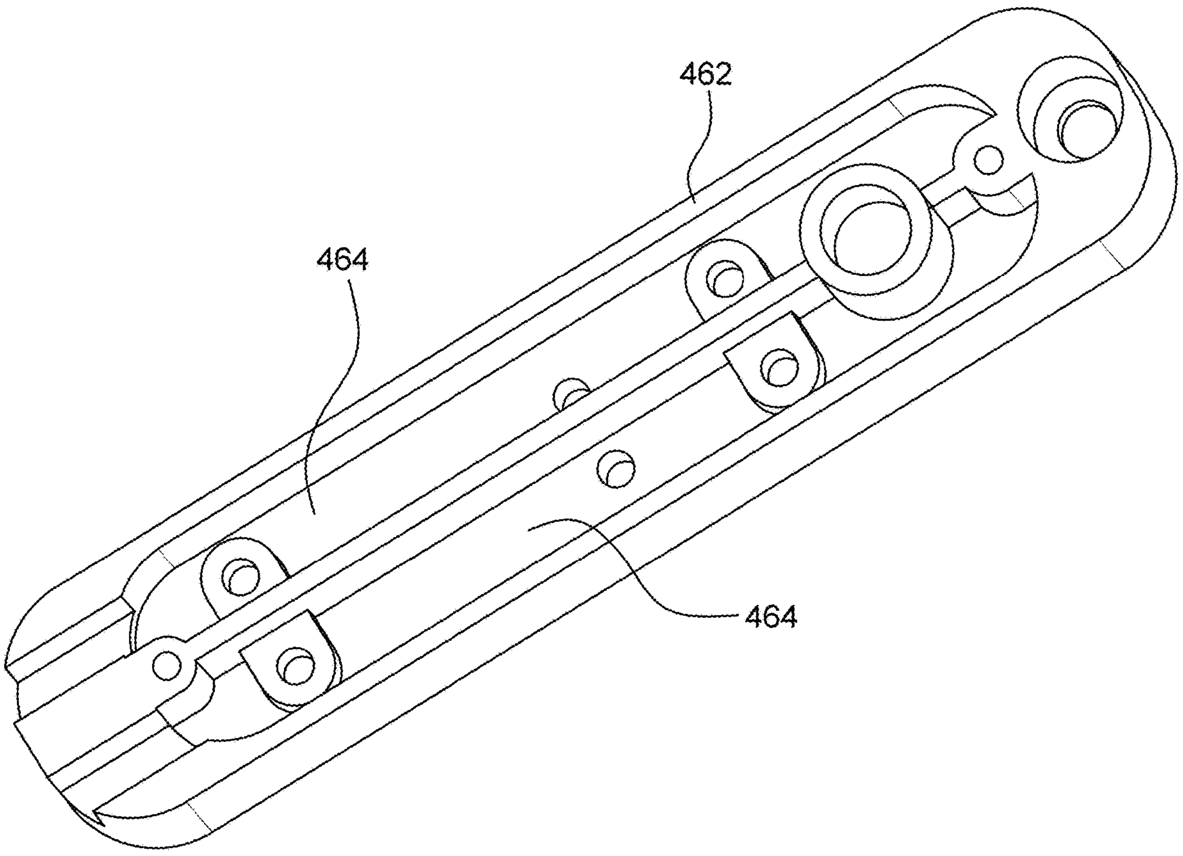

FIG. 175 schematically illustrates a perspective view of the body of the charging pad.

Figure 176:
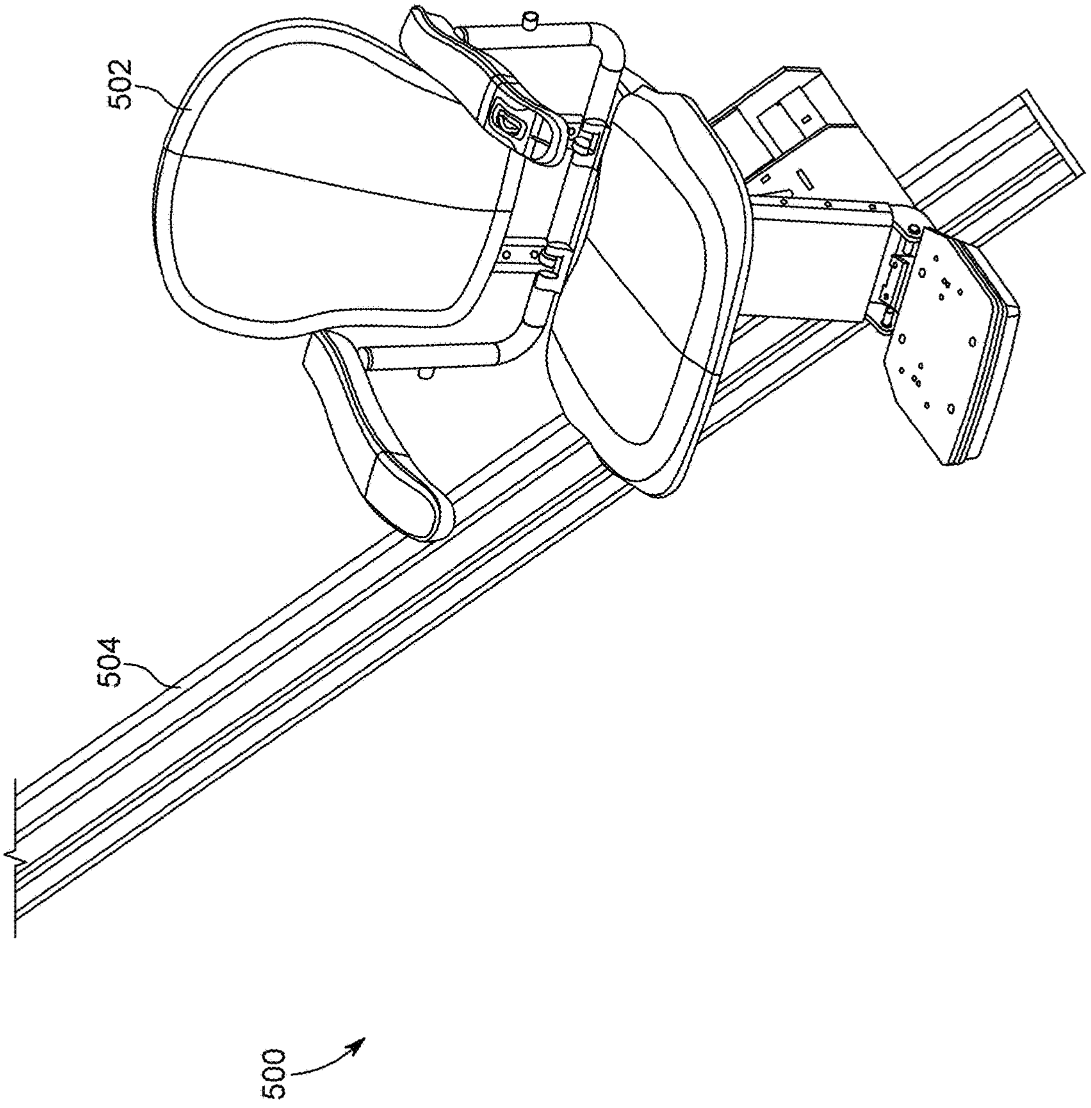

FIG. 176 schematically illustrates an embodiment of a stair lift system.

Figure 177:
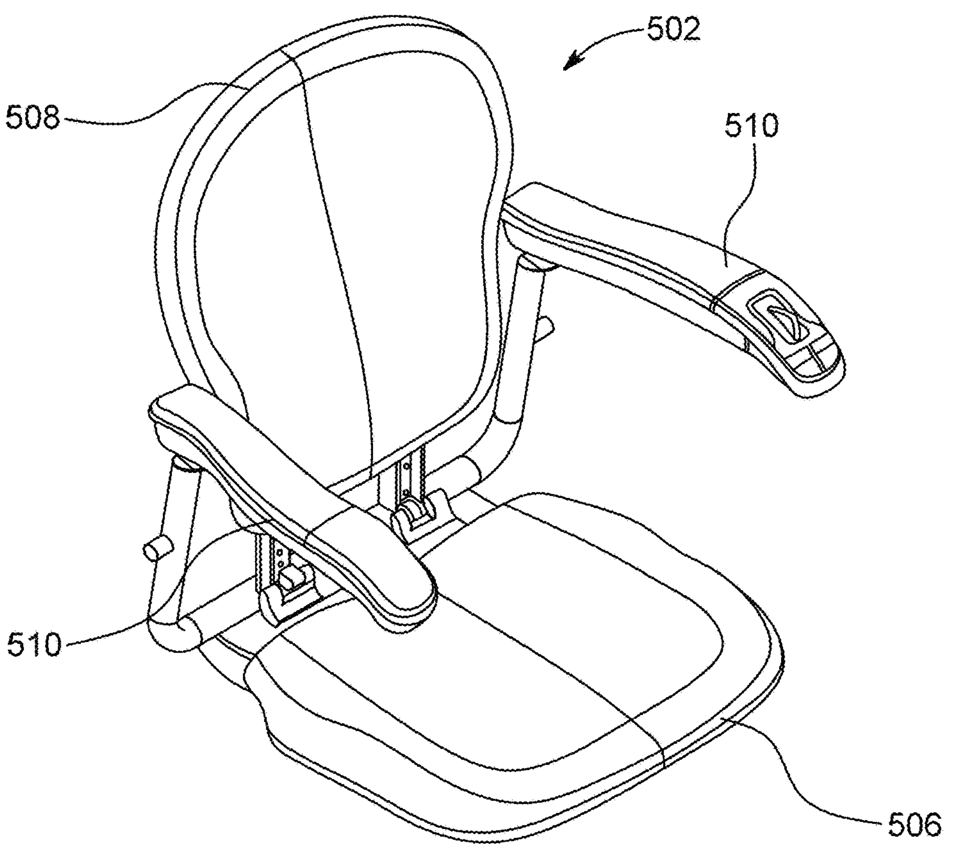

FIG. 177 schematically illustrates a perspective view of a portion of a chair for use with a stair lift system.

Figure 178:
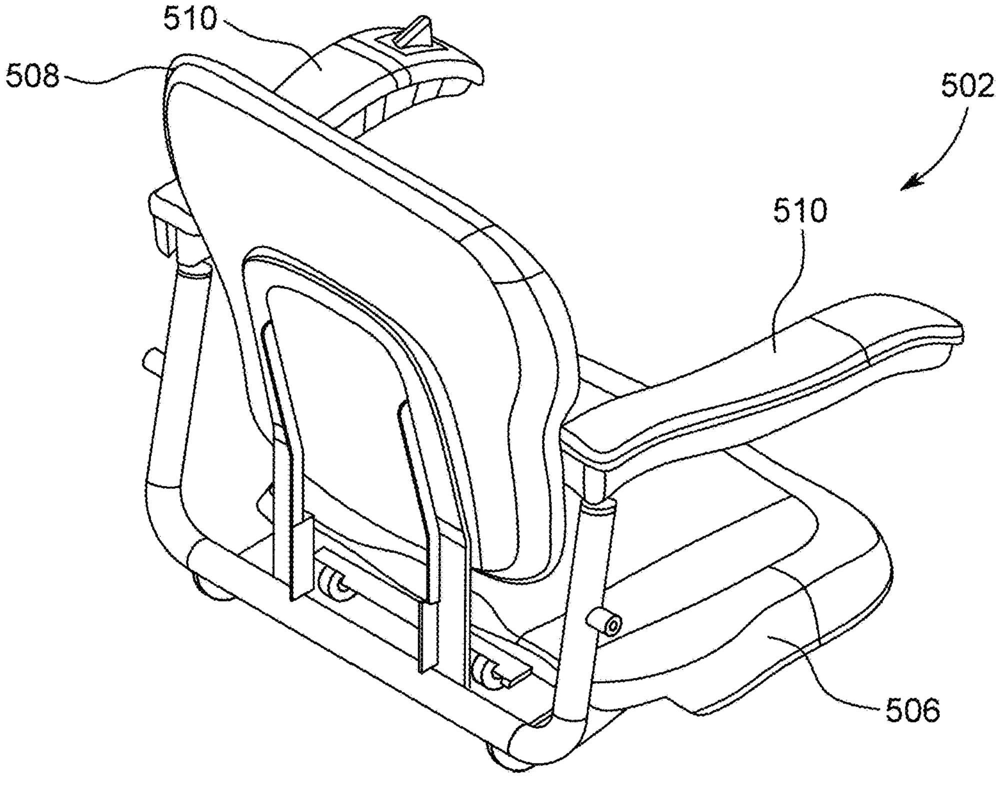

FIG. 178 schematically illustrates another perspective view of a portion of a chair for use with a stair lift system.

Figure 179:
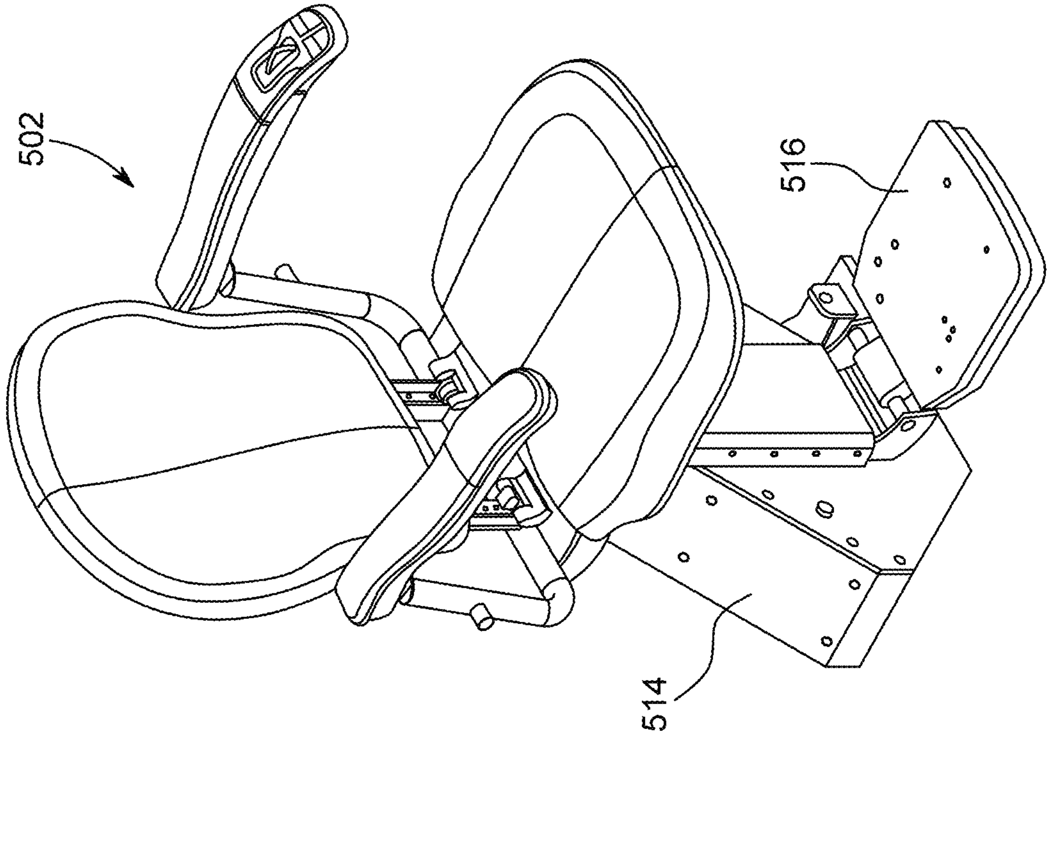

FIG. 179 schematically illustrates a perspective view of a chair and chassis for use with a stair lift system.

Figure 180:
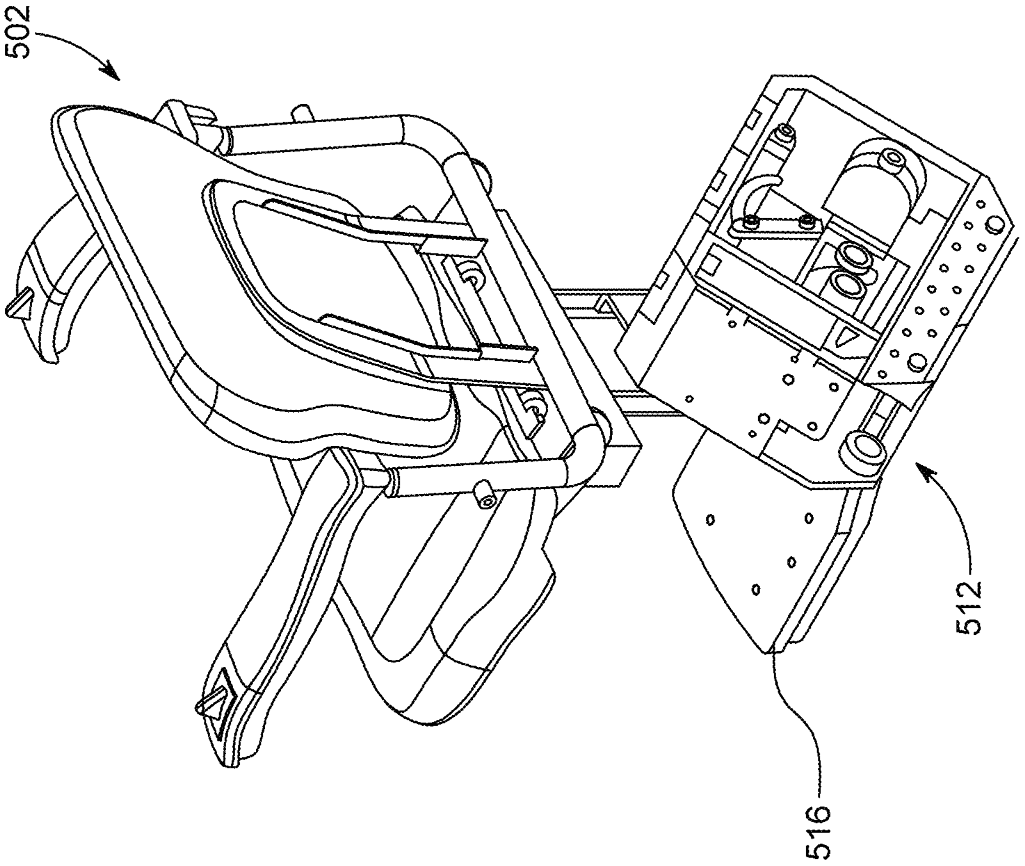

FIG. 180 schematically illustrates another perspective view of the chair and chassis for use with a stair lift system.

Figure 181:
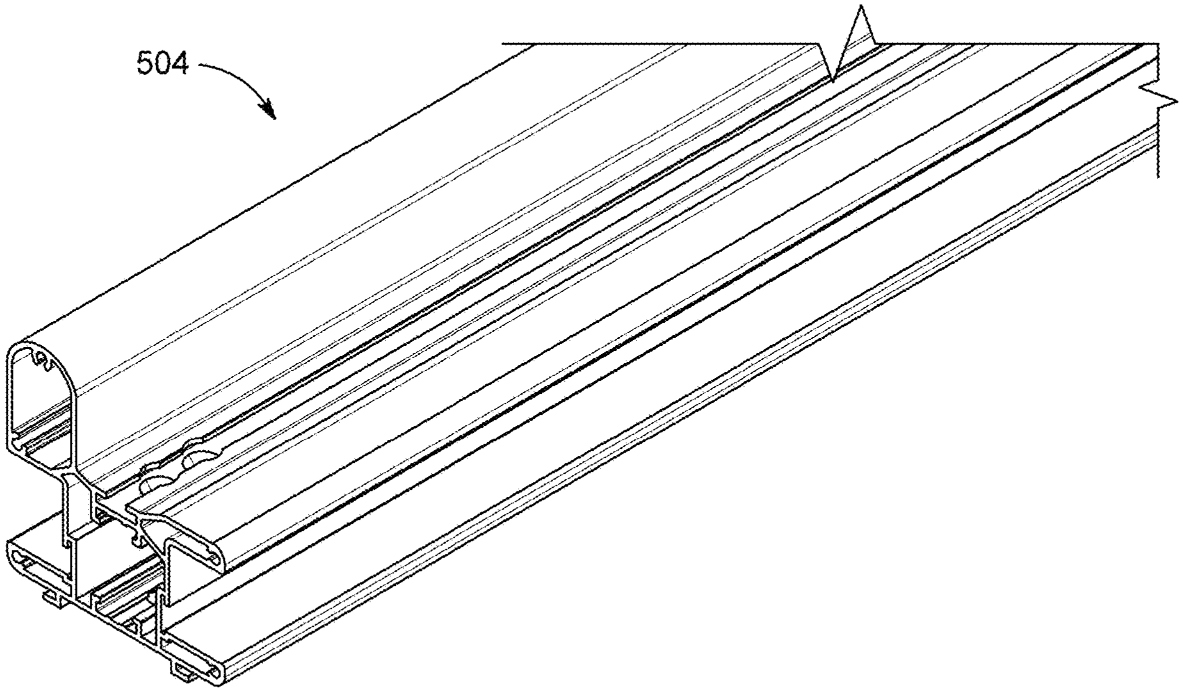

FIG. 181 schematically illustrates a perspective view of a rail for use with a stair lift system.

Figure 182:
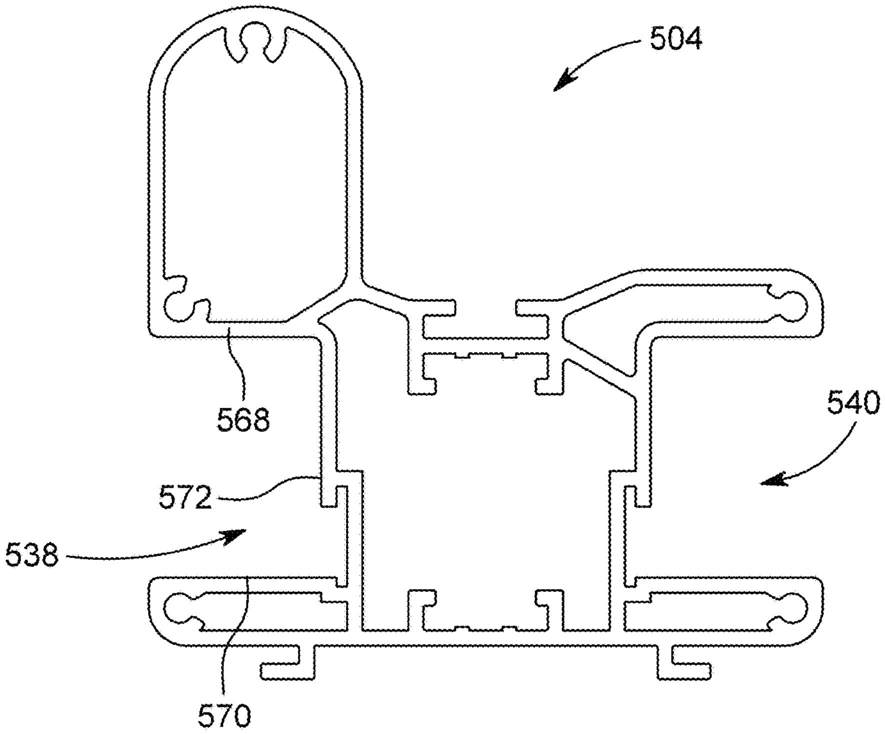

FIG. 182 schematically illustrates a side view of a rail for use with a stair lift system.

Figure 183:
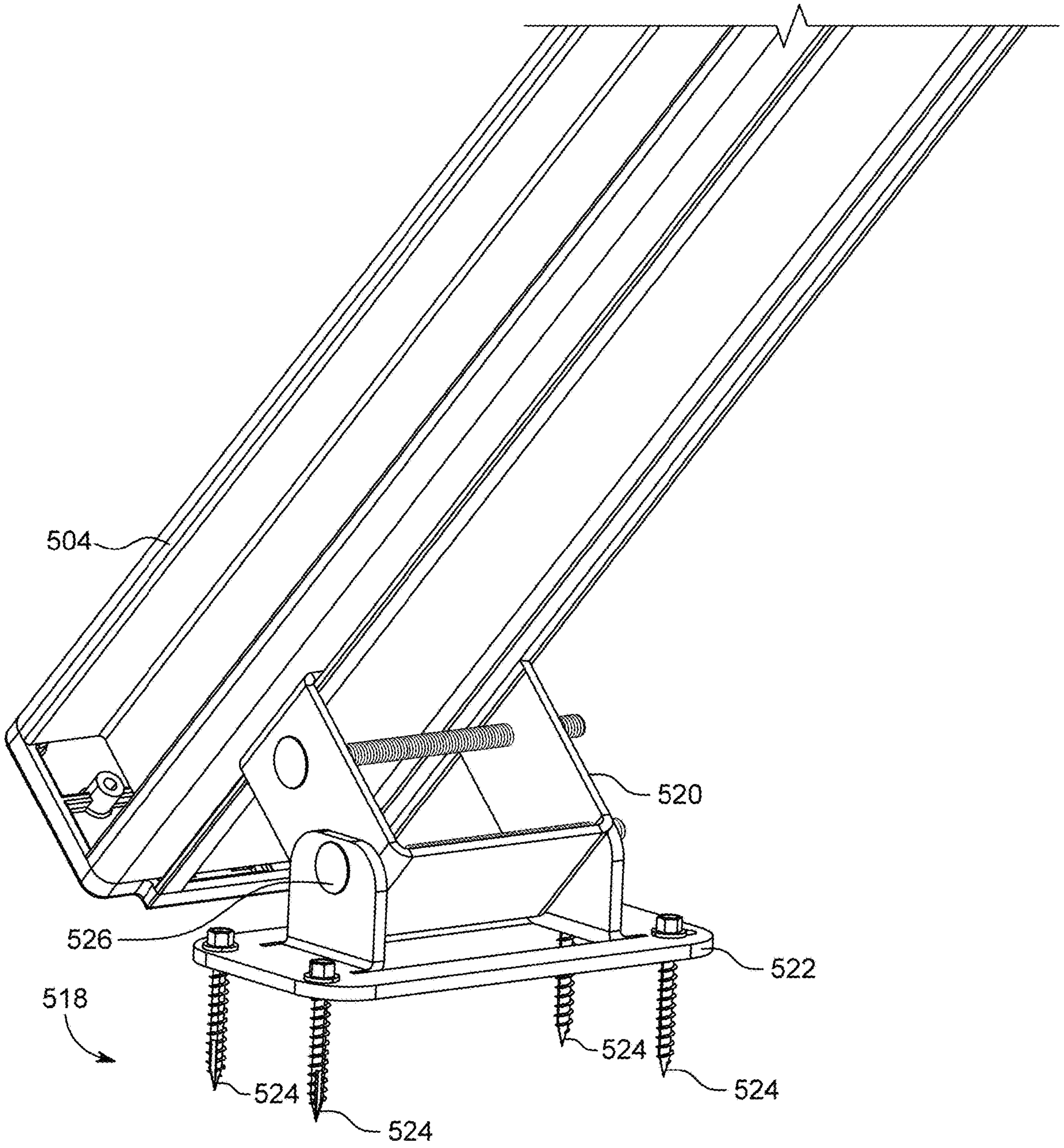

FIG. 183 schematically illustrates a perspective view of a bracket assembly for securing a stair lift system to the treads of a staircase.

Figure 184:
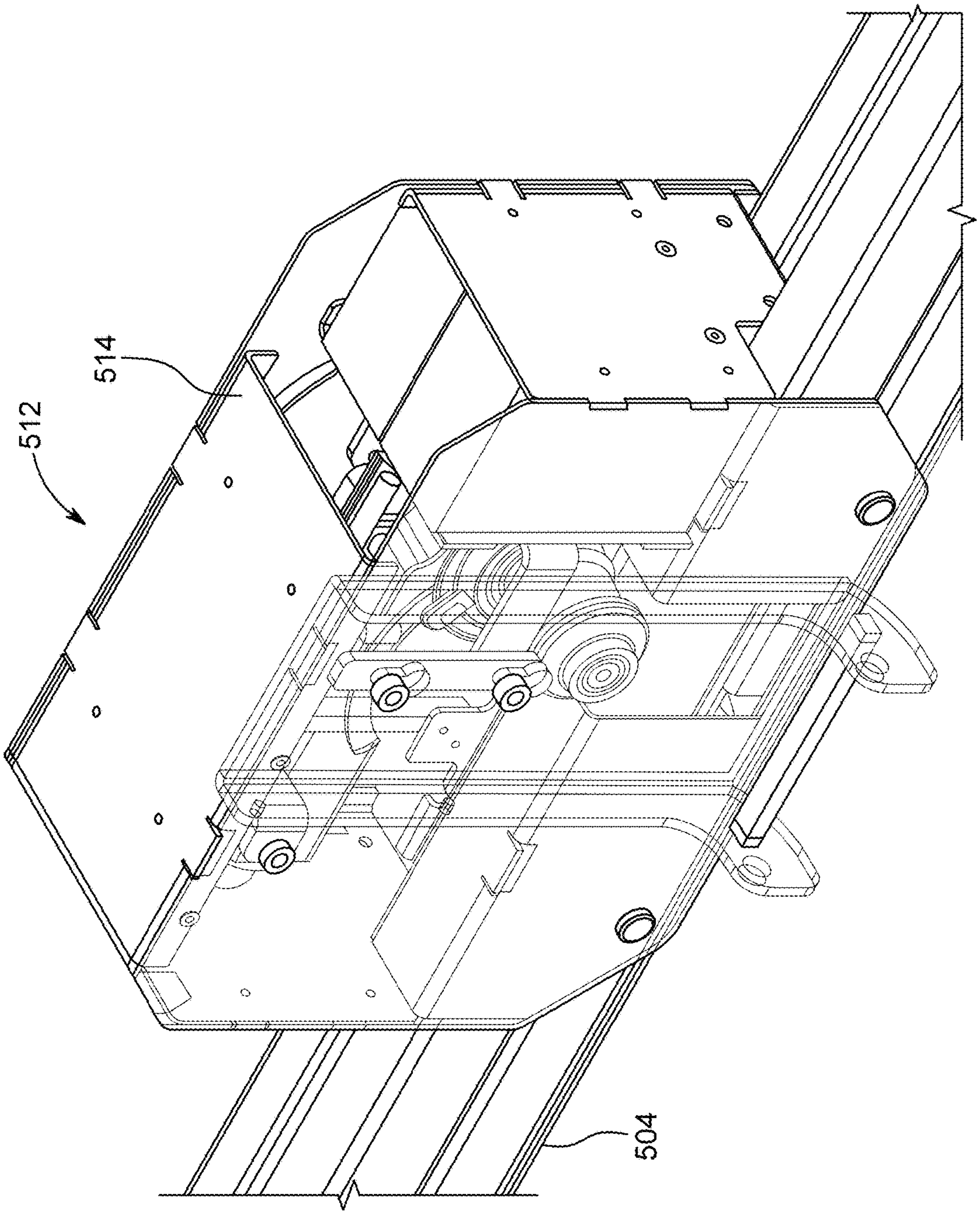

FIG. 184 schematically illustrates a perspective view of a chassis attached to a rail for use with a stair lift system.

Figure 185:
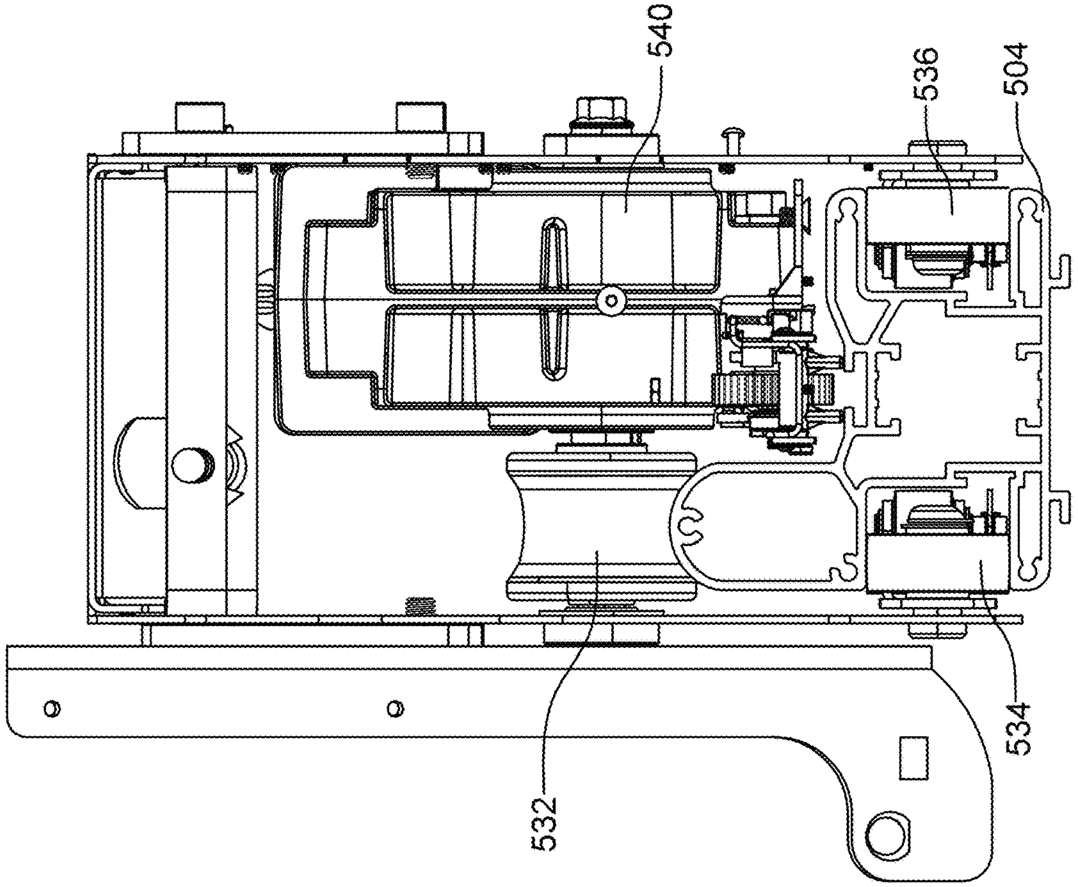

FIG. 185 schematically illustrates a side view of a chassis attached to a rail for use with a stair lift system.

Figure 186:
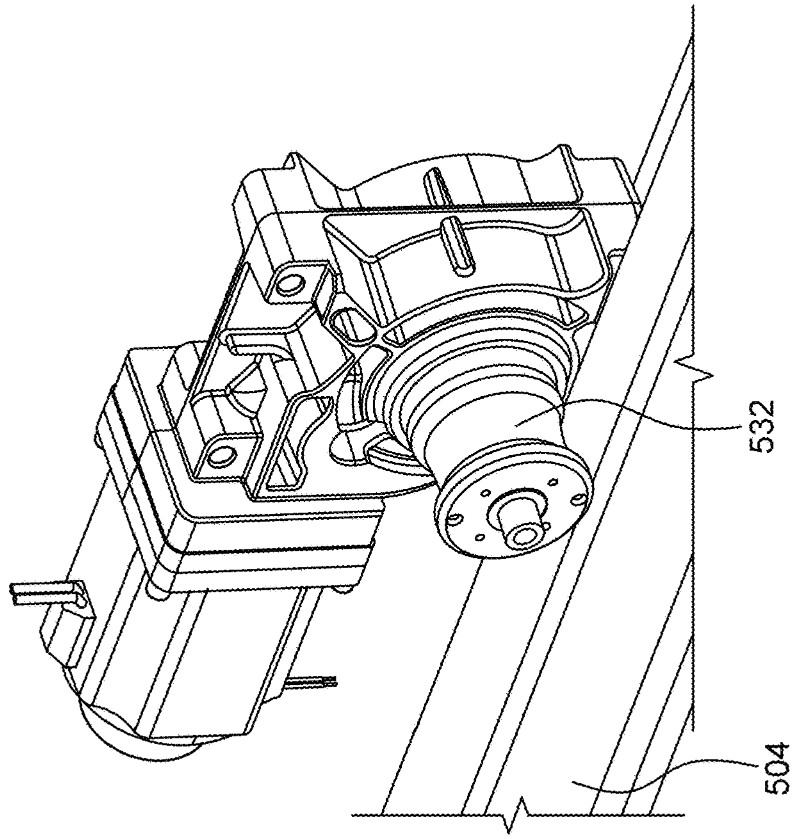

FIG. 186 schematically illustrates another perspective view of a chassis attached to a rail for use with a stair lift system.

Figure 187:
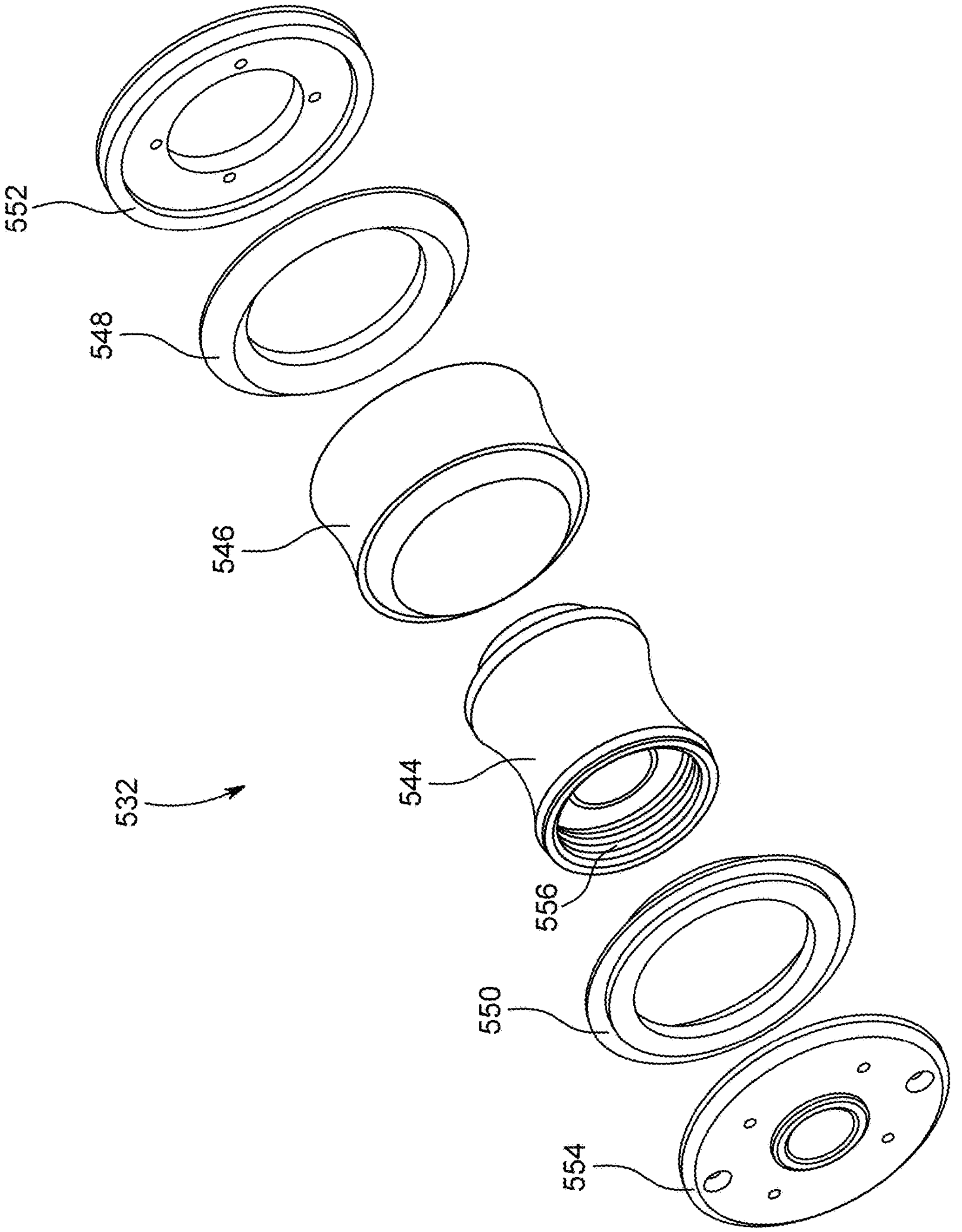

FIG. 187 schematically illustrates an exploded view of an upper roller assembly for use with a stair lift system.

Figure 188:
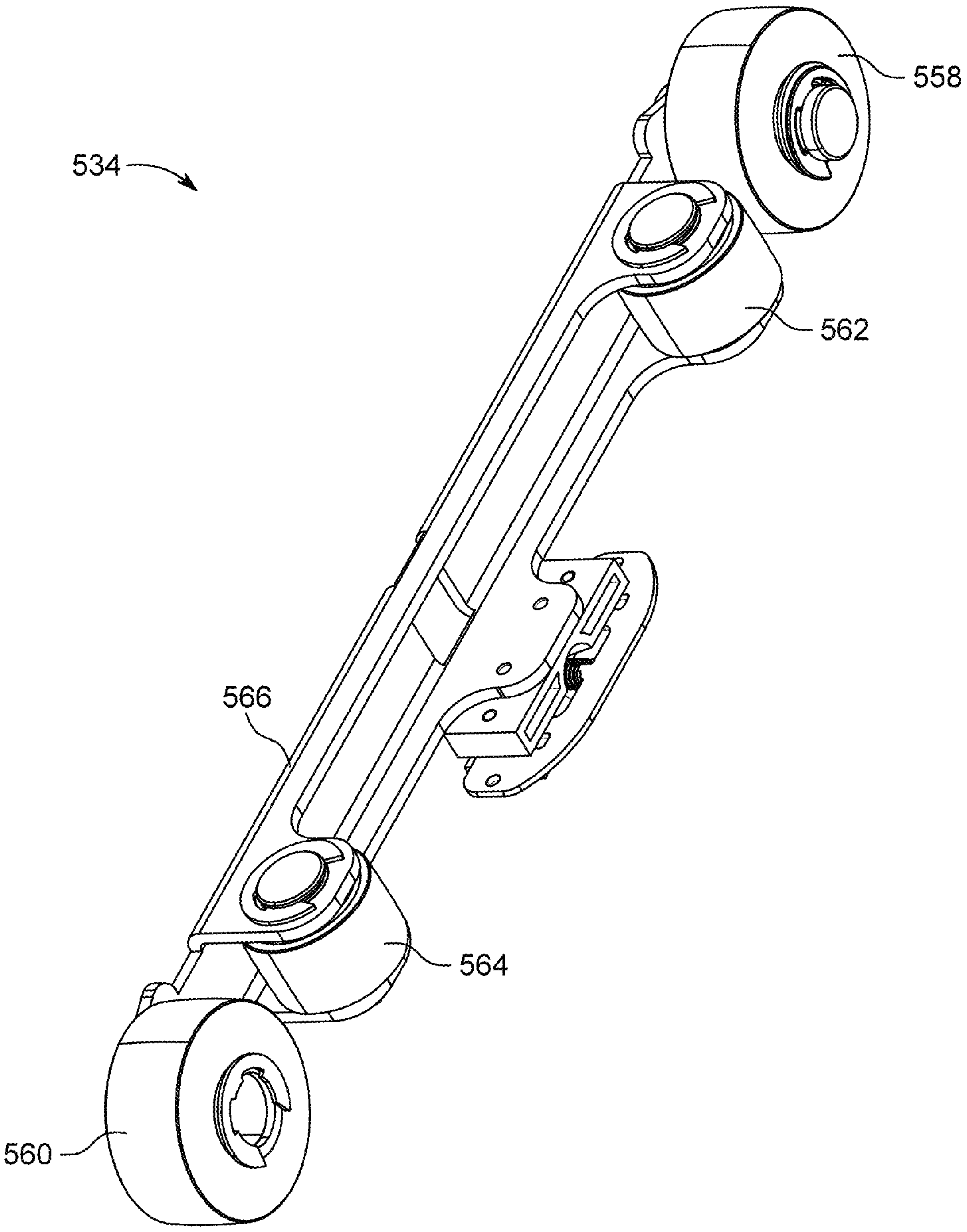

FIG. 188 schematically illustrates a perspective view of a lower roller assembly for use with a stair lift system.

Figure 189:
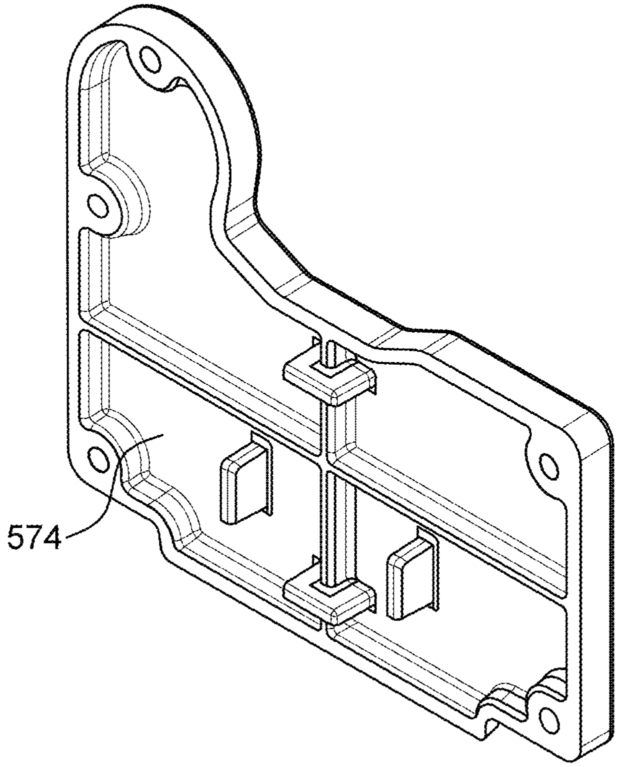

FIG. 189 schematically illustrates a perspective view of an end cap for use with a rail.

Figure 190:
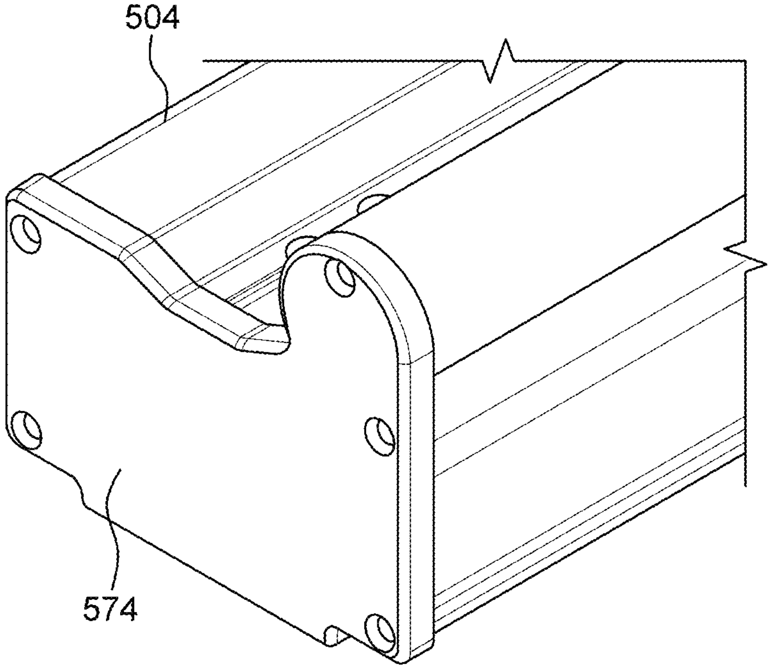

FIG. 190 schematically illustrates a perspective view of an end cap secured to the end of a rail.

Figure 191:
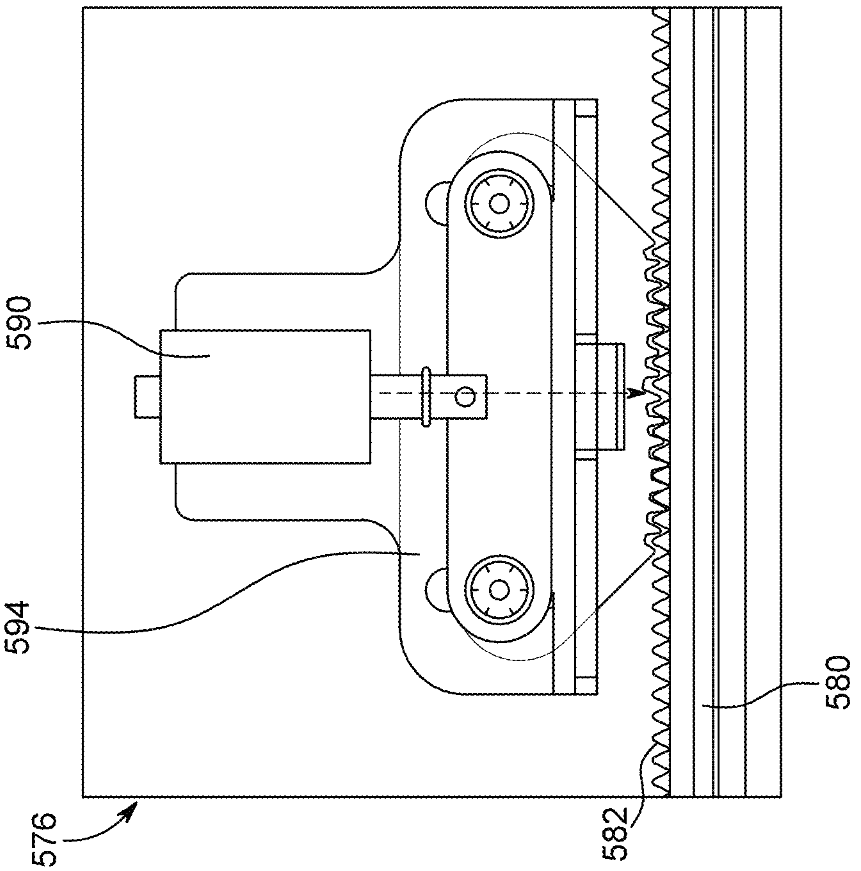

FIG. 191 schematically illustrates an emergency brake assembly engaged.

Figure 192:
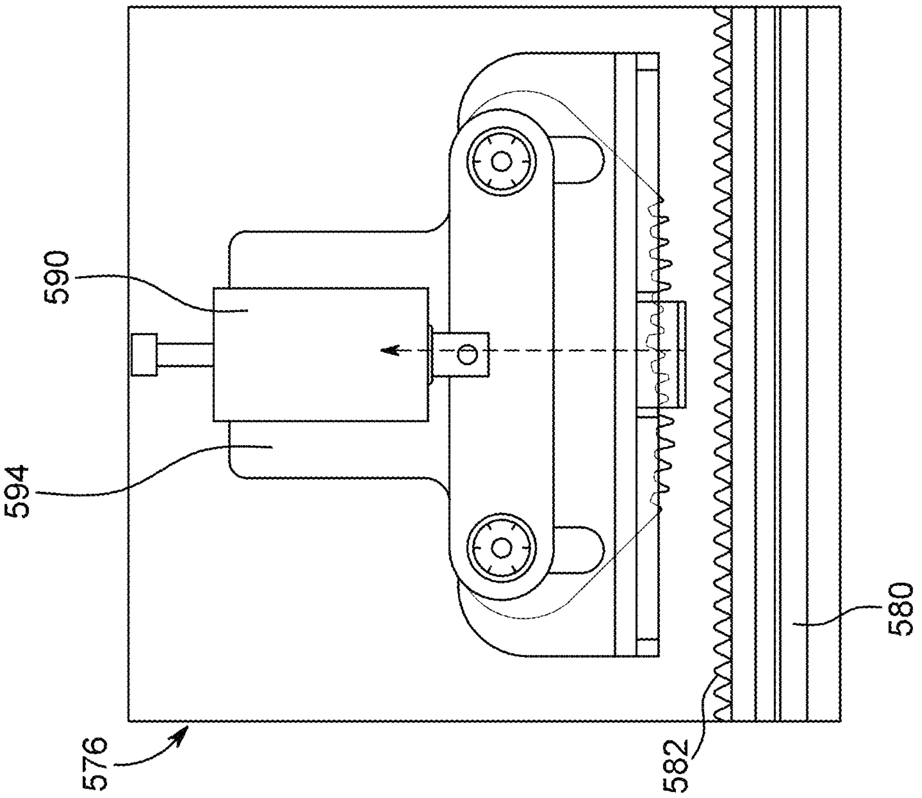

FIG. 192 schematically illustrates an emergency brake assembly disengaged.

Figure 193:
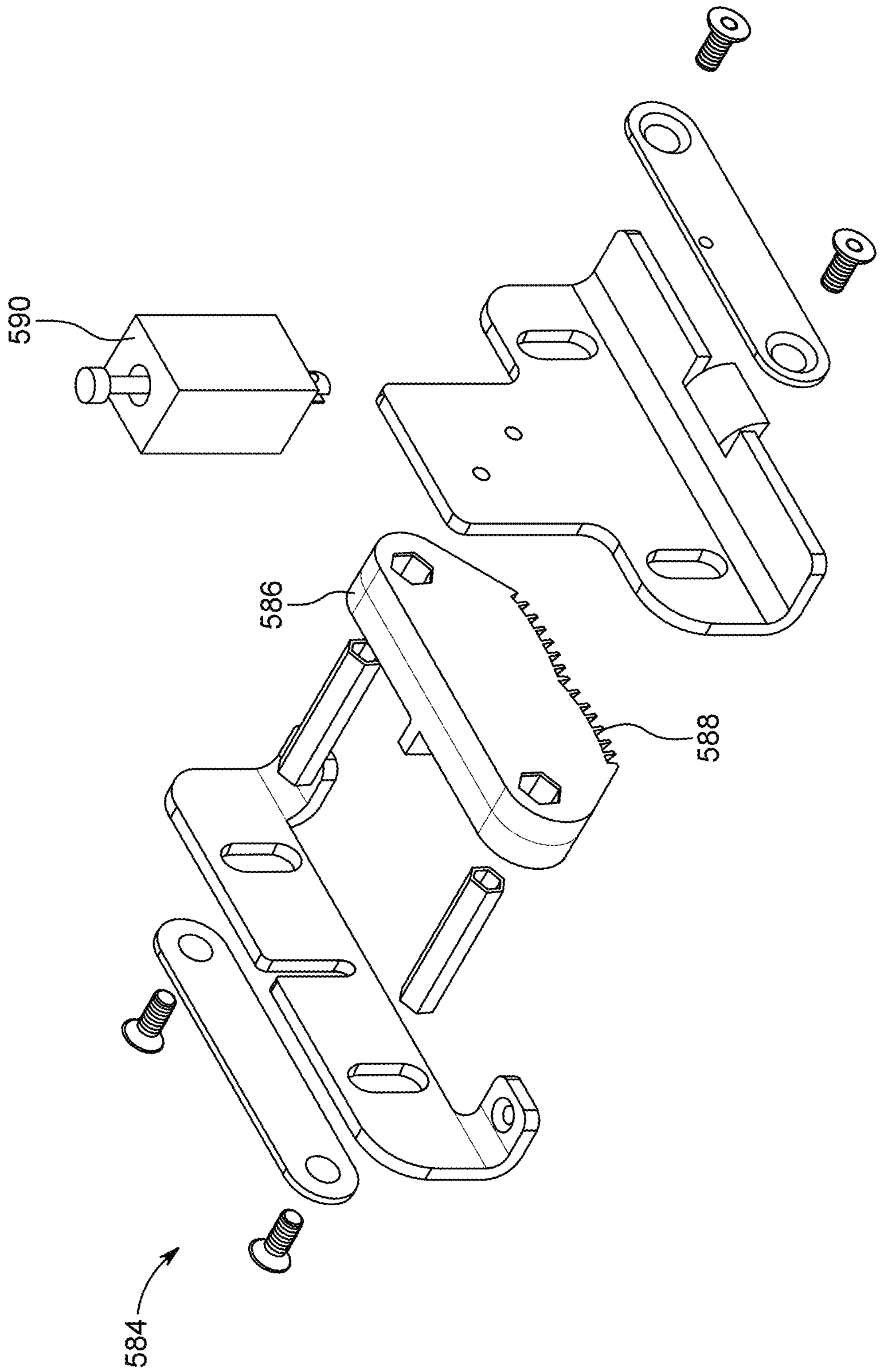

FIG. 193 schematically illustrates an exploded view of a portion of an emergency brake assembly for use with a stair lift system.

Figure 194:
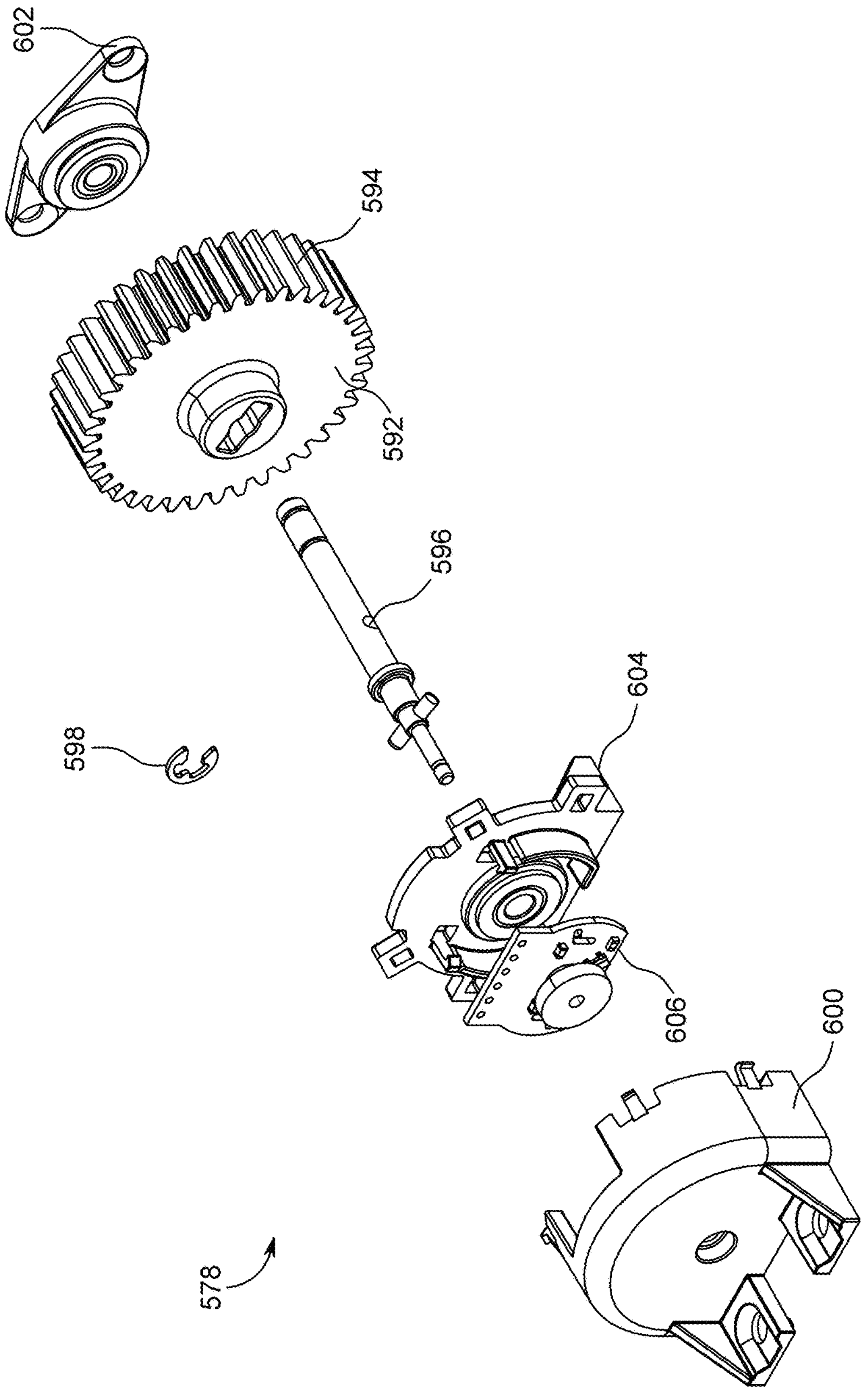

FIG. 194 schematically illustrates an exploded view of a position sensor for use with a stair lift system.

Figure 195:
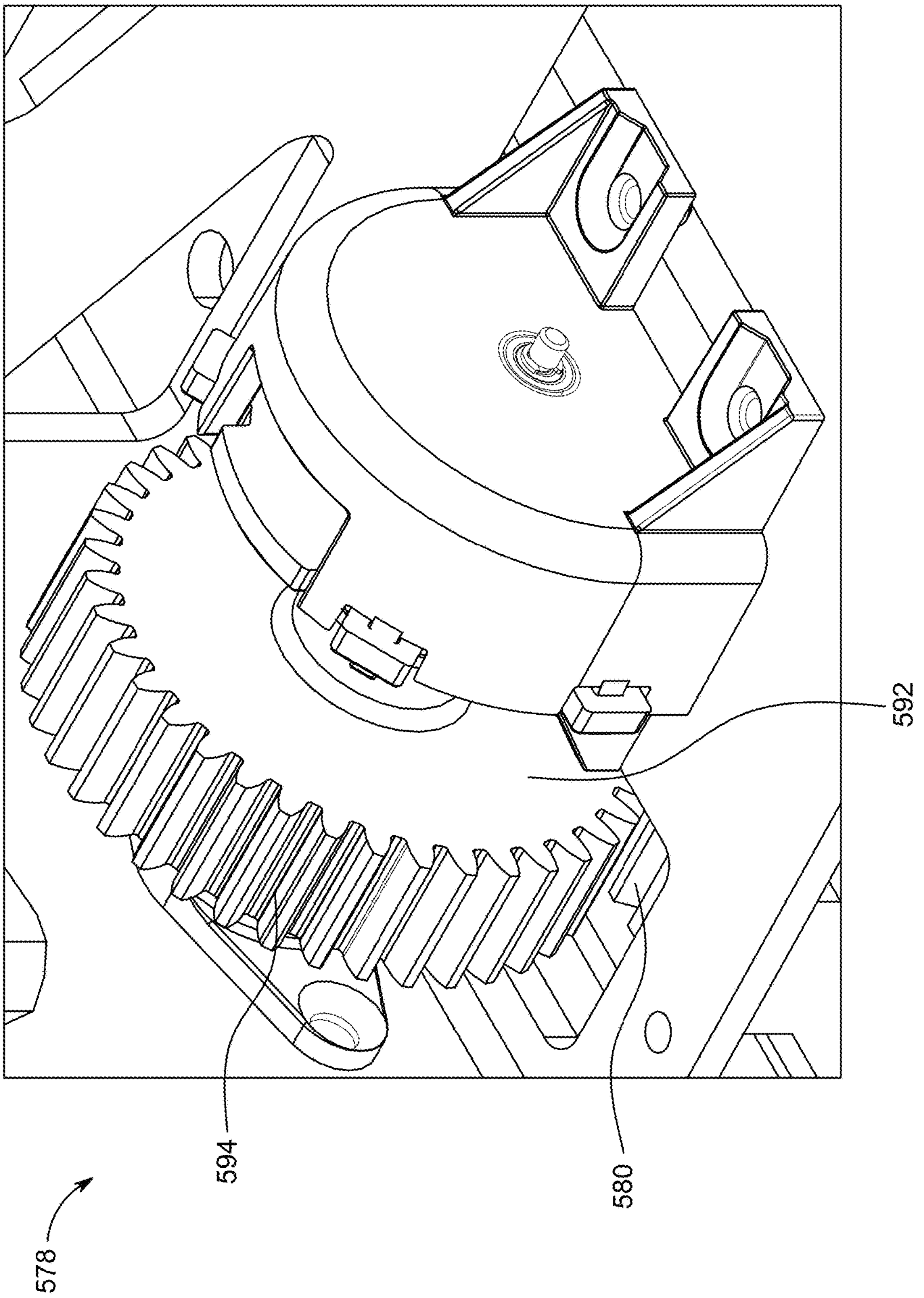

FIG. 195 schematically illustrates a perspective view of the position sensor assembled with the stair lift system.

Figure 196:
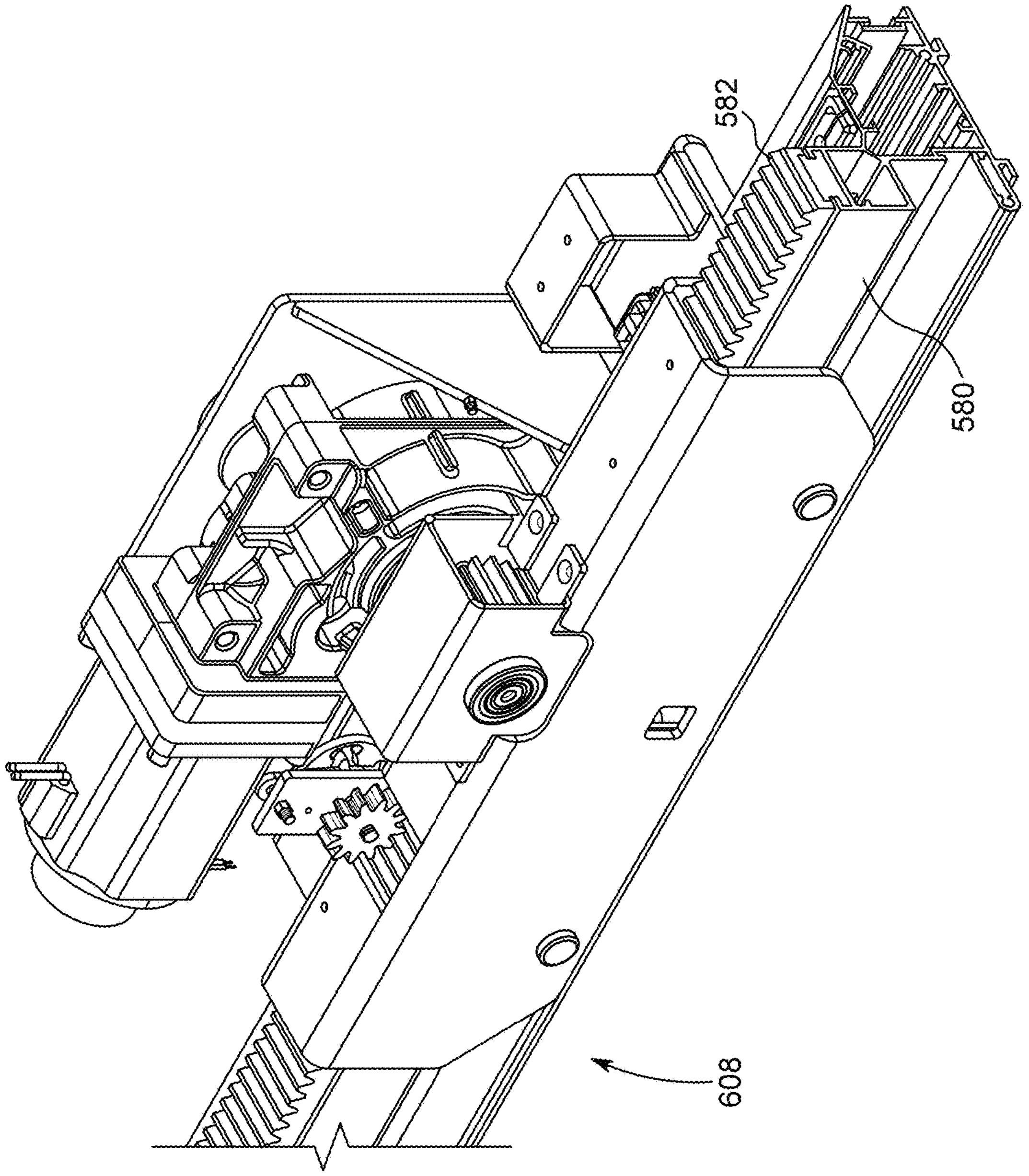

FIG. 196 schematically illustrates another embodiment of an emergency braking system for use with a stair lift system.

Figure 197:
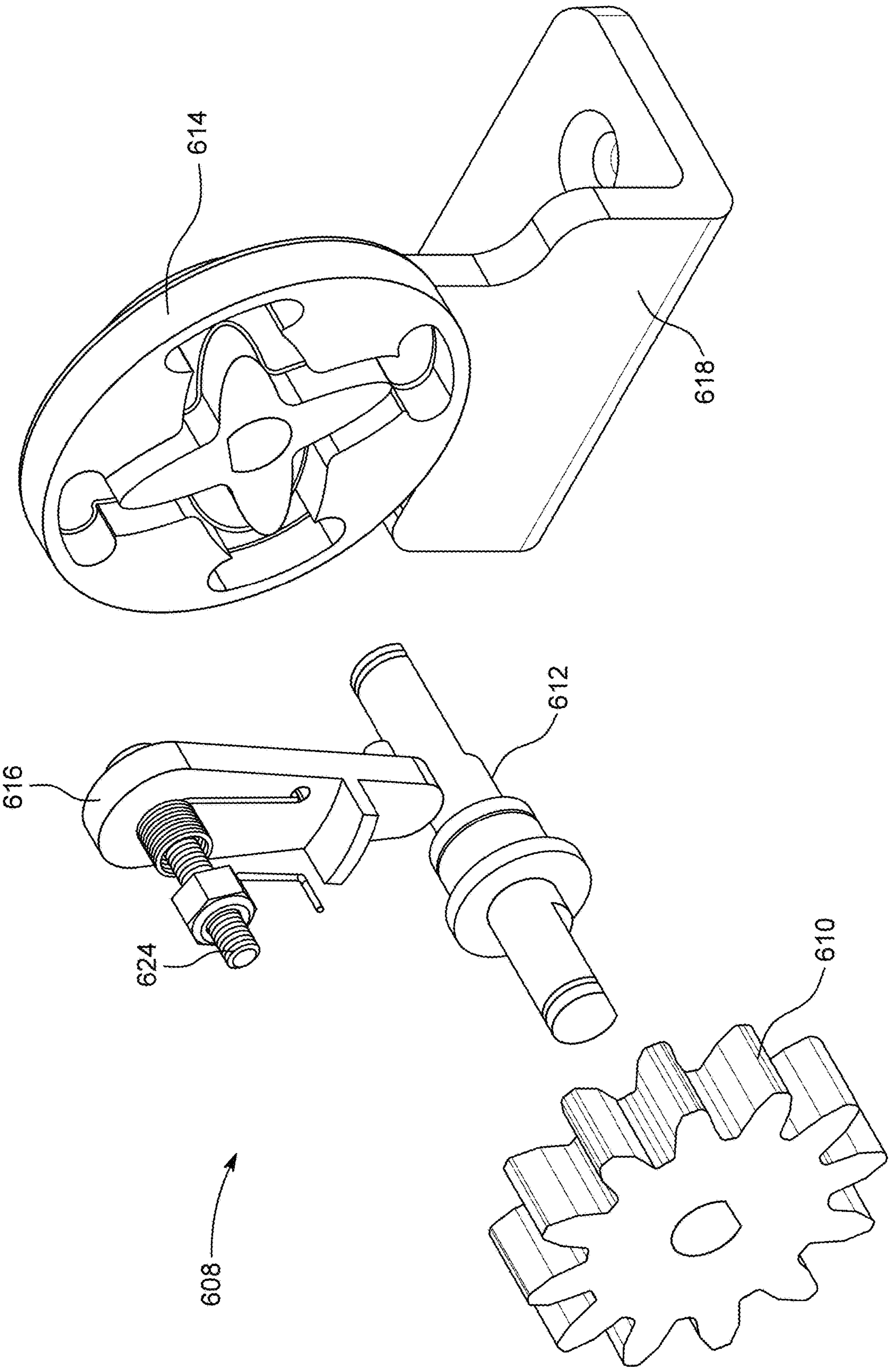

FIG. 197 schematically illustrates an exploded view of the emergency braking system of FIG. 196.

Figure 198:
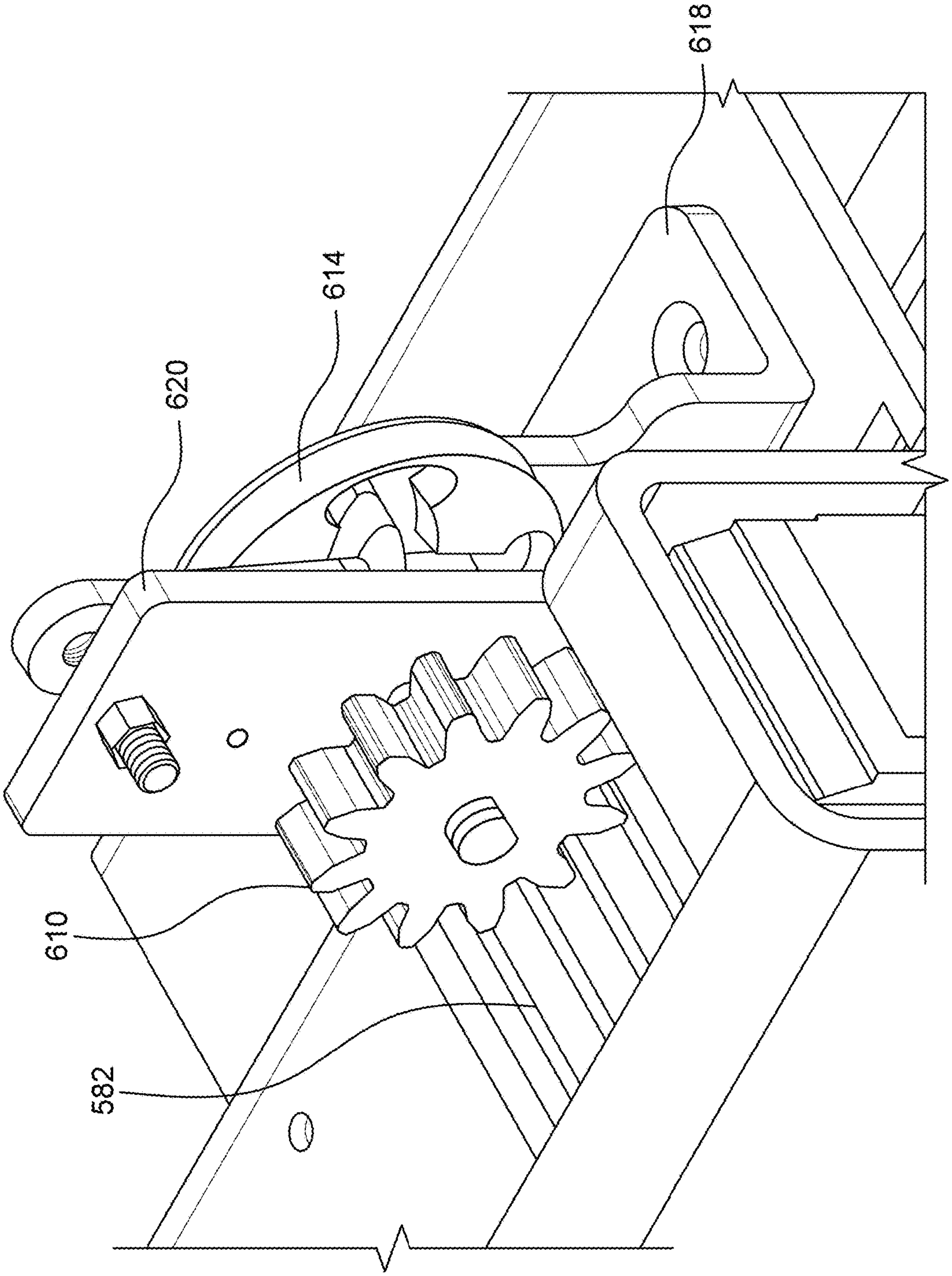

FIG. 198 schematically illustrates an enhanced view of the emergency braking system of FIG. 196.

Figure 199:
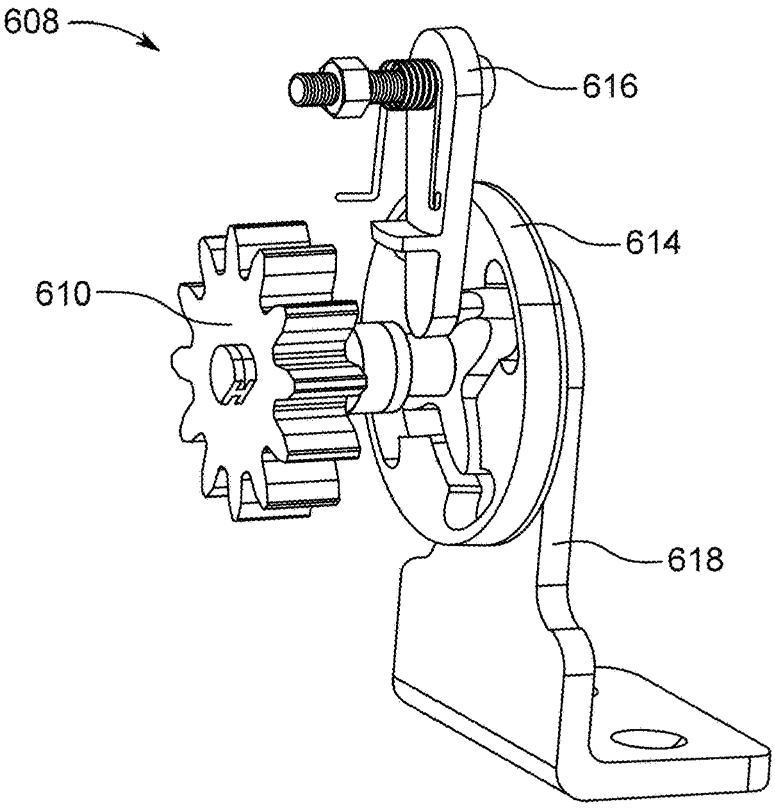

FIG. 199 schematically illustrates a perspective view of the emergency braking system of FIG. 196.

Figure 200:
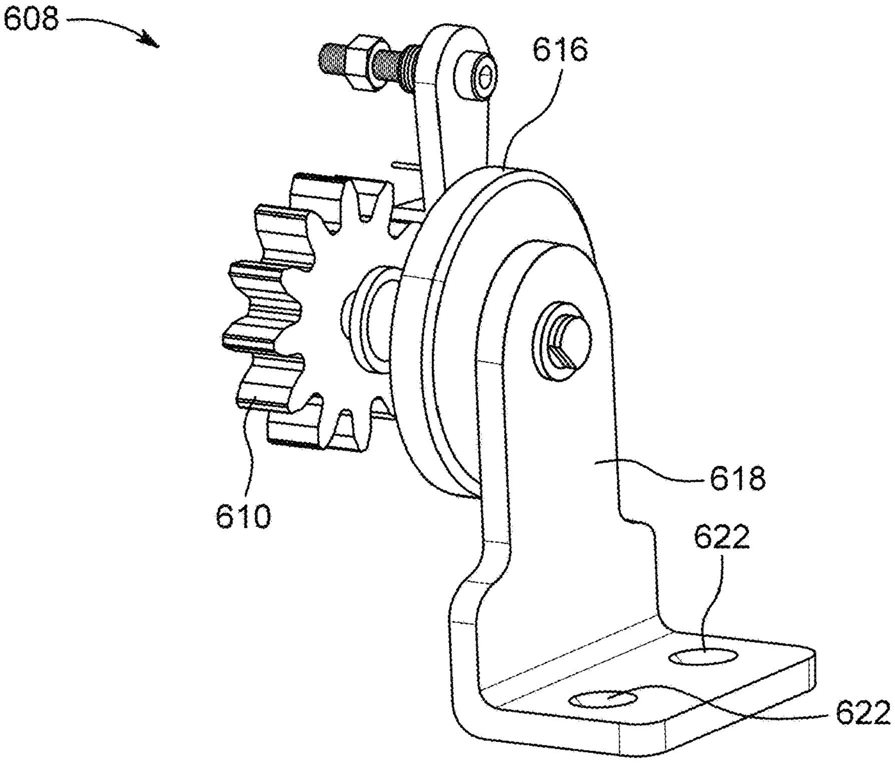

FIG. 200 schematically illustrates another perspective view of the emergency braking system of FIG. 196.

Figure 201:
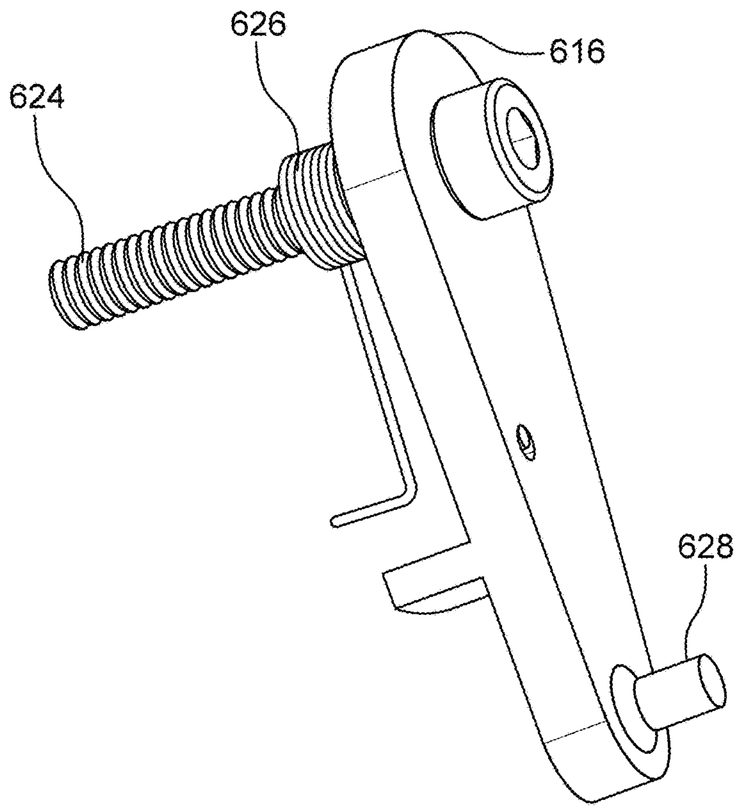

FIG. 201 schematically illustrates a perspective view of a link arm and torsion spring for use with the emergency braking system of FIG. 196.

Figure 202:
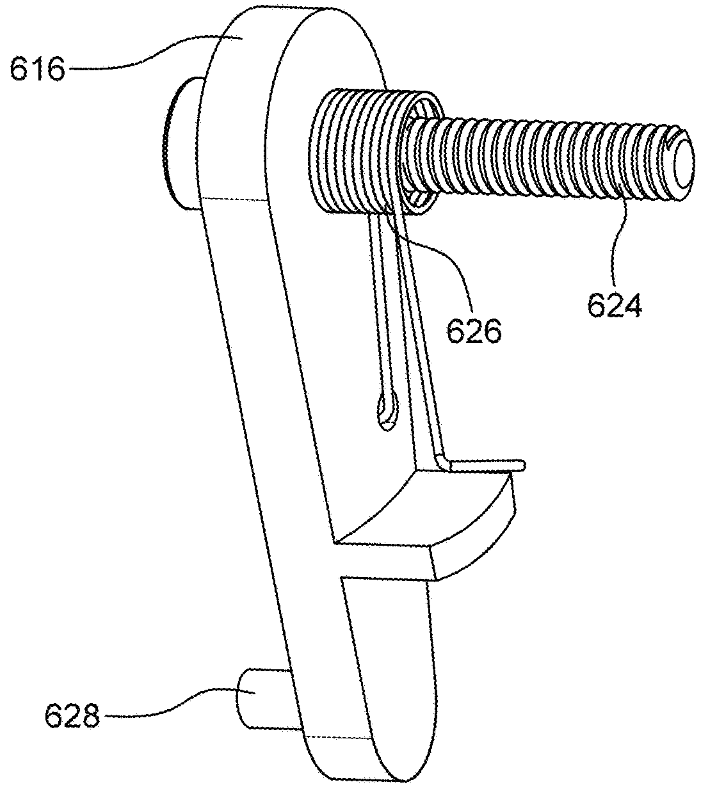

FIG. 202 schematically illustrates another perspective view of a link arm and torsion spring for use with the emergency braking system of FIG. 196.

Figure 203:
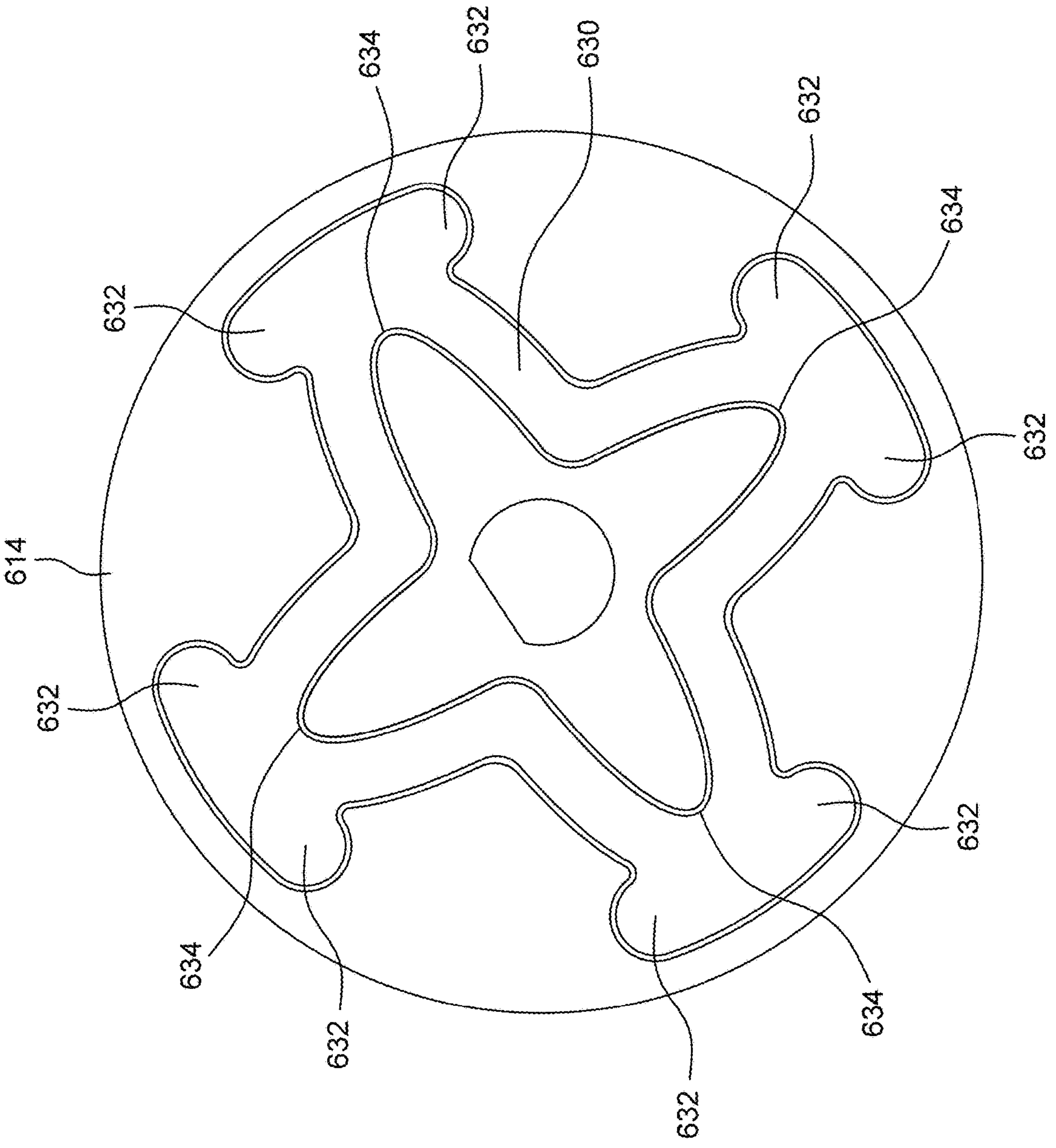

FIG. 203 schematically illustrates a front view of a flywheel for use with the emergency braking system of FIG. 196.

Figure 204:
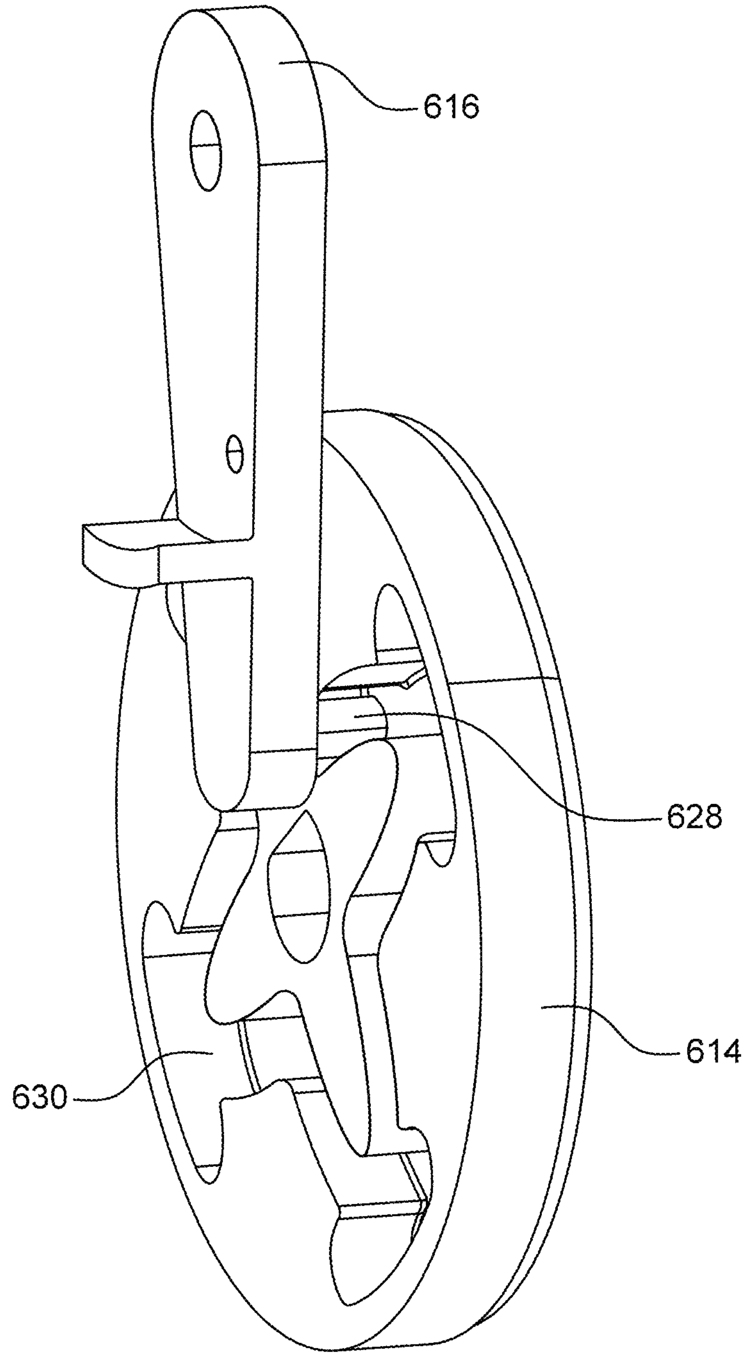

FIG. 204 schematically illustrates a perspective view of a link arm engaged with a flywheel for use with the emergency braking system of FIG. 196.

FIGS. 205-208 illustrate front views of the link arm engaged at different positions with a flywheel for use with the emergency braking system of FIG. 196

Figure 209:
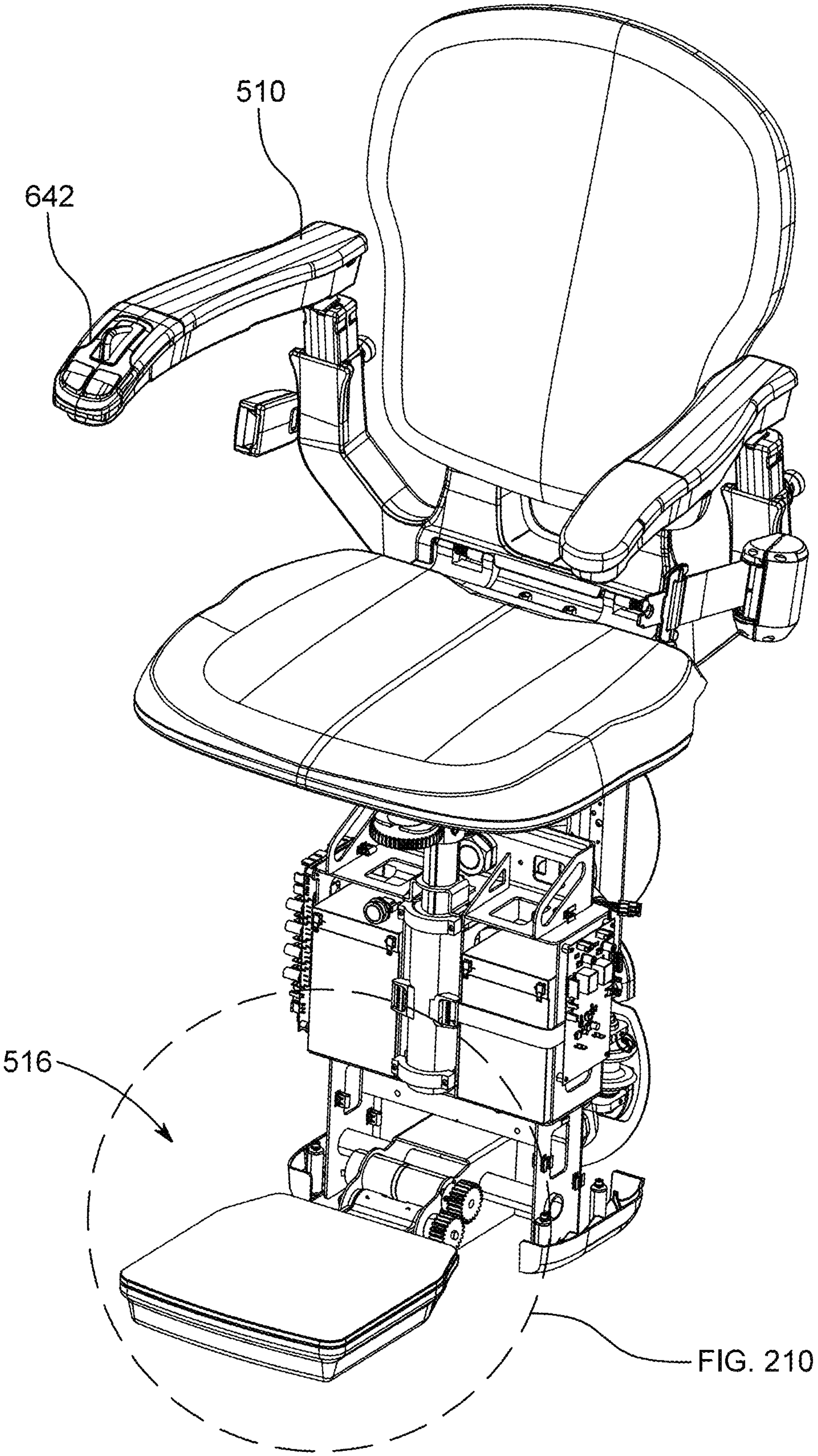

FIG. 209 schematically illustrates a perspective view of a chair for use with a stair lift system.

Figure 210:
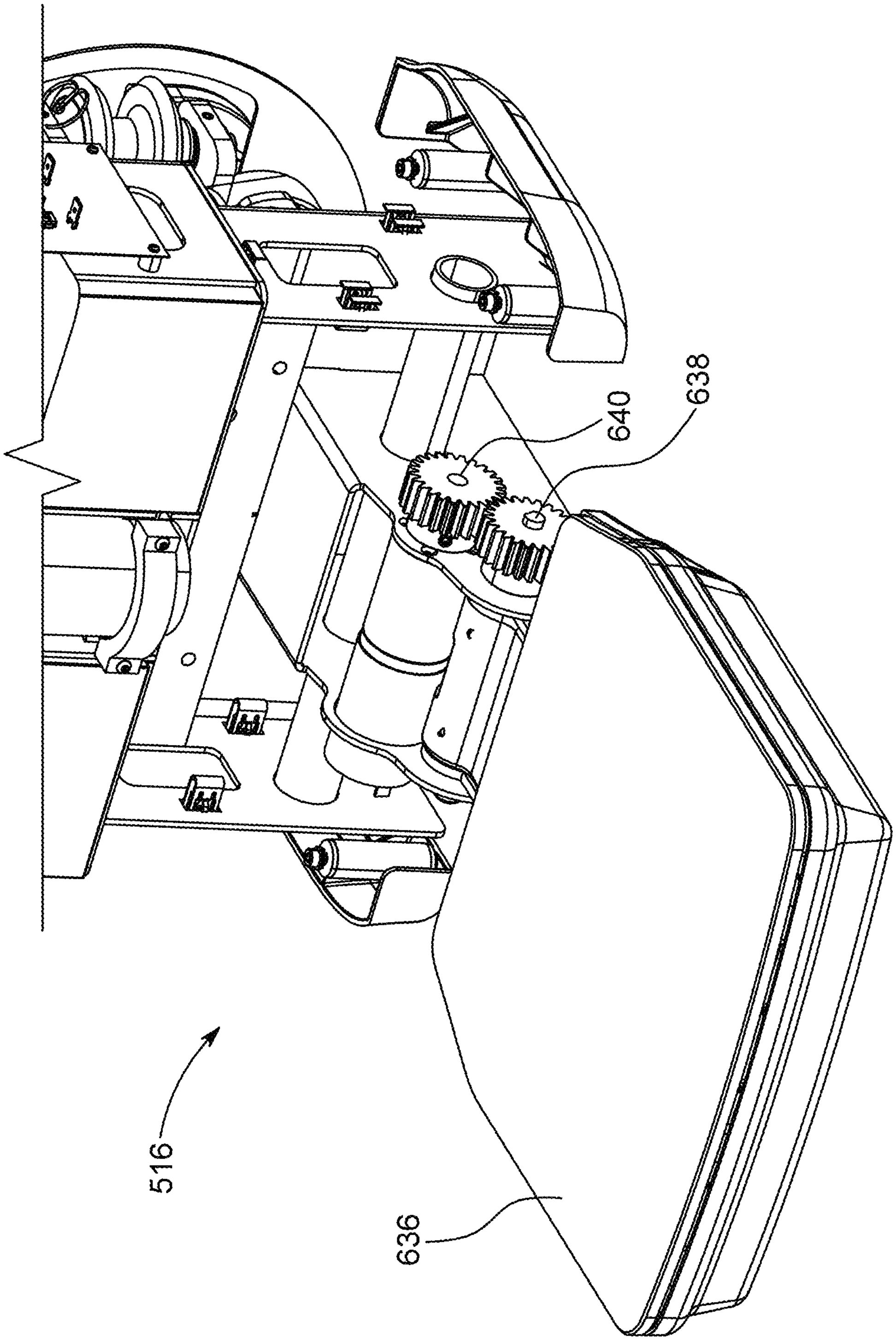

FIG. 210 schematically illustrates a perspective view of a footrest for use with a stair lift system.

Figure 211:
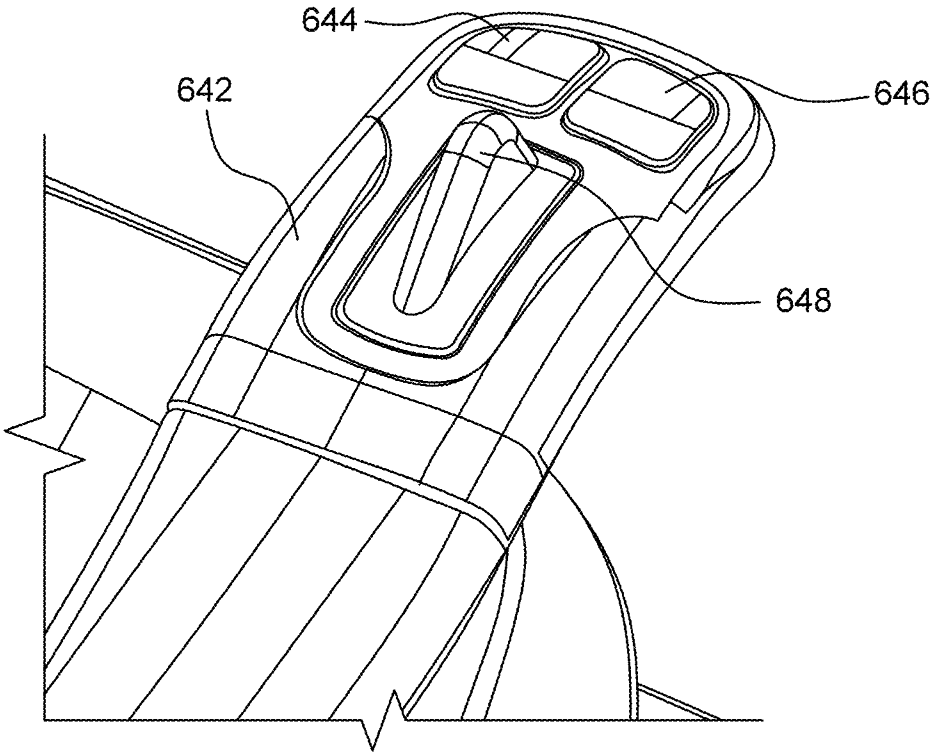

FIG. 211 schematically illustrates a perspective view of a panel embedded in an armrest for use with a stair lift system.

Figure 212:
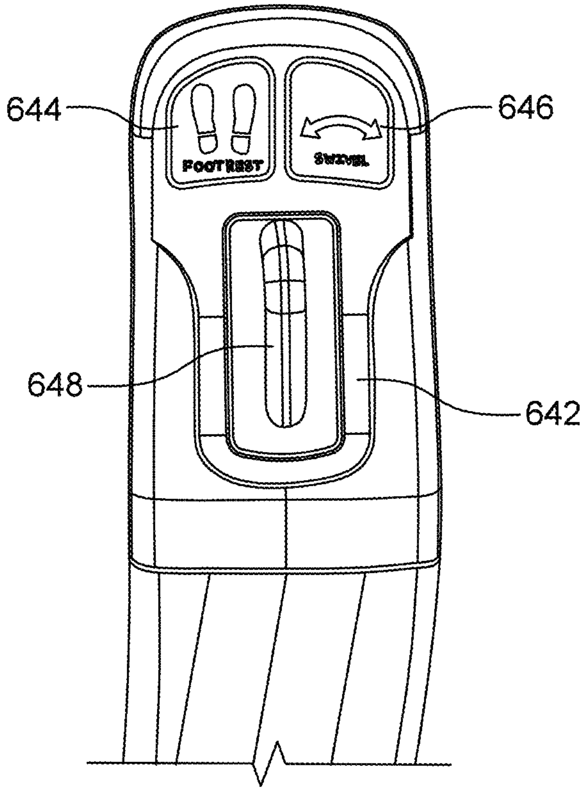

FIG. 212 schematically illustrates another view of a panel embedded in an armrest for use with a stair lift system.

Figure 213:
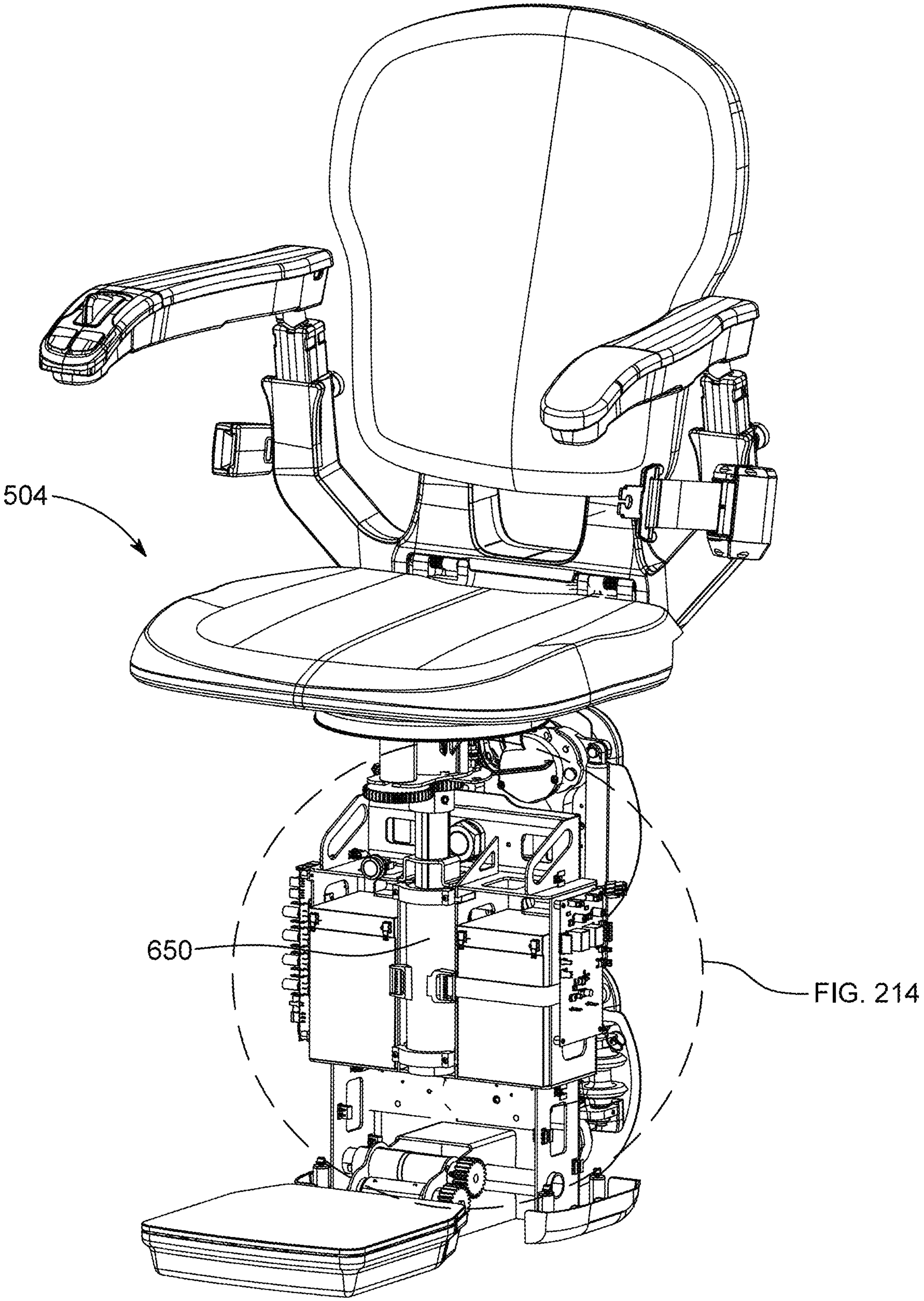

FIG. 213 schematically illustrates a perspective view of a chair for use with a stair lift system.

Figure 214:
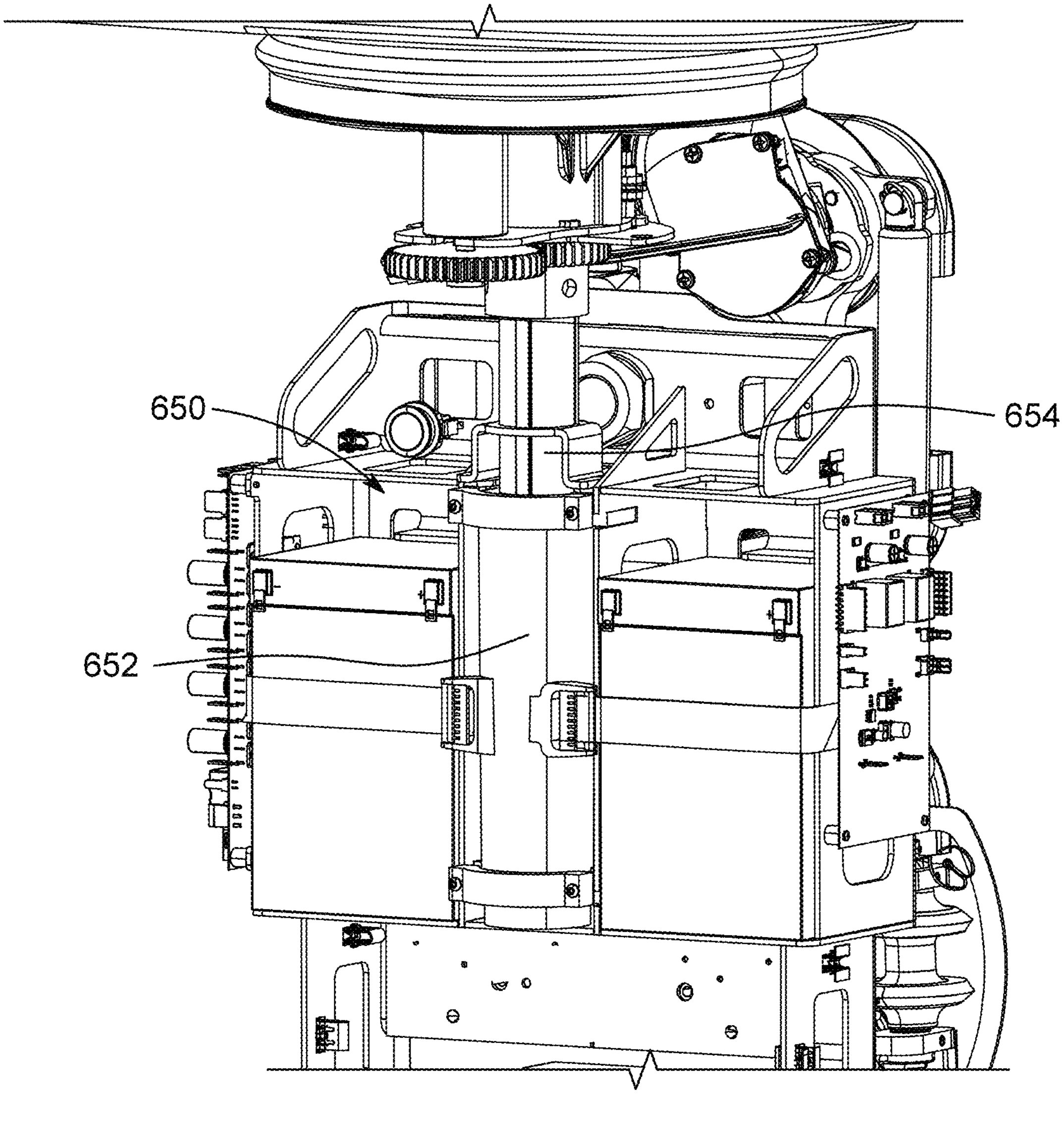

FIG. 214 schematically illustrates a perspective view of a sealed cylinder for use with a stair lift system.

Figure 215:
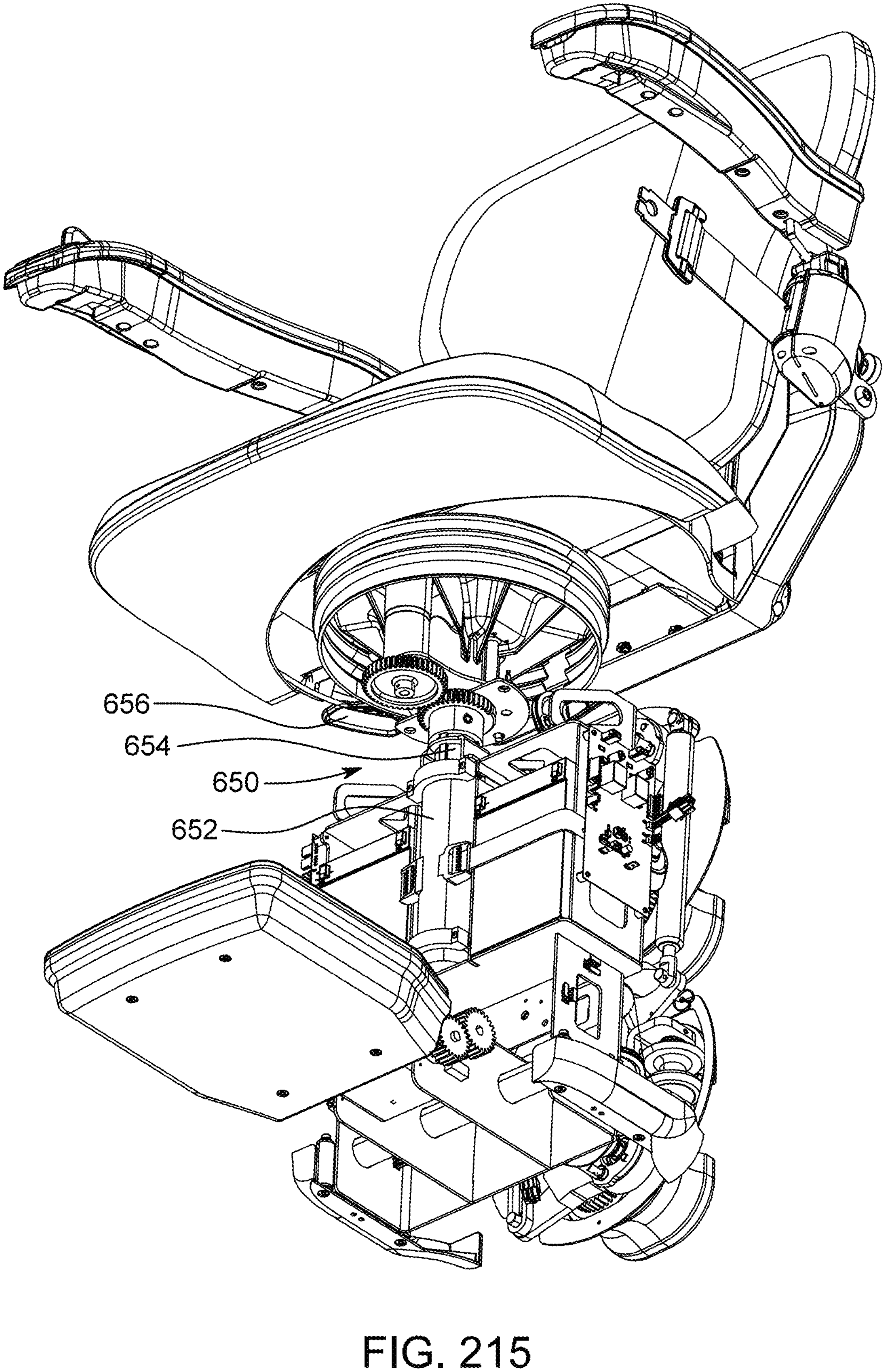

FIG. 215 schematically illustrates a view of the underside of a chair for use with a stair lift system.

Figure 216:
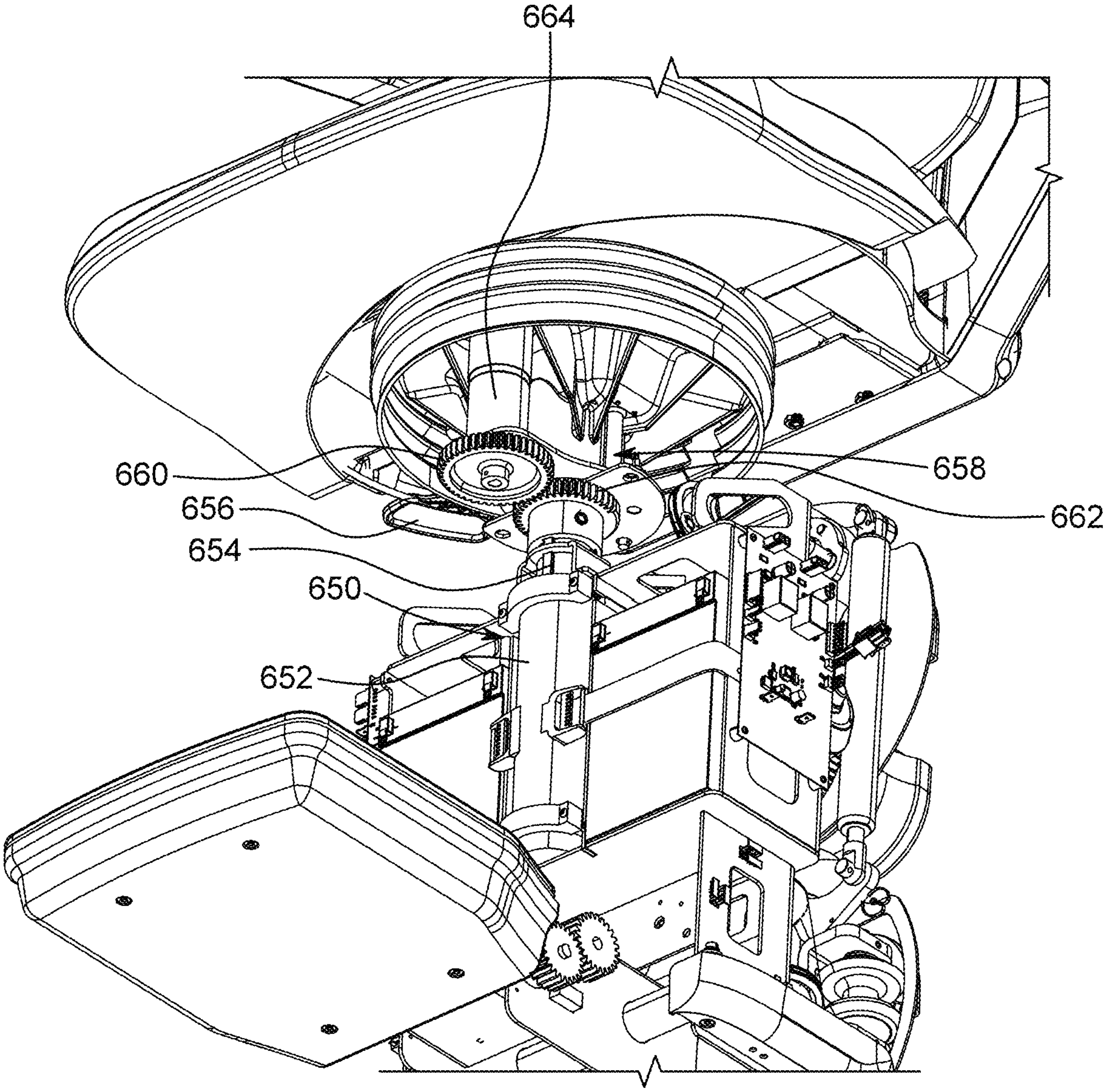

FIG. 216 schematically illustrates another view of the underside of a chair for use with a stair lift system.

Figure 217:
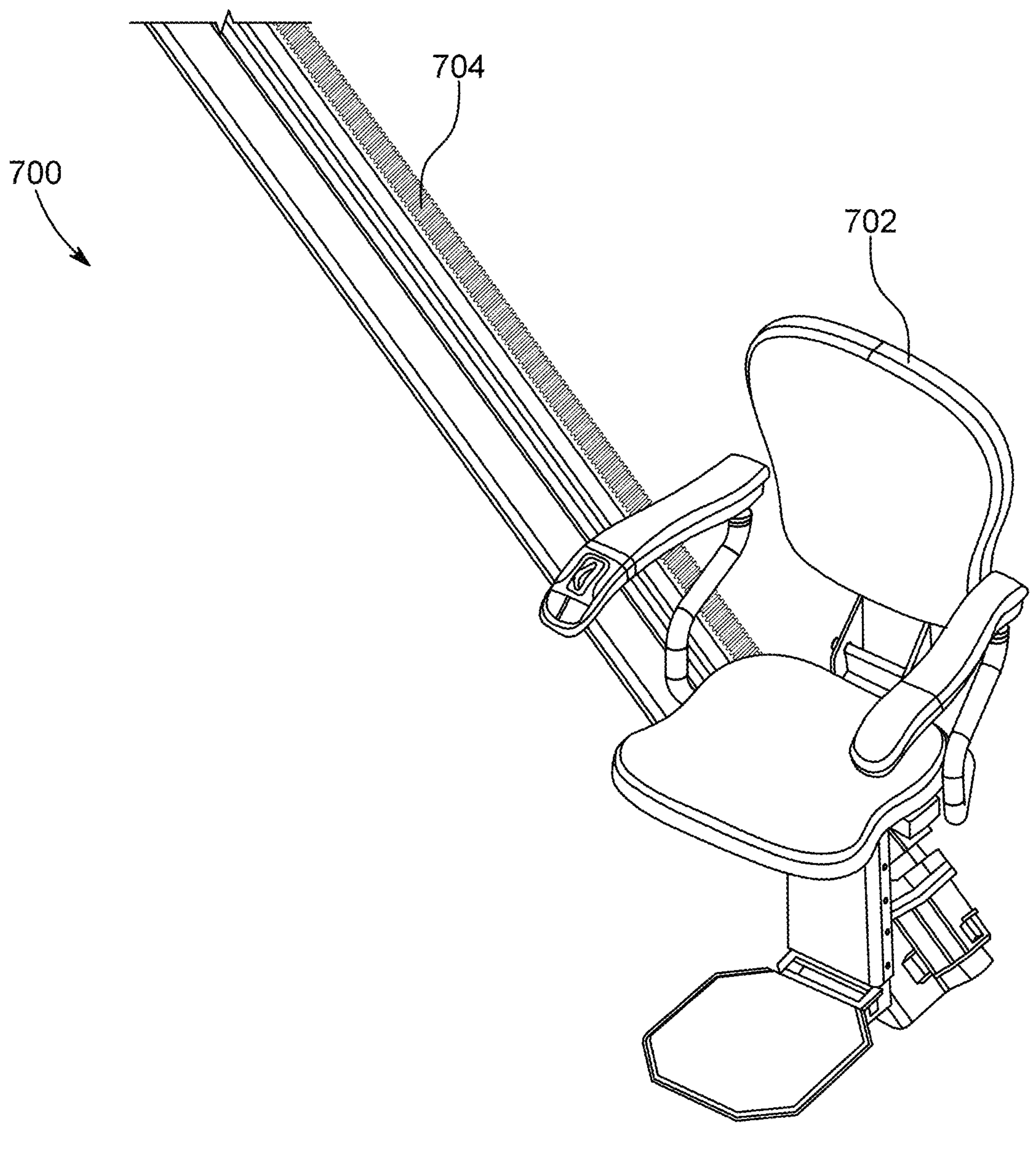

FIG. 217 schematically illustrates schematically illustrates a perspective view of another embodiment of a stair lift system.

Figure 218:
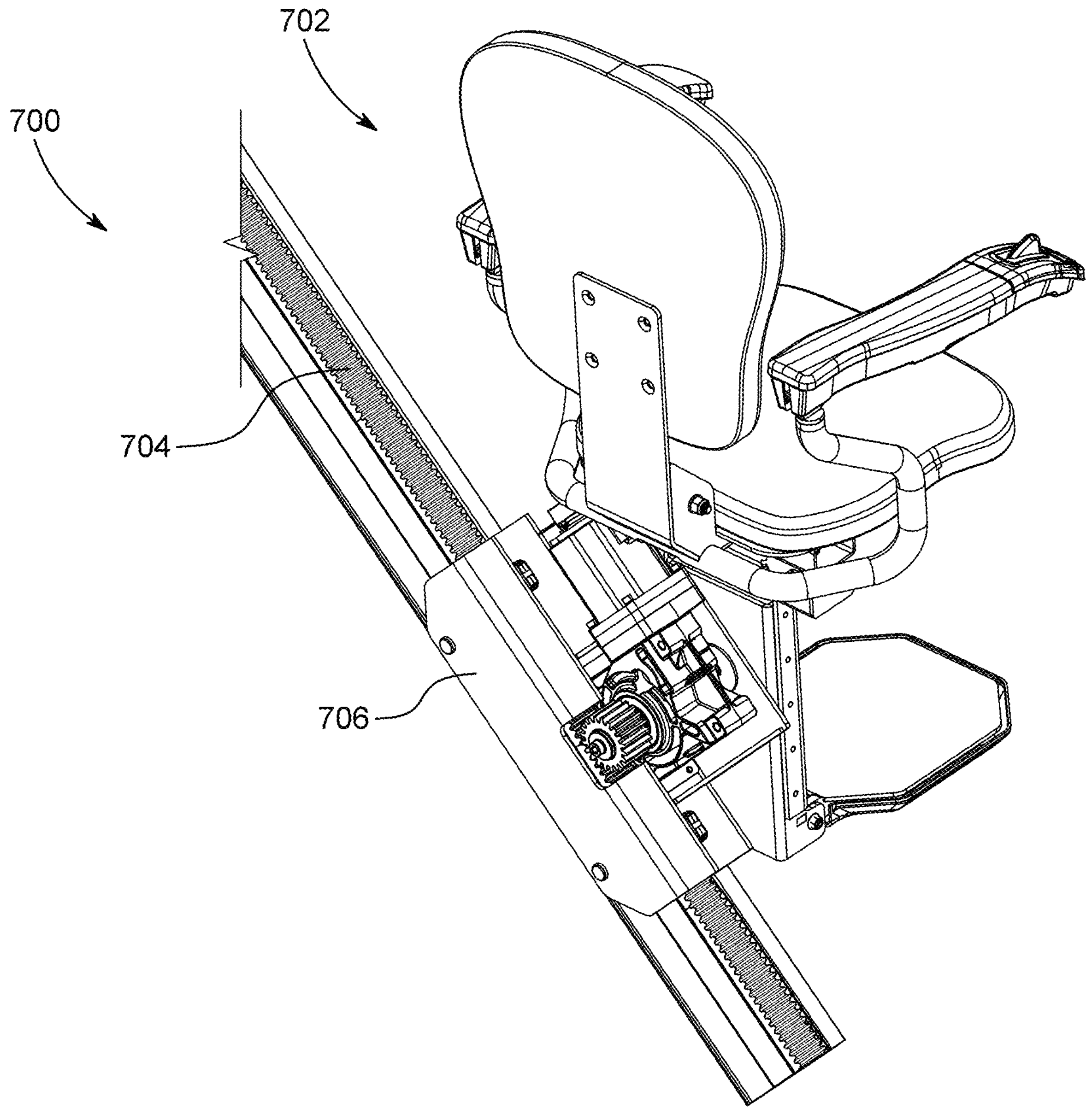

FIG. 218 schematically illustrates a perspective view of another embodiment of a stair lift system.

Figure 219:
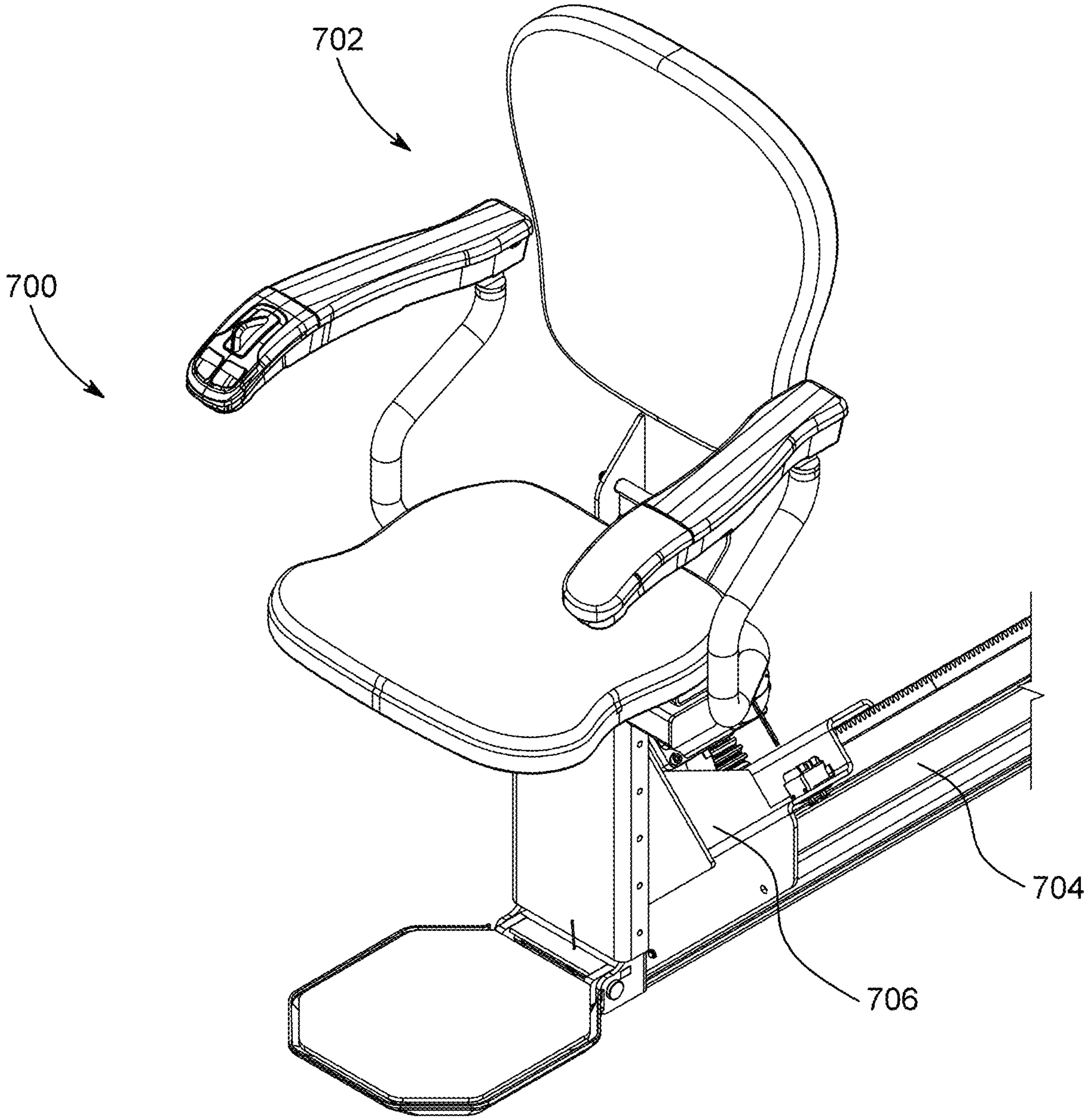

FIG. 219 schematically illustrates another perspective view of the stair lift system of FIG. 217.

Figure 220:
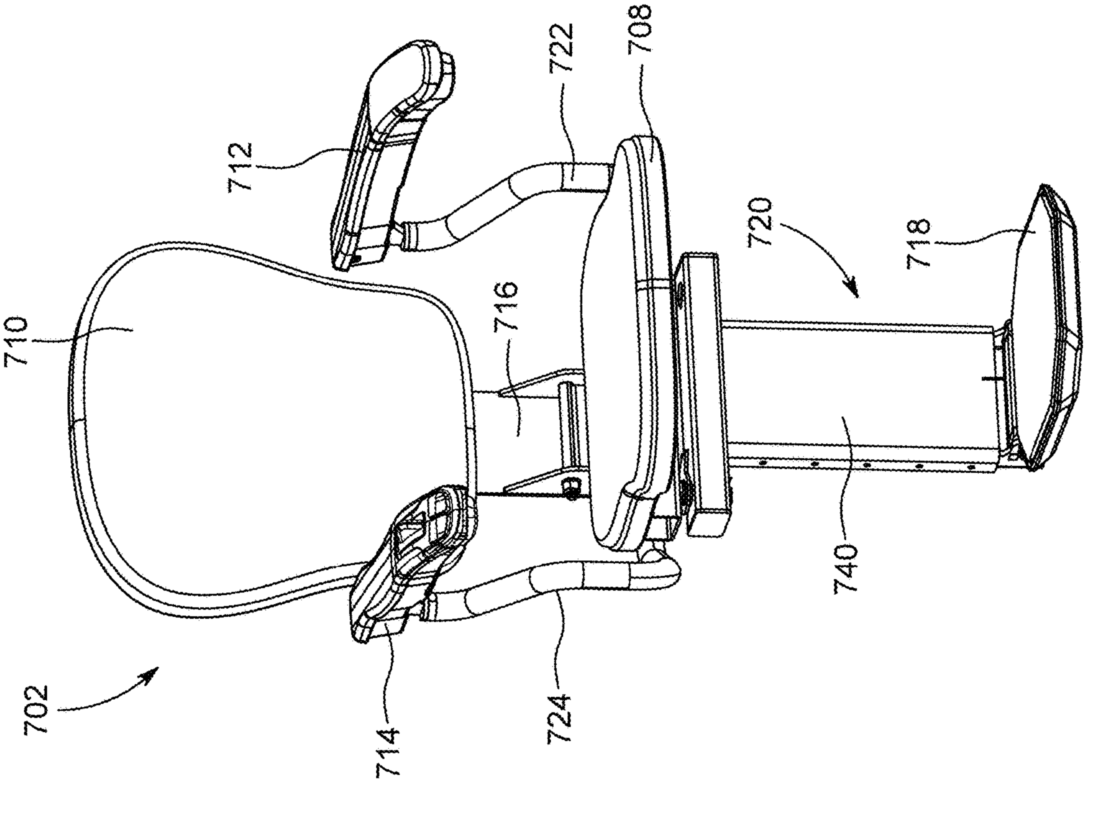

FIG. 220 schematically illustrates a perspective view of a chair assembly for use with the stair lift system of FIG. 217.

Figure 221:
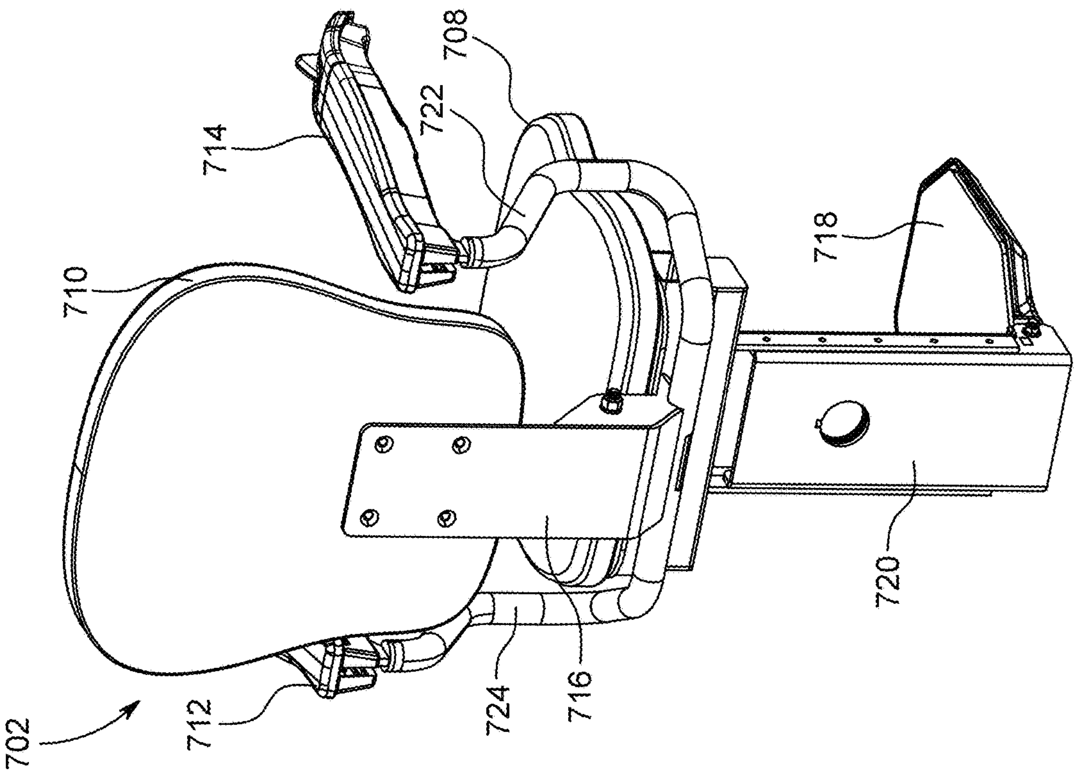

FIG. 221 schematically illustrates another perspective view of a chair assembly for use with the stair lift system of FIG. 217.

Figure 222:
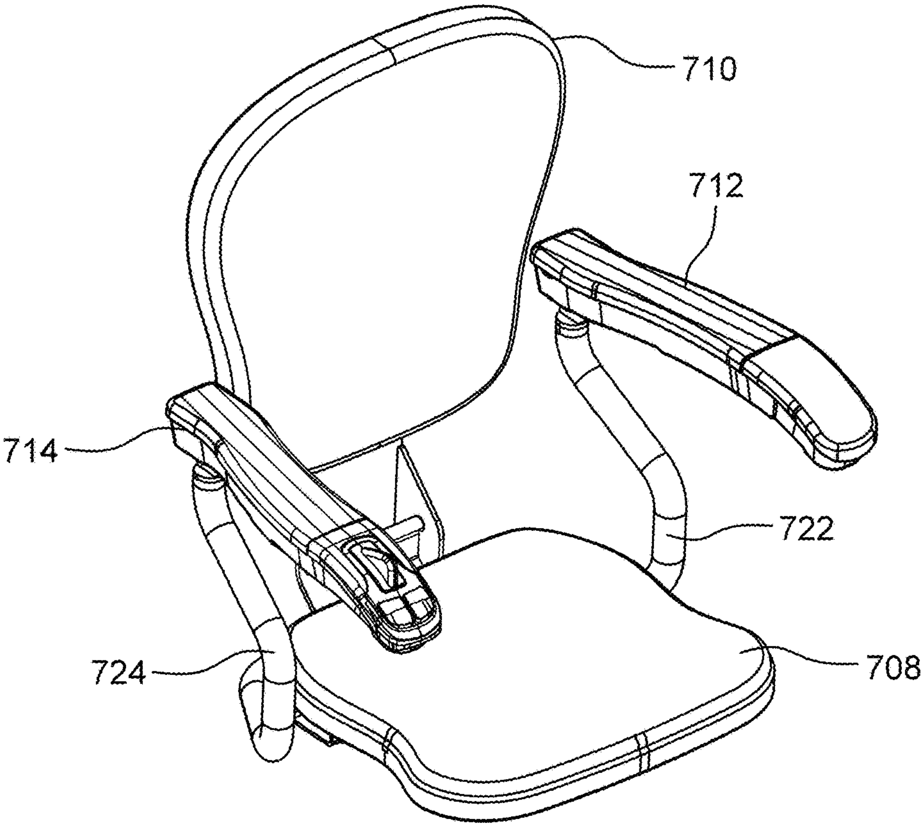

FIG. 222 schematically illustrates a perspective view of a portion of the chair assembly for use with the stair lift system of FIG. 217.

Figure 223:
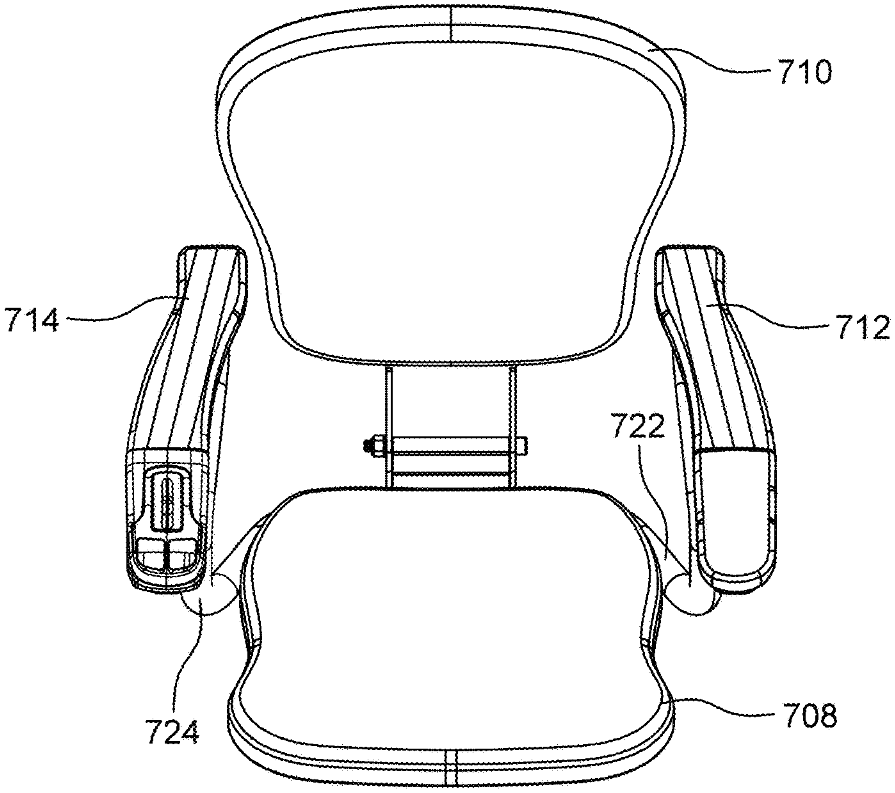

FIG. 223 schematically illustrates another perspective view of a portion of a chair assembly for use with the stair lift system of FIG. 217.

Figure 224:
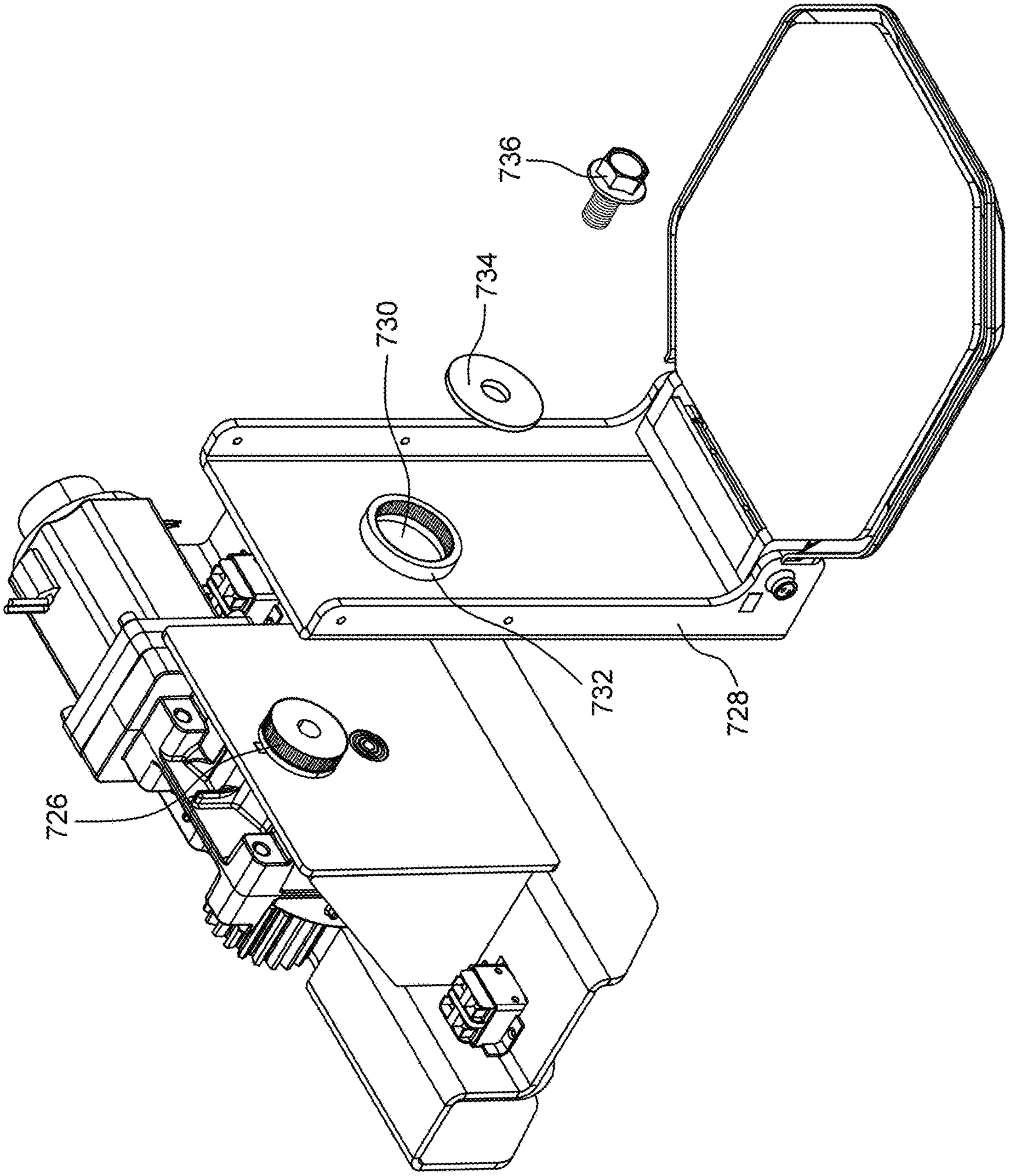

FIG. 224 schematically illustrates a mechanism for attaching the chair assembly to the chassis of the stair lift system of FIG. 217.

Figure 225:
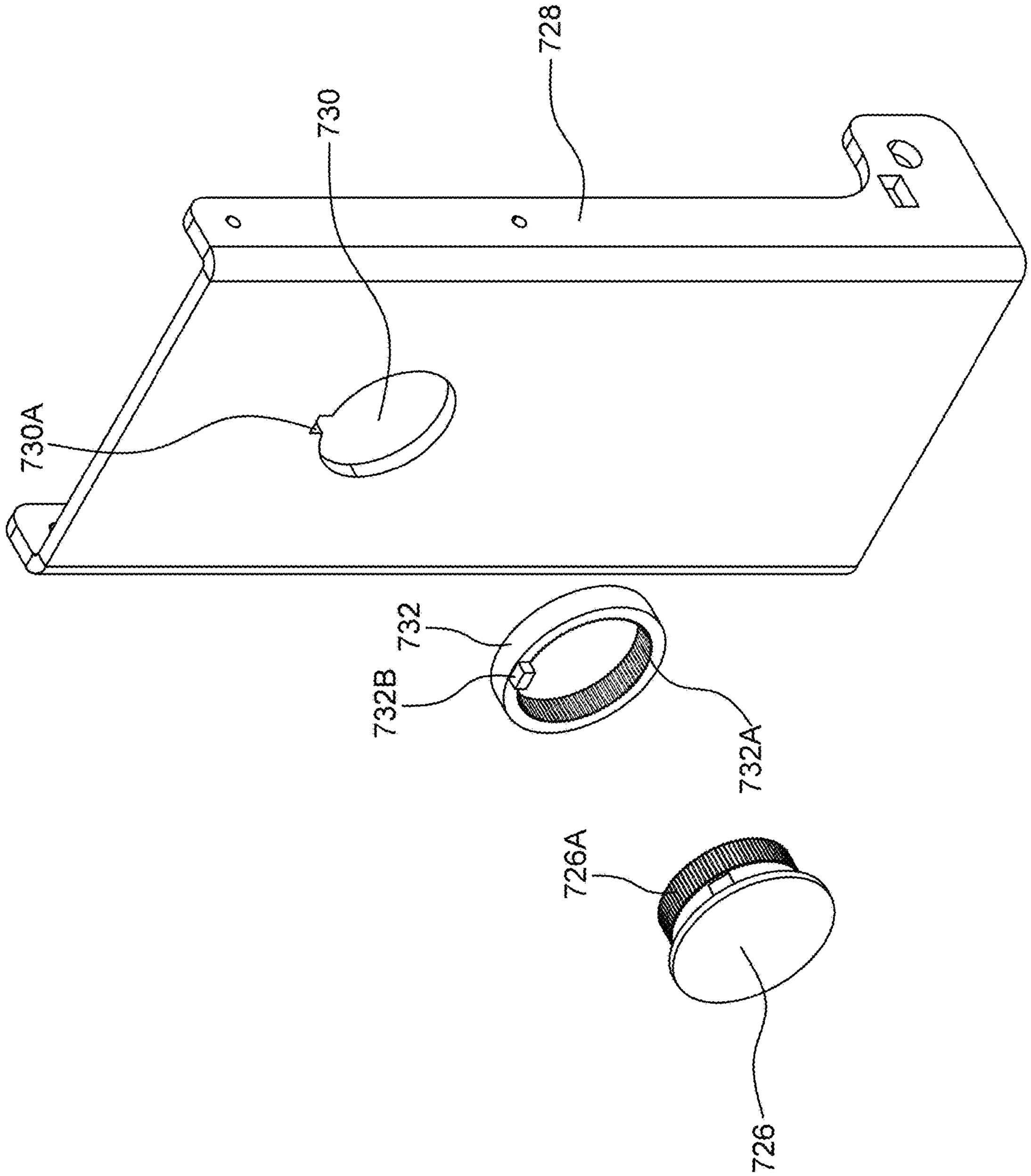

FIG. 225 schematically illustrates a portion of a mechanism for attaching the chair assembly to the chassis of the stair lift system of FIG. 217.

Figure 226:
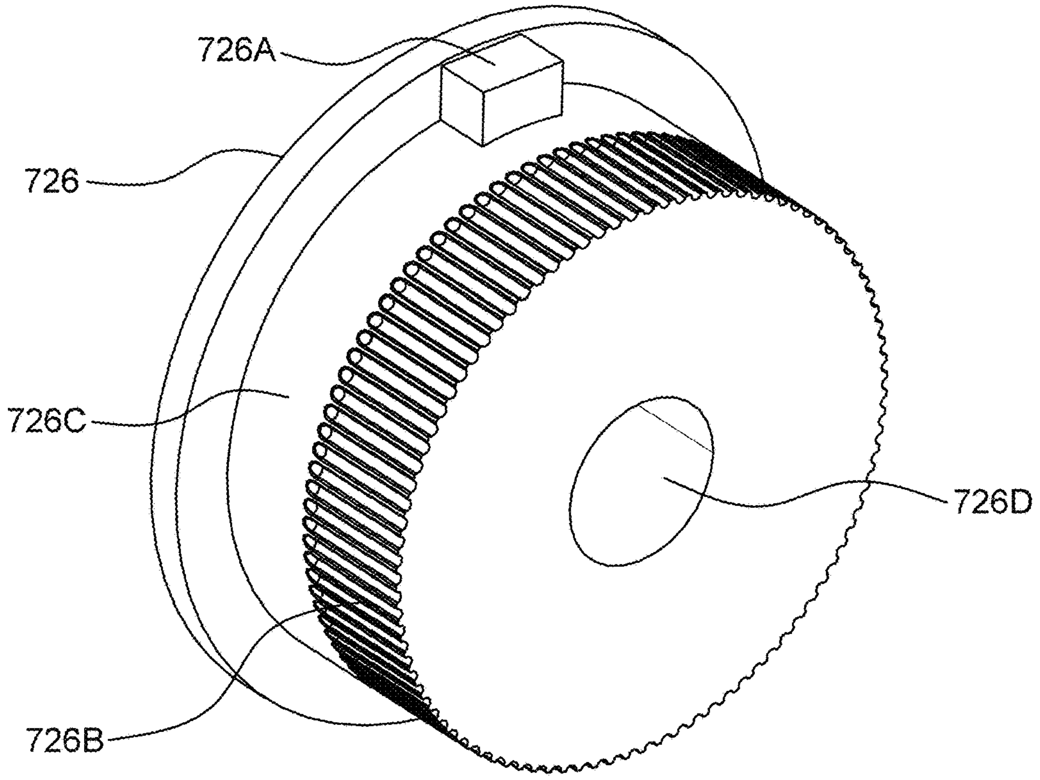

FIG. 226 schematically illustrates a portion of a mechanism for attaching the chair assembly to the chassis of the stair lift system of FIG. 217.

Figure 227:
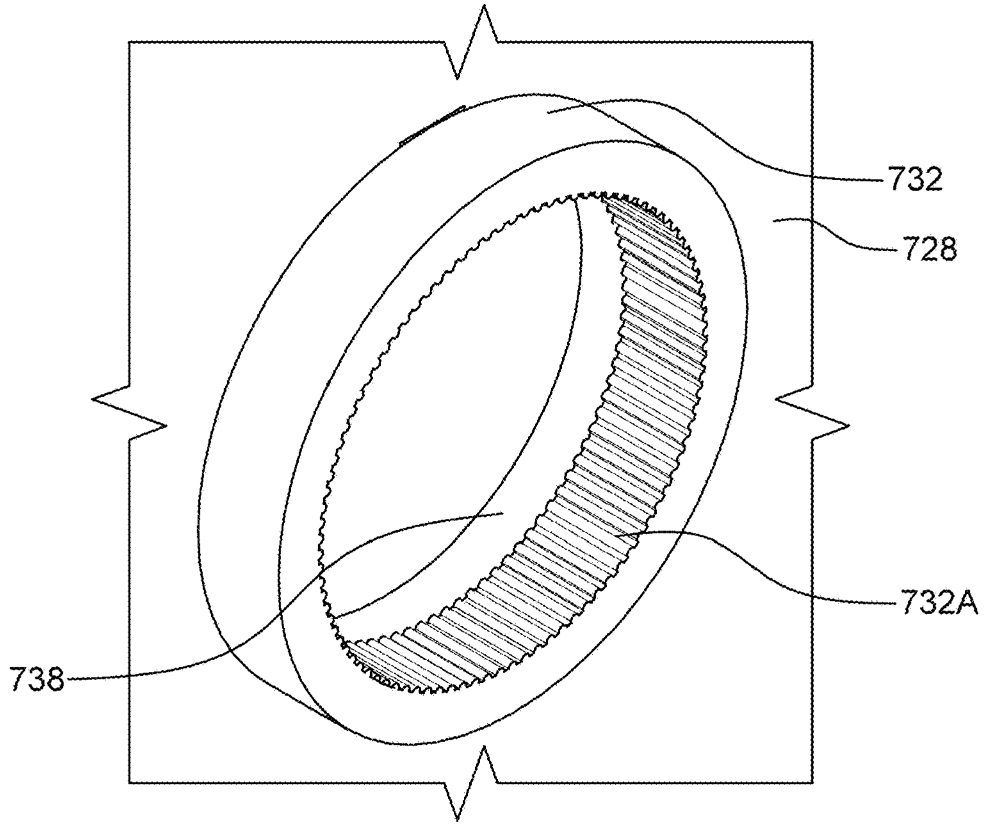

FIG. 227 schematically illustrates a portion of a mechanism for attaching the chair assembly to the chassis of the stair lift system of FIG. 217.

Figure 228:
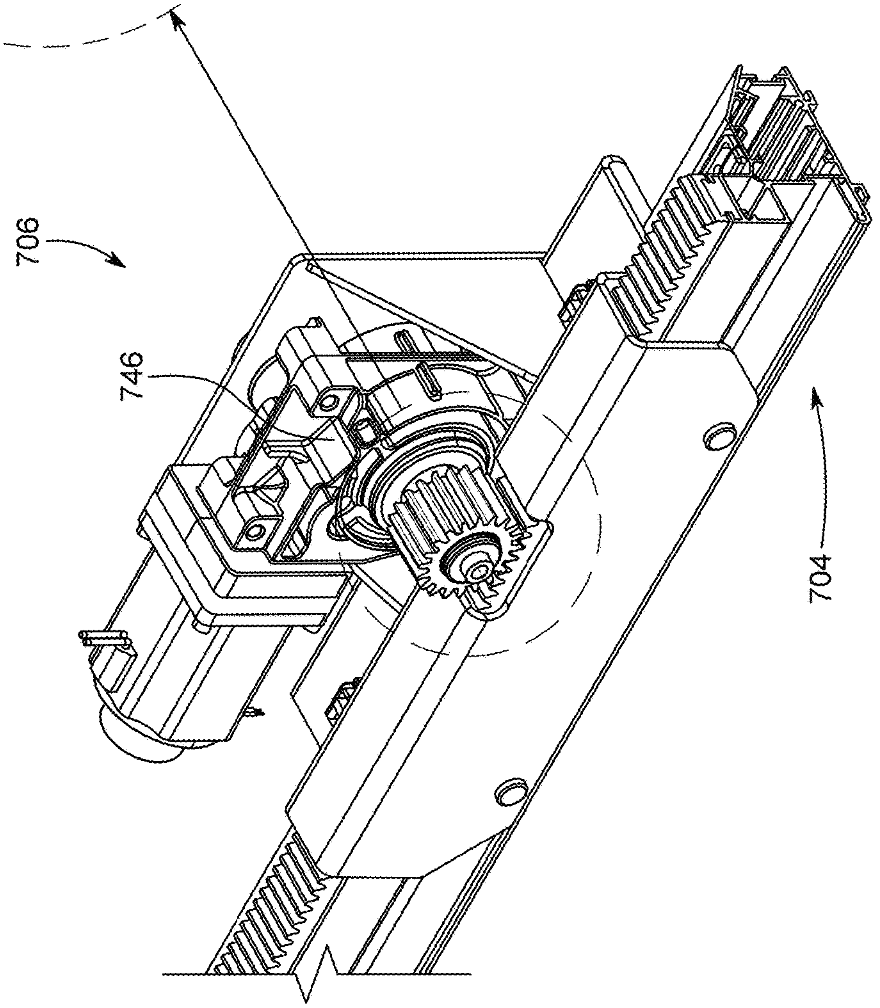

FIG. 228 schematically illustrates a chassis assembly and straight rail assembly for use with the stair lift system of FIG. 217.

Figure 229:
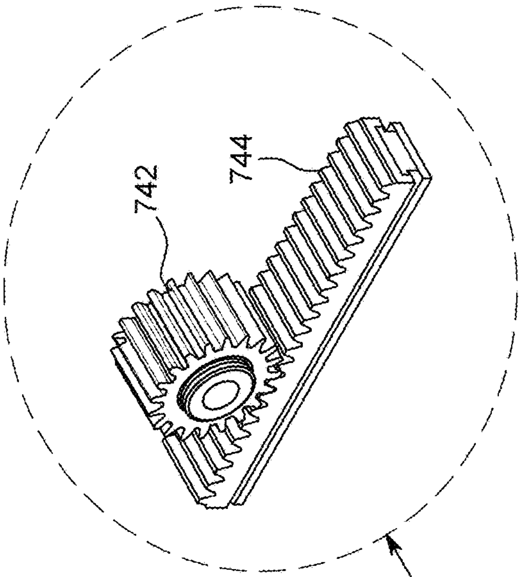

FIG. 229 schematically illustrates an enhanced view of a rack and pinion system for use with the stair lift system of FIG. 217.

Figure 230:
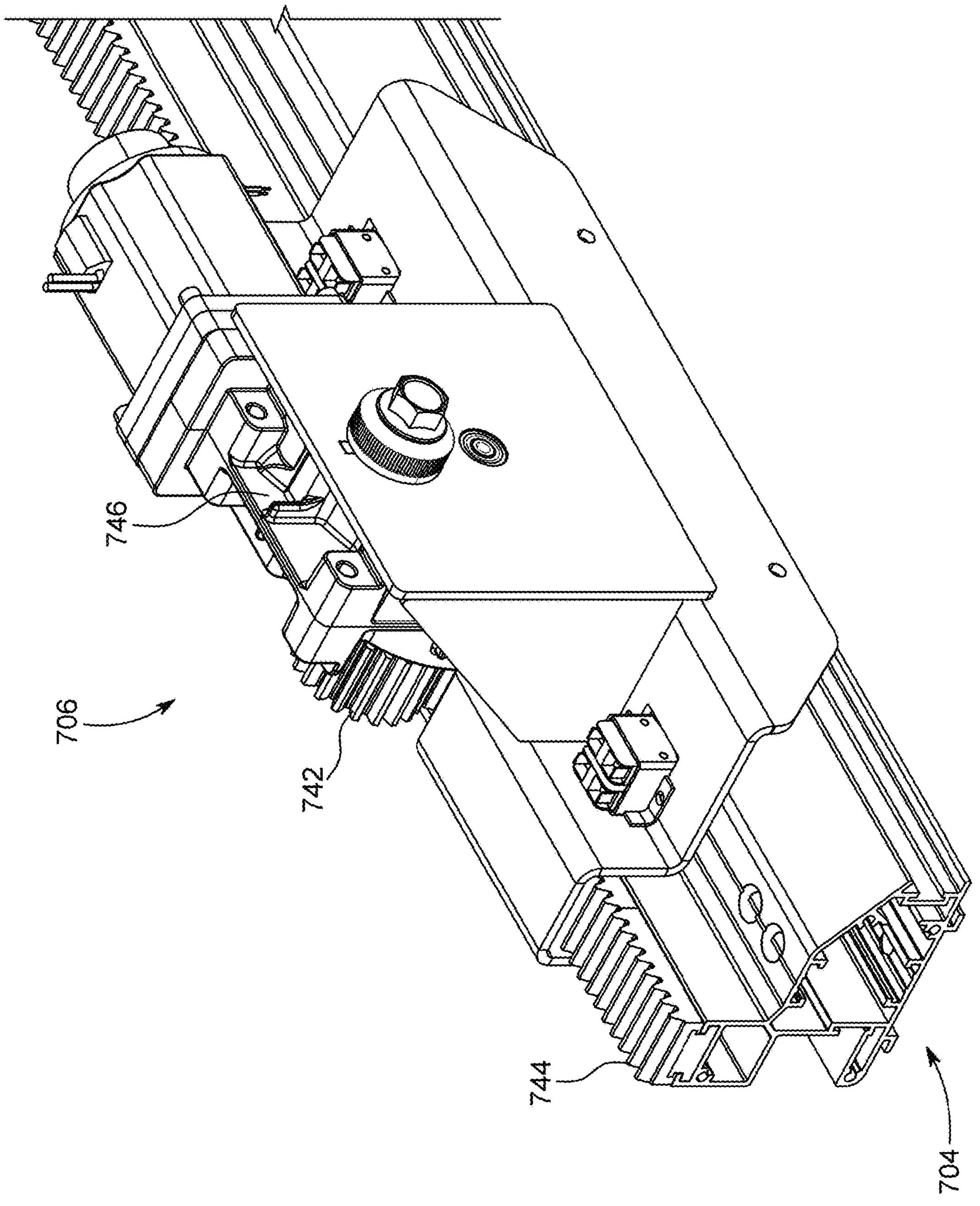

FIG. 230 schematically illustrates a chassis assembly and straight rail assembly for use with the stair lift system of FIG. 217.

Figure 231:
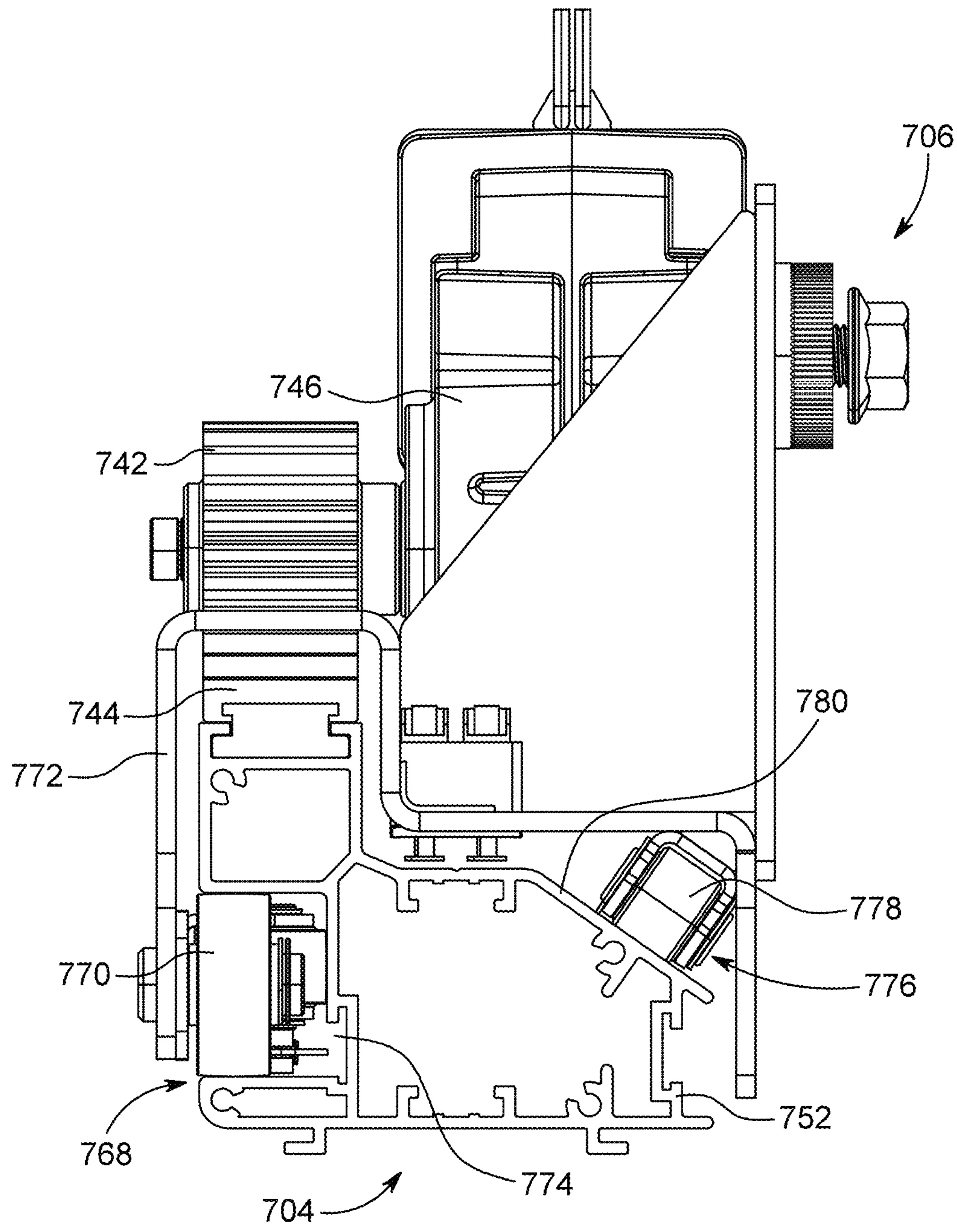

FIG. 231 schematically illustrates a chassis assembly and straight rail assembly for use with the stair lift system of FIG. 217.

Figure 232:
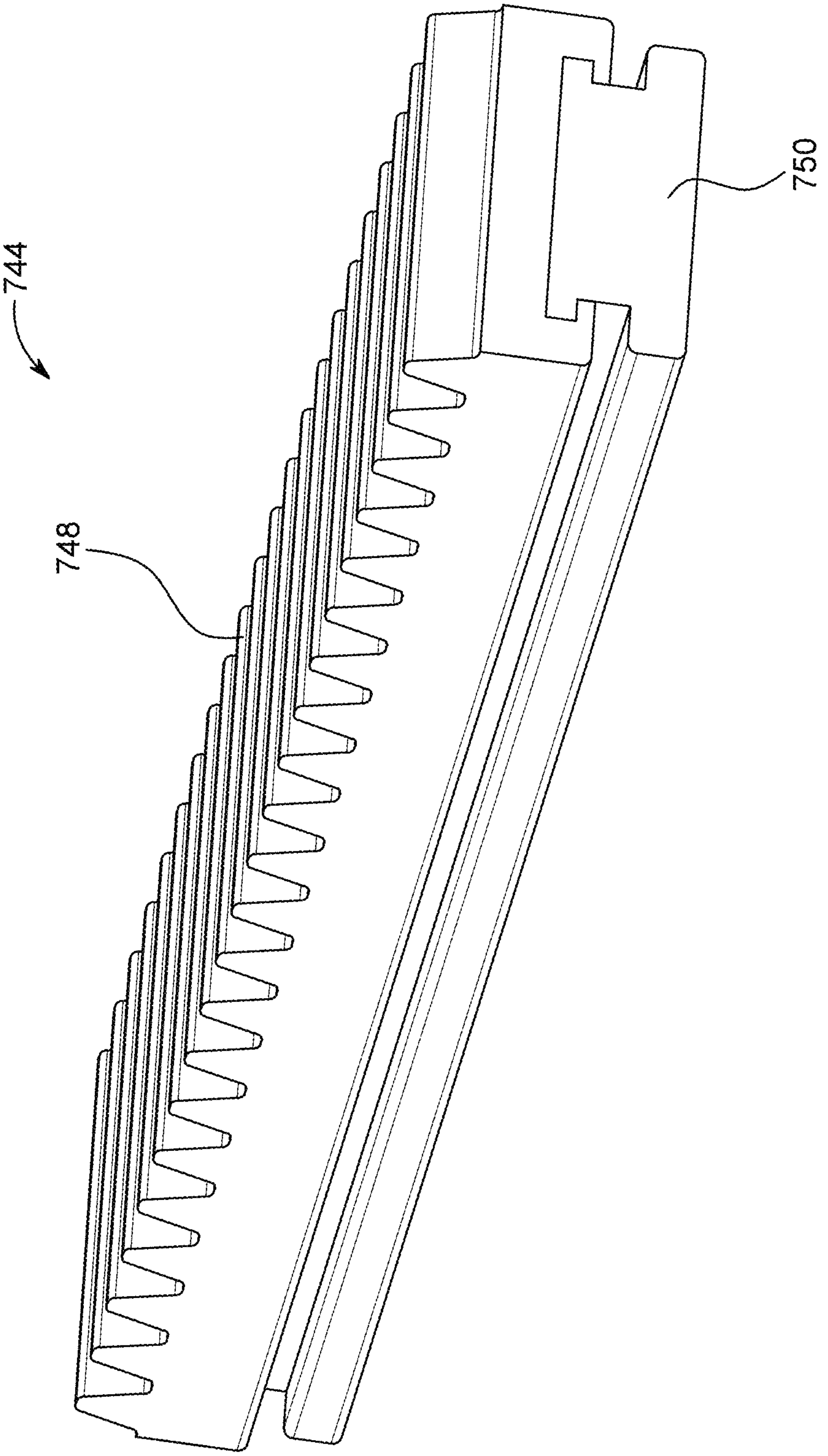

FIG. 232 schematically illustrates a linear gear for use with the stair lift system of FIG. 217.

Figure 233:
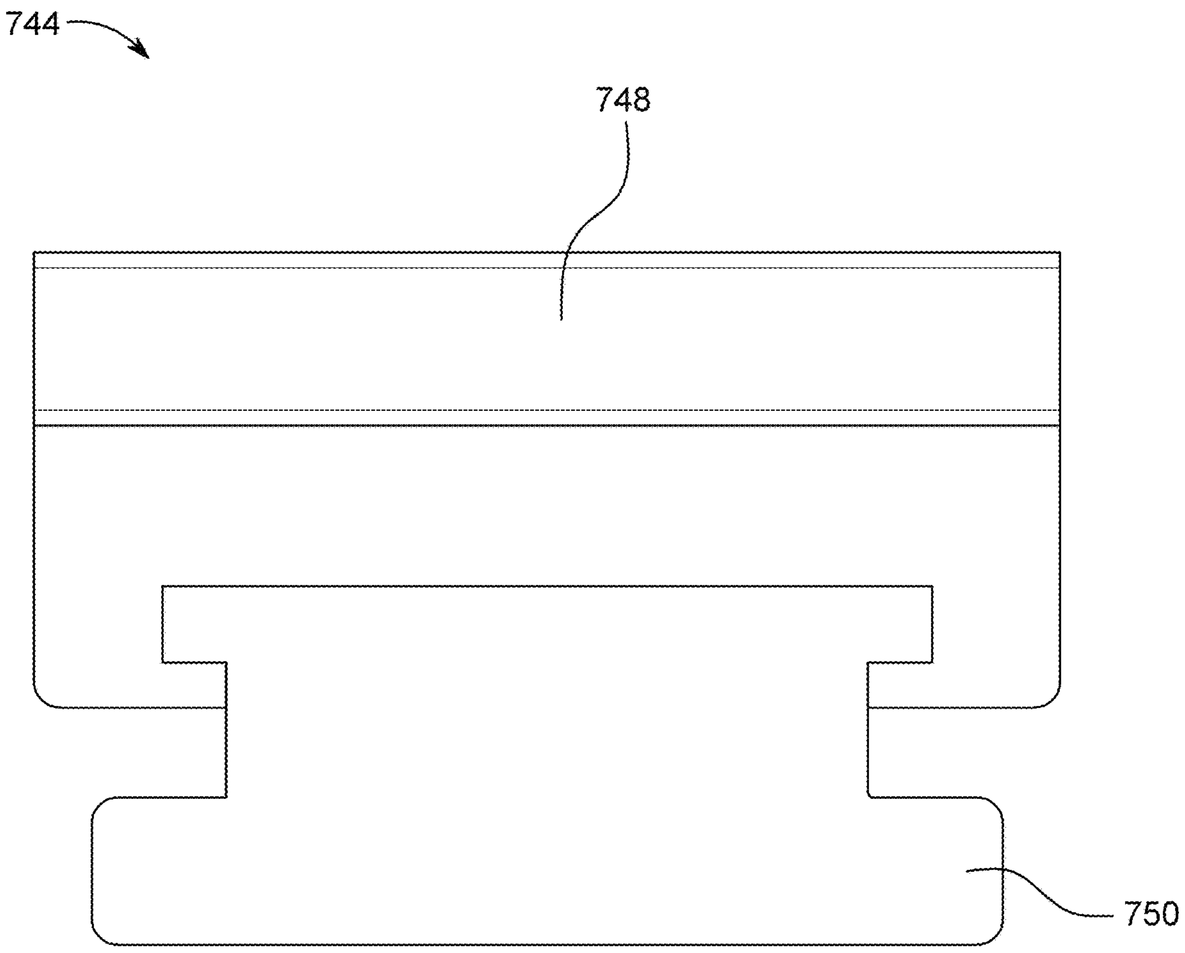

FIG. 233 schematically illustrates a linear gear for use with the stair lift system of FIG. 217.

Figure 234:
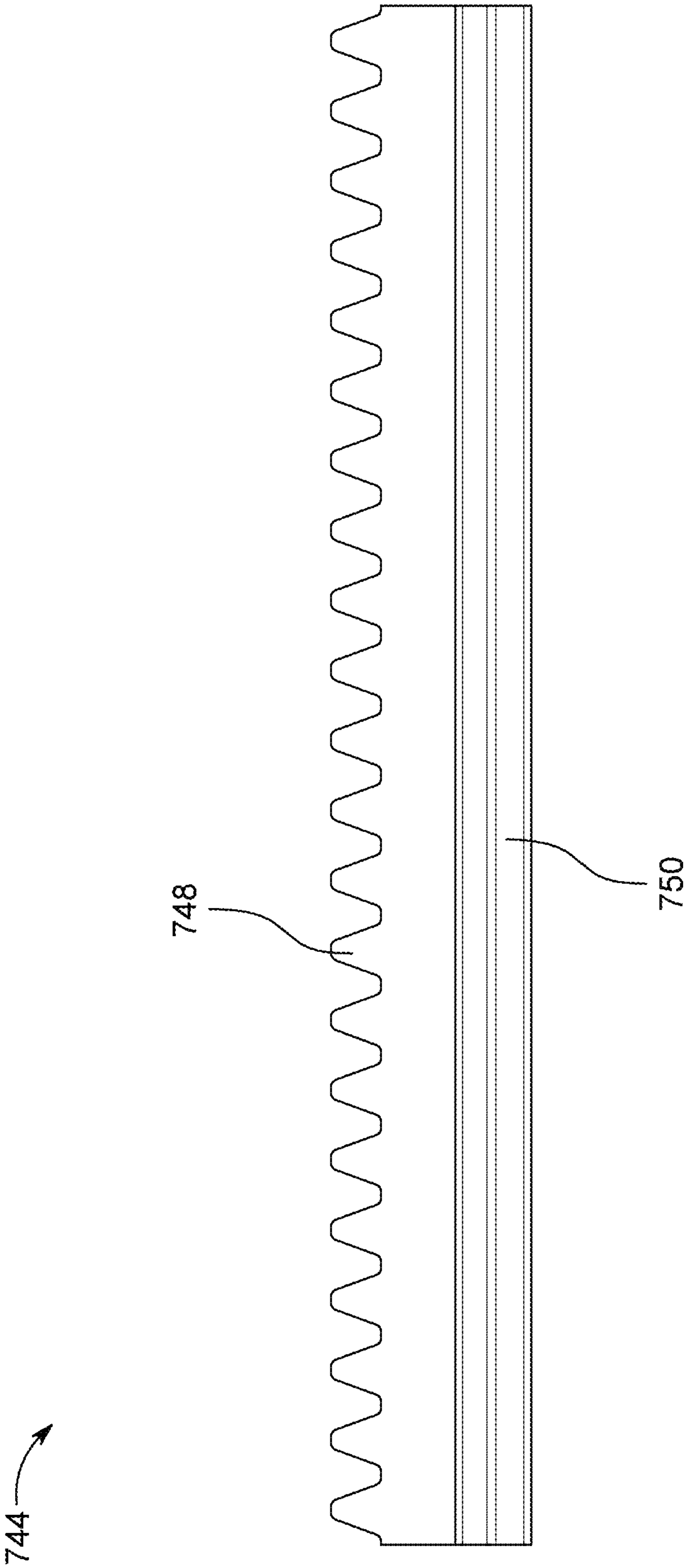

FIG. 234 schematically illustrates a linear gear for use with the stair lift system of FIG. 217.

Figure 235:
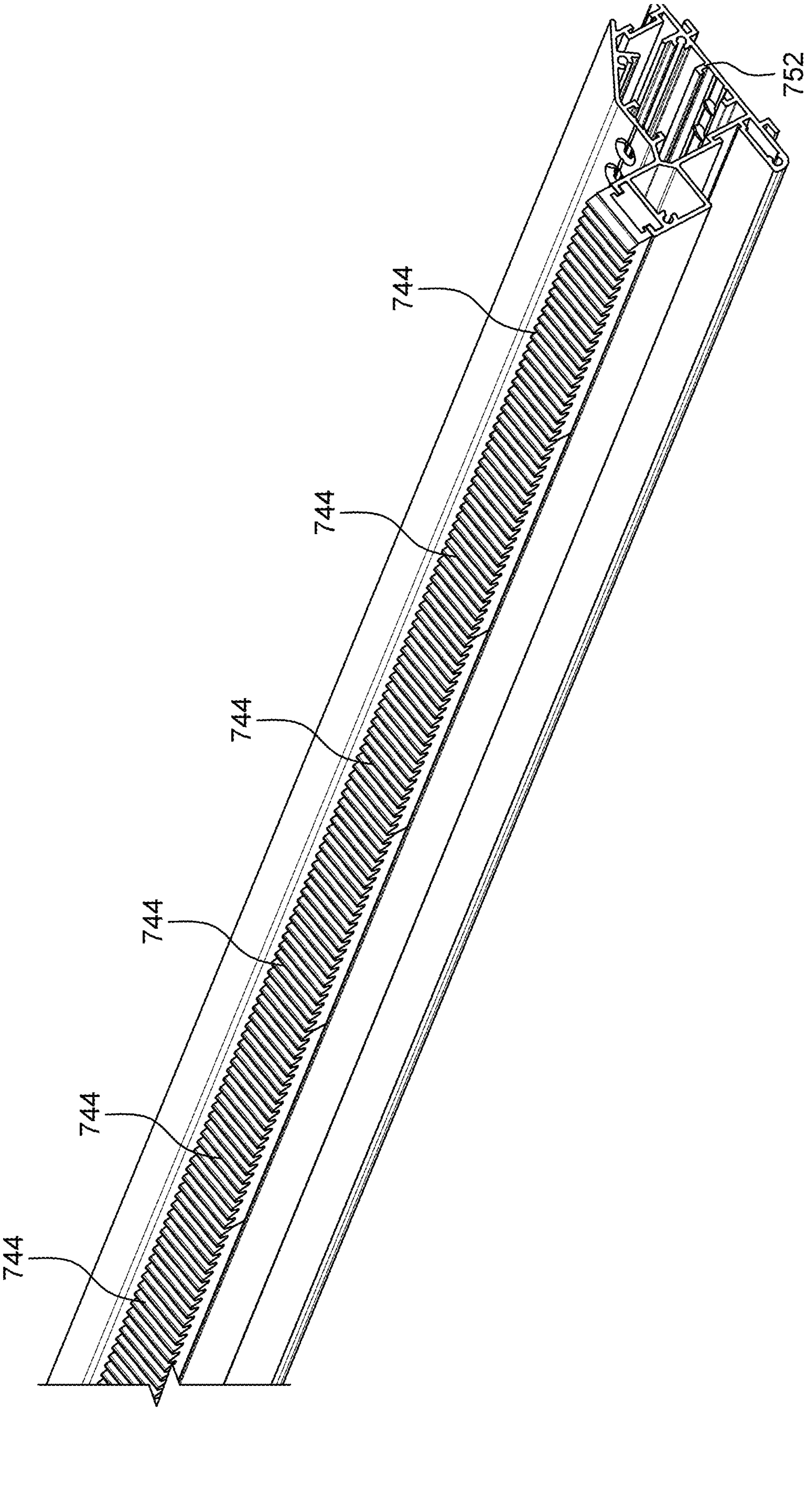

FIG. 235 schematically illustrates a straight rail system for use with the stair lift system of FIG. 217.

Figure 236:
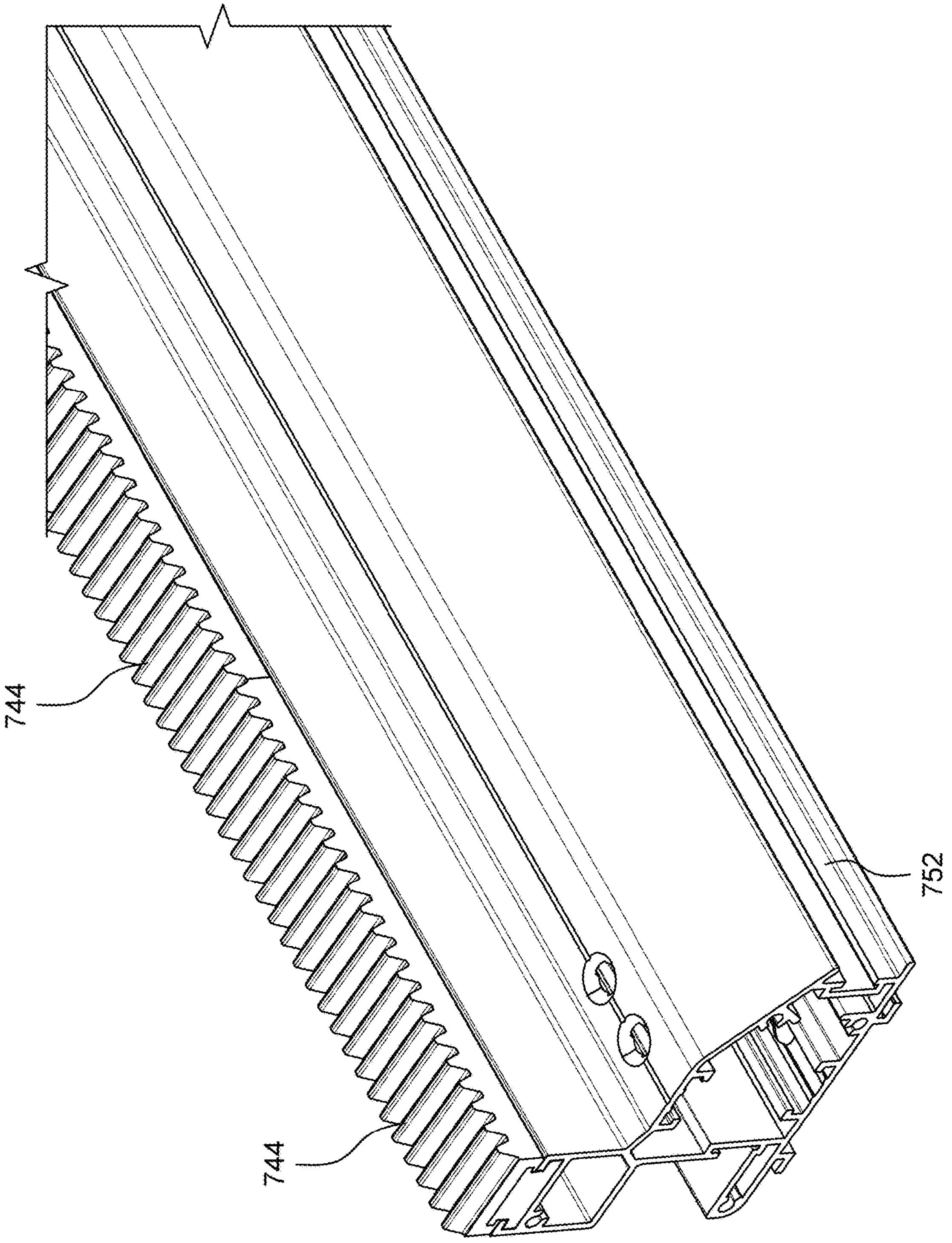

FIG. 236 schematically illustrates a straight rail system for use with the stair lift system of FIG. 217.

Figure 237:
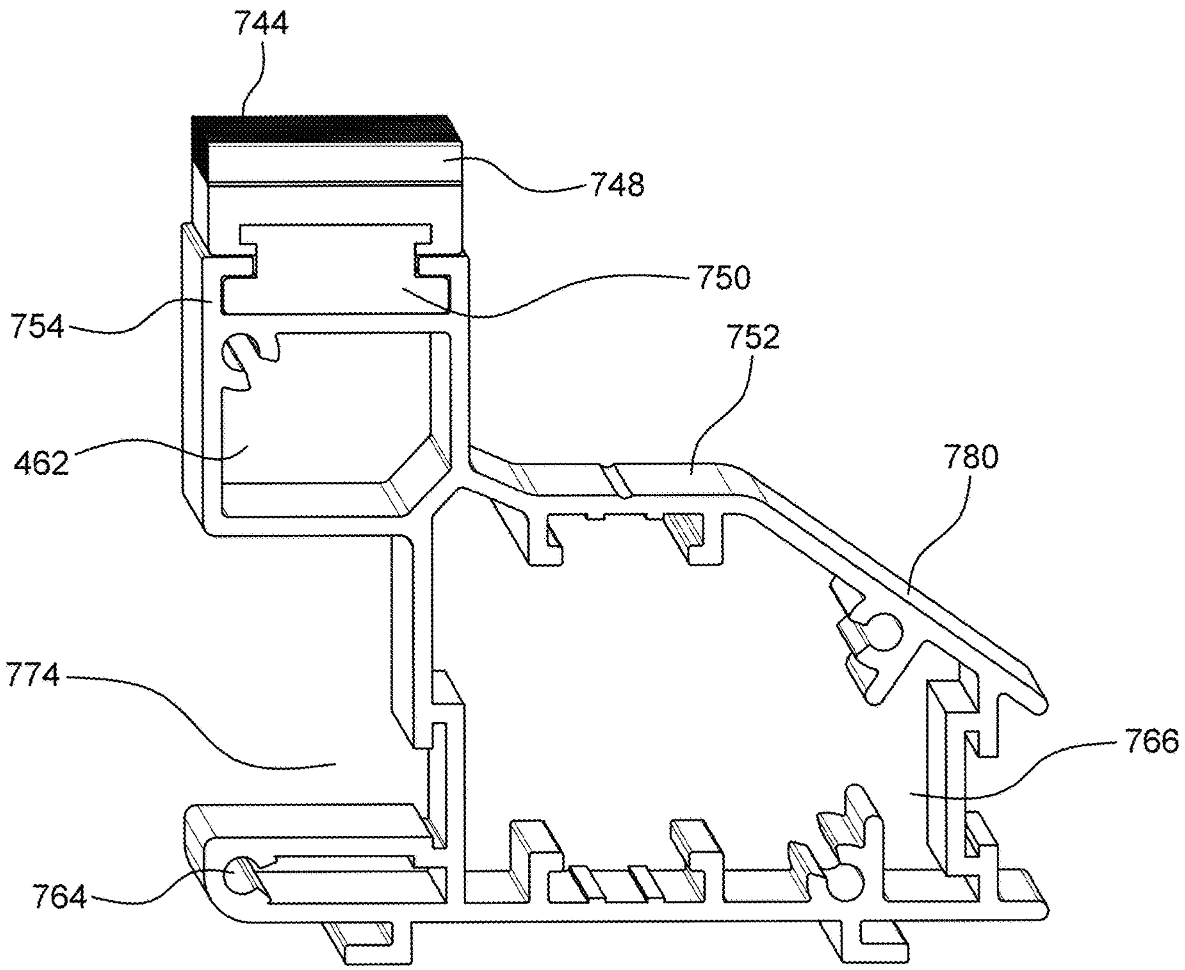

FIG. 237 schematically illustrates a straight rail system for use with the stair lift system of FIG. 217.

Figure 238:
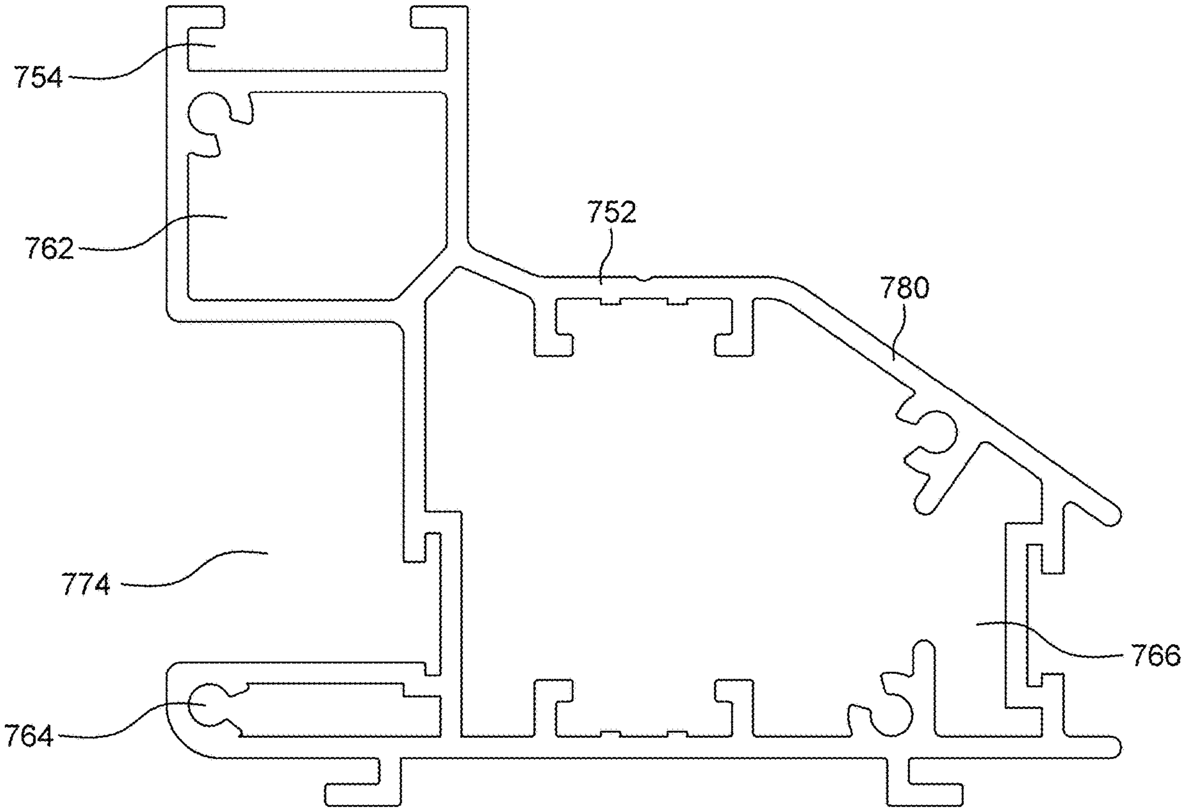

FIG. 238 schematically illustrates a straight rail system for use with the stair lift system of FIG. 217.

Figure 239:
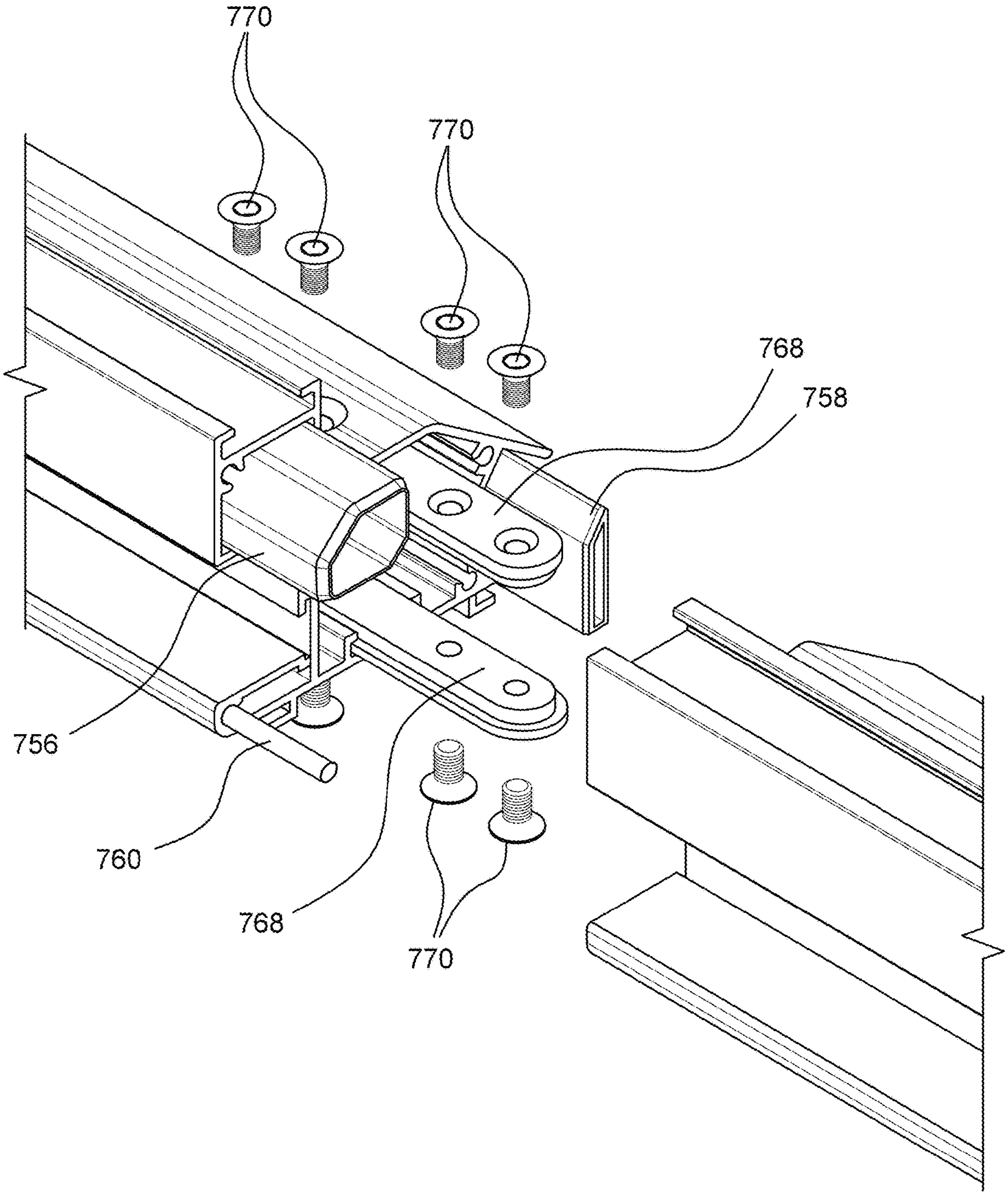

FIG. 239 schematically illustrates a straight rail system for use with the stair lift system of FIG. 217.

Figure 240:
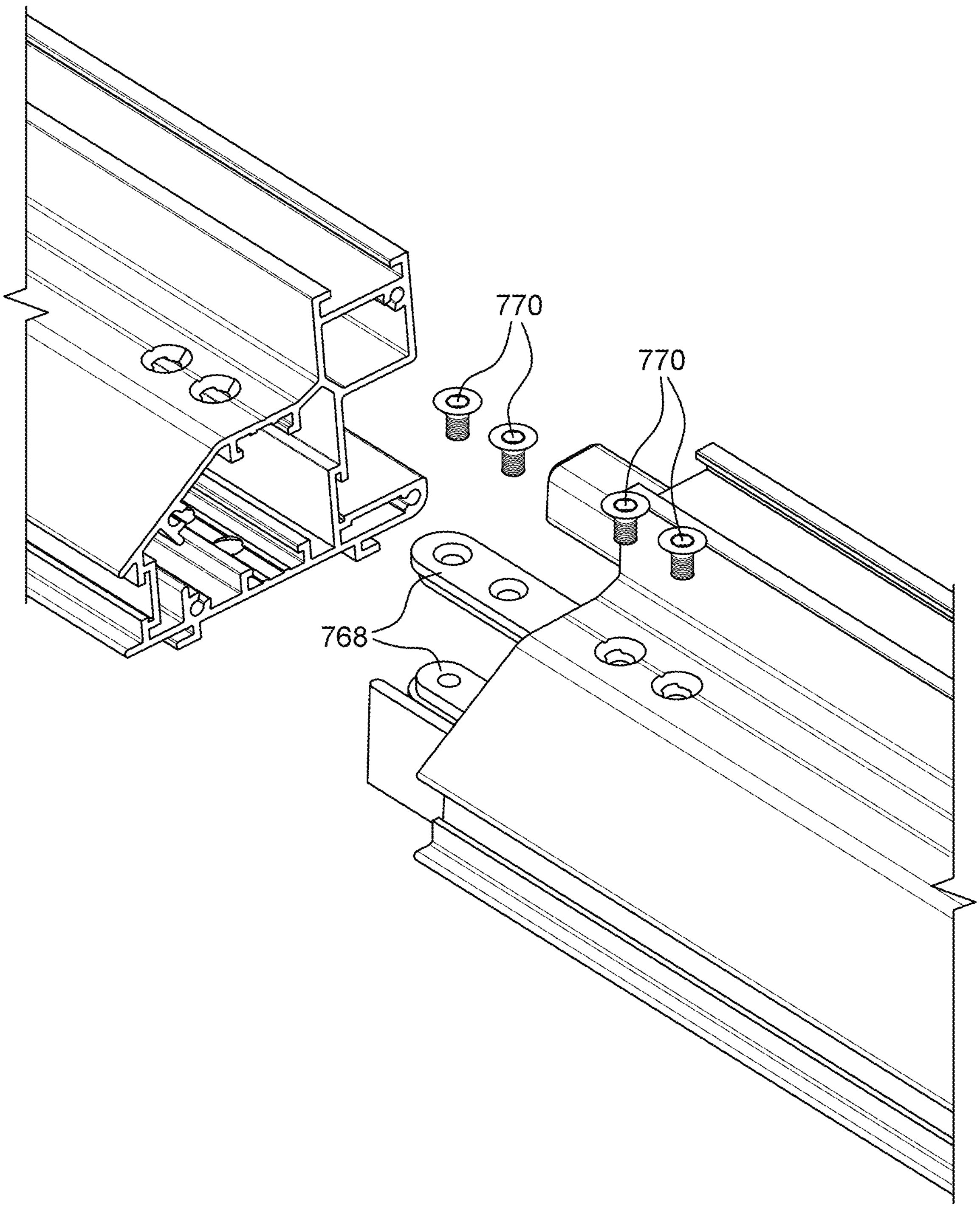

FIG. 240 schematically illustrates another view of the straight rail system of FIG. 239.

Figure 241:
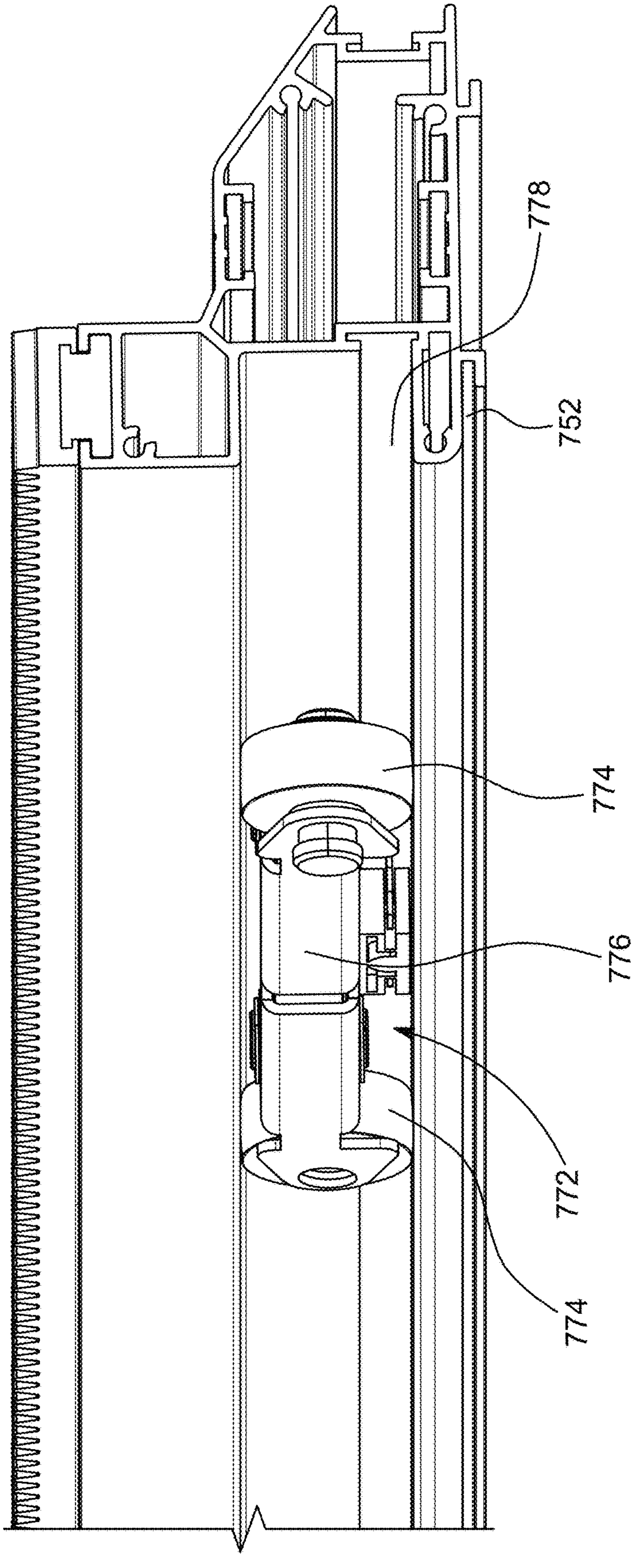

FIG. 241 schematically illustrates a straight rail system and guide roller assembly for use with the stair lift system of FIG. 217.

Figure 242:
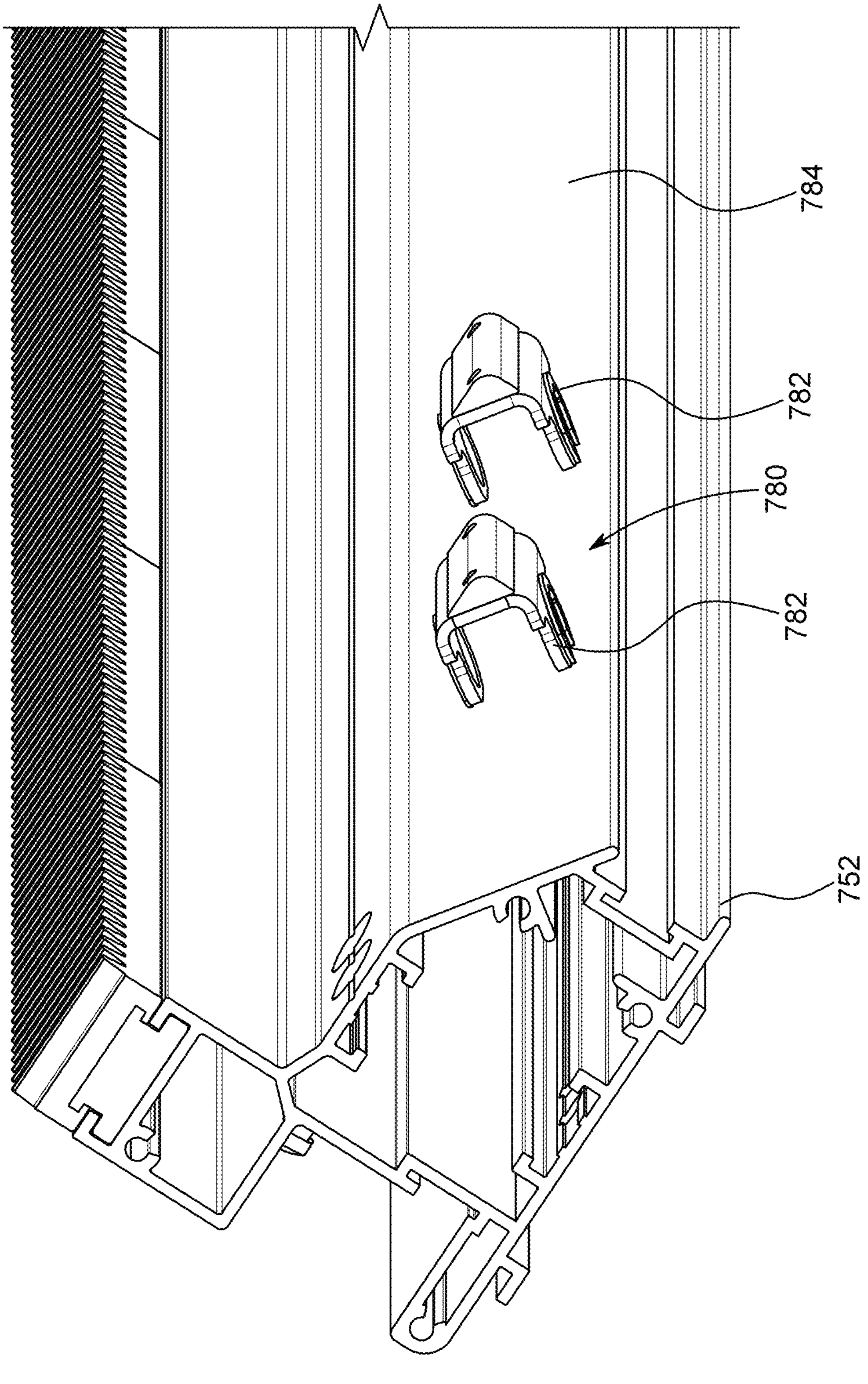

FIG. 242 schematically illustrates a straight rail system and guide roller assembly for use with the stair lift system of FIG. 217.

Figure 243:
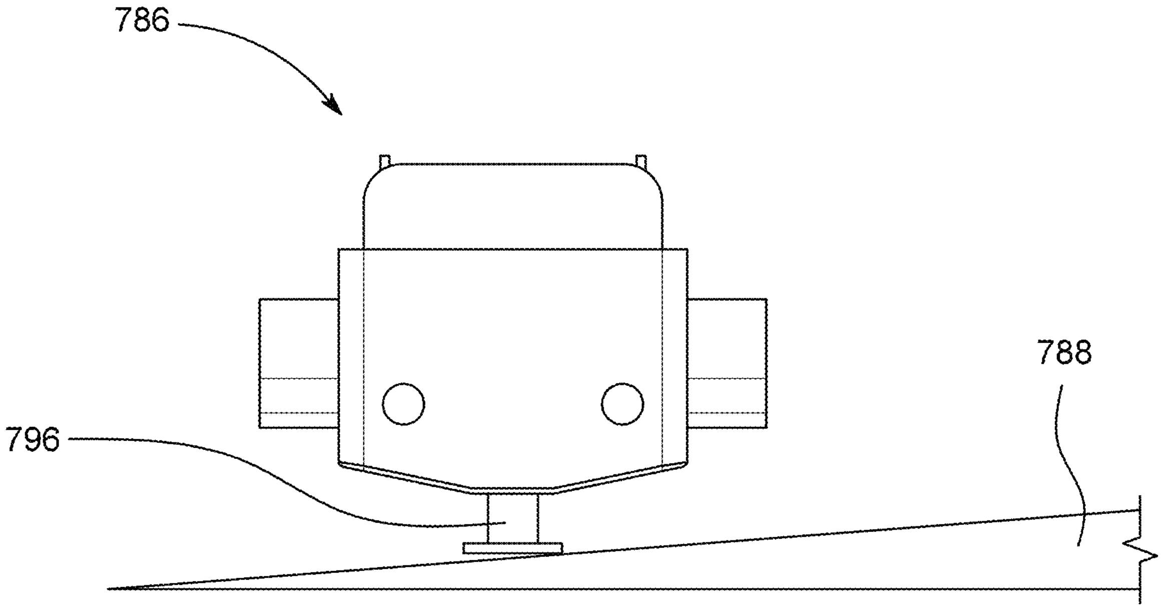

FIG. 243 schematically illustrates a view of an end sensor assembly and a ramp for use with a stair lift system.

Figure 244:
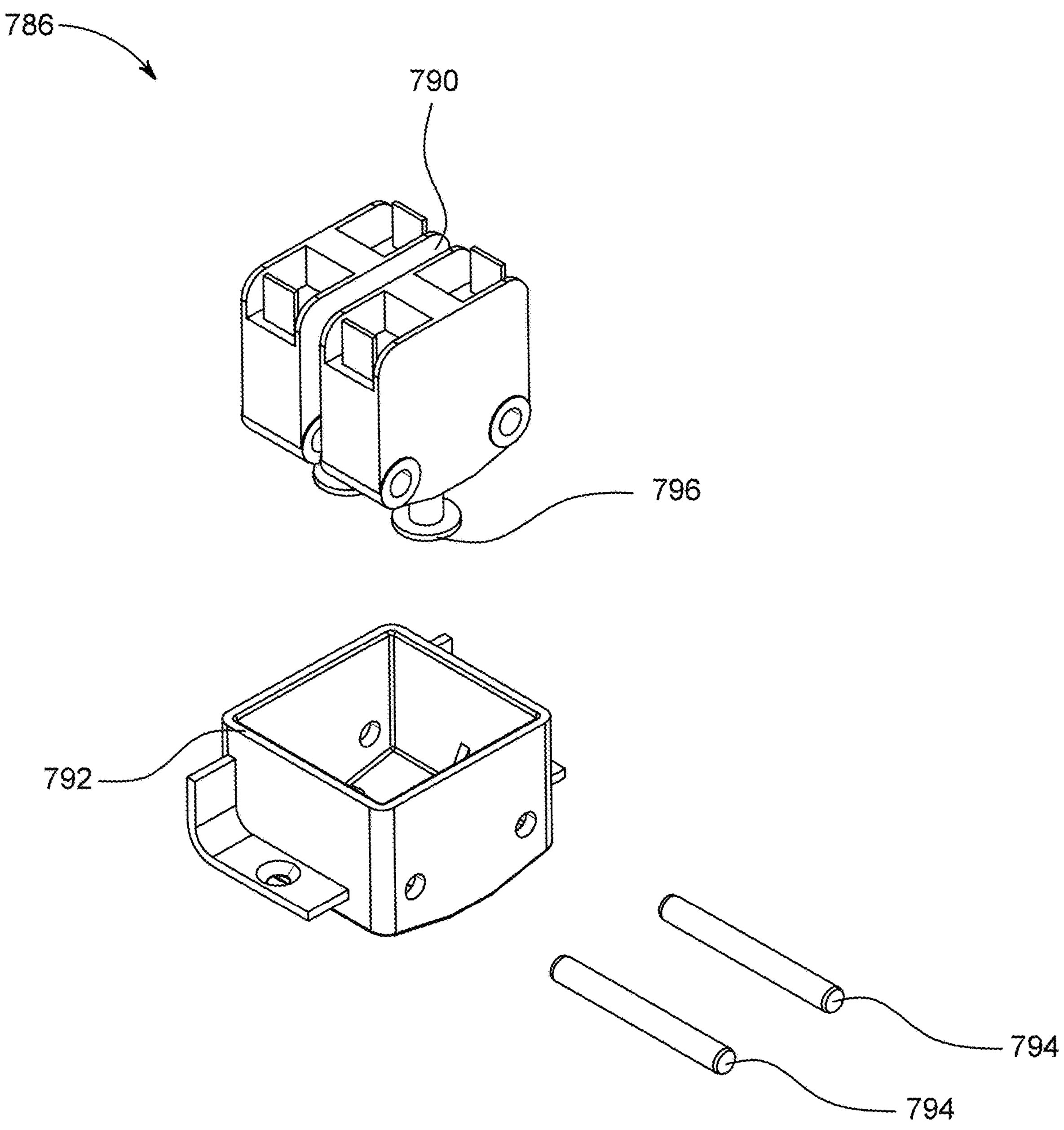

FIG. 244 schematically illustrates an exploded view of an end sensor assembly.

Figure 245:
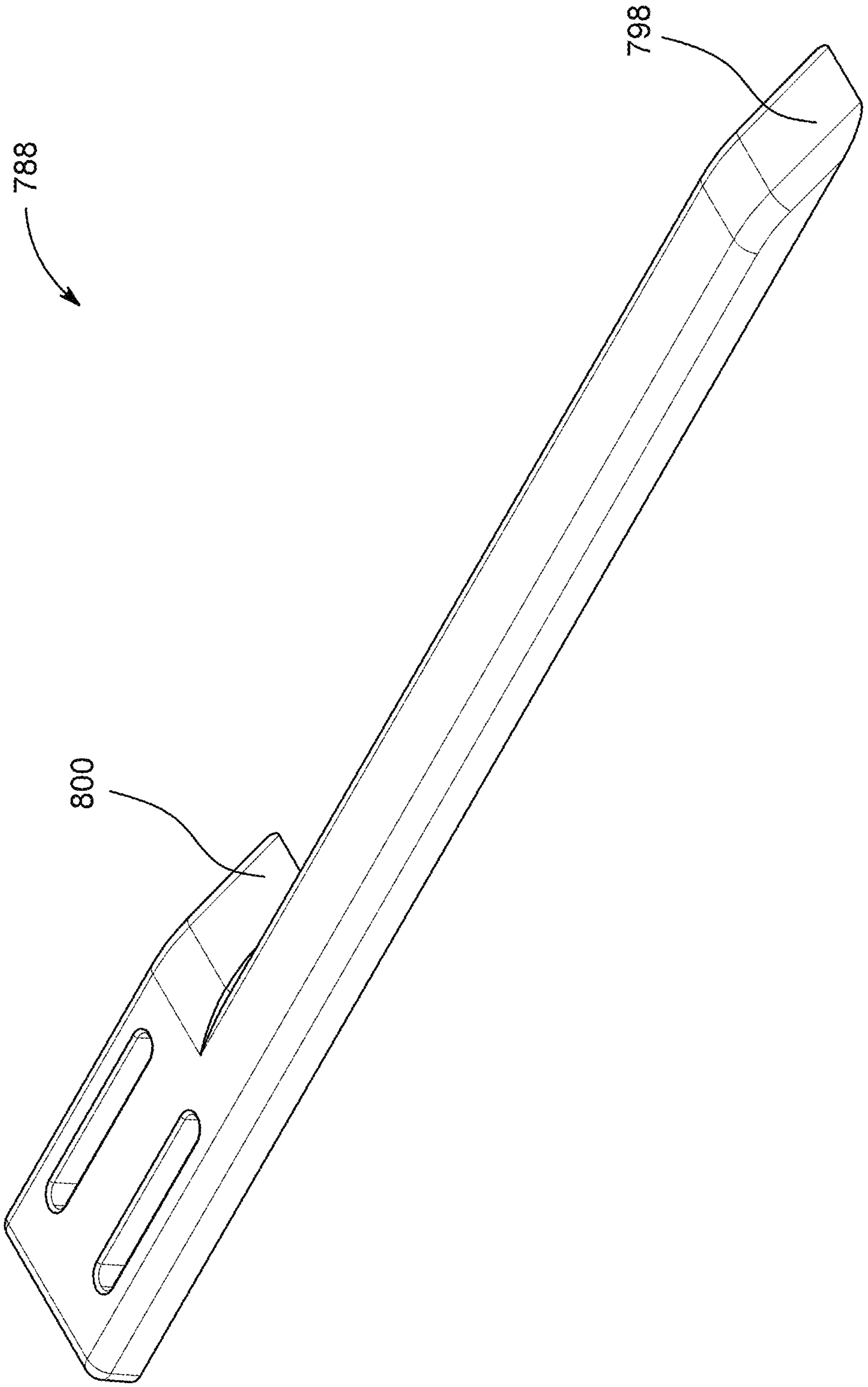

FIG. 245 schematically illustrates a perspective view of the ramp.

DETAILED DESCRIPTION

The apparatus, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of stair lift systems that includes a modular rail assembly and a chair that can be configured and assembled to accommodate a large variety of stairways and staircases are hereinafter disclosed and described in detail with reference made to FIGS. 1-245.

As will be described in detail herein, this disclosure is directed to embodiments of stair lift systems with modular stair rail assemblies, modular post assemblies, chairs, and a variety of subsystems for convenient operation and safety that together are suitable for forming a stable and configurable system to assist a user in traversing pre-existing stairways and staircases in residential and commercial settings. The embodiments are arranged to facilitate efficient manufacturing, transporting, inventorying, sourcing, distributing, delivering, assembling, and installing such stair lift systems regardless of the arrangement or configuration of the pre-existing stairway or staircase. In particular, the modular stair rail assemblies disclosed herein (also referred to generally as "rail systems") can include multiple subcomponents that are arranged to be interchangeably assembled to accommodate the spatial, dimensional, and physical arrangement and configuration of the large variety of pre-existing residential and commercial stairways and staircases. Such stair lift systems, and specifically, such modular rail assemblies and modular post assemblies, can be customized and assembled on-site during the installation process by a contractor, other such worker, or even a homeowner. Once the modular post assemblies are assembled, several can be secured to one side of the treads of the staircase from the bottom of the staircase to the top of the staircase. Then the modular rail assembly can be configured and assembled (as a pair of rail subassemblies) and secured to the modular post assemblies along one side of the staircase such that the modular rail assembly extends from the bottom of the staircase to the top of the staircase. A chair can be engaged with the rail assembly such that the chair can traverse the length of the rail assembly to move the chair and its occupant selectively and safely between the bottom and the top of the staircase. In certain embodiments, the rail system can be secured directly to the treads of a staircase without the need for posts. Embodiments of stair lift system described herein are suitable for staircases that include landings and turns along the staircase as well as straight staircases.

Figure 2:
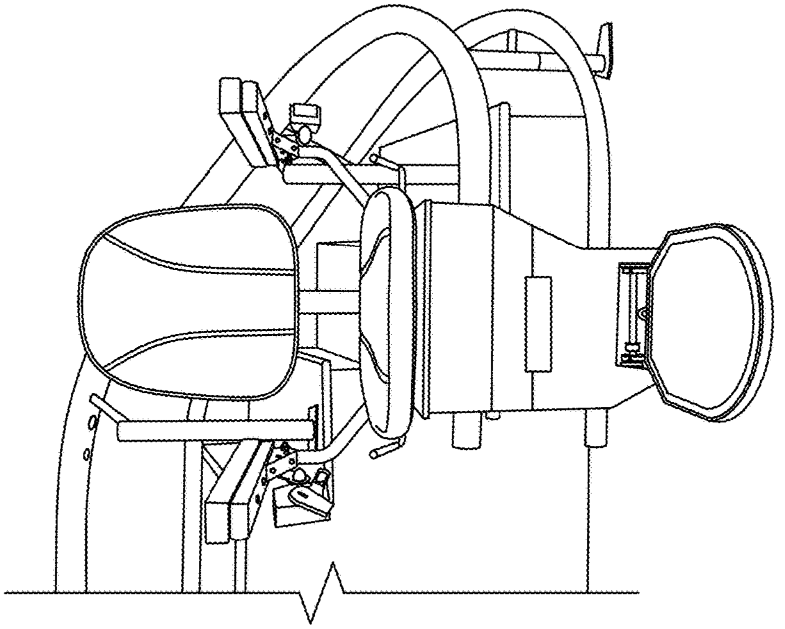
FIG. 2 PRIOR ART
FIG. 2 is a photograph of a prior art stair lift system.
Figure 1:
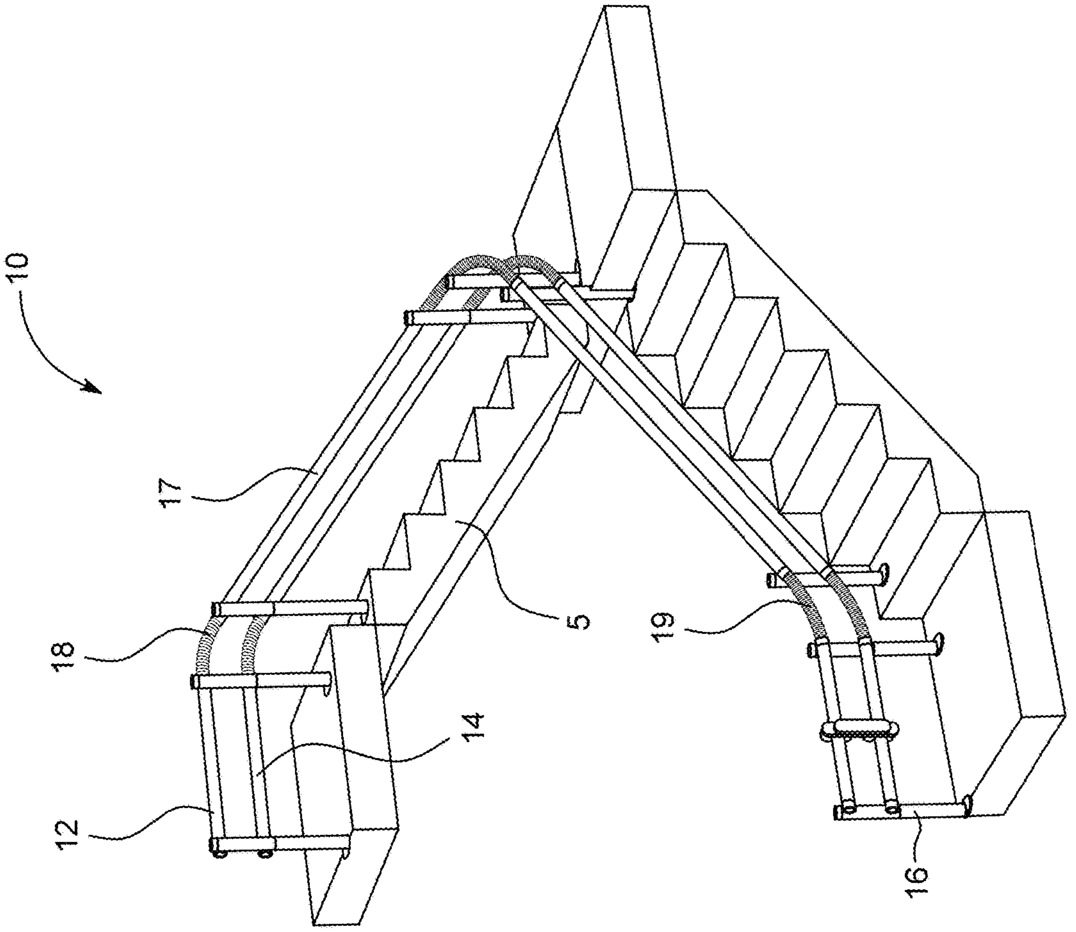
FIG. 1 is a schematic representation of a modular rail assembly for use with a stair lift system.

FIG. 1 schematically illustrates one embodiment of a modular rail assembly 10 installed and secured at one edge of a pre-existing staircase 5. The modular rail assembly 10 includes an upper rail subassembly 12 and a lower rail subassembly 14 supported by a series of modular post assemblies 16. It will be appreciated that the modular rail assembly 10 is customized to accommodate the angle of the staircase, the size of the lower, middle, and upper landings, and the 180 degree turn at the middle landing. FIG. 2 is a photograph of a prior art stair lift system. The stair lift system uses a dual rail arrangement equipped with a traction drive system, propelling the chair from a first lower floor in a home to a second, higher floor in the home. It will be appreciated that prior art lift chairs and drive systems, including traction drive systems, may be combined with the modular rail assemblies disclosed herein. Moreover, the modular rail assemblies may be adapted to accommodate various embodiments of commercially available lift chairs or lift chairs built specifically for use with the modular rail assembly.

Figure 3:
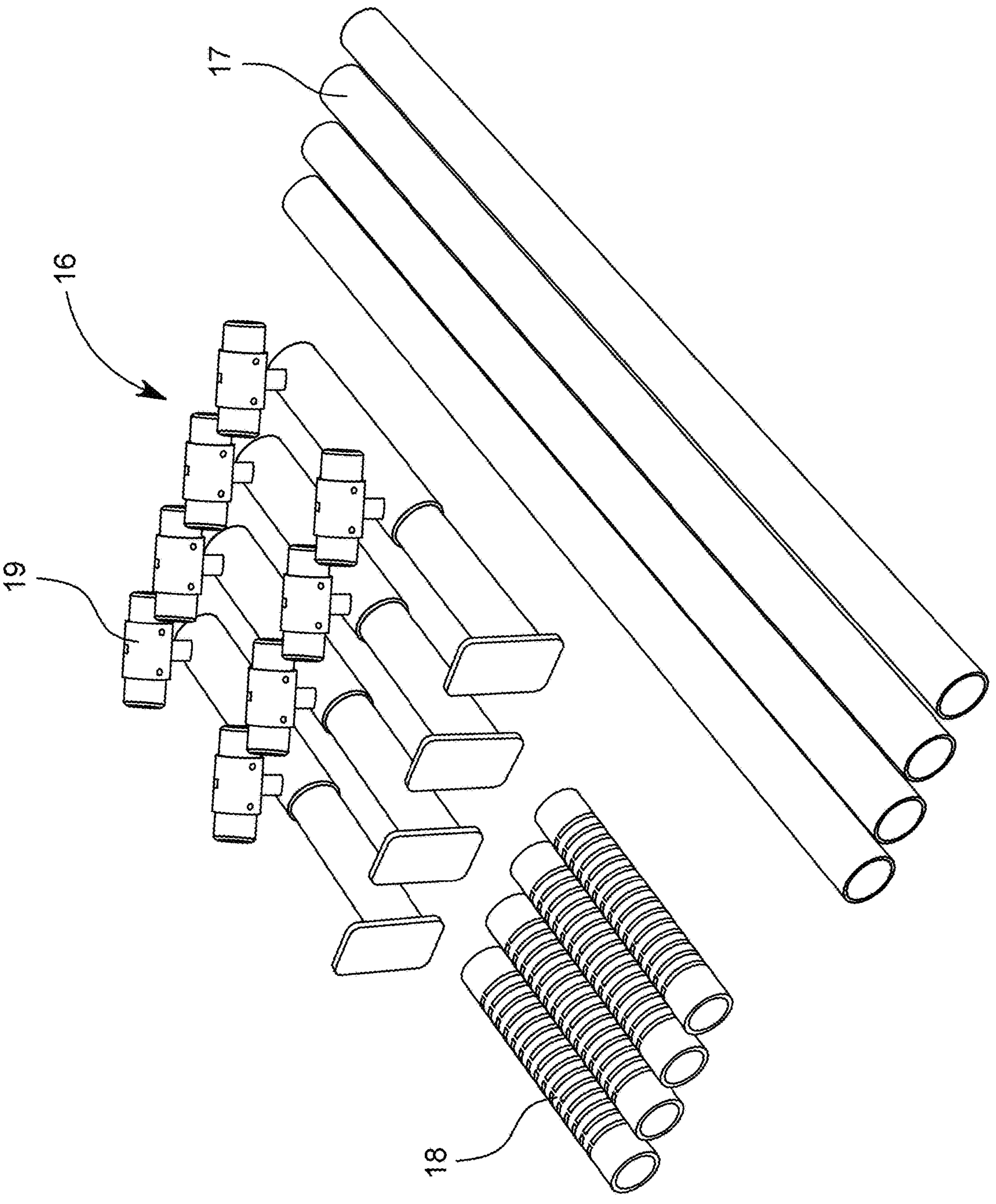
FIG. 3 is a perspective view of a variety of components useful in assembling an embodiment of a modular rail assembly for use with a stair lift system.

As shown in FIG. 1 and FIG. 3, the modular rail assembly (also referred to herein as a "rail assembly") 10 may include a plurality of modular post assemblies 16, a plurality of straight rail segments or segments 17, and a plurality of corner rail segments or segments 18. The modular post assemblies 16 and rail segments 17 and 18 may be joined together to form the rail assembly 10 using connectors 19 coupled to the modular post assemblies 16. The corner rail segments 18 illustrated in FIG. 3 are designed to bend to accommodate the configuration of the customer's staircase, allowing an installer to dynamically customize the shape and arrangement of the rail assembly during the installation process.

Figure 4:
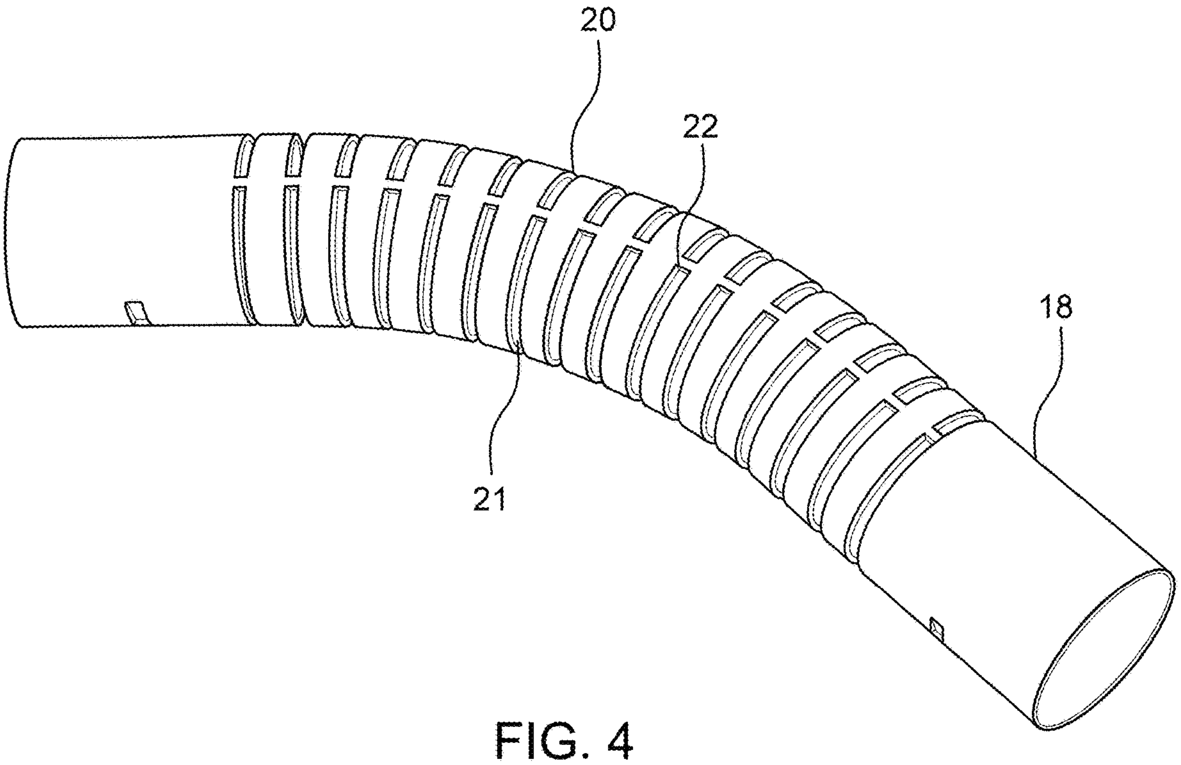
FIG. 4 is a top perspective view of a corner rail segment for use in a modular rail assembly.
Figure 5:
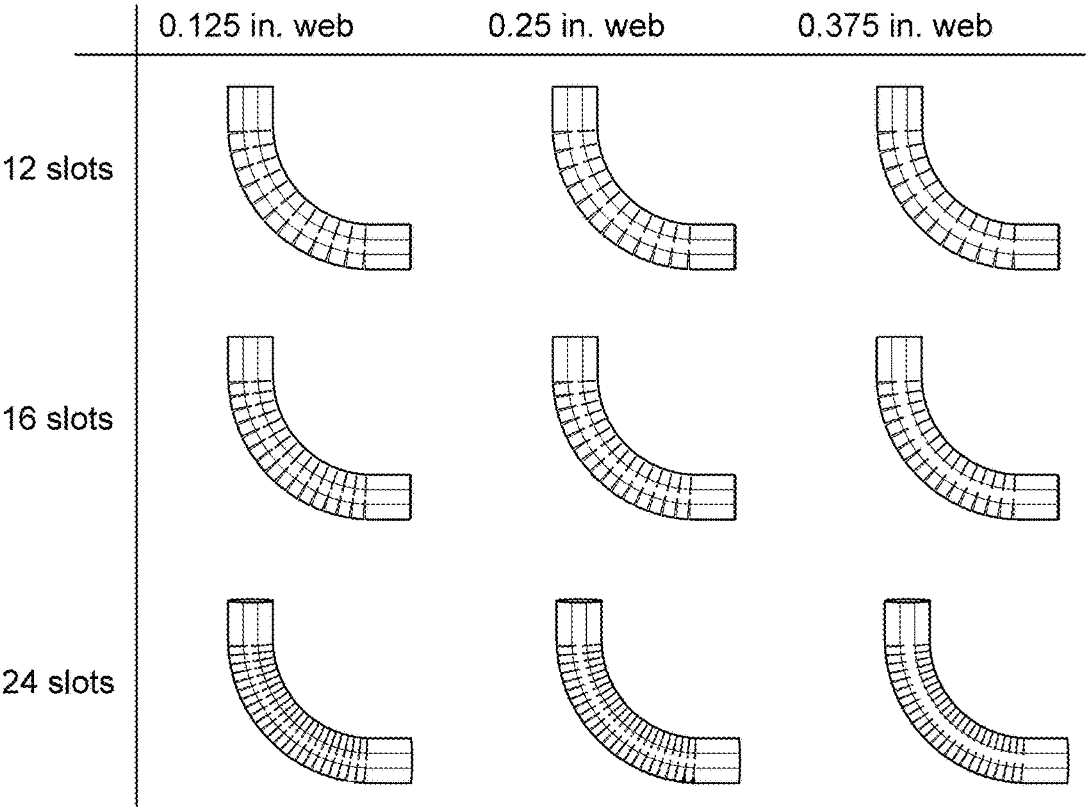
FIG. 5 is a top perspective view of alternative embodiments of a corner rail segment suitable for use in the modular rail assembly.

As illustrated in FIG. 4, in one embodiment, the corner rail segments 18 include a plurality of laser cut openings 20. The openings 20 may be positioned along a length of the corner rail segment 18 and may be separated from a corresponding opening 21 by a solid web of rail material 22. The plurality of corresponding openings 20, spaced apart by a solid web 22, allows the corner rail segment 18 to be manually bent to whatever angle is needed by the installation professional, in order to accommodate the dimensions of the unique or existing staircase. In one embodiment, the web 22 may be about 0.125 inches to about 0.375 inches, and in another embodiment, the web is about 0.25 inches wide. FIG. 5 illustrates various corner rail segments with different numbers of laser cut openings 20, ranging from 12 openings to 24 openings. It will be appreciated that the corner rail segments 18 with a larger number of openings will be able to be bent to tighter angles. Such variability in the arrangement of the cut openings can provide additional customization of a modular rail assembly.

Figure 6:
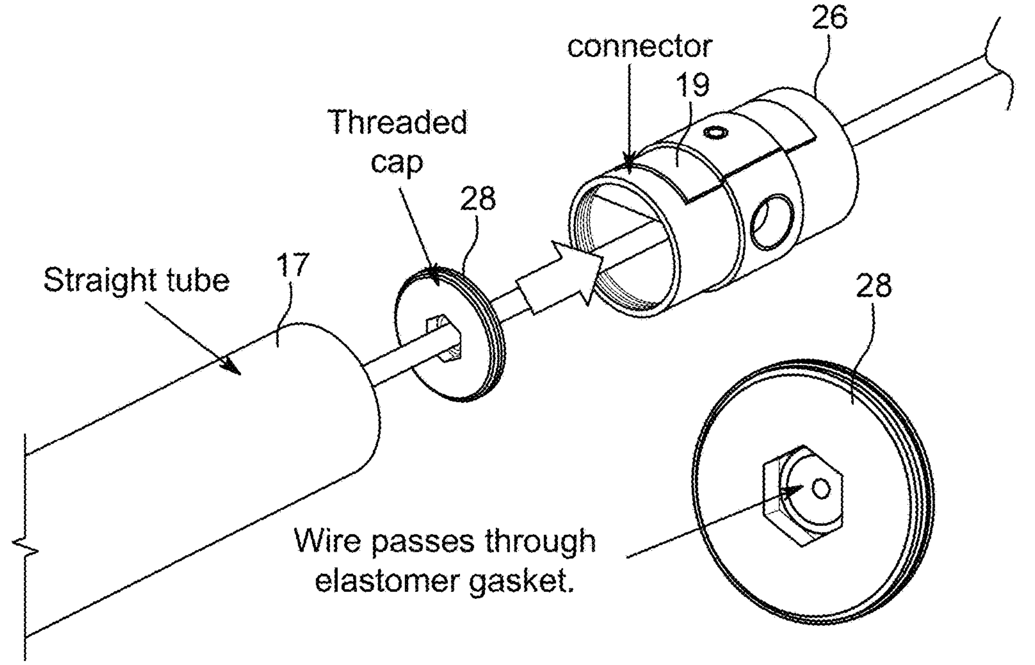
FIGS. 6-9 are top perspective views of components of the modular rail assembly illustrating a method for assembling the same.
Figure 7:
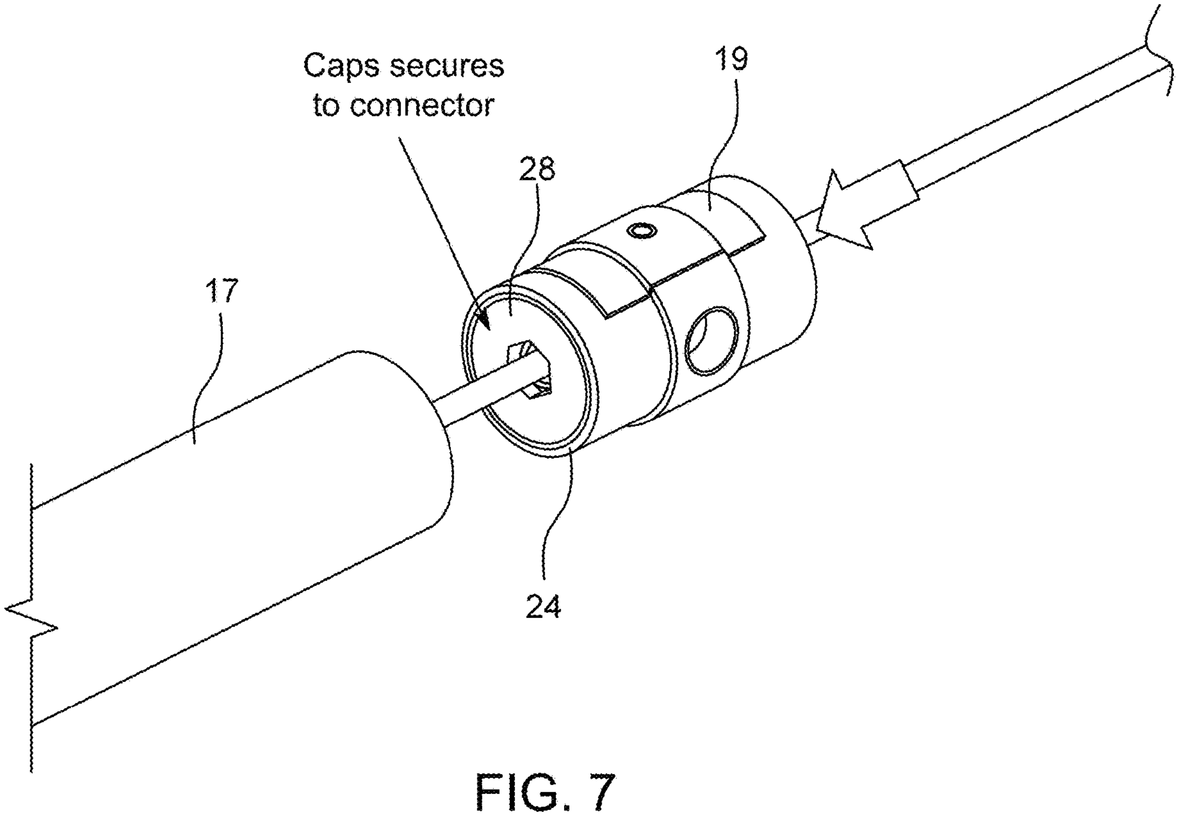
Figure 8:
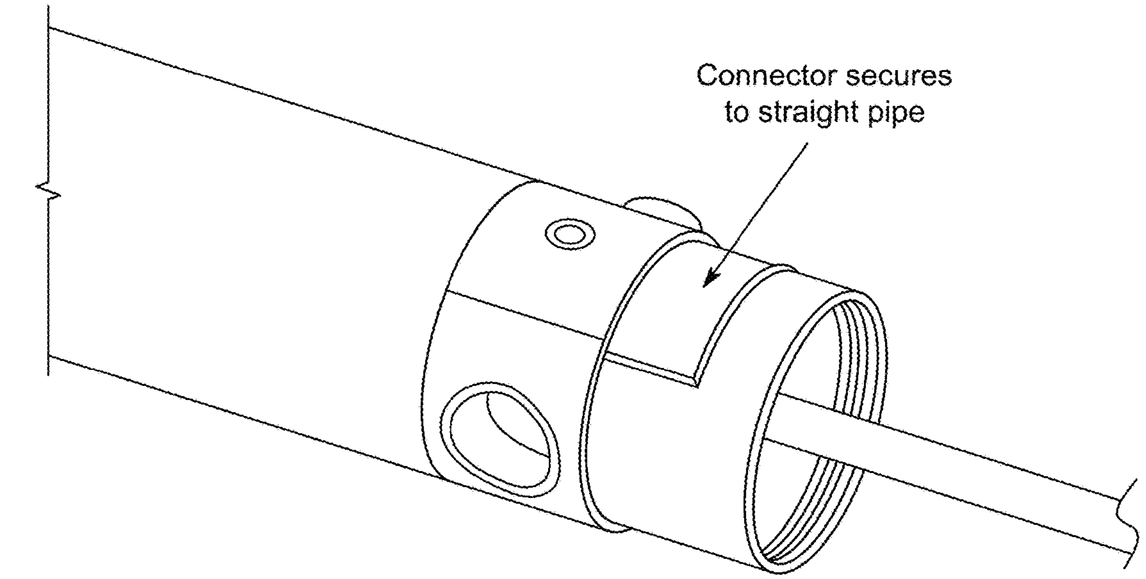
Figure 9:
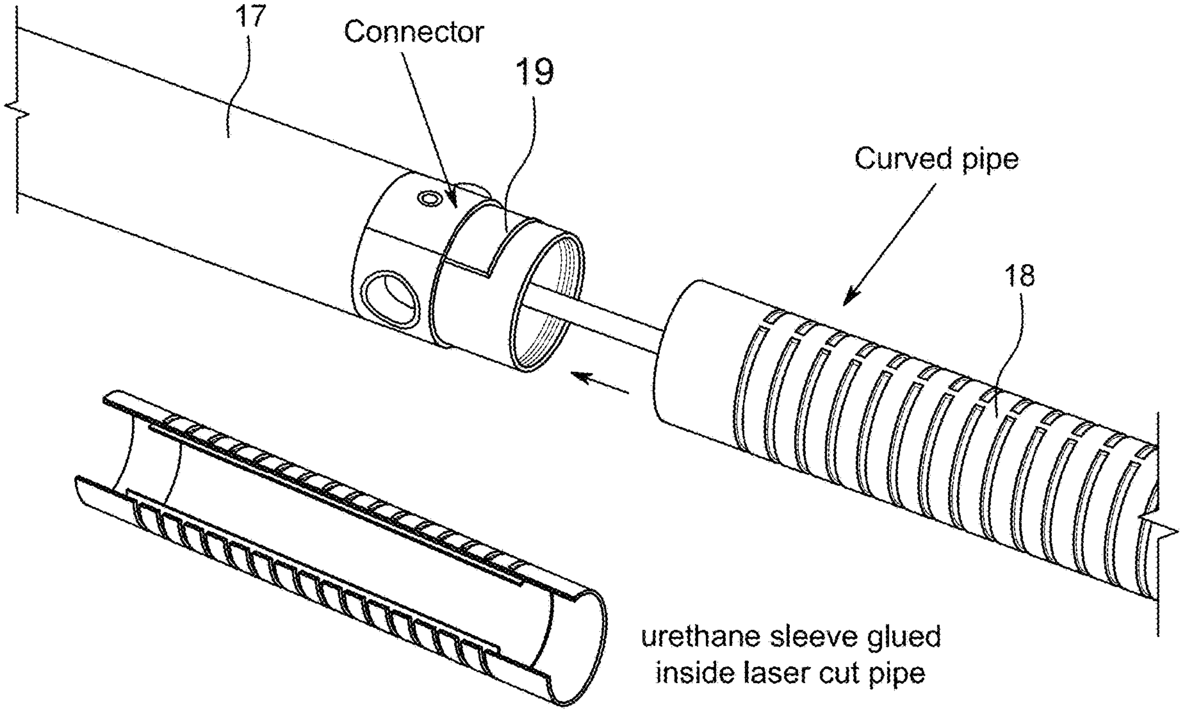
Figure 10:
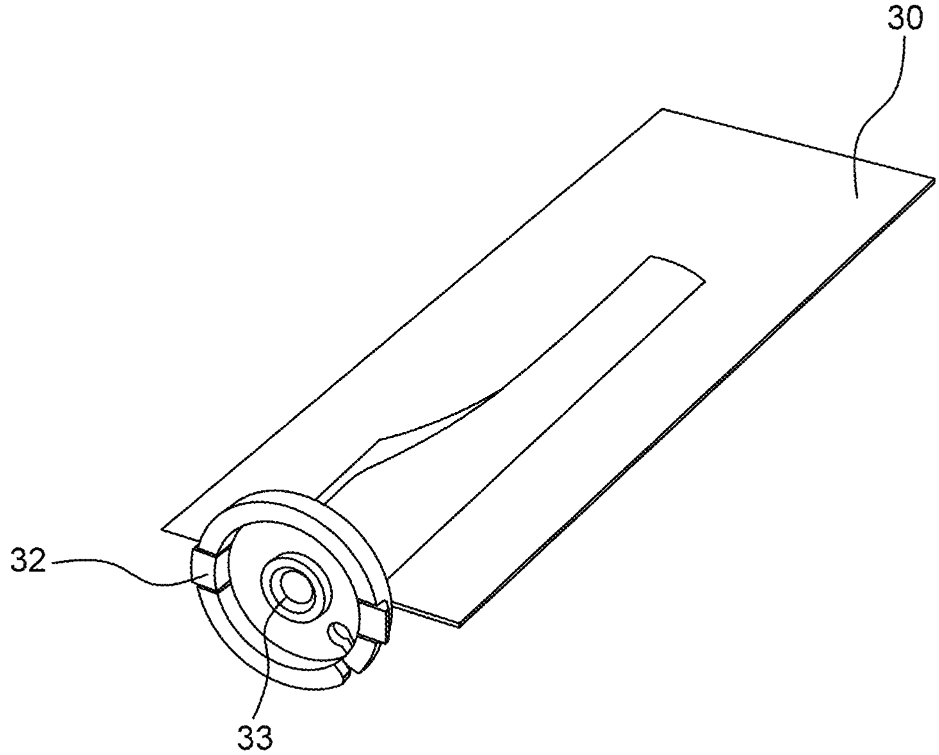
FIGS. 10-15 are top perspective views of various components for use in assembling a corner rail segment for use with a modular rail assembly.

Referring now to FIGS. 6-9, the corner rail segments 18 may be connected to the straight rail segments 17, or other corner rail segments 18, using connectors 19. As described above, the connectors 19 are generally coupled to the post assemblies 16; however for purposes of illustration, FIGS. 6-9 show the connectors 19 without the rest of the post assembly 16. The connectors 19 may be coupled to the post assemblies 16 such that the connectors 19 swivel or otherwise rotate to accommodate the angle between the post assembly 16 and one or more rail segments 17, 18. As shown in FIG. 6, a connector 19 may generally include a distal end 24 and a proximal end 26. The connector 19 may also include one or more threaded caps 28 configured to fit inside of either end 24 or 26 and facilitate wiring for the stair lift system. The straight 17 and corner 18 rail segments may be made of any suitable material, such as stainless steel. In addition, the straight rail segments 17 may be cut to any custom length during installation using tools readily available to installation professionals. In one embodiment, the corner rail segments 18 are all the same length and may be attached to one another to effectuate the proper dimensions and shape of the rail assembly 10 (as shown in FIG. 2).

Figure 14:
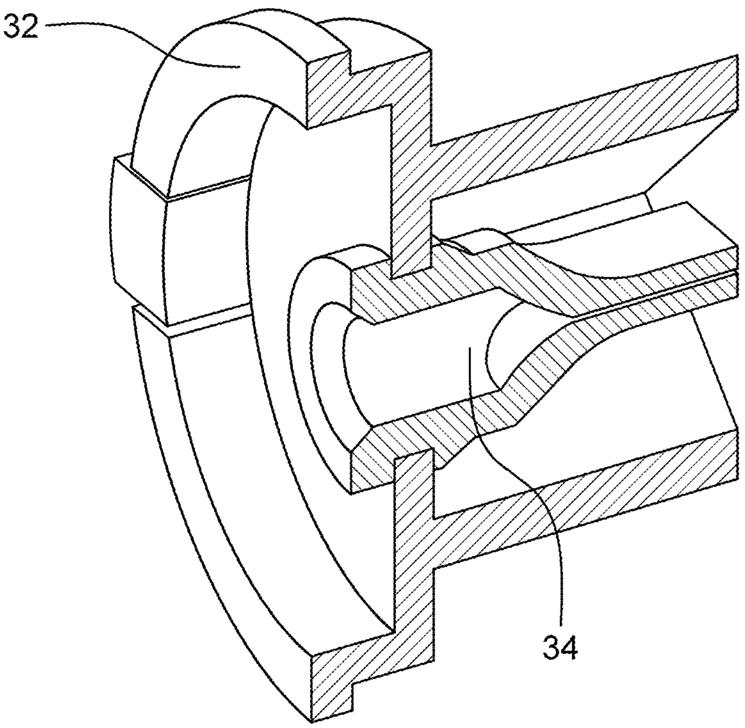
Figure 15:
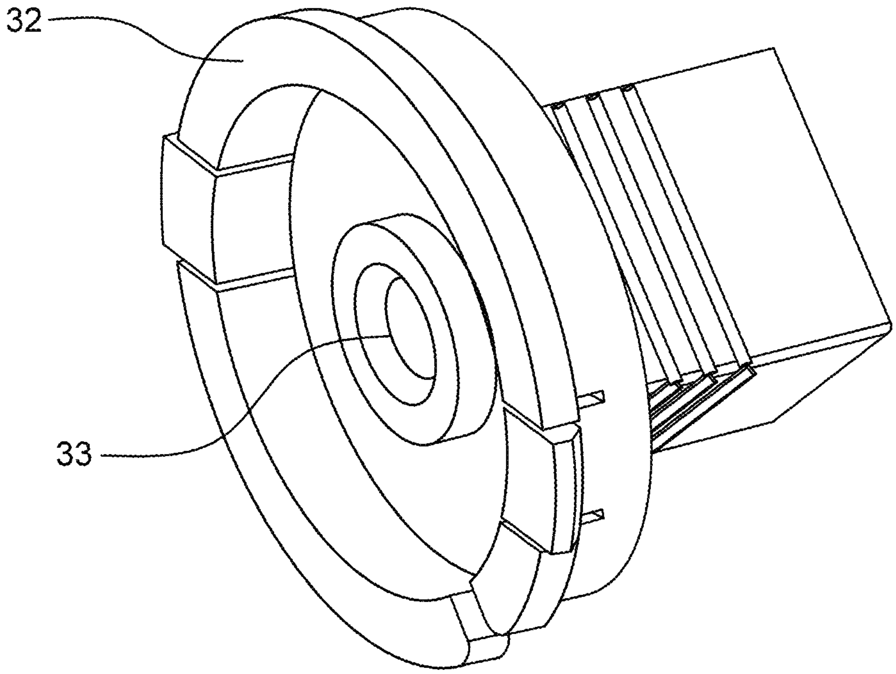

As illustrated in FIGS. 10-30, the corner rail segments 18 are designed and constructed to accommodate a wide variety of different weights and loads. For example, the stair lift system may need to accommodate users that weight up to 450 pounds. Therefore, it may be necessary to reinforce these laser-cut corner rail segments 18 to prevent failure of the stair lift system while in use. As shown in FIGS. 10-17, in one embodiment, the corner rail segment 18 may include an internal bladder 30 designed to be positioned within the corner rail segment and subsequently inflated by the insertion of epoxy resin. The process includes first bending the corner rail segment 18 to its desired final arraignment, rolling up the bladder 30 and positioning the bladder 30 within the corner rail segment 18. Once so positioned, epoxy resin is injected into the bladder 30. When hardened, the resin provides a rigid internal structure that increases the strength to the corner rail segment 18. In this embodiment, the bladder 30 is fitted with an end cap 32. The end cap 32 may generally be designed to facilitate the influx of resin through a central opening 33, and in one embodiment may include a duck bill valve 34 (FIGS. 14 and 15). By first bending the corner rail segment 18 to a desired position and then adding the epoxy resin, this process provides for a customized corner rail segment 18 for use with the modular rail assembly.

Figure 11:
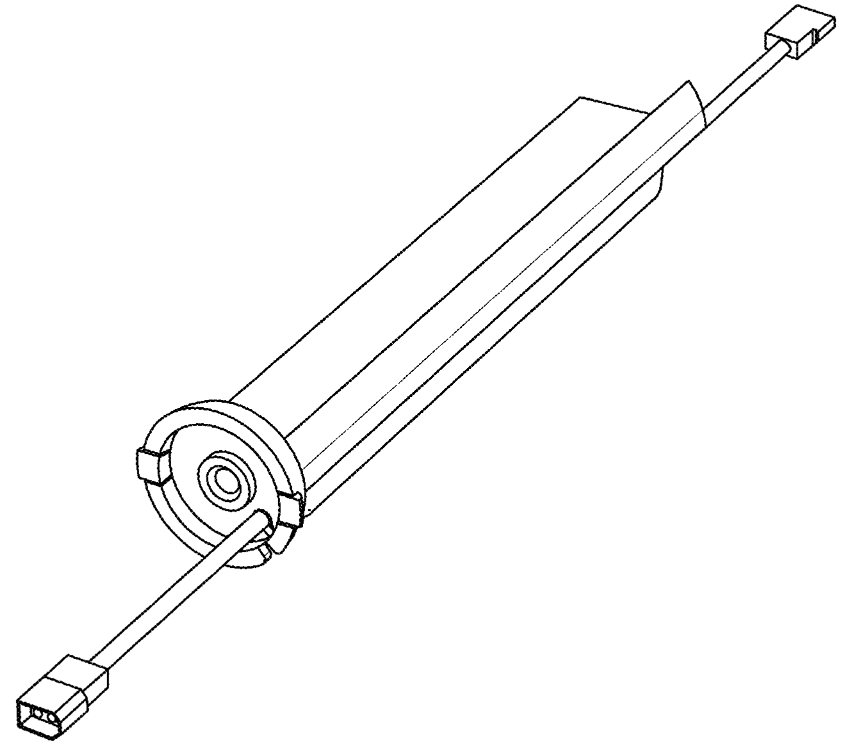
Figure 12:
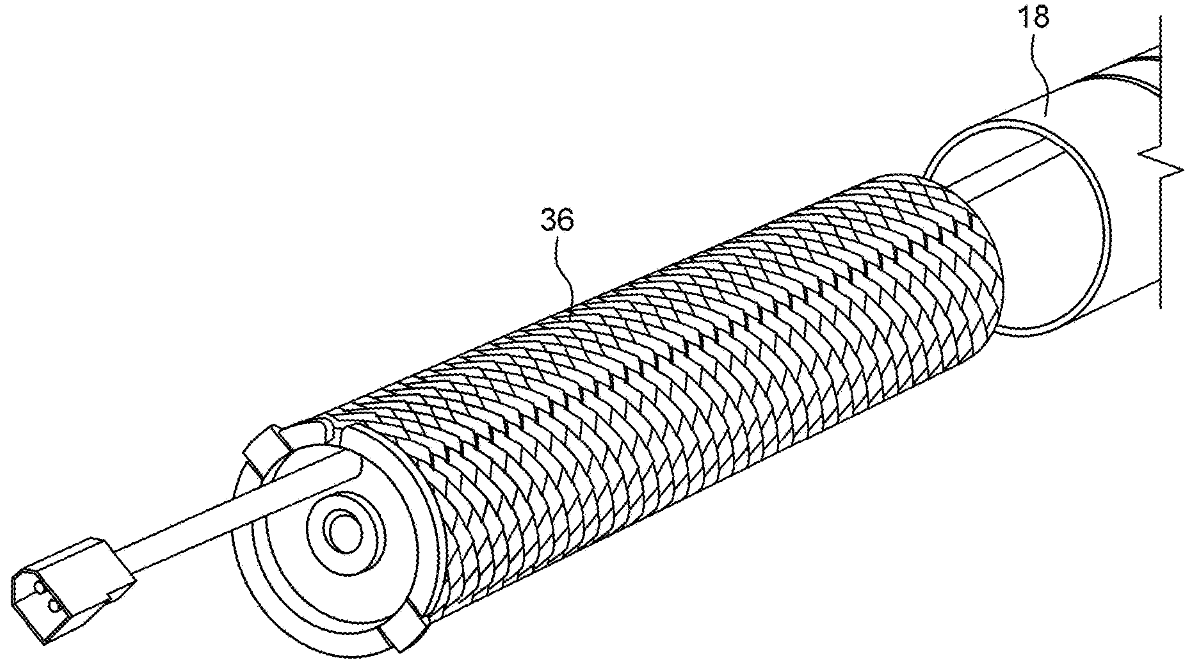
Figure 13:
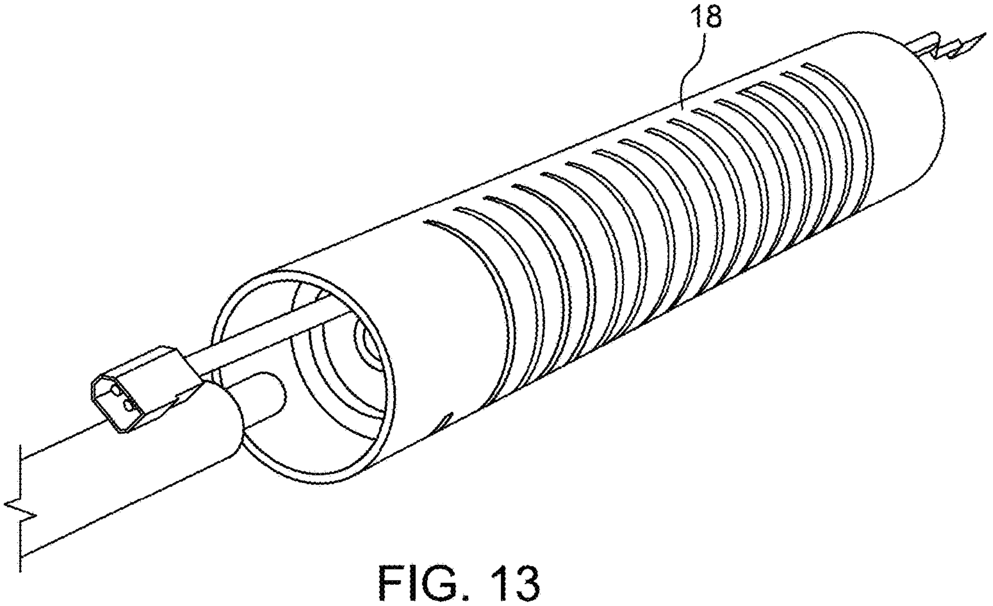
Figure 16:
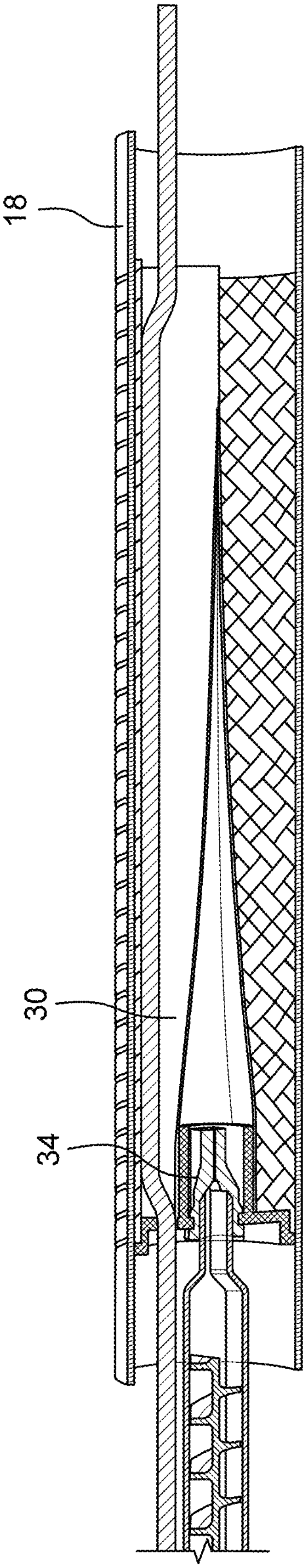
FIGS. 16 and 17 are cross-sectional views of the assembled corner rail segment shown in FIGS. 10-15.
Figure 17:
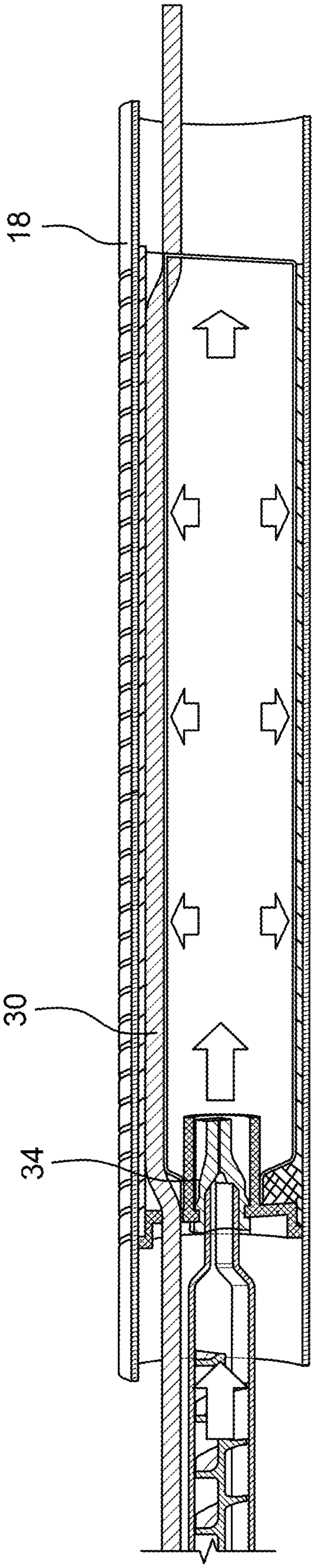
Figure 18:
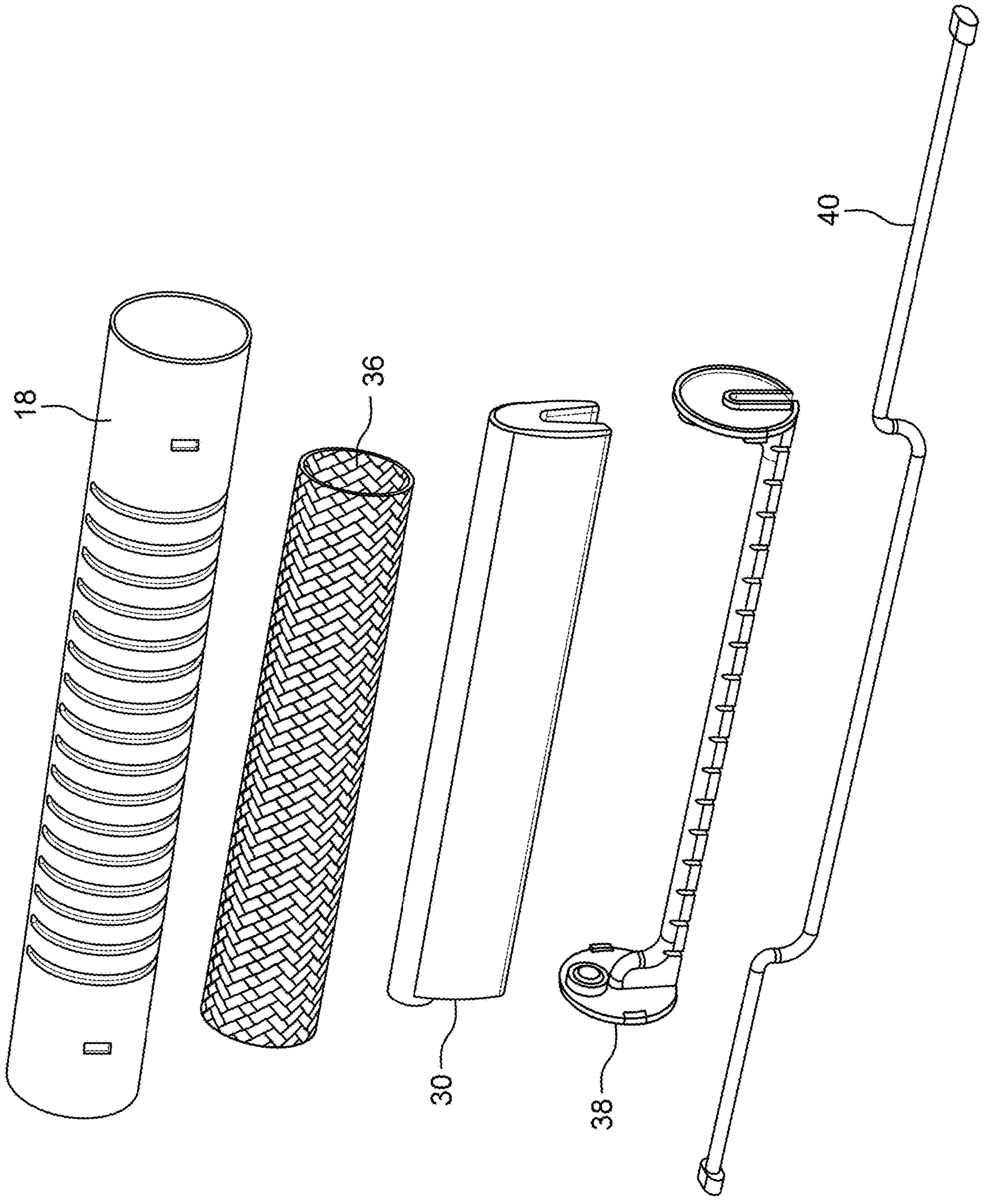
FIG. 18 is an exploded perspective view showing components for assembling another corner rail segment.
Figure 19:
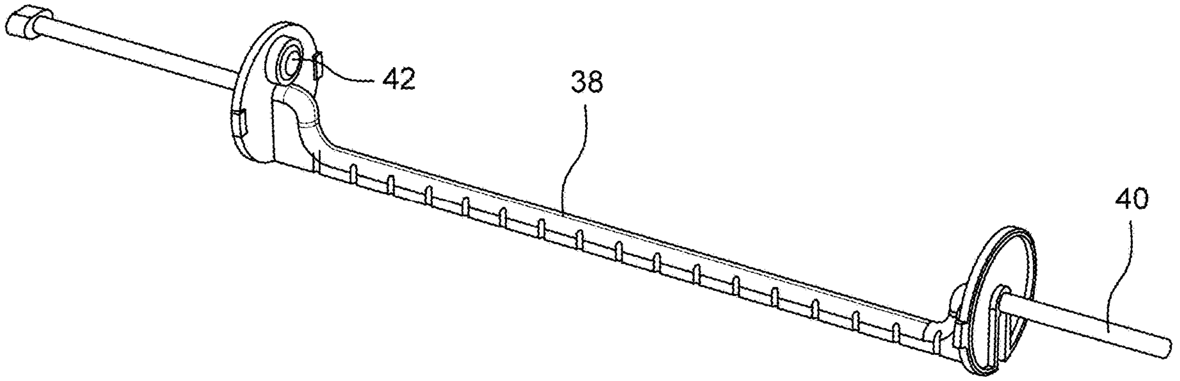
FIGS. 19-22 are top perspective views of the components for another corner rail segment shown in FIG. 18.
Figure 20:
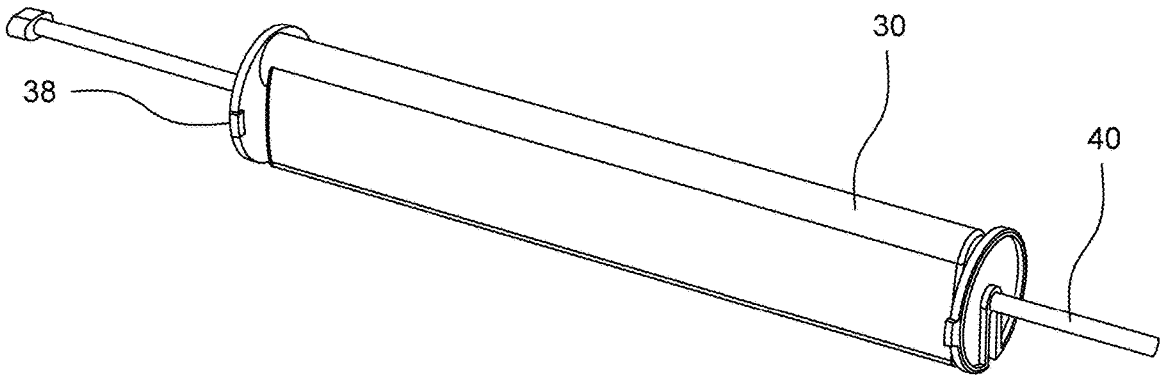
Figure 21:
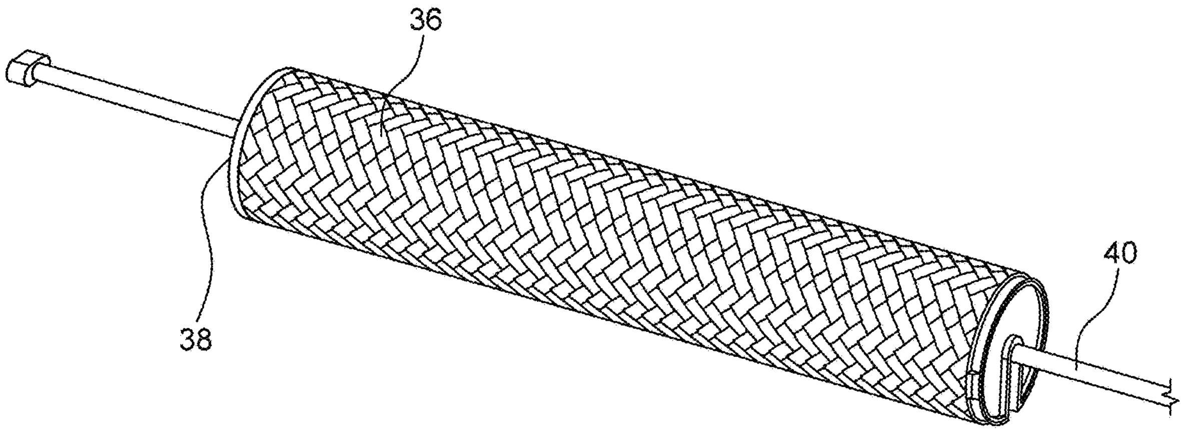
Figure 22:
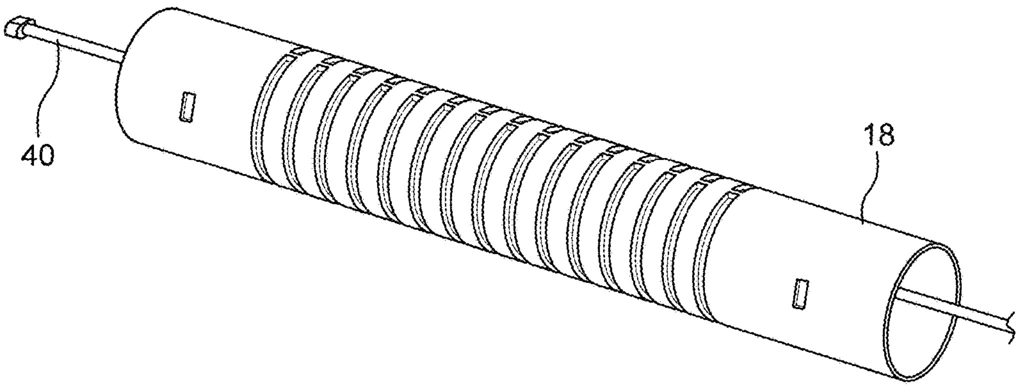

As generally noted above, during installation, the bladder 30 may be folded or rolled (as illustrated in FIG. 11) to a size that allows for the bladder 30 to be positioned within an outer sheath 36 (illustrated in FIG. 12), which in turn is positioned within the corner rail segment 18 (illustrated in FIG. 13). The outer sheath 36 may be made of any suitable material, such as nylon or urethane. In one embodiment, the sheath 36 may be made of an expandable braided nylon material, capable of bending to accommodate the shape of the corner rail segment 18. As illustrated in FIGS. 16 and 17, the corner rail segment 18 may be filled and reinforced with an epoxy resin by injecting resin through the duck bill valve 34, which causes the bladder 30 to expand and fill the internal space of the corner rail segment 18.

Figure 23:
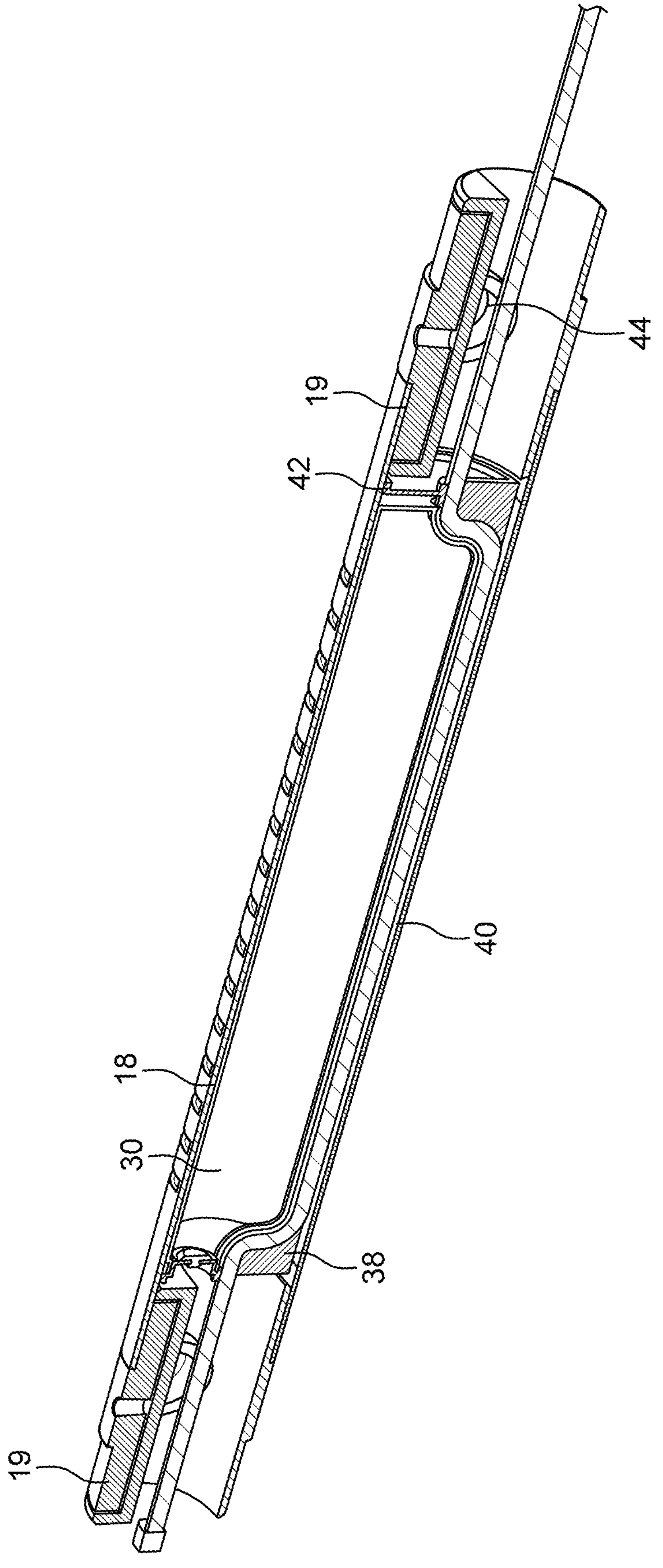
FIG. 23 is a cross-sectional view of the corner rail segment disclosed in FIGS. 18-22.
Figure 24:
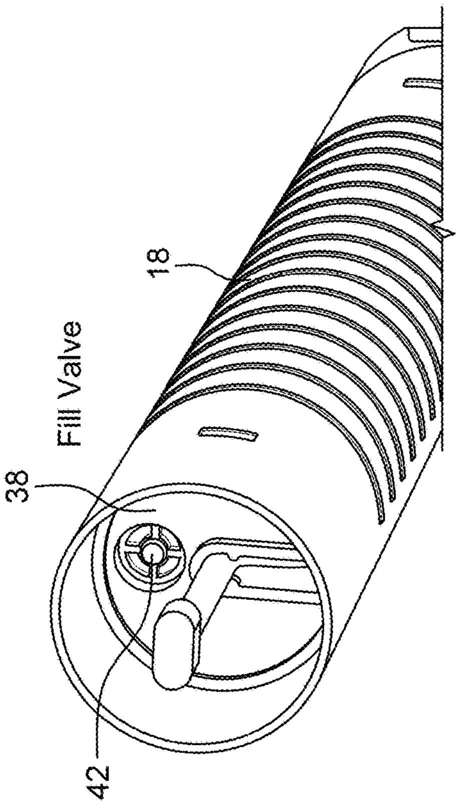
FIGS. 24-26 are end-perspective views of the corner rail segment disclosed in FIGS. 18-22, illustrating various steps in assembly.
Figure 26:
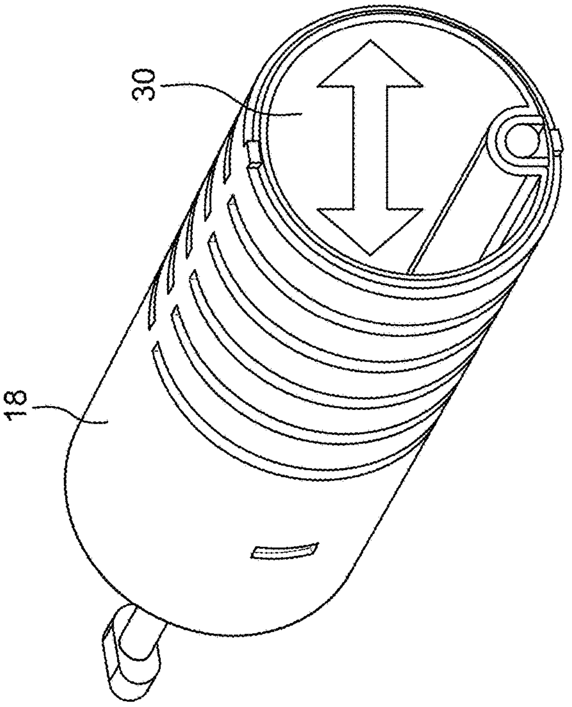
Figure 25:
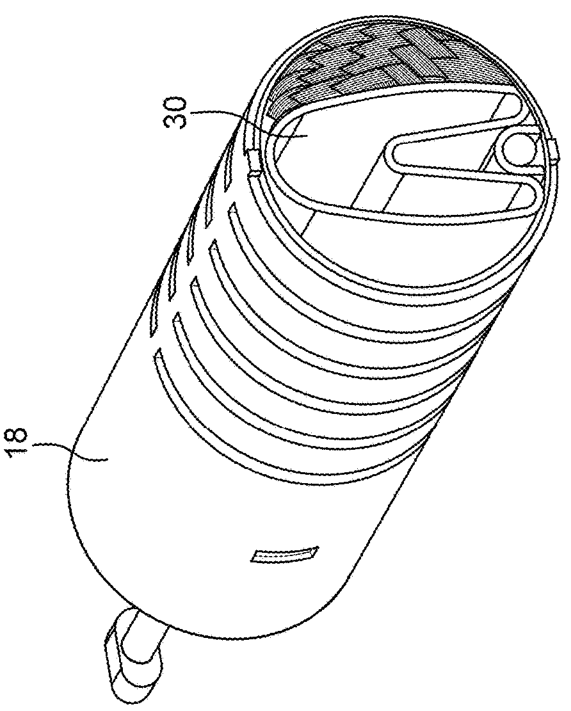
Figure 27:
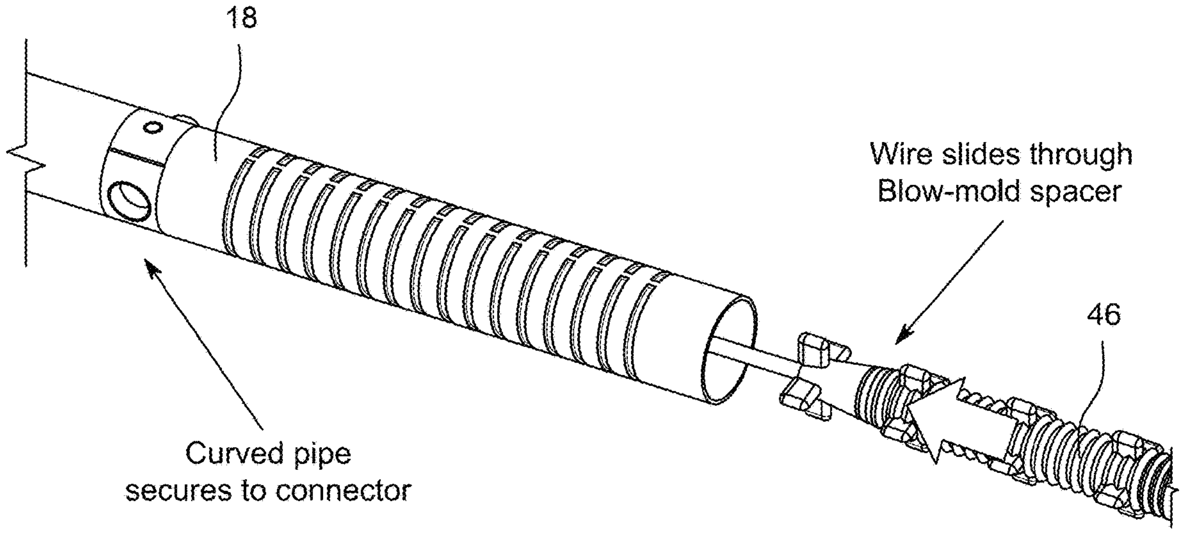
FIGS. 27-29 are exploded views of another corner rail segment suitable for use in the modular rail assembly.
Figure 28:
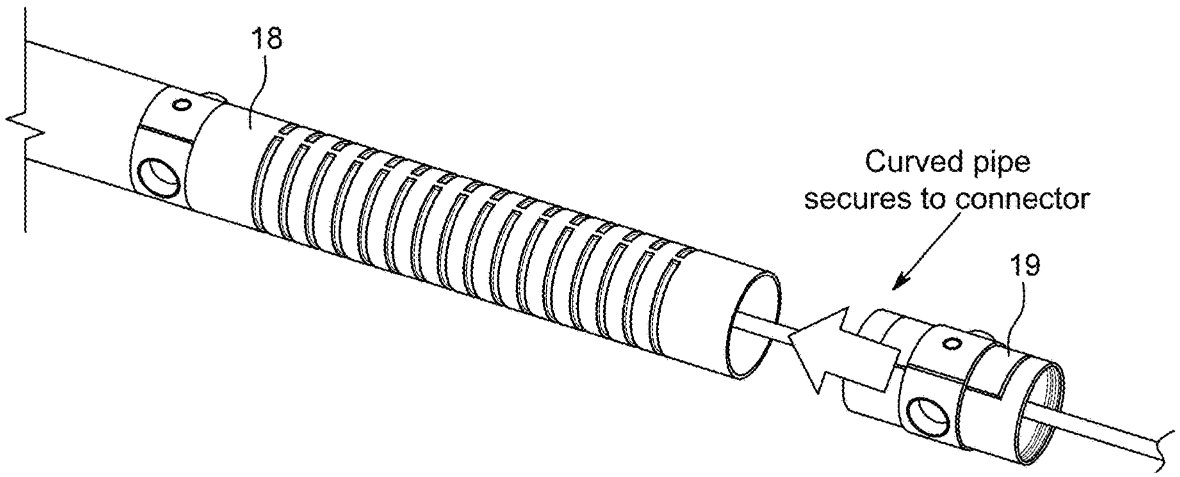
Figure 29:
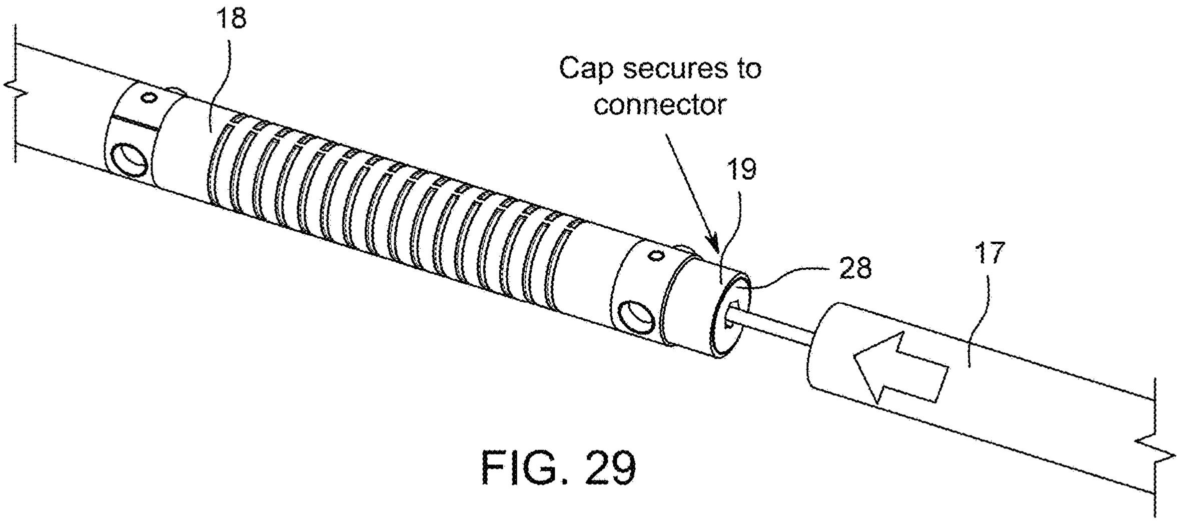
Figure 30:
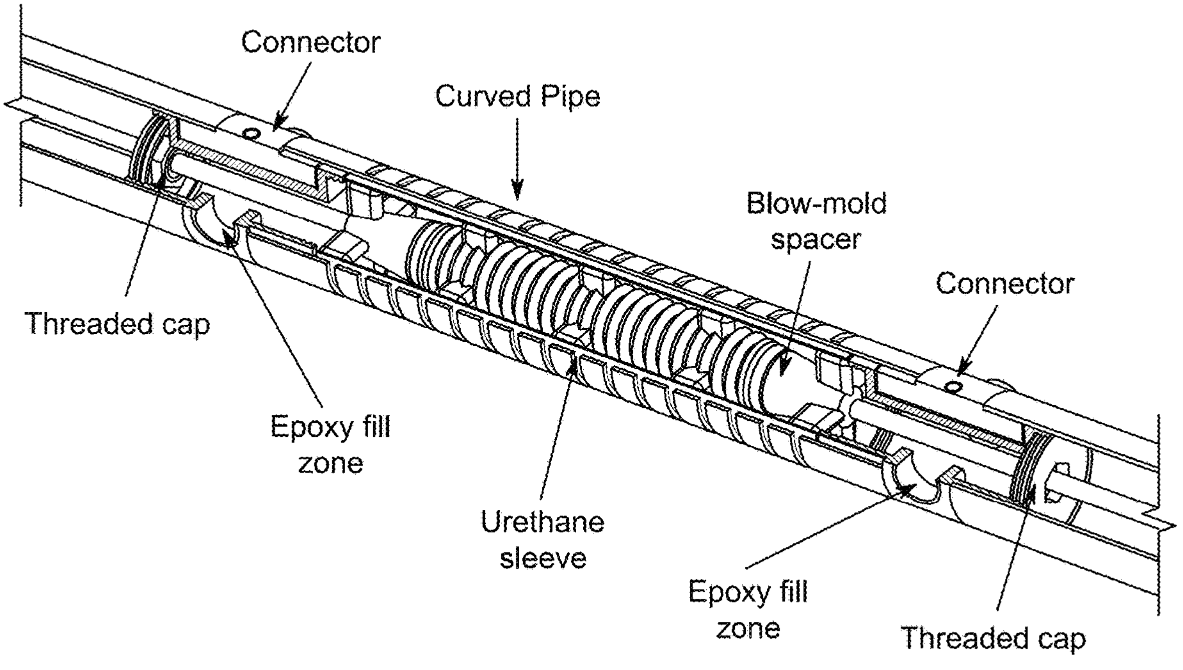
FIG. 30 is a cross-sectional view of the assembled corner rail segment shown in FIGS. 27-29.

In another embodiment, as shown in FIGS. 18-26, the empty bladder 30 may be mounted on a substructure component 38 and a daisy chain wire 40. In this embodiment, a fill valve 42 is positioned at one end of the substructure 38 to fill the bladder 30 with resin. As shown in FIG. 23, once coupled with the connectors 19, the assembled corner rail segment 18 may be filled with epoxy resin by injecting the epoxy resin through a fill hole 44 in the connector 19 and further through the fill valve 42 of the substructure component 38 (illustrated in FIG. 24). As the epoxy resin fills the bladder 30, the bladder will expand to fill the internal shape of the corner rail segment 18, as illustrated in FIGS. 25 and 26. In yet another embodiment, the bladder 30 may be replaced with a blow-mold spacer 46, as illustrated in FIGS. 27-30.

Figure 31:
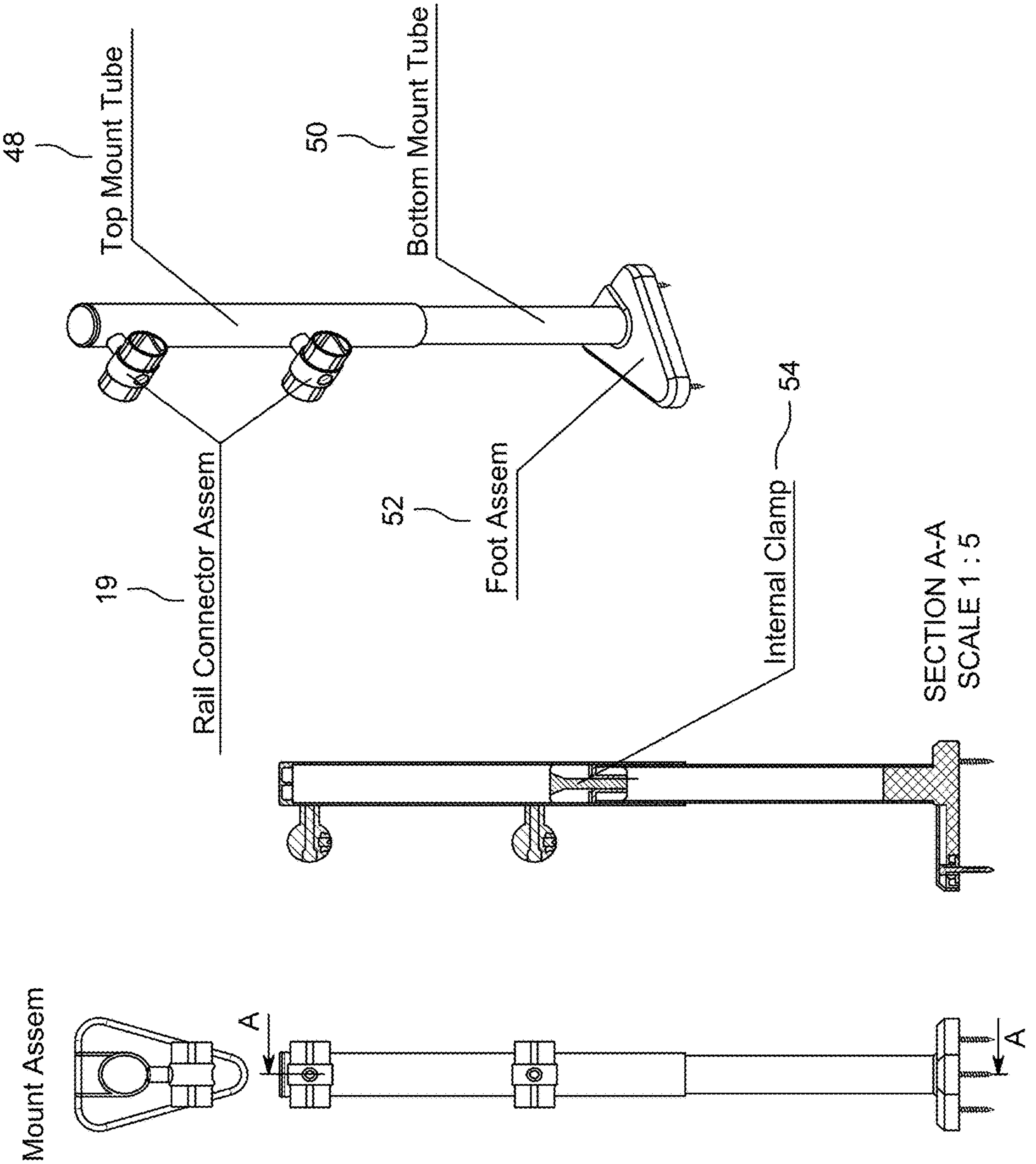
FIG. 31 is a schematic representation of a modular post assembly suitable for use with the stair lift system.
Figure 32:
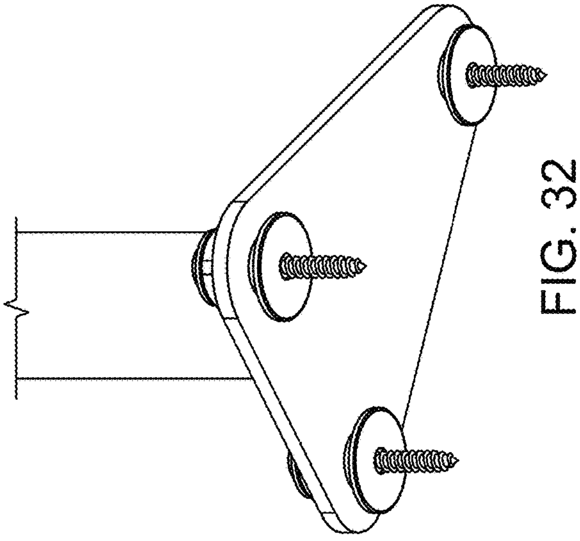
FIGS. 32-34 are rear perspective views of components of the modular post assembly shown in FIG. 31.
Figure 33:
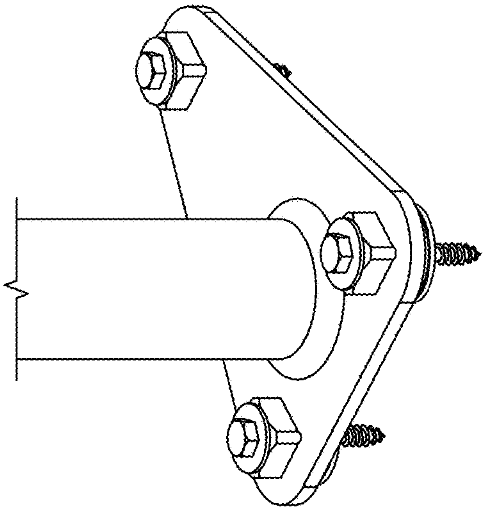
Figure 34:
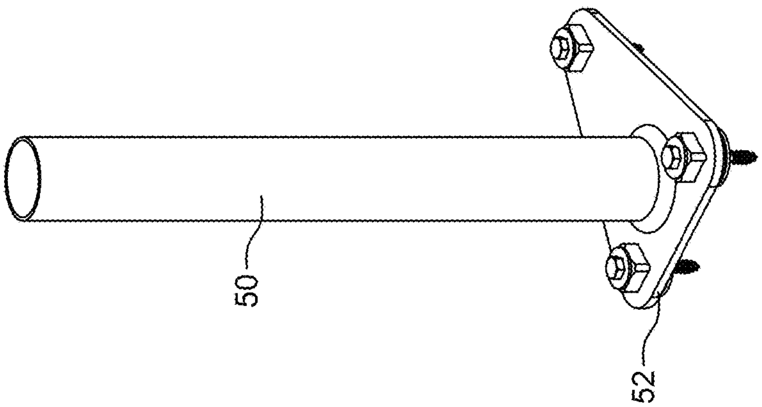

Now referring to FIGS. 31-35, the straight rail segment 17 and corner rail segments 18 are coupled to a set of post assemblies 16 (as illustrated in FIG. 1). As shown in FIGS. 31-34, the post assemblies 16 each include at least one, but an also include two, rail connectors 19 (a first and second connector to accommodate a top and bottom rail subassemblies), a top mount tube 48, a bottom mount tube 50, a foot assembly 52, and a clamp assembly 54. As illustrated in FIG. 31, the top mount tube 48 is configured to be concentric with the bottom mount tube 50, so that the height of the modular post assembly may be manually adjusted by sliding the top mount tube 48 up or down, relative to the bottom mount tube 50. Once in place, the top and bottom mount tubes 48 and 50 may be secured in place using a clamp assembly 54.

Figure 35:
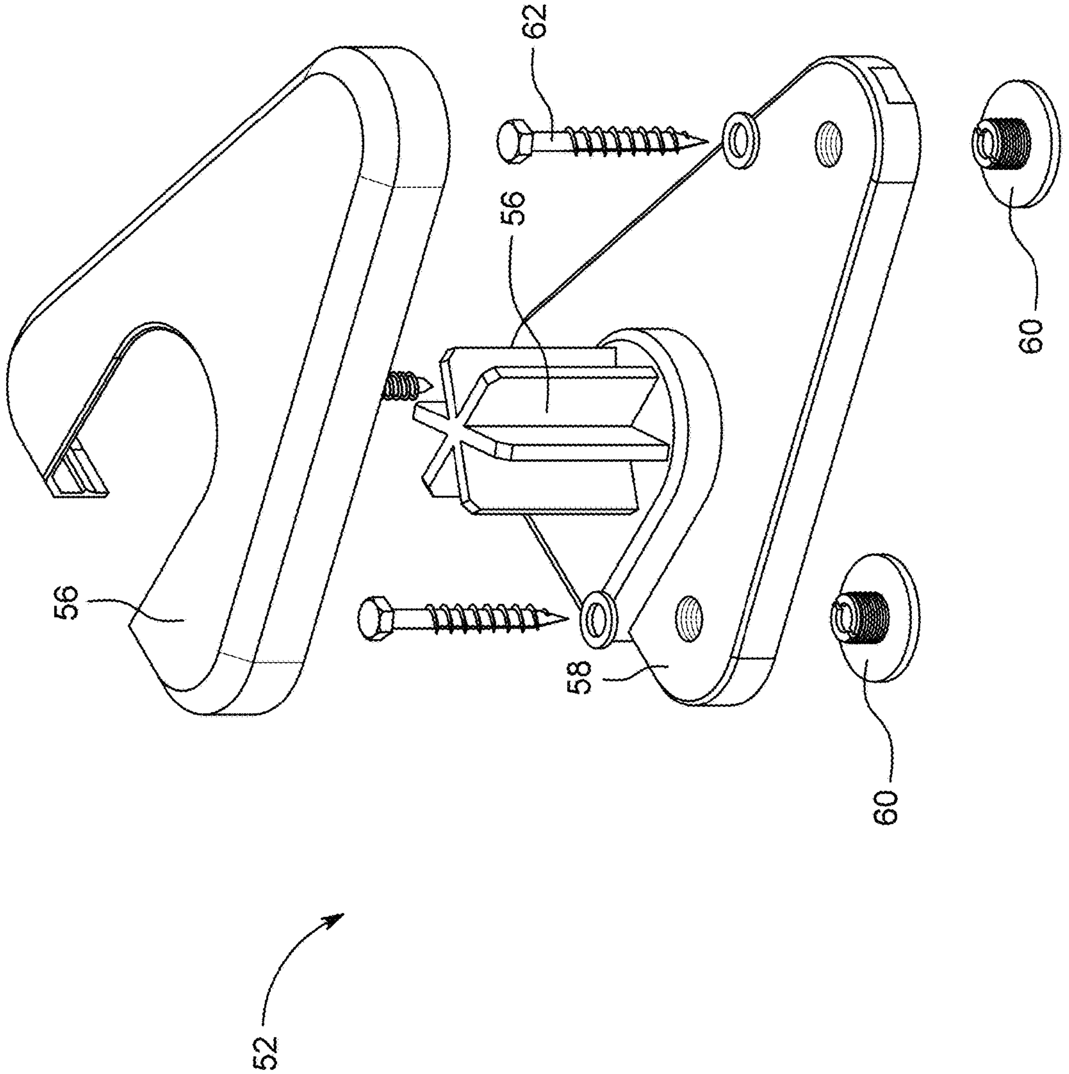
FIG. 35 is an exploded view schematic representation of a foot for use with the modular post assembly.

Referring now to FIGS. 32-35, the post assembly 16 may include a foot assembly 52 coupled to the proximal end of the bottom mount tube 50. The foot assembly 52 may be fastened to the floor of the customer's home or on a stair using any suitable fastening mechanism, such as screws, adhesive, and the like. Referring to FIG. 35, in one embodiment the foot assembly 52 may include a foot cover 56 (for decorative purposes) that is designed to fit over top of the foot body 58. The foot assembly 52 may also include a plurality of fasteners 62 and leveler feet 60, to accommodate uneven surfaces. Finally, the foot assembly 52 may be connected to the bottom mount tube 50 by press-fitting a foot flange 64 within the internal circumference of the bottom mount tube 50.

Figure 36:
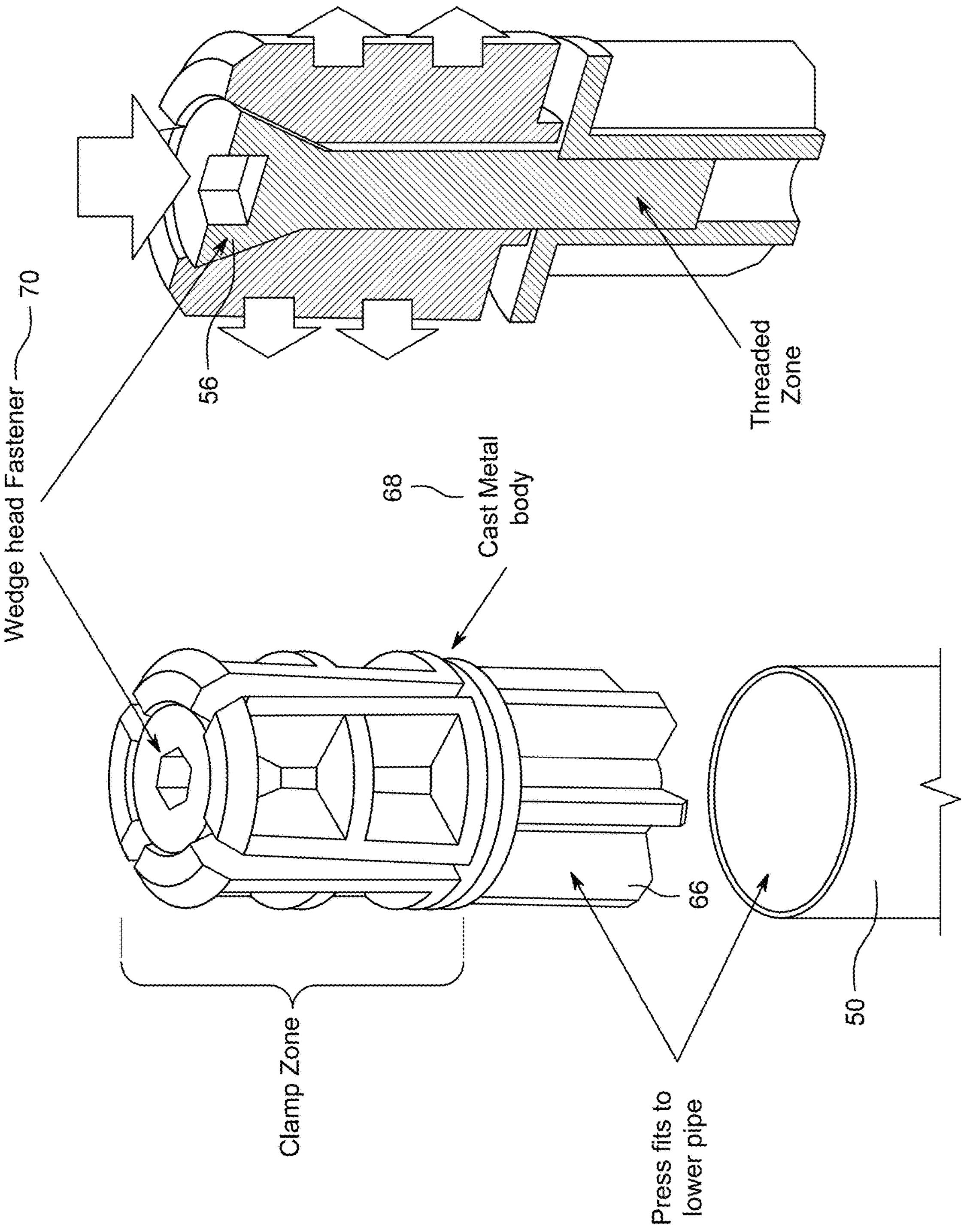
FIGS. 36-38 are illustrations of an adjustment system, suitable for use with the modular post assembly.
Figure 38:
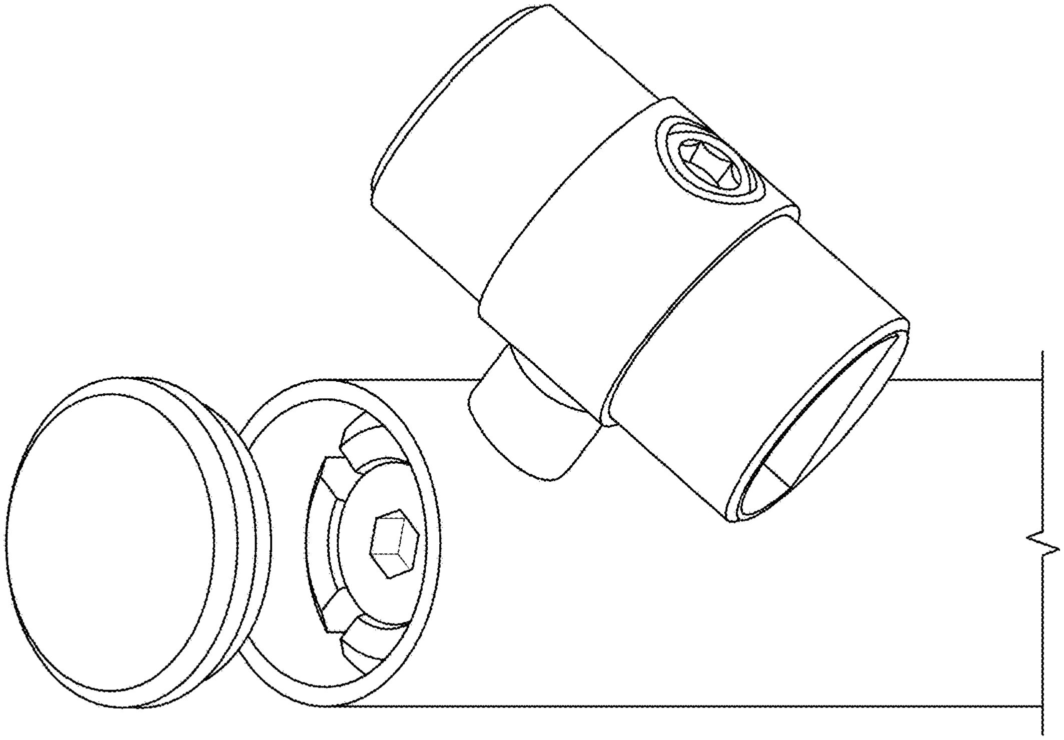
Figure 37:
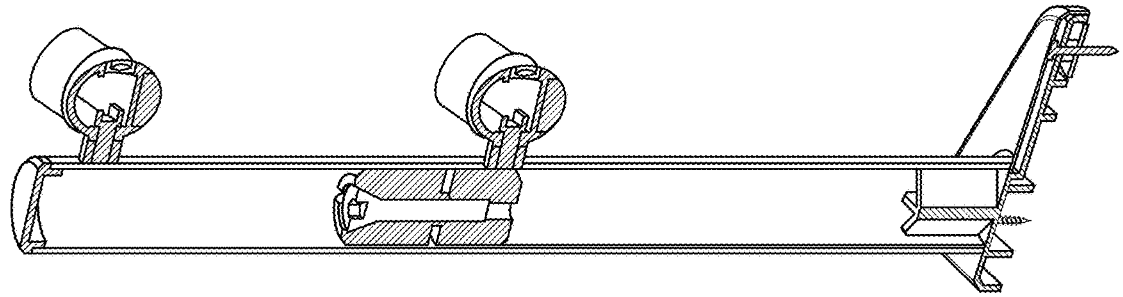
Figure 40:
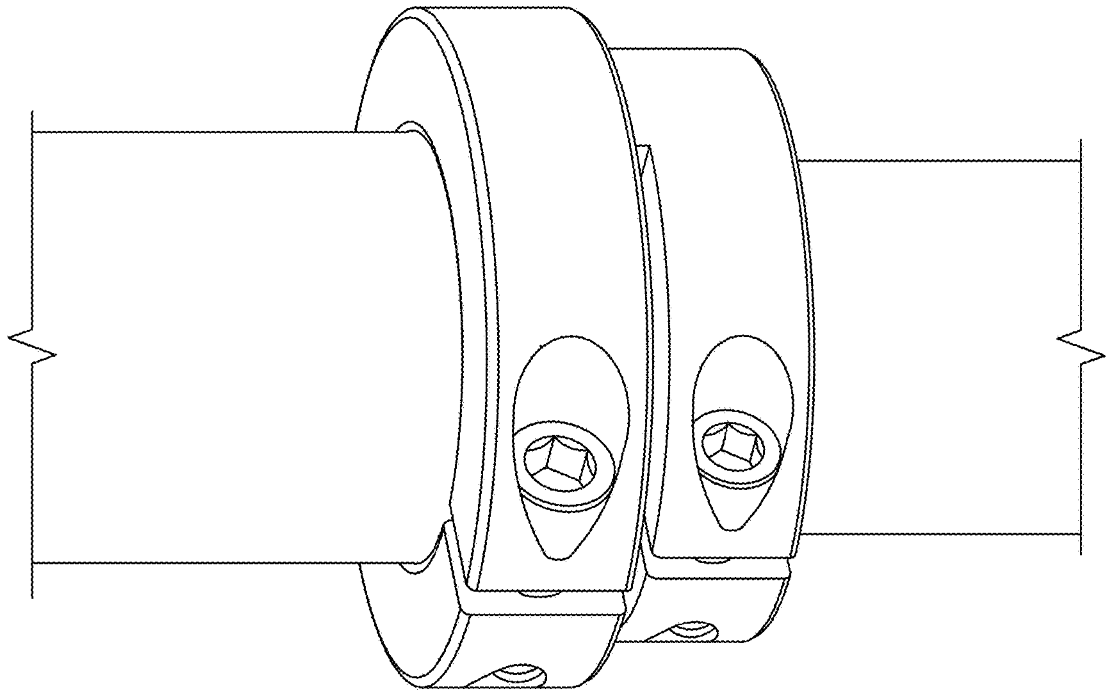
FIGS. 39-44 are illustrations of another adjustment system, suitable for use with the modular post assembly.

Referring now to FIGS. 36-38, in one embodiment, the clamp assembly 54 may be an internal clamp configured to be positioned within the bottom mount tube 50. As shown in FIGS. 36-37, the clamp assembly 54 may include a star-shaped clamp flange 66 configured to be press fitted within the distal end of the lower mount tube 50. The clamp assembly may further include an internal clamp body 68 and a wedge head fastener 70, which expands the internal clamp body 68 when turned. In one embodiment, the wedge head fastener 70 may be reached through an opening in the distal end of the top mount tube 48 (see FIG. 37).

Figure 39:
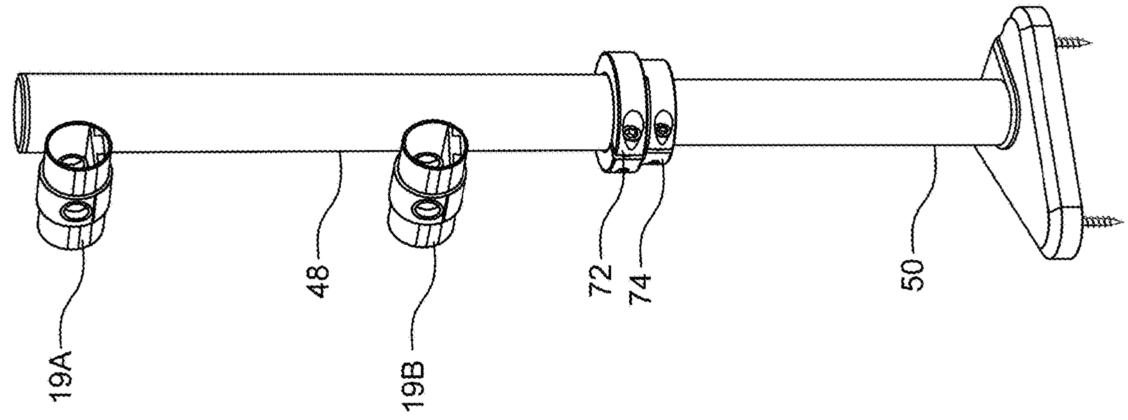
Figure 42:
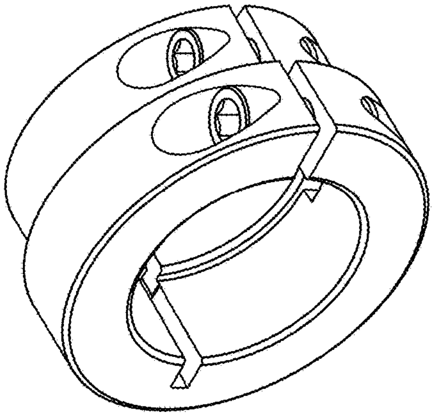
Figure 44:
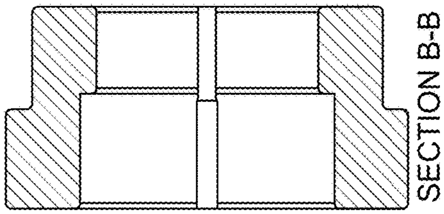
Figure 41:
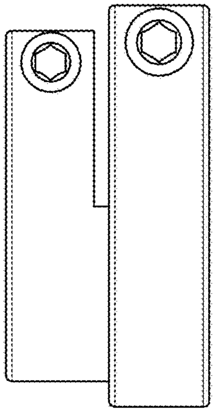
Figure 43:
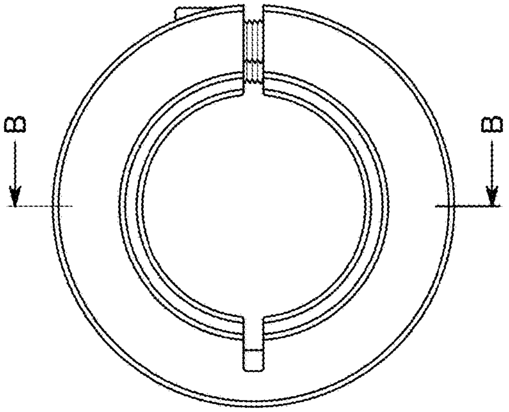
Figure 45:
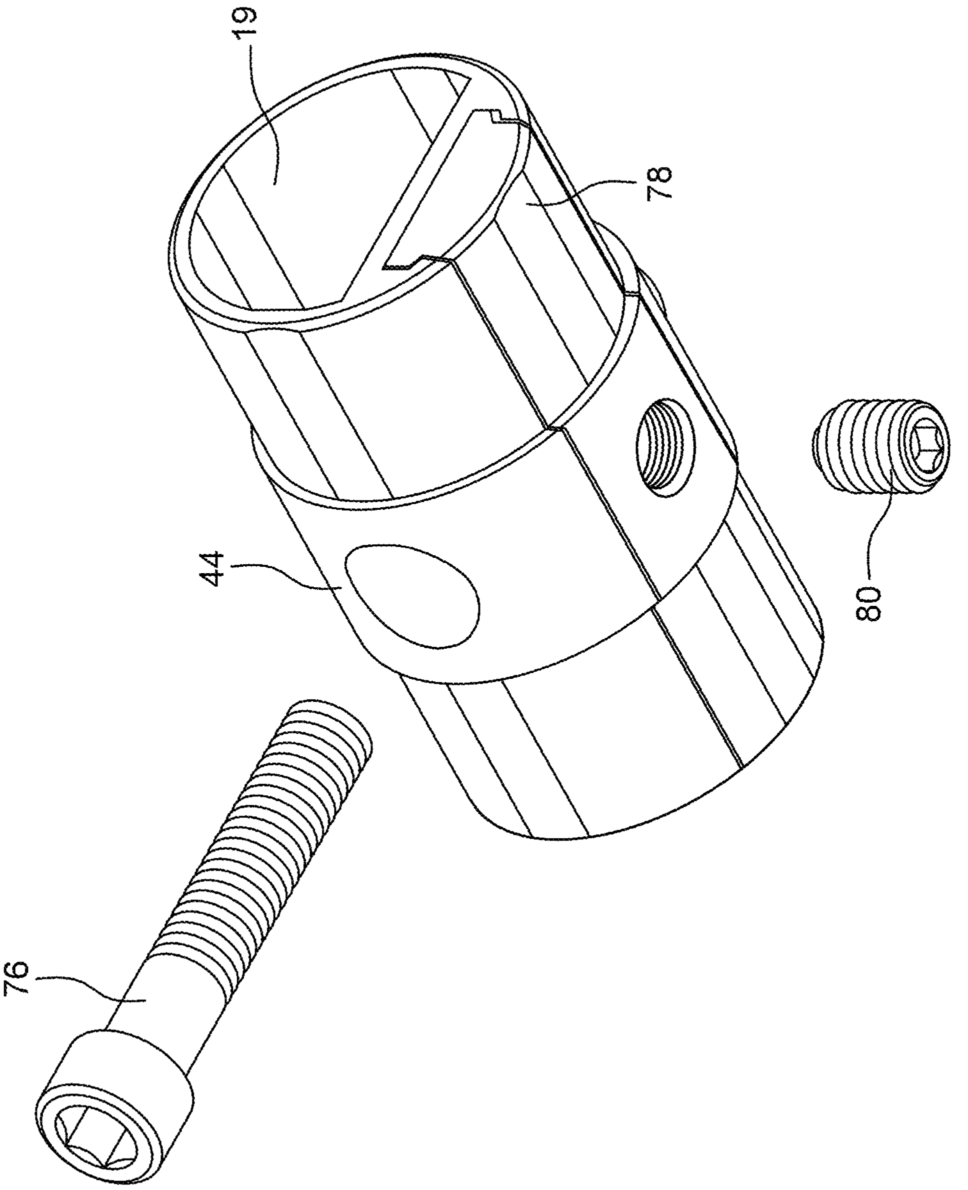
FIGS. 45-49 are schematic representations of a rail connector suitable for use with the modular rail assembly.
Figure 47:
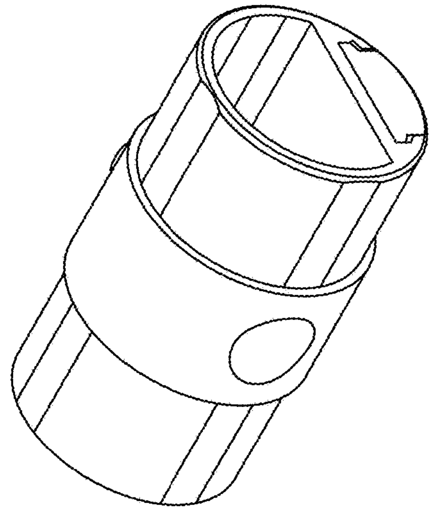
Figure 49:
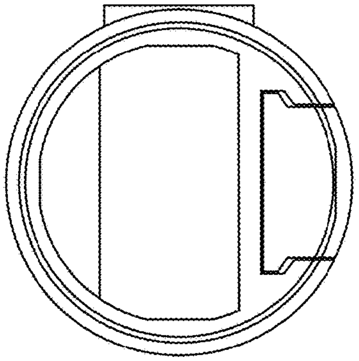
Figure 46:
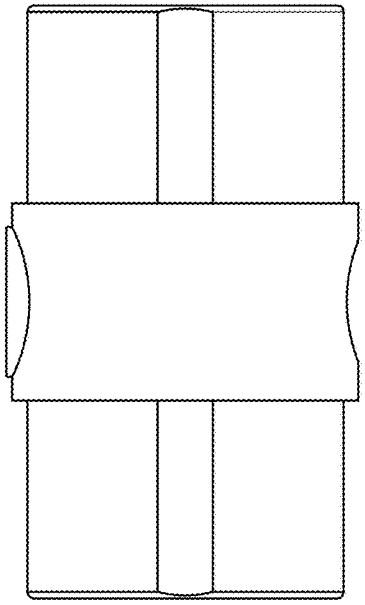
Figure 48:
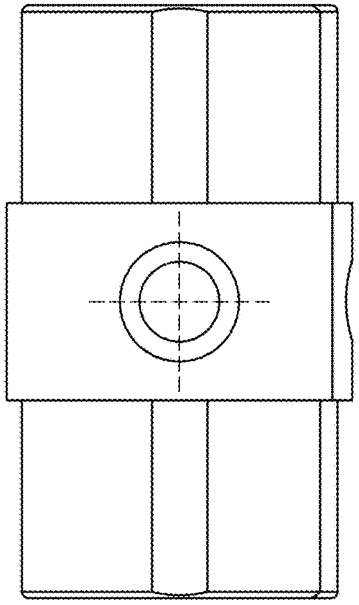
Figure 52:
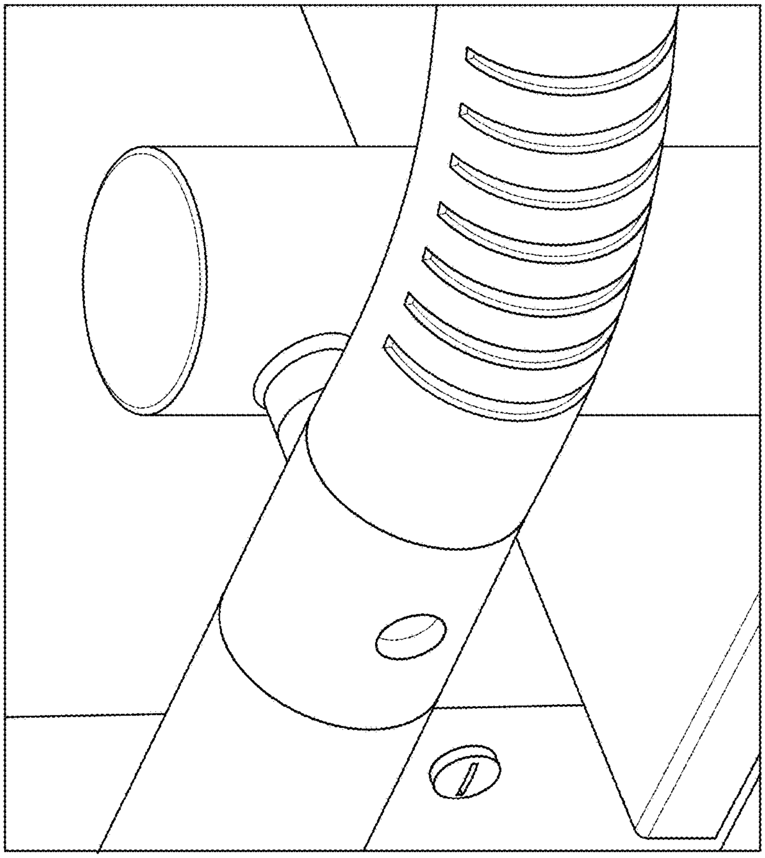
FIGS. 50-52 are photographs depicting perspective views of additional components suitable for use in installing the modular rail assembly.
Figure 50:
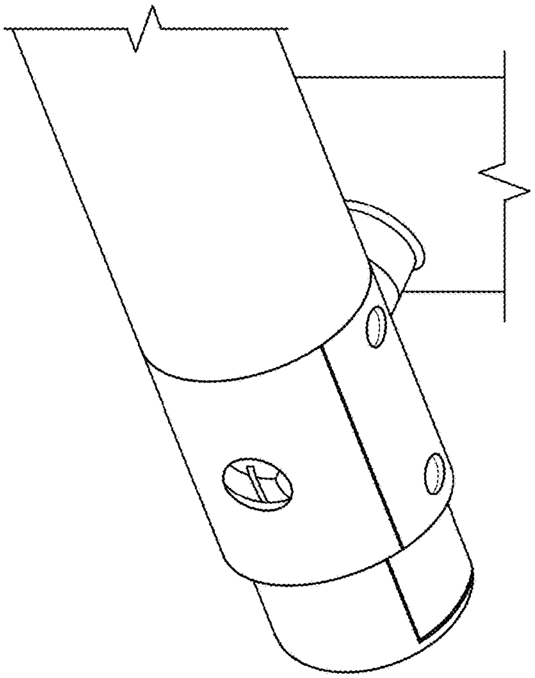
Figure 51:
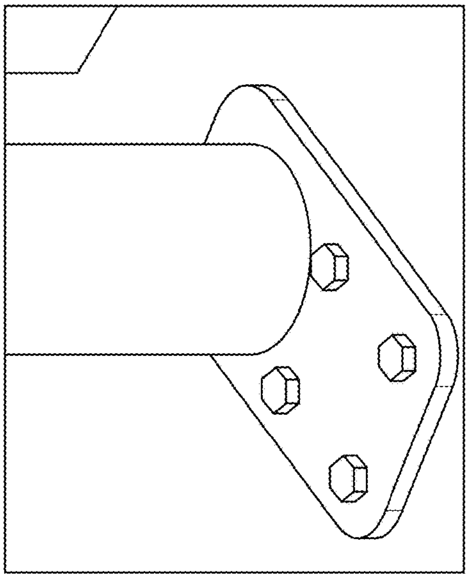
Figure 53:
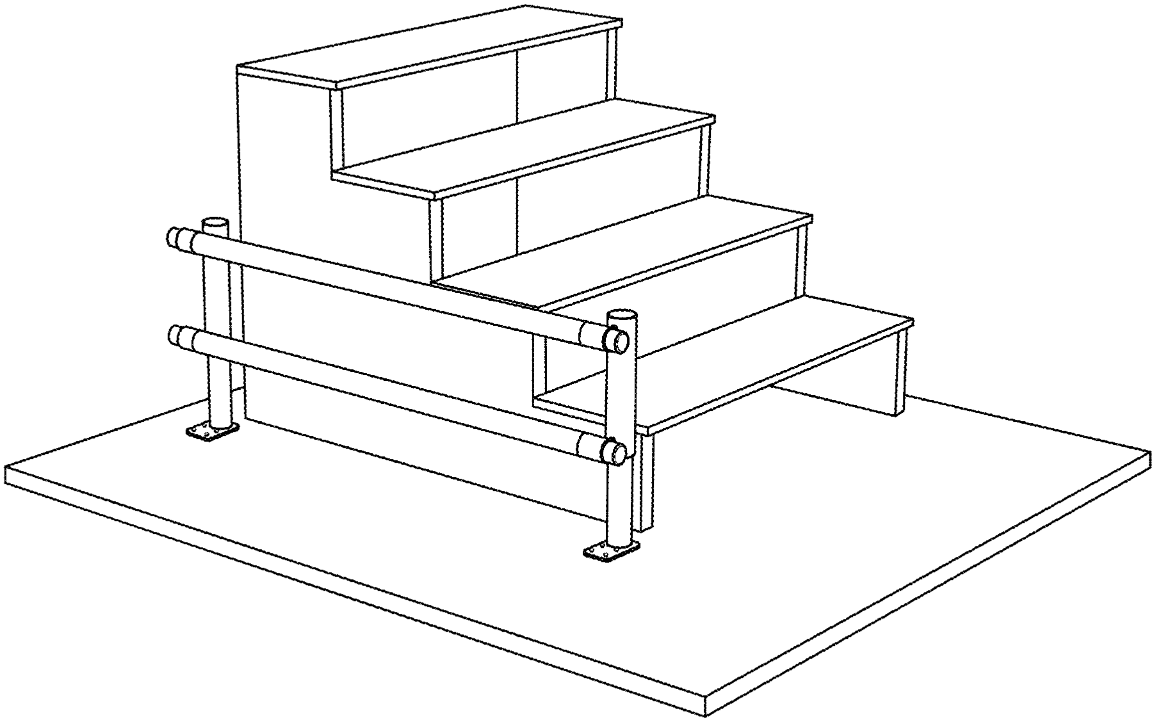
FIGS. 53-56 are illustrations of a method of assembling the modular rail assembly.
Figure 54:
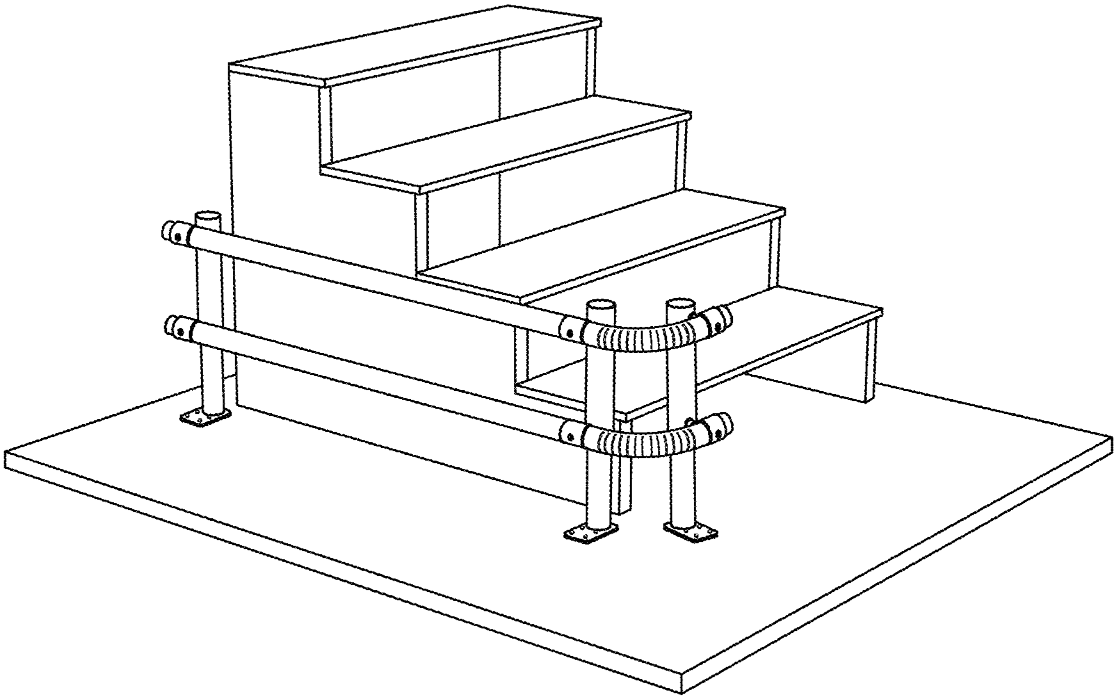
Figure 55:
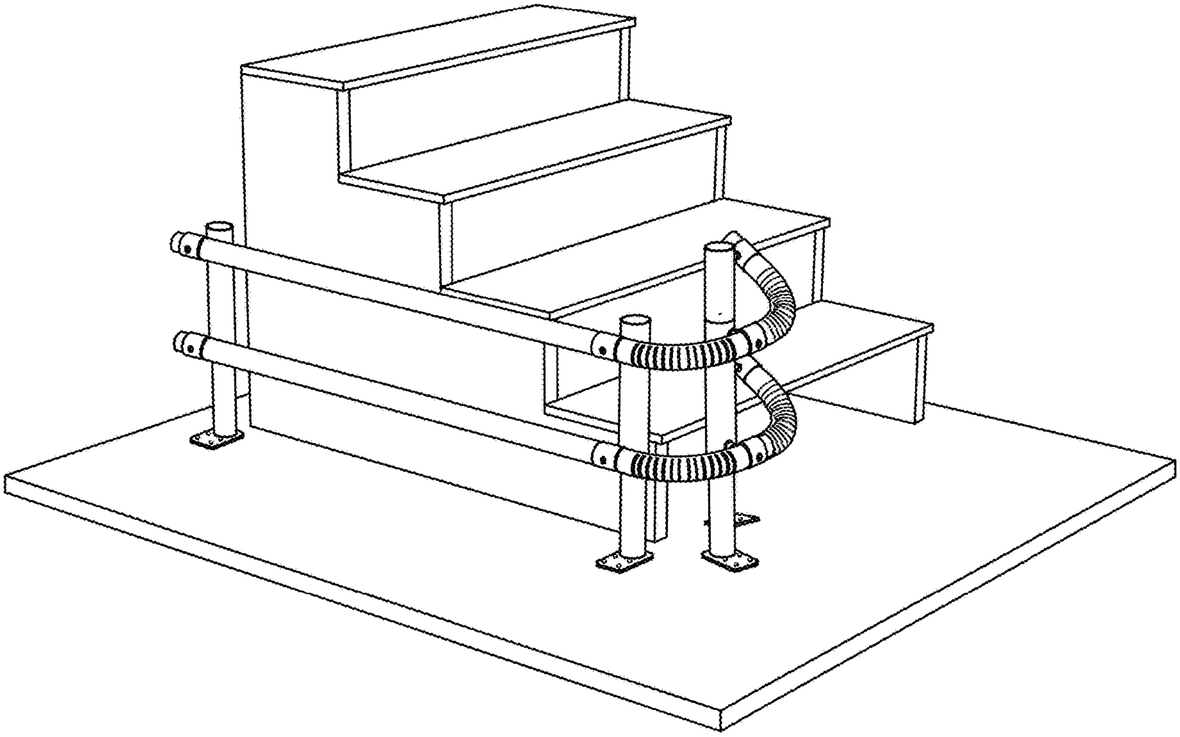
Figure 56:
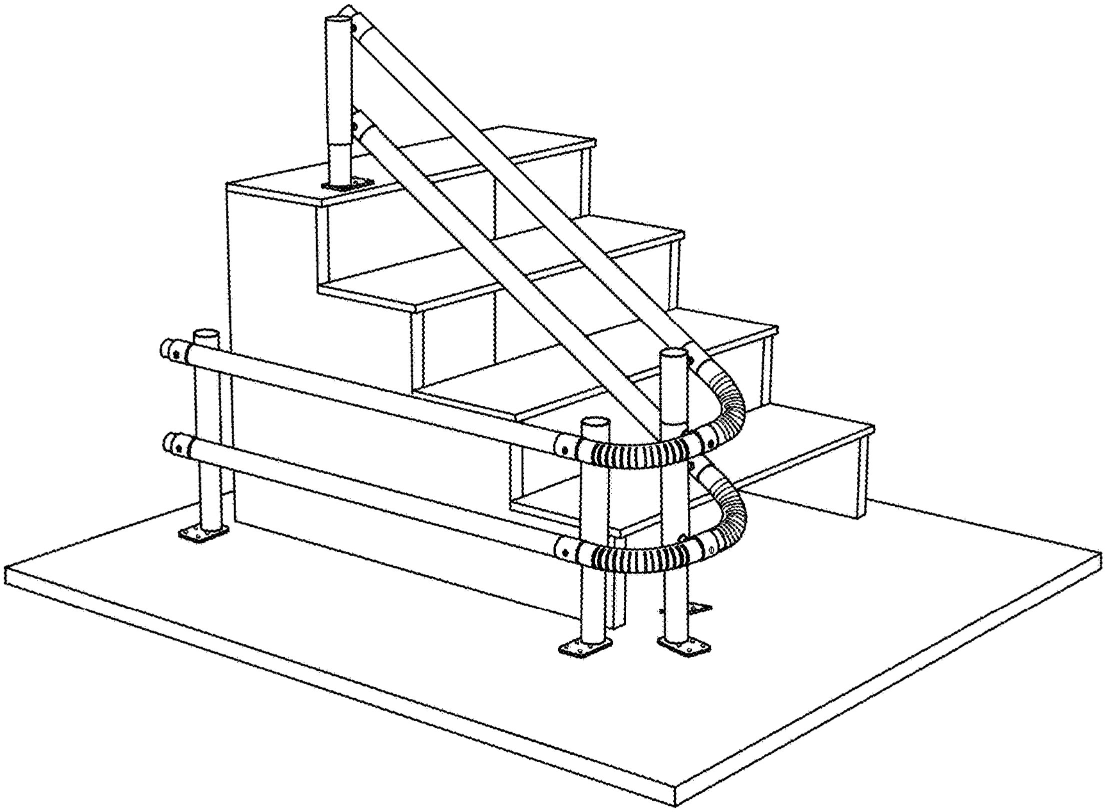

In yet another embodiment, the clamp assembly 54 may include a dual dimension collar configured to have a first collar 72 that is fitted to the proximal end of the top mount tube 48 and a second collar 74 that is fitted to the bottom mount tube 50, as shown in FIGS. 39-44. Once tightened around each tube, the dual collar clamp 54 will lock the post assembly 16 in place. As shown in FIG. 39, in one embodiment, the post assembly 16 includes a first and second rail connector 19A and 19B coupled to the top mount tube 48. Referring now to FIGS. 45-51, in one embodiment, each connector 19 may include a mount fastener 76, a fill hole cap (not shown), at least one rail connector clamp 78, and a set of claim screws 80, configured to allow the connector to be mounted to the top mount tube 48 and each portion of the straight rail segment 17 and corner rail segment 18.

Figure 57:
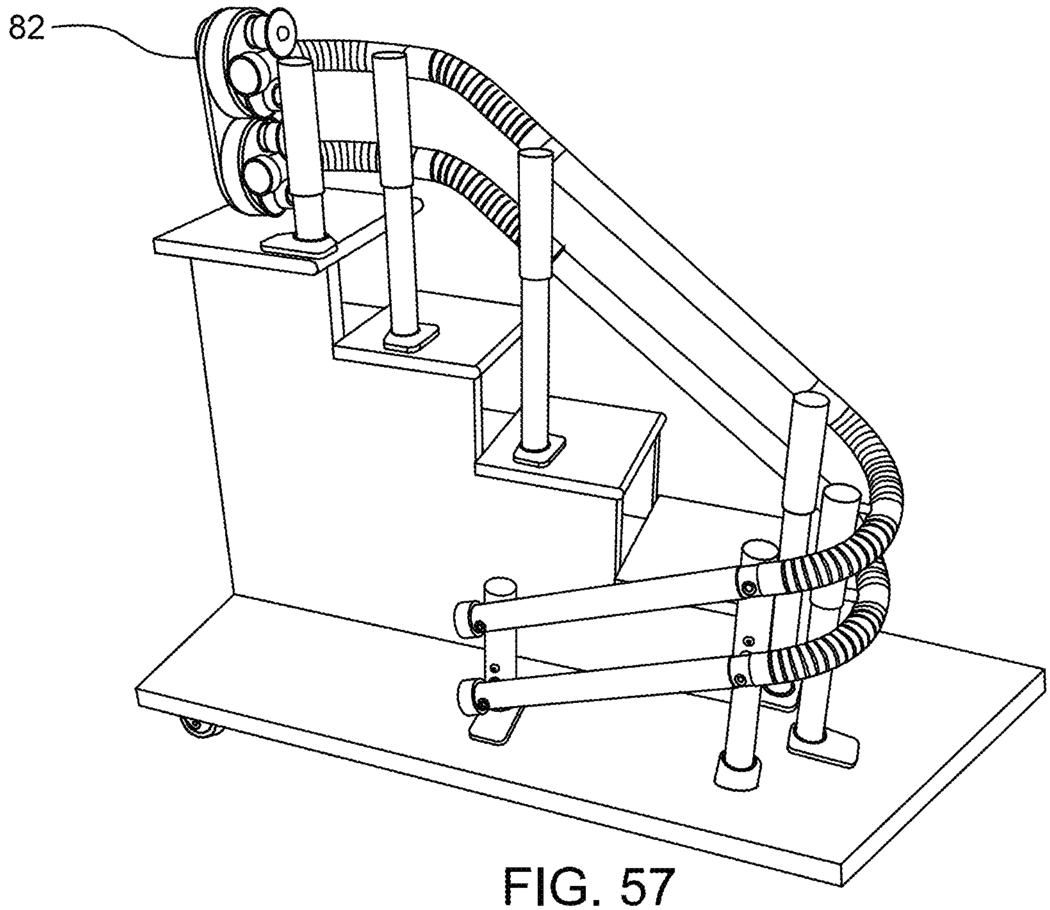
FIGS. 57 and 58 are perspective views of the modular rail assembly installed on a staircase and equipped with a friction-drive assembly.
Figure 58:
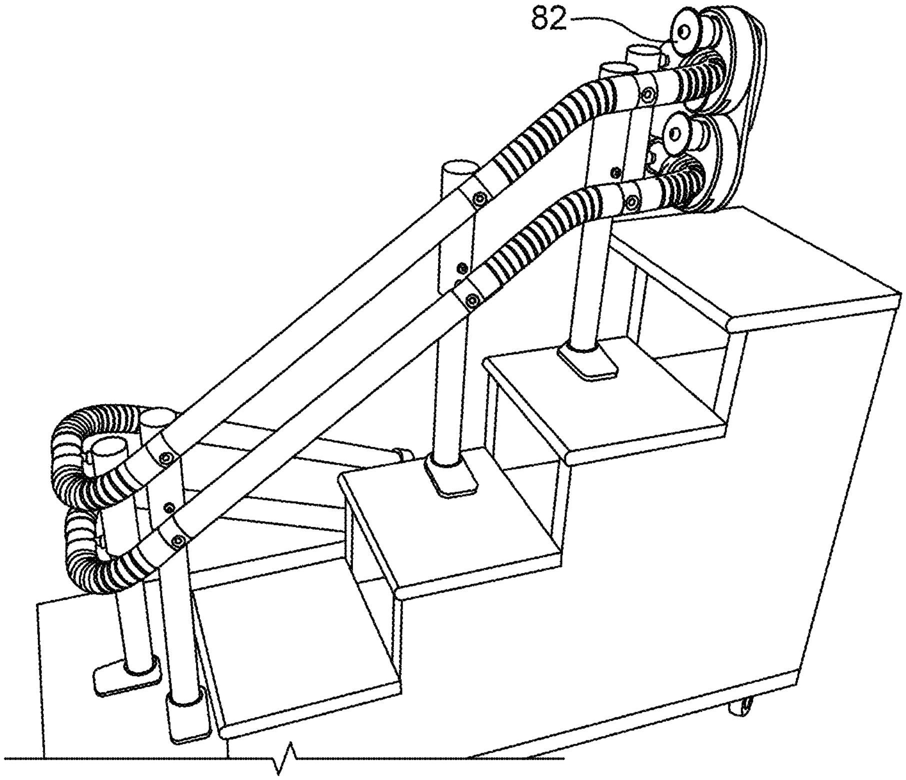

As shown in FIGS. 53-56, the modular rail assembly may be installed with a manageable number of configurable modular components. Moreover, as shown in FIGS. 57 and 58, the modular rail assembly may be coupled with an existing traction drive system 82 in order to facilitate the movement of a lift chair (not shown) from a first floor to a second floor.

As noted herein, several different embodiments of corner rail segments can be used with modular rail assemblies. In another embodiment, the corner rail segments themselves are an assembly of components and are highly configurable. FIGS. 59-74 illustrate such a modular corner rail assembly 100 for use with modular rail assemblies and stair lift systems disclosed herein. The modular corner rail assembly 100 includes a plurality of inter-engaging discs 102, a first coupling component 104, a second coupling component 106, and a cable 108. Depending on the particular requirement of a pre-existing staircase, an appropriate number of discs 102 are selected and positioned adjacent to one another. The discs 102 are designed to engage with and be secured to adjacent discs 102. The discs 102 are designed so that one surface of the disc 102 is at an angle to the opposite surface of the disc 102. In one embodiment, the angle between the surfaces is approximately five degrees. In such an arrangement, if the modular corner rail assembly 100 needed a ninety degree bend, fifteen discs 102 together with the coupling components 104 and 106 can be used. The ninety degree bend is facilitated by fifteen discs 102 each at five degrees (totaling 75 degrees) and the first coupling component 104 including a seven degree angled surface and the second component 106 including an eight degree angled (adding another 15 degrees to total 90 degrees). It will be appreciated that the design of the discs 102 provides an installer with a wide variety of possibilities for arranging the modular corner rail assembly 100.

Figure 66:
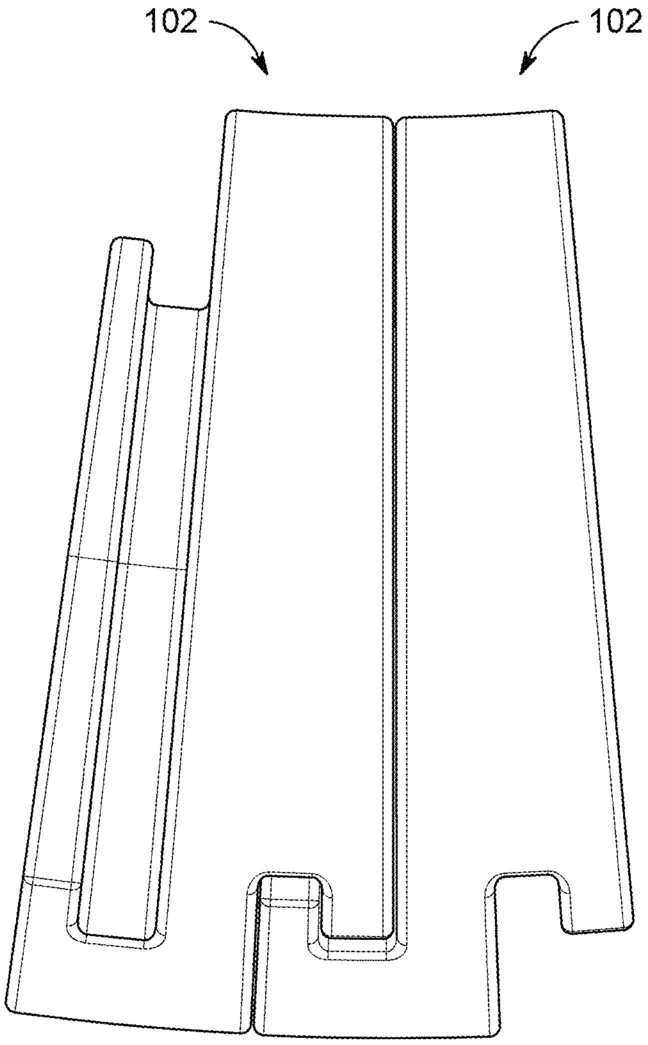
FIG. 66 schematically illustrates a side view of two discs coupled together for use in corner rail segments.
Figure 68:
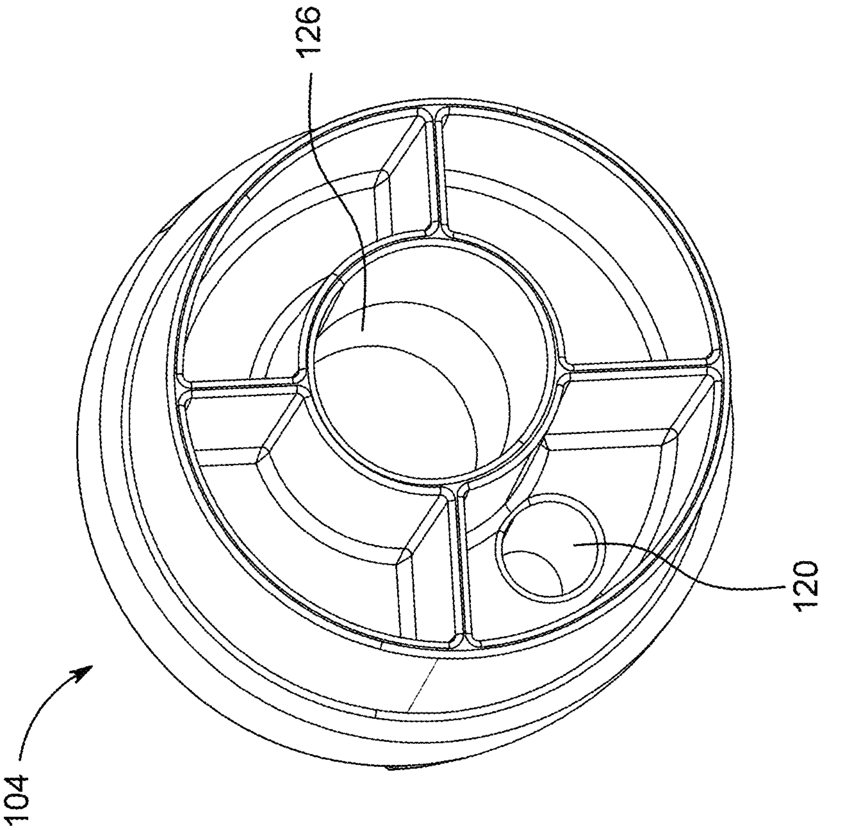
FIGS. 67-68 schematically illustrate perspective views of a first connector component for use in corner rail segments.
Figure 67:
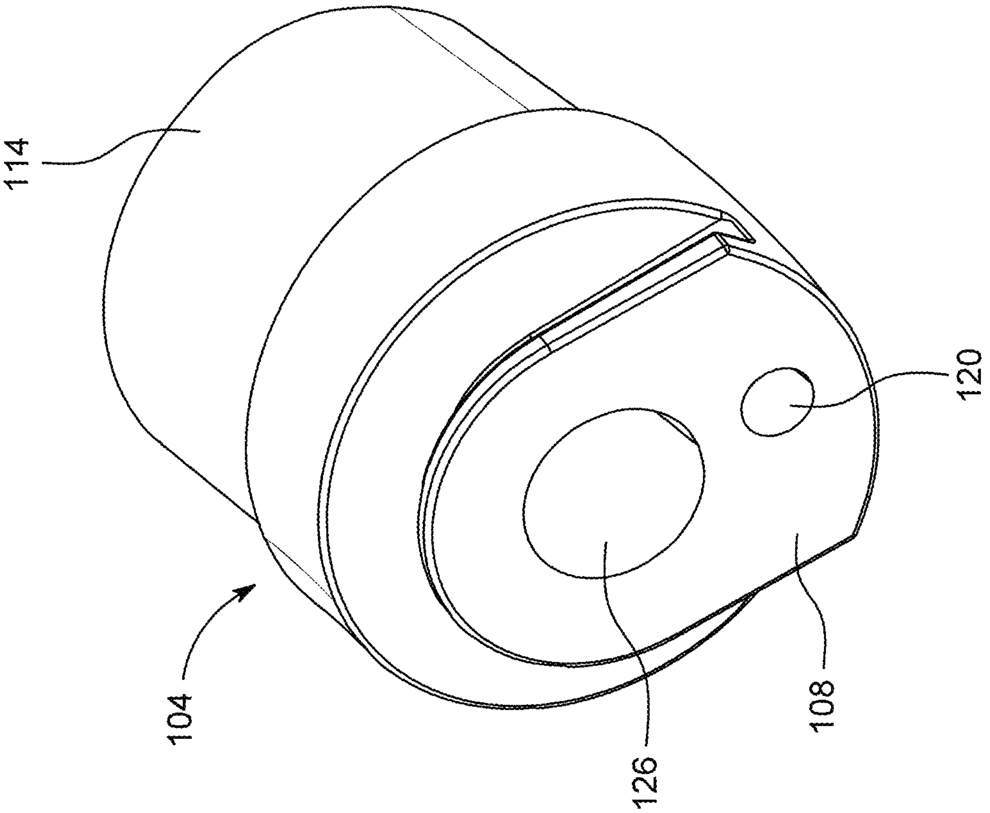
Figure 69:
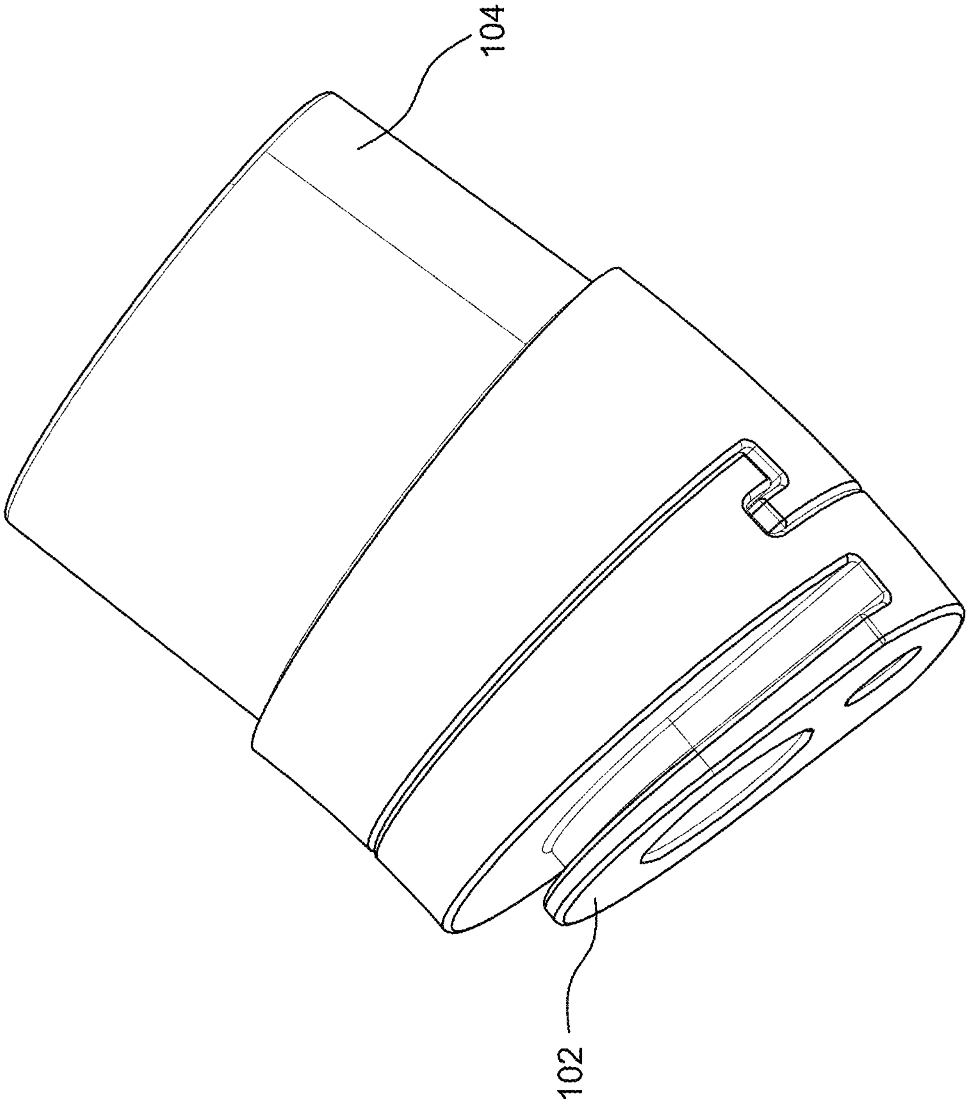
FIG. 69 schematically illustrates a perspective view of the first connector component and a disc coupled together for use in a corner rail segments.
Figure 71:
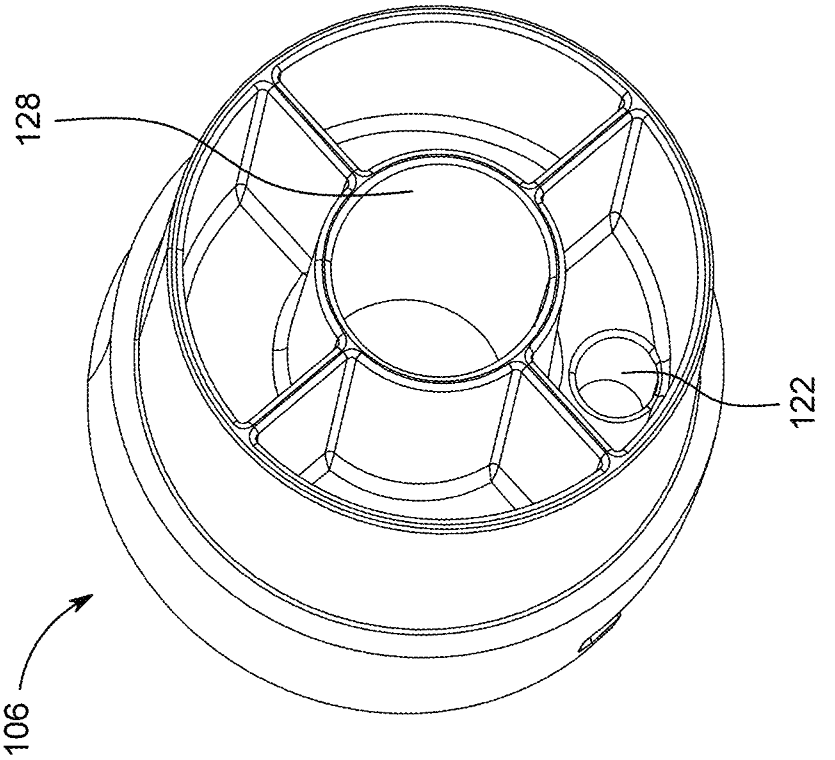
FIGS. 70-71 schematically illustrate perspective views of a second connector component for use in corner rail segments.
Figure 70:
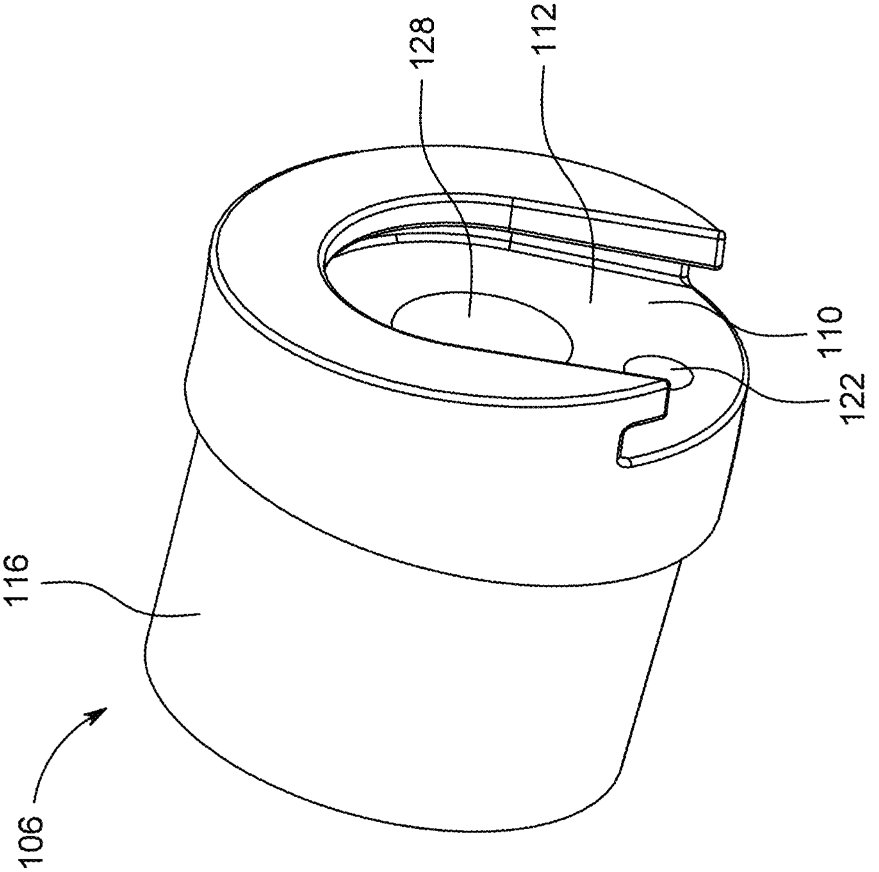
Figure 72:
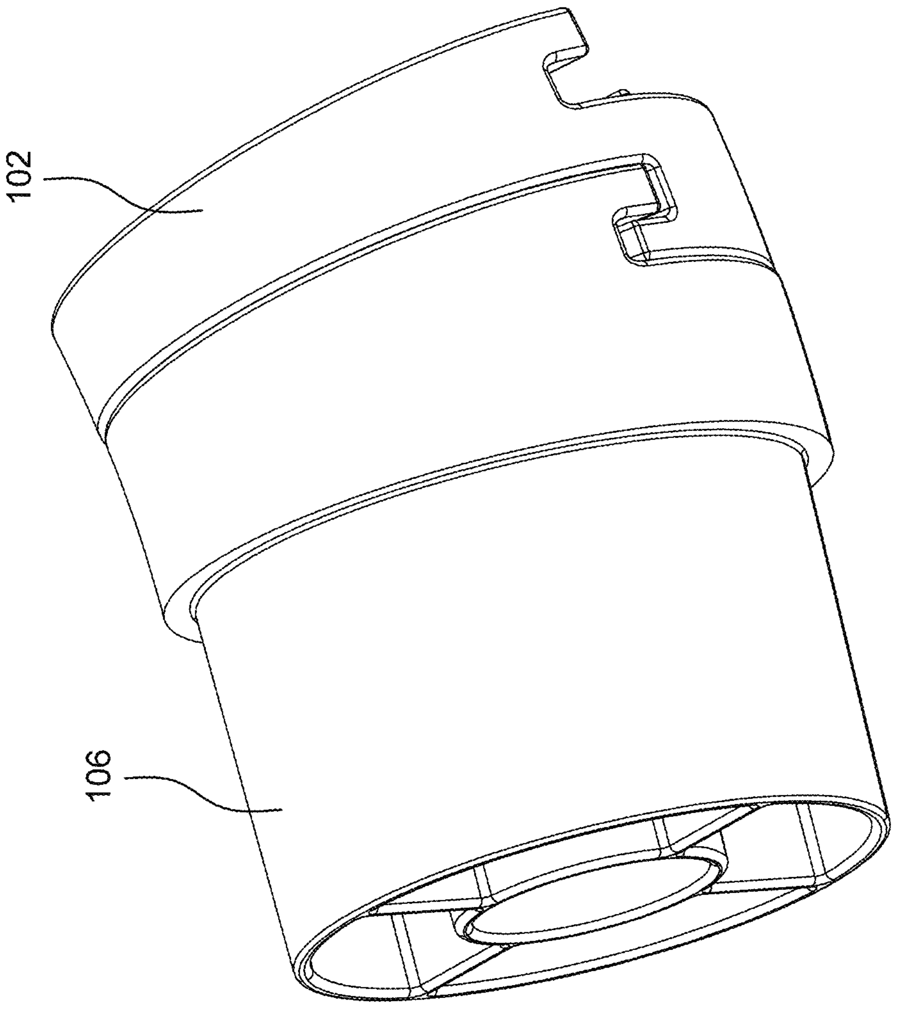
FIG. 72 schematically illustrates a perspective view of the second connector component and a disc coupled together for use in a corner rail segments.

Each disc 102 includes matching interlocking features that facilitate engagement with adjacent discs 102. As illustrated in FIGS. 60-66, one side of the disc 102 includes a protrusion 110, and the opposite side of the disc 102 includes a slot 112 arranged to accommodate the protrusion 108. FIG. 66 illustrates a side view of two discs 102 engaged. When so engaged, the arrangement of the protrusion 110 and slot 112 restrain movement between the two discs 102 to form a stable assembly. As noted above, the number of discs 102 selected is based on the particular requirement, and more specifically, the angle that the modular rail assembly needs to accommodate. At the opposite ends of the plurality of discs 102 include a first coupling component 104 and a second coupling component 106. As illustrated in FIGS. 67-69, one end of the first coupling component 104 includes a protrusion 110 matching the protrusion on the disc 102. The opposite end of the first coupling component 104 includes a collar 114 that can be used to couple the modular corner rail assembly 100 to other modular rail assembly components, such as a connector on a modular post assembly or a straight rail segment. FIG. 69 illustrates the first coupling component 104 engaged with a disc 102, where the protrusion 110 of the first coupling component 104 is positioned within the slot 112 of the disc 102. As illustrated in FIGS. 70-72, one end of the second coupling component 106 includes a slot 112 matching the protrusion on the disc 102. The opposite end of the second coupling component 106 includes a collar 116 that can be used to couple the modular corner rail assembly 100 to other modular rail assembly components. FIG. 72 illustrates the second coupling component 106 engaged with a disc 102, where the protrusion of the disc 102 positioned within the slot 112 of the second coupling component 106.

Figure 59:
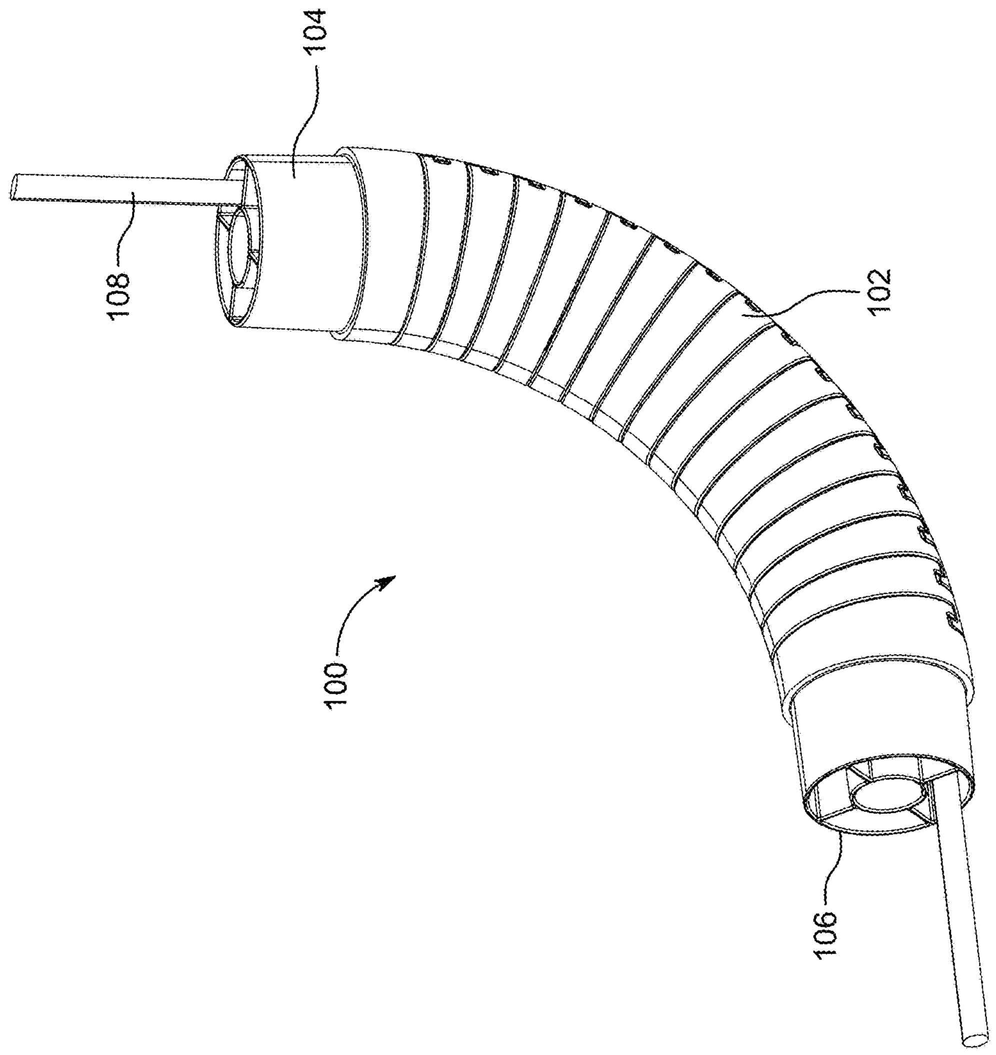
FIG. 59 schematically illustrates a perspective view of another corner rail segment for use with a modular rail assembly.
Figure 61:
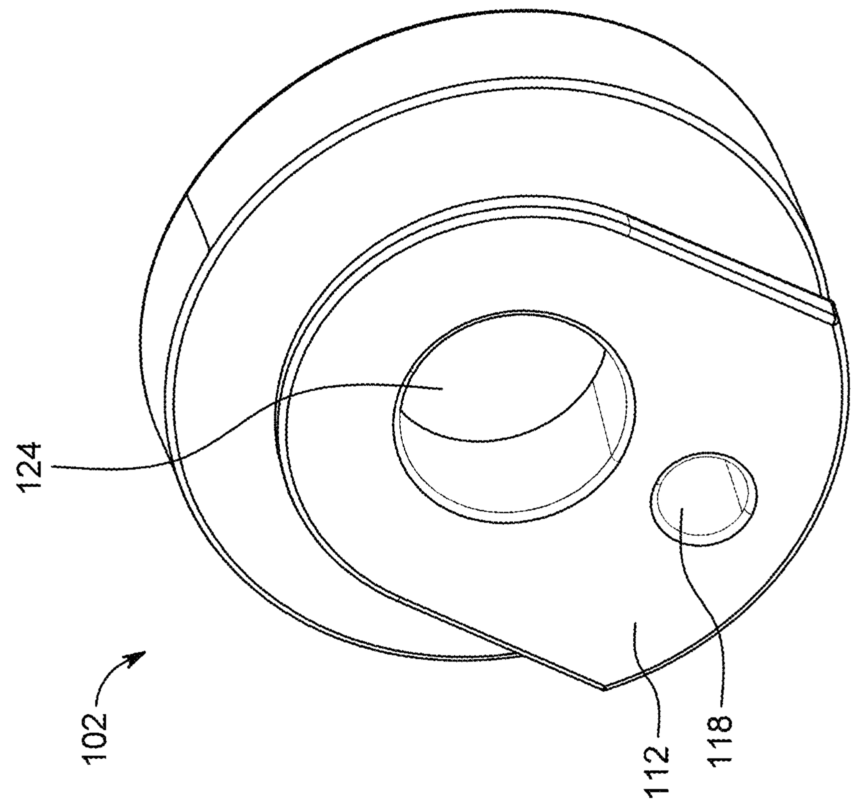
FIGS. 60-61 schematically illustrate perspective views of discs for use in corner rail segments.
Figure 60:
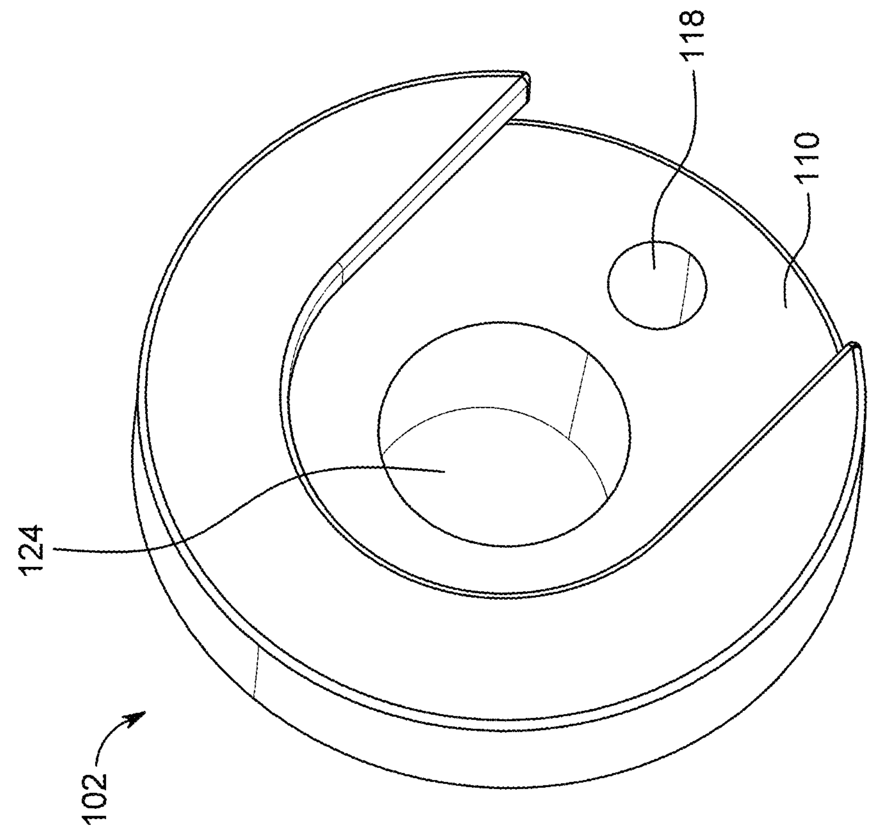
Figure 63:
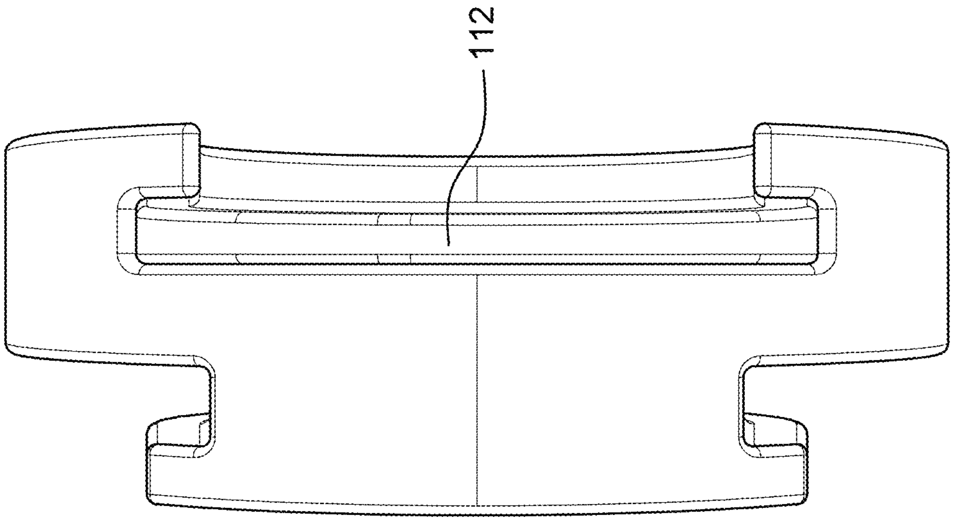
FIGS. 62-63 schematically illustrate side views of discs for use in corner rail segments.
Figure 62:
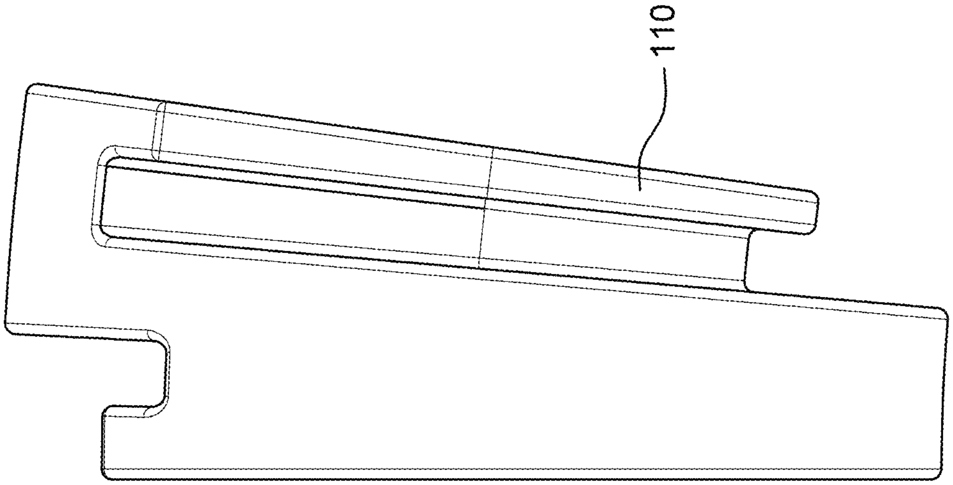
Figure 64:
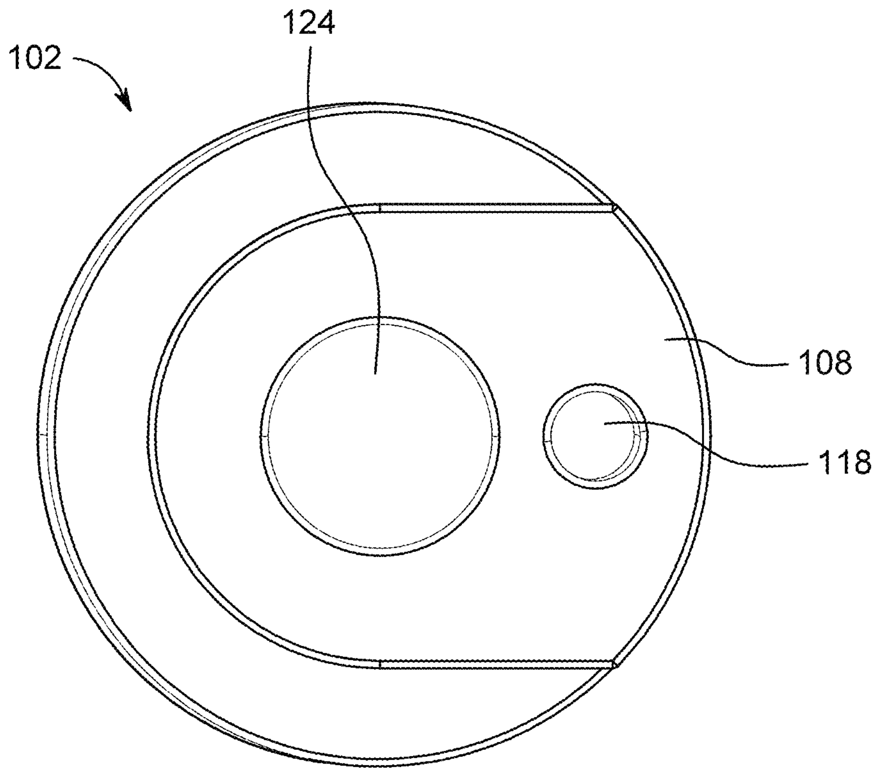
FIGS. 64-65 schematically illustrate top and bottom views of discs for use in corner rail segments.
Figure 65:
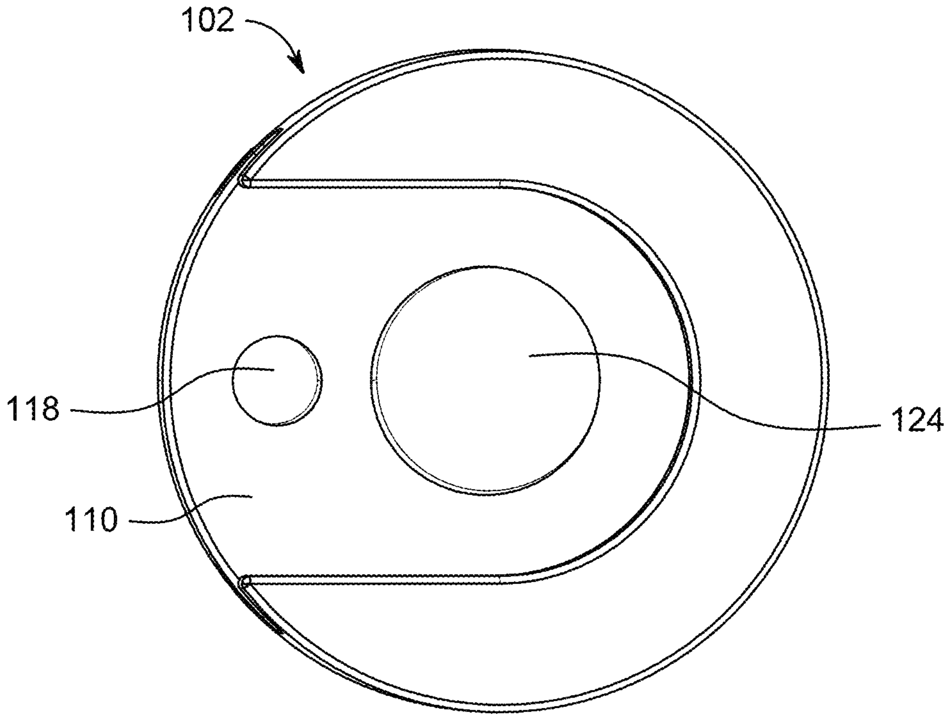
Figure 73:
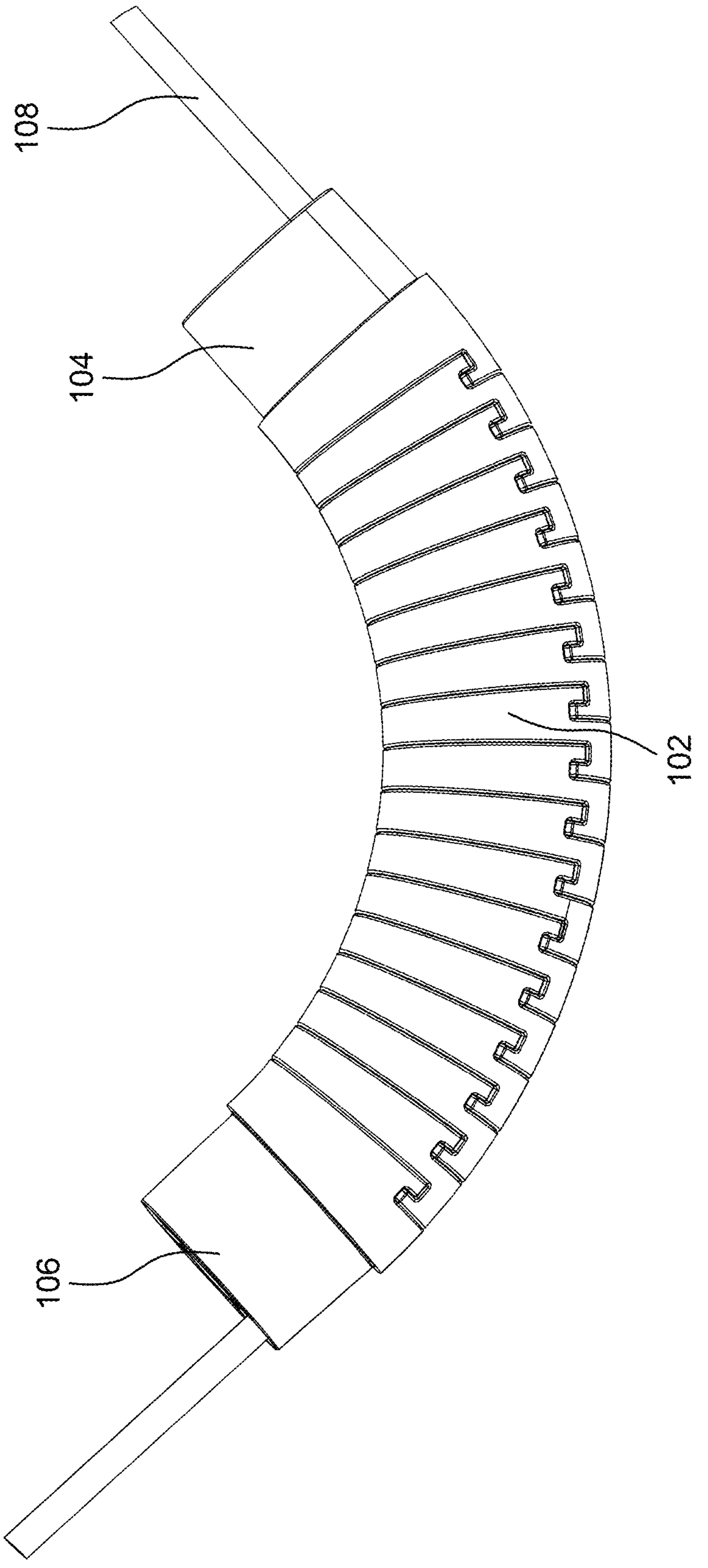
FIG. 73 schematically illustrates a side view of an assembled corner rail segment with a cable.
Figure 74:
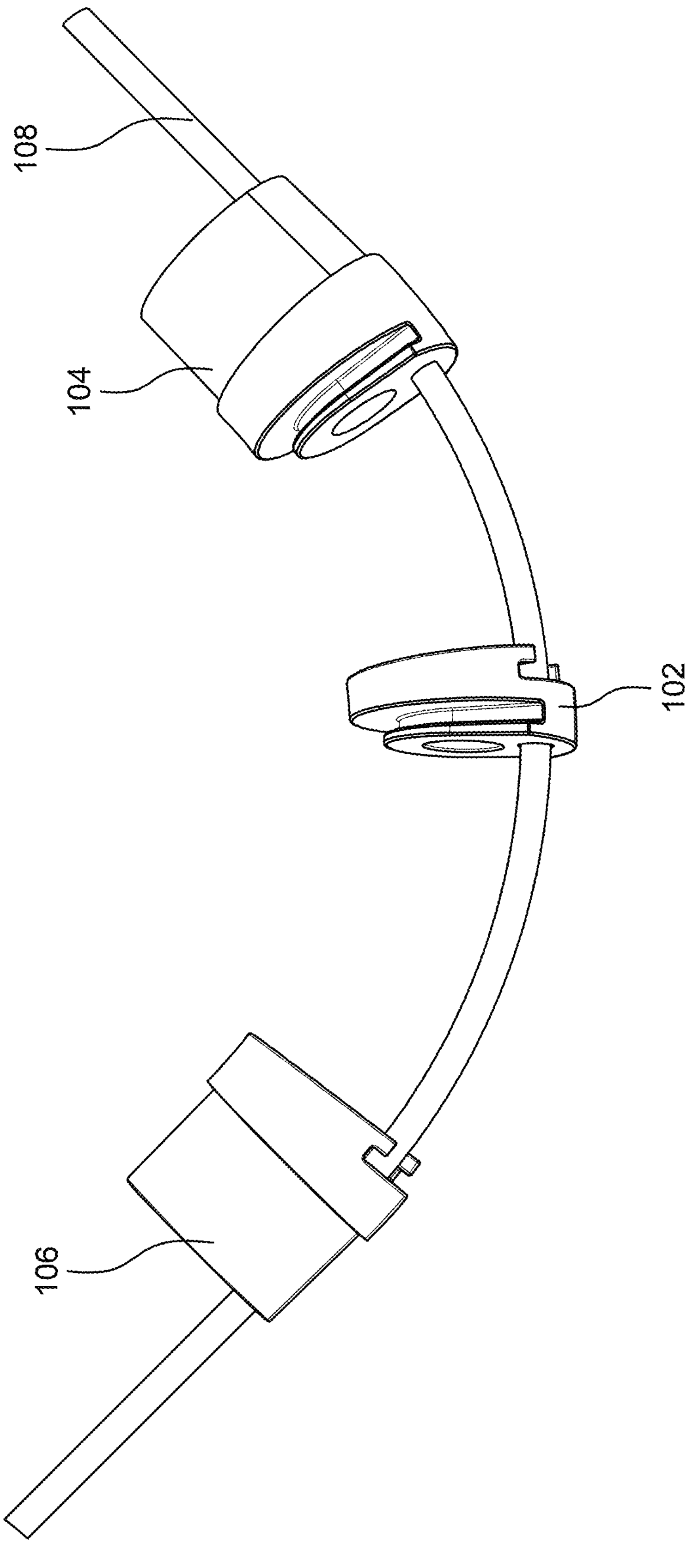
FIG. 74 schematically illustrates a perspective view of a partially assembled corner rail segment with a cable.

To add additional stability to the modular corner rail assembly 100, a cable 108 can be added to the modular corner rail assembly 100. Each of the components in the modular corner rail assembly 100 includes an aperture (for disc 102, aperture 118; for first coupling component 104, aperture 120; and for second coupling component 106, aperture 122). When the modular corner rail assembly 100 is assembled, all the apertures (118, 120, 122) align and the cable 108 is passed through the apertures (118, 120, 122, as illustrated in FIG. 59). FIG. 73 illustrates a side view of a modular corner rail assembly 100 fully assembled with a cable 108, and FIG. 74 illustrates a partially assembled modular corner rail assembly 100 that shows the positioning of the cable 108 through the apertures (118, 120, 122). In addition to passing the cable 108 through the components of the modular corner rail assembly 100, the cable 108 can be passed through all components of a modular rail assembly and tightened to secure the various components and further stabilize the modular rail assembly. The inter-engaging discs 102, first coupling component 104, and second coupling component 106 can each further include a central aperture (124, 126, 128, respectively). As with the prior described apertures (118, 120, 122) that accommodate the cable 108, the central apertures (124, 126, 128) are aligned when the discs 102, first coupling component 104, and second coupling component 106 are assembled into a modular corner rail assembly 100. Certain components of the stair lift system can be positioned through these central apertures (124, 126, 128) such as a power cord or cable that supplies electrical power. Such a power cord can run along a section of the rail system or the entire length of the rail system and supply power to different components of the stair lift system.

Figure 75:
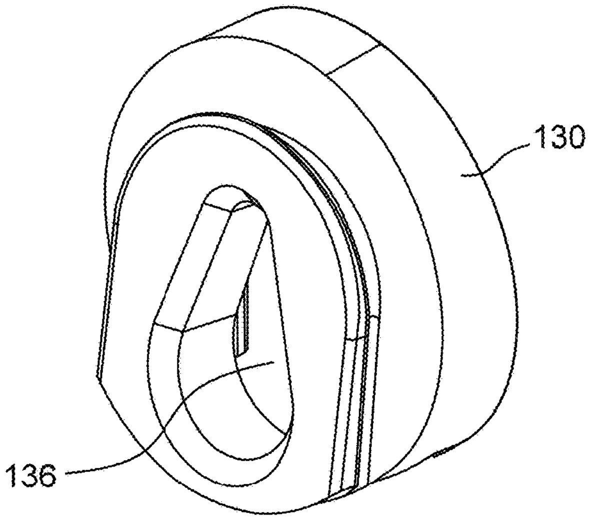
FIG. 75 schematically illustrates a front perspective views of another embodiment of a disc for use in corner rail segments.
Figure 76:
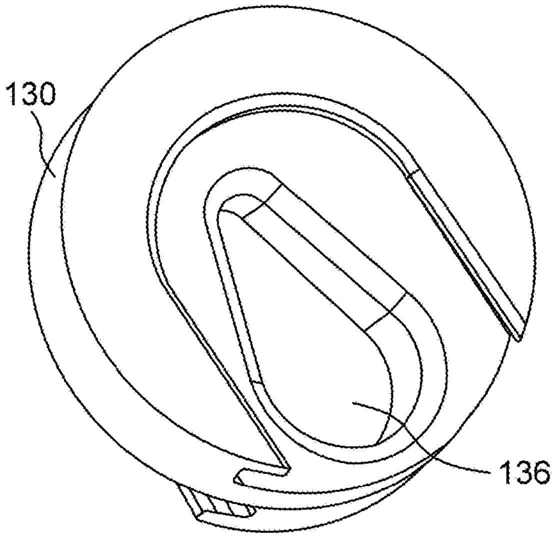
FIG. 76 schematically illustrates a rear perspective views of the disc of FIG. 75.
Figure 77:
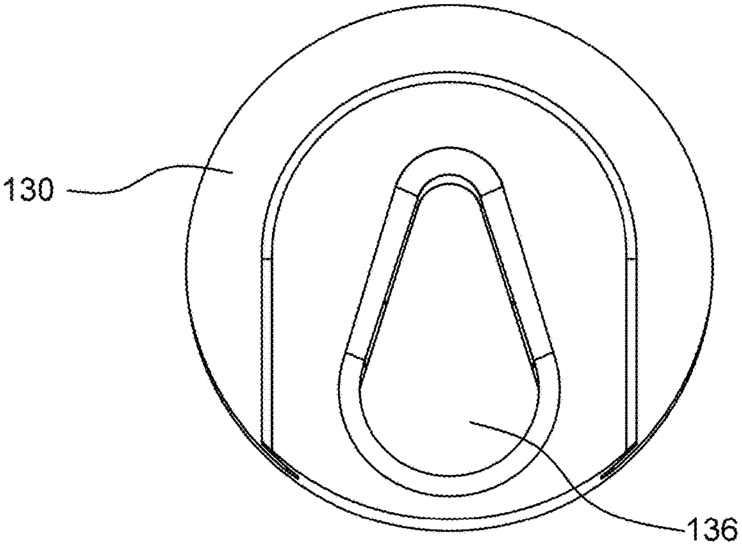
FIG. 77 schematically illustrates a front plan views of the disc of FIG. 75.
Figure 78:
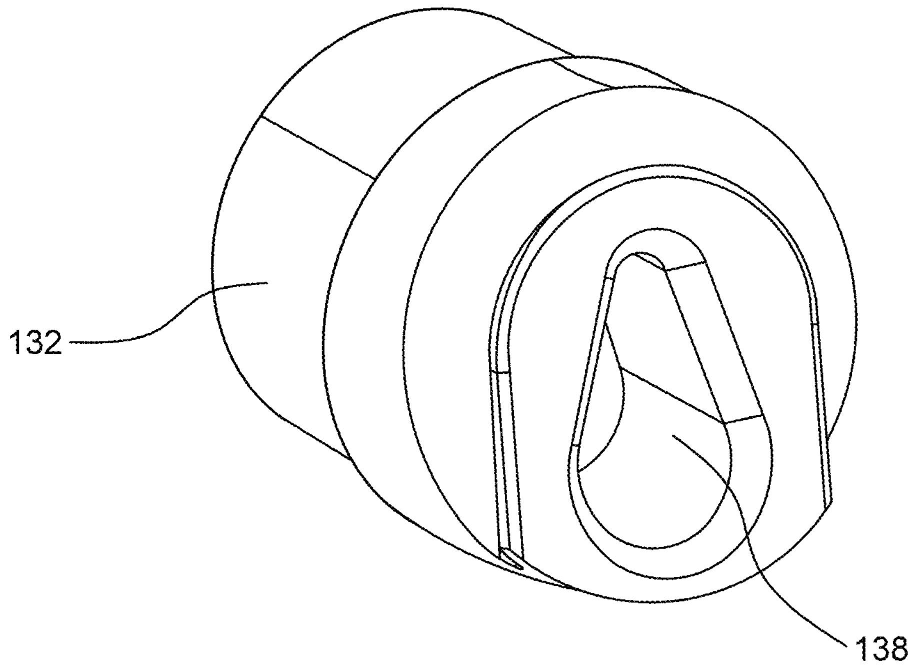
FIG. 78 schematically illustrates a front perspective view of another embodiment for a first coupling component for use in corner rail segments.
Figure 79:
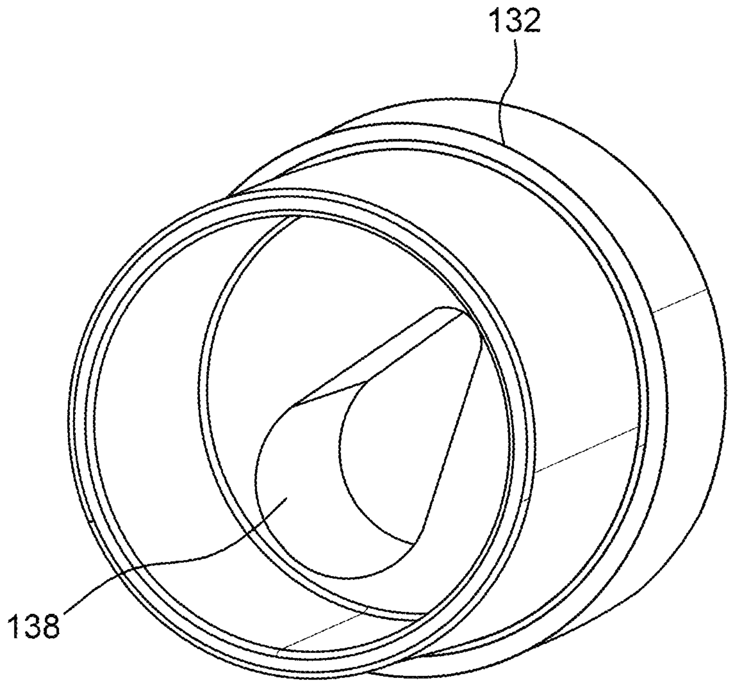
FIG. 79 schematically illustrates a rear perspective view of the first coupling component of FIG. 78.
Figure 80:
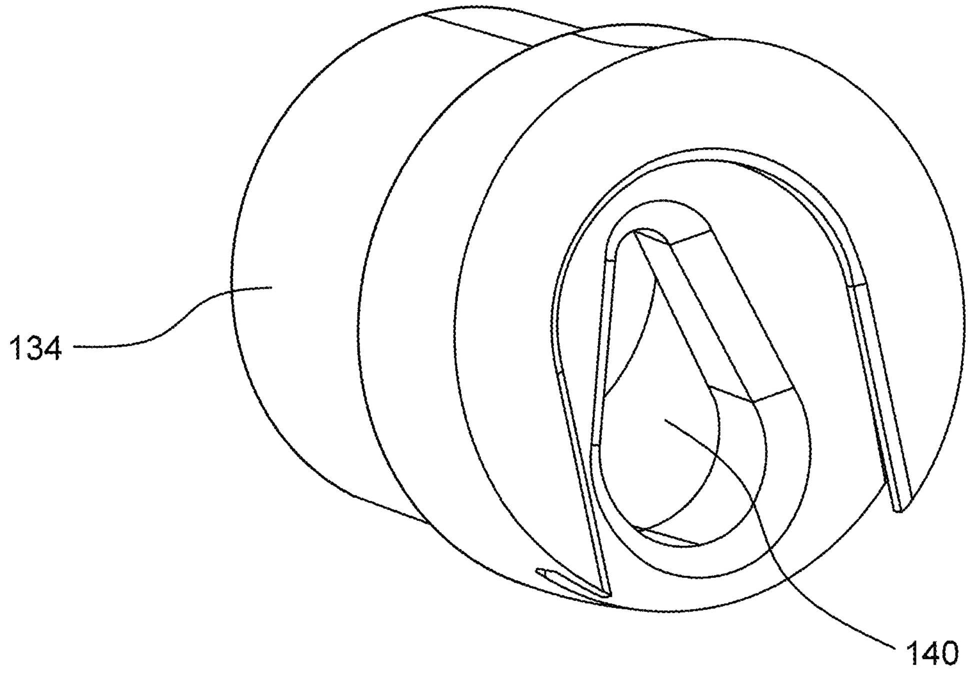
FIG. 80 schematically illustrates a front perspective view of another embodiment for a second coupling component for use in corner rail segments.
Figure 81:
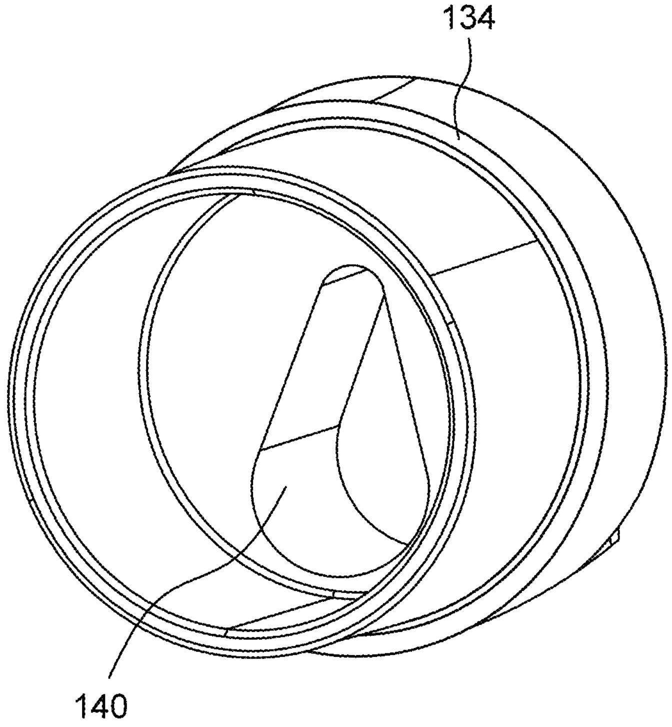
FIG. 81 schematically illustrates a rear perspective view of the second coupling component of FIG. 80.
Figure 82:
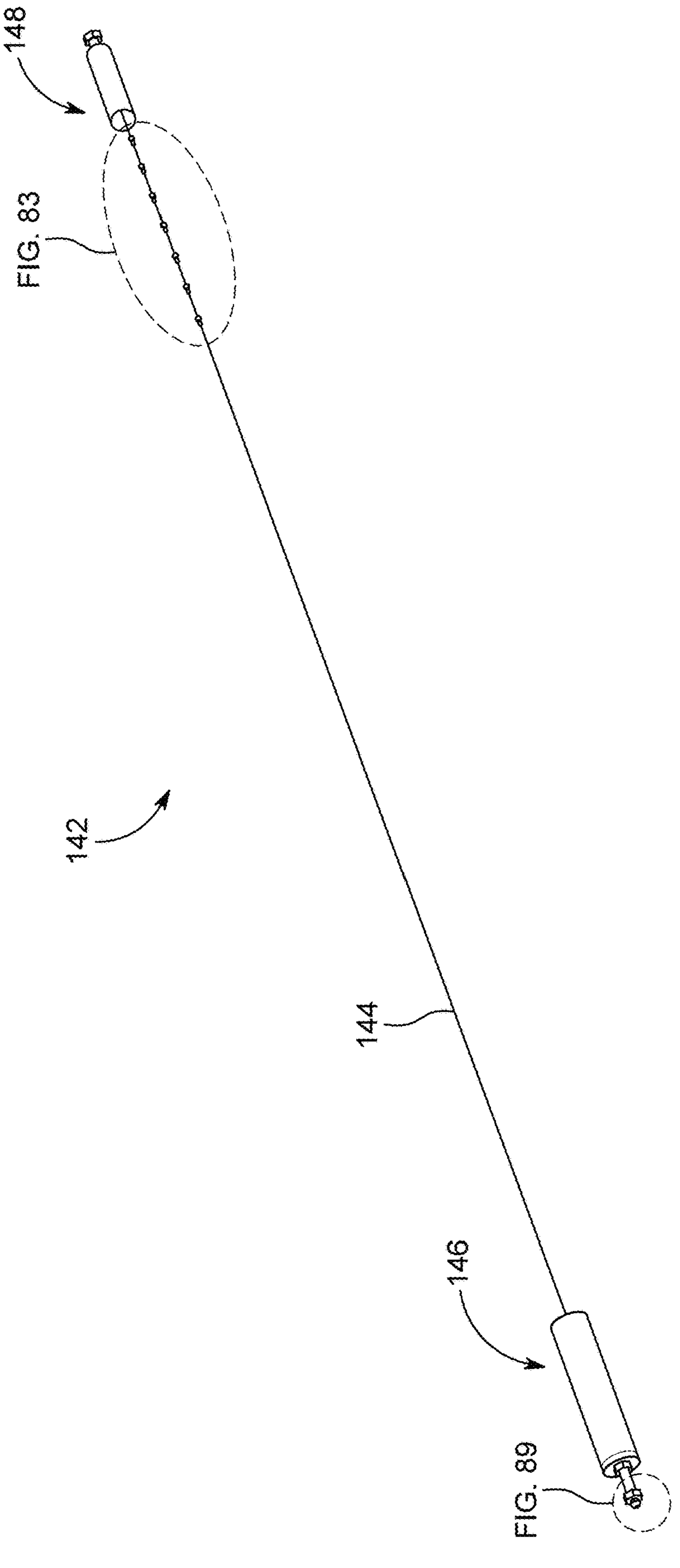
FIG. 82 schematically illustrates a cable tensioning assembly for use with stair lift systems.
Figure 83:
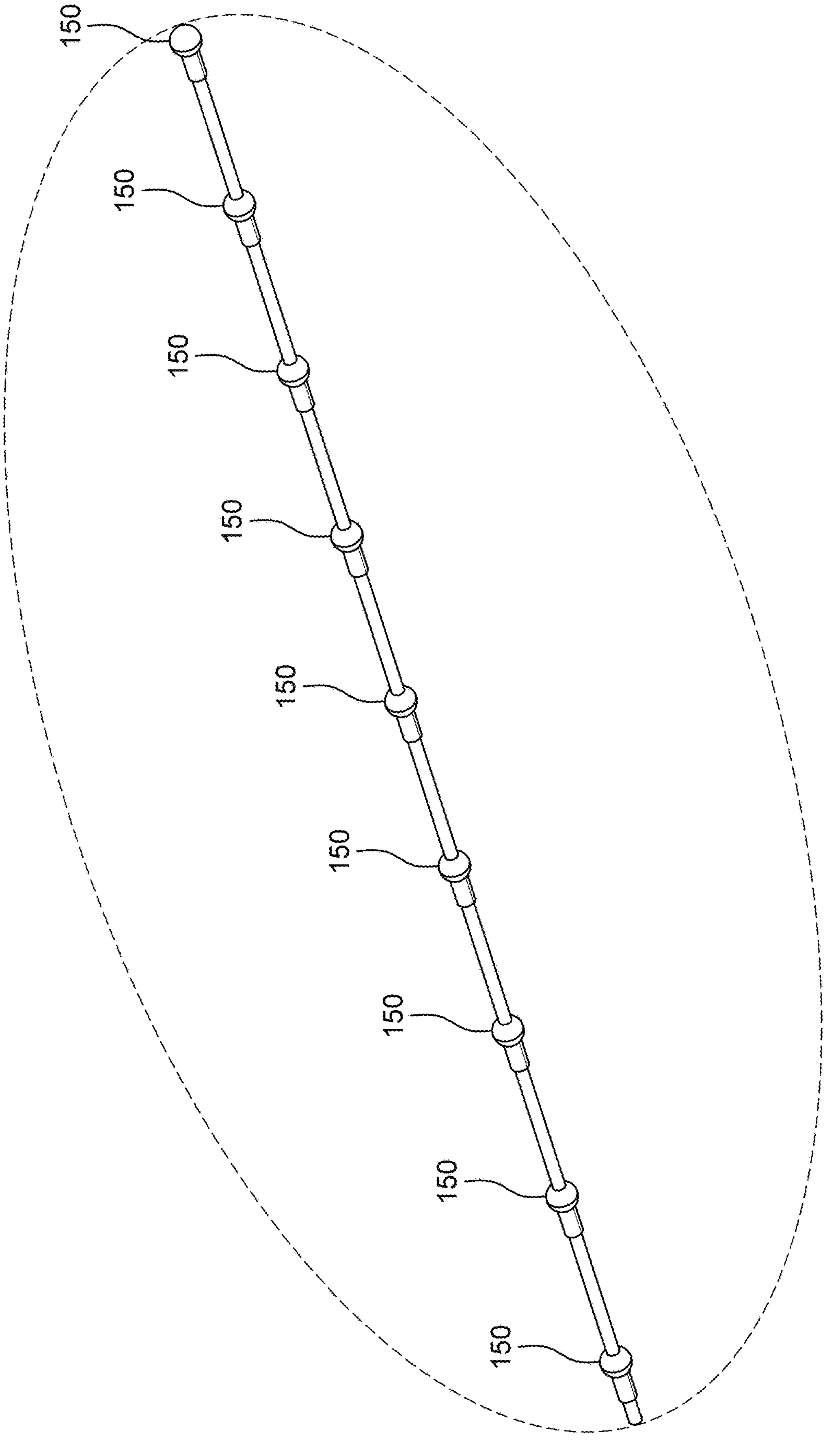
FIG. 83 schematically illustrates a series of ball shanks secured to a cable of the cable tensioning assembly of FIG. 82.
Figure 84:
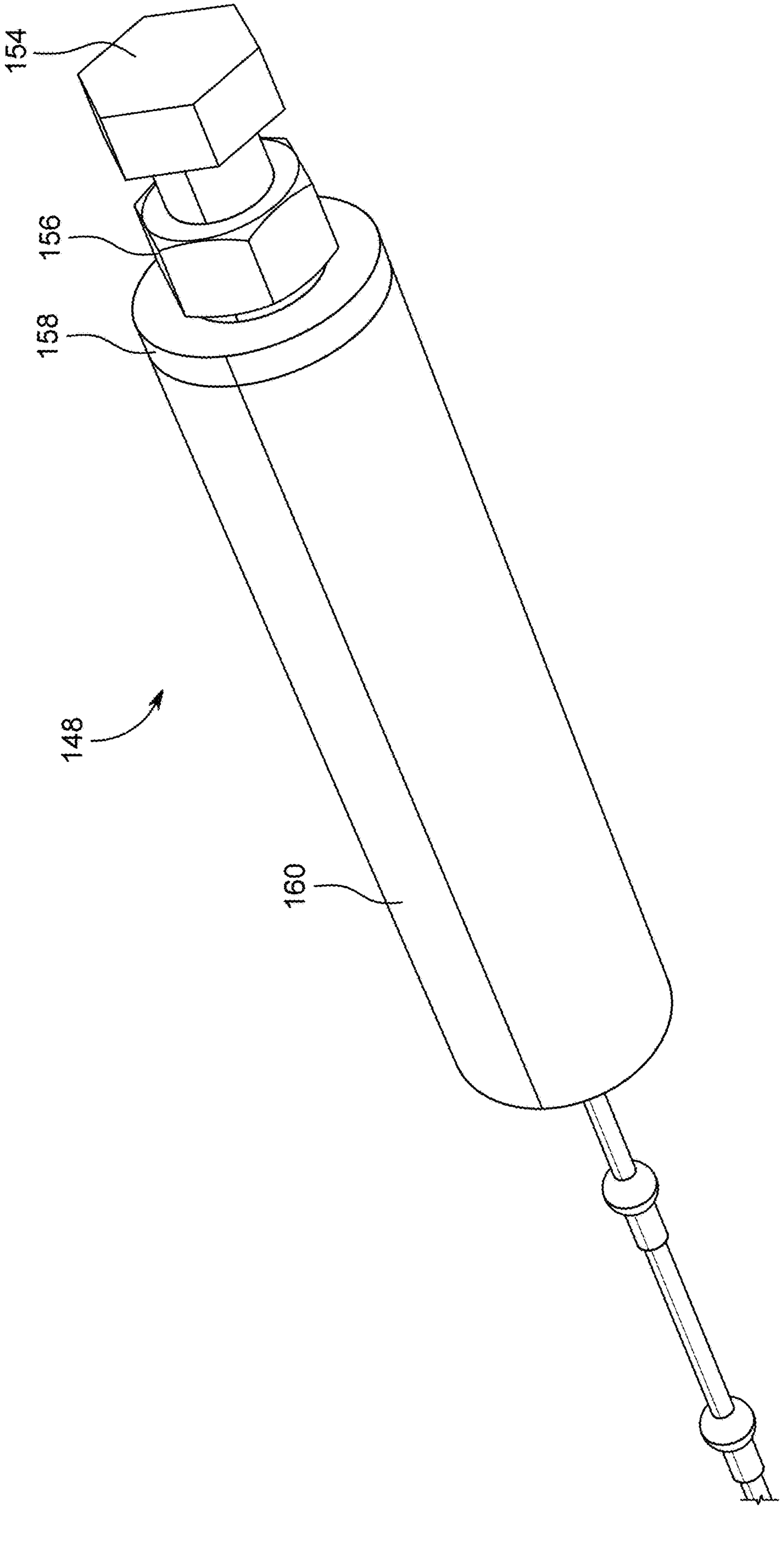
FIG. 84 schematically illustrates a tensioning assembly of the cable tensioning assembly of FIG. 82.

FIGS. 75-77 illustrate another embodiment of an inter-engaging disc 130 for use with a first coupling component 132 (illustrated in FIGS. 78 and 79) and a second coupling component 134 (illustrated in FIGS. 80 and 81) to form a modular corner rail assembly. Multiple discs 130 are assembled with a first coupling component 132 and second coupling component 134 as described above for inter-engaging discs 102 and its corresponding first coupling component 104 and second coupling component 106 and as illustrated in FIGS. 59-74. However, in place of two apertures for accommodating a cable and other components, the disc 130 includes a single teardrop aperture 136 with the aperture 136 tapering from the edge of the disc 130 to the center of the disc 130. The first coupling component 132 (FIGS. 78 and 79) includes a matching teardrop aperture 138, and the second coupling component 134 (FIGS. 80 and 81) also includes a matching teardrop aperture 140. The teardrop apertures (136, 138, 140) are arranged such that when multiple discs 130 are coupled together with a first coupling component 132 and second coupling component 134, the teardrop apertures (136, 138, 140) align to form a passageway. This passage is arranged to accommodate a cable 108 (and alternatively, a cable 144 that includes preassembled stops as will be further described with reference to FIGS. 82-91). The cable 108, 144 can be freely passed through the teardrop apertures (136, 138, 140) from one end of a modular corner rail assembly to the other end of modular corner rail assembly, and ultimately from one end of a rail system the other end of the rail system. When the cable 108, 144 is inserted and tensioned, the cable 108, 144 moves toward the narrow end of the teardrop apertures (136, 138, 140), i.e., toward the center of the disc 130, first coupling component 132, and second coupling component 134 and generally to the center of the modular corner rail assembly. This movement toward the center of the modular corner rail assembly can create more space for the insertion of a power cord or other components that are needed to span all or significant portions of the rail system.

With the arrangement of the modular corner rail assembly 100 as described herein, an installer can use fifteen discs 102 or 130, and both coupler components 104 or 132 and 106 or 134, to form a ninety degree modular corner rail assembly 100 to accommodate a ninety degree turn in a staircase. If the staircase includes a 180 degree turn, the installer can form two ninety degree modular corner rail assemblies 100 to accommodate the 180 degree turn. In such a situation, the installer can use a modular post assembly to couple the two ninety degree modular corner rail assemblies 100 together and add support to such a coupling. It will also be appreciated that the use of discs 102 or 130 facilitates the corner rail assembly 100 not only forming a general arc in two dimensions, but the assembly of discs 102 or 130 can also be arranged so that the corner rail assembly 100 forms a three dimensional curve. This is to say, that the corner rail assembly 100 can bend to accommodate a ninety degree turn in the staircase and also extend upward to accommodate the rise due to additional steps around that ninety degree turn.

A number of embodiments of cable tensioning assemblies useful in securing components of modular rail assemblies are illustrated in FIGS. 82-109. FIGS. 82-91 illustrate an embodiment of an exemplary cable tensioning assembly 142 generally for use with modular rail assemblies. In one example, the cable tensioning assembly 142 can span the entire length of a modular rail assembly and can add structural stability and redundance to the modular rail assembly. In another embodiment, the cable tensioning assembly 142 can span a portion of the modular rail assembly, such as from the bottom of the stairway to a landing area a portion of the way up the stairway or from such a landing area to the top of the stairway. Such arrangements can prevent misalignments and deformation of components over time as well as safeguard against structural failure of the modular rail assembly. The cable tensioning assembly 142 is arranged such that it can be generally configured with the approximate overall length needed to secure multiple modular rail assembly components together and then manipulated to maintain a tension force that applies a desirable compressive force on the multiple modular rail components to provide the appropriate structural support for the modular rail assembly.

Figure 85:
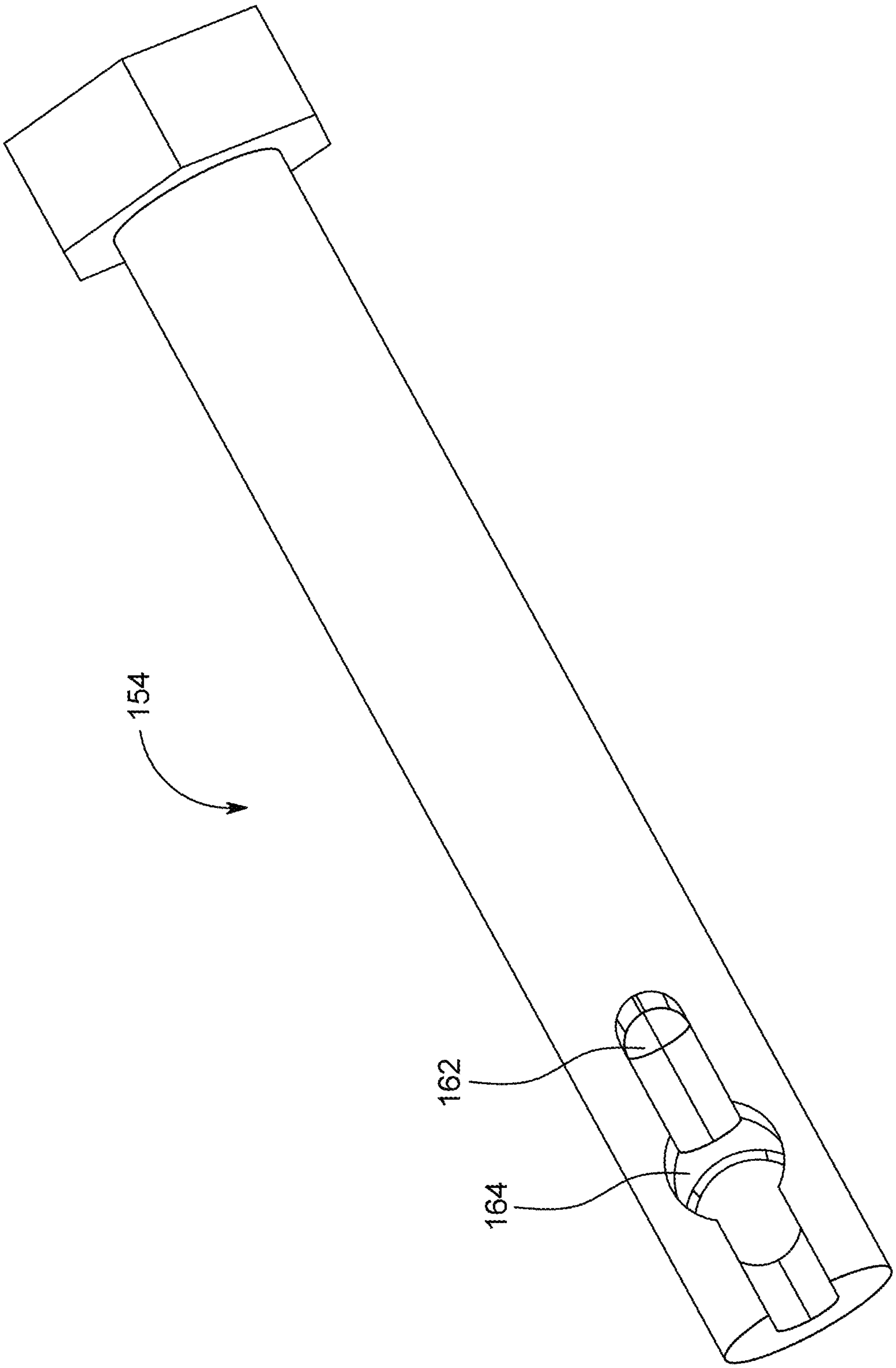
FIG. 85 schematically illustrates a perspective view of the tensioning bolt of the cable tensioning assembly of FIG. 82.
Figure 86:
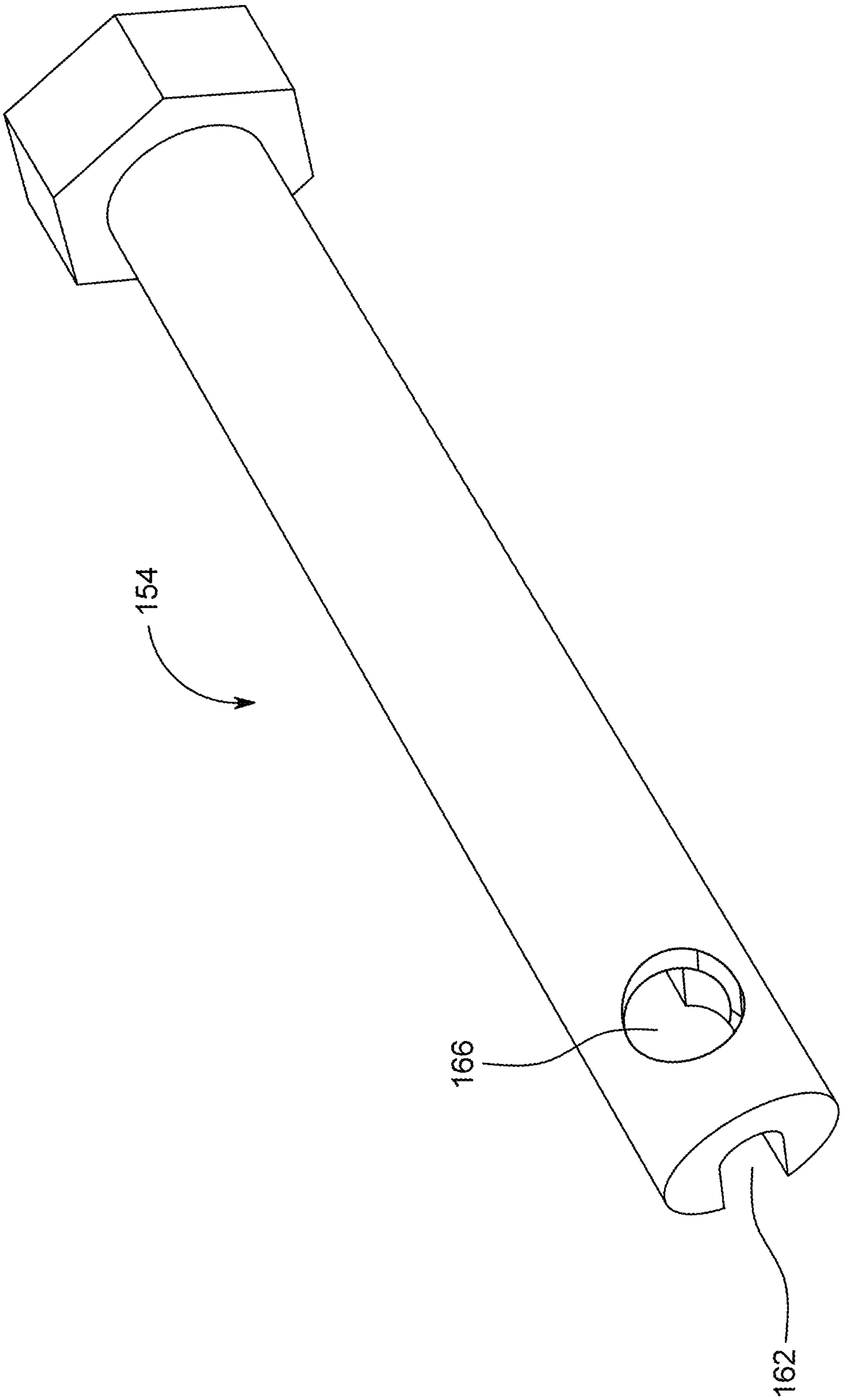
FIG. 86 schematically illustrates another perspective view of the tensioning bolt of the cable tensioning assembly of FIG. 82.
Figure 87:
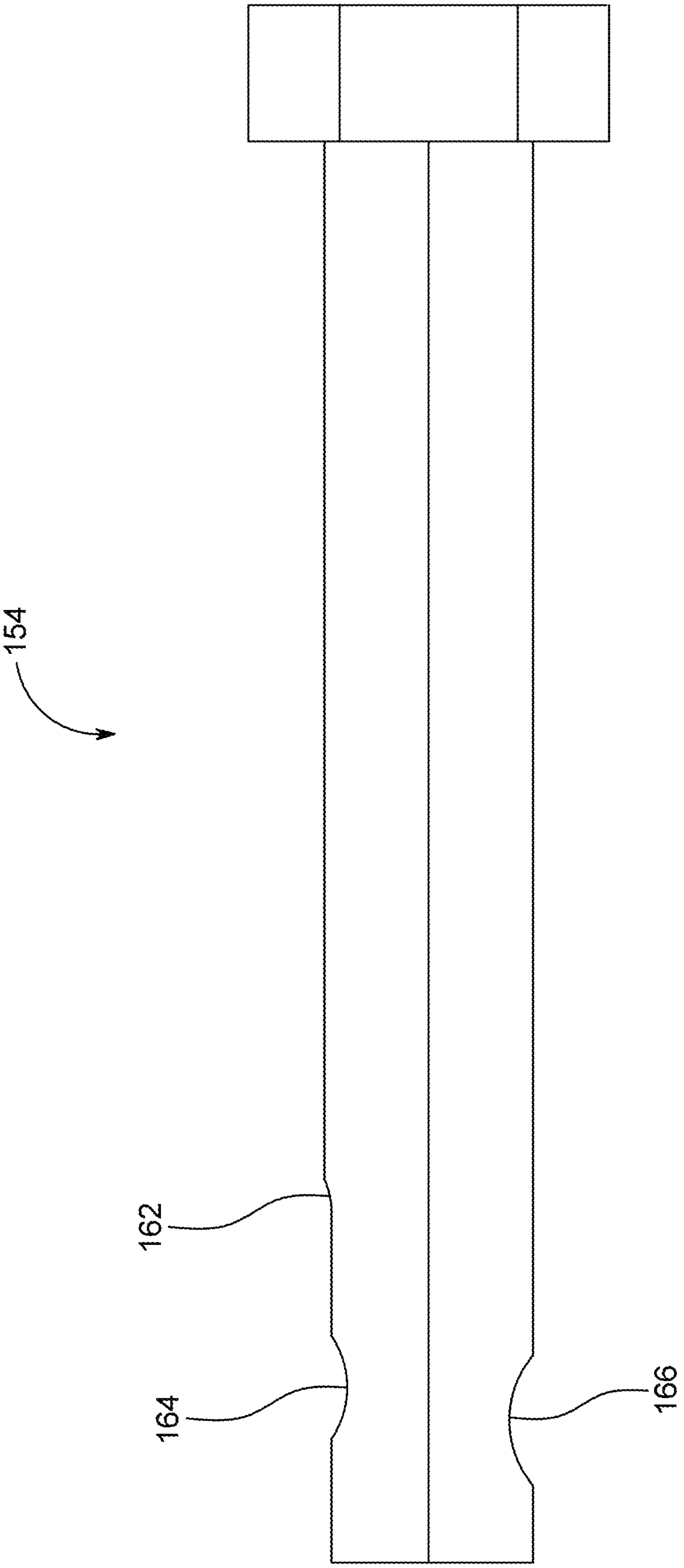
FIG. 87 schematically illustrates a side plan view of the tensioning bolt of the cable tensioning assembly of FIG. 82.
Figure 88:
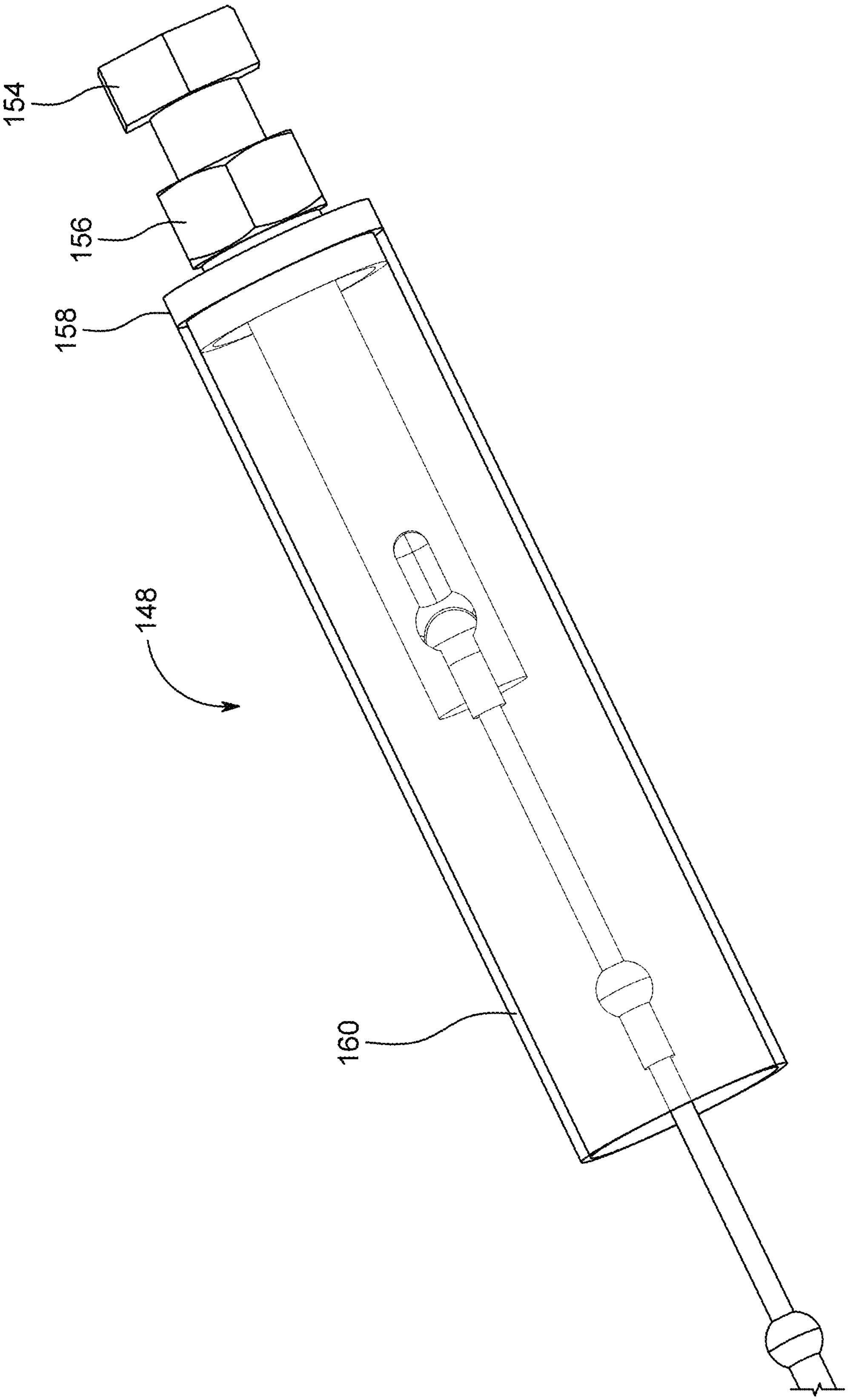
FIG. 88 schematically illustrates the tensioning assembly of the cable tensioning assembly of FIG. 82 with a transparent tensioning sleeve.
Figure 89:
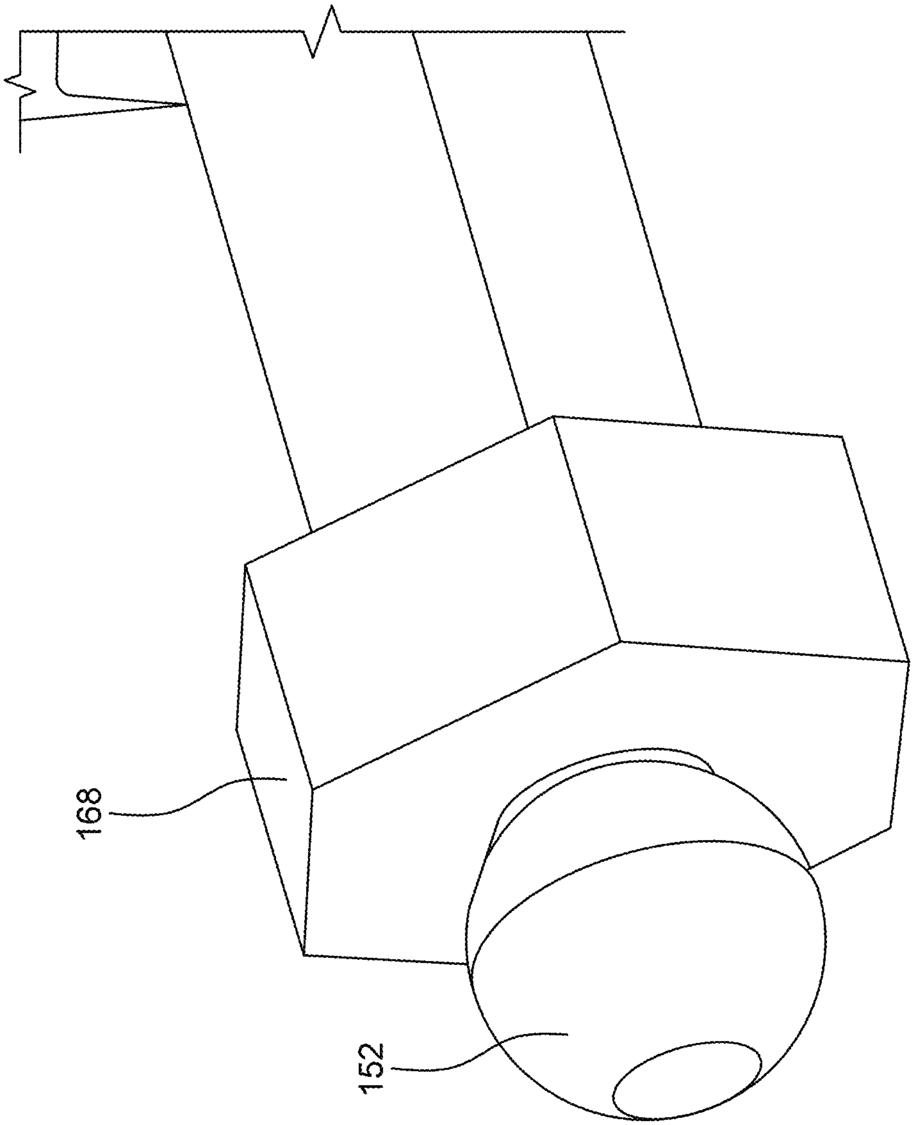
FIG. 89 schematically illustrates a portion of an anchoring tensioning assembly of the cable tensioning assembly of FIG. 82.

The cable tensioning assembly 142 includes a cable 144, an anchor assembly 146 on one end of the cable 144, and a tension assembly 148 on the opposite end of the cable 144. The cable 144 includes a series of ball shanks 150 (best illustrated in FIG. 83) located proximate to the tension assembly 148. The cable 144 also includes a single ball shank 152 located at one end of the cable 144 (best illustrated in FIG. 89) and located proximity to the anchor assembly 146. As illustrated in FIGS. 84-88, the tension assembly 148 includes a number of components including a tensioning bolt 154, a tensioning nut 156, a tensioning end flange 158, and a tensioning sleeve 160. The tensioning bolt 154 is externally threaded (not illustrated) to accommodate the tensioning nut 156. As illustrated in FIGS. 85-87, the tensioning bolt 136 includes a slot 162 that can accommodate one of the ball shanks 150 of the cable 144. The tensioning bolt 154 further includes a first aperture 164 formed in the slot 162 and a second aperture 166 (illustrated in FIGS. 86 and 87) formed opposite the first aperture 164. The first aperture 164 is arranged such that a ball shank 150 can be inserted through the first aperture 164, into an upper portion of the slot 162, and slid downward to secure the ball shank 150 within the slot 162. The second aperture 166 is formed slightly off center from the first aperture 164 and positioned lower on the tensioning bolt 154 (illustrated in FIG. 87). Such an arrangement allows the ball shank 150 to partially move into the second aperture 166 as it is slid downward in the slot 150 to facilitate the slot 150 securing the ball shank 150. The positioning of the ball shank 150 within the slot 150 is illustrated in FIG. 88 (where the tensioning sleeve 160 is transparent to reveal the slot 150 and ball shank 150).

Figure 90:
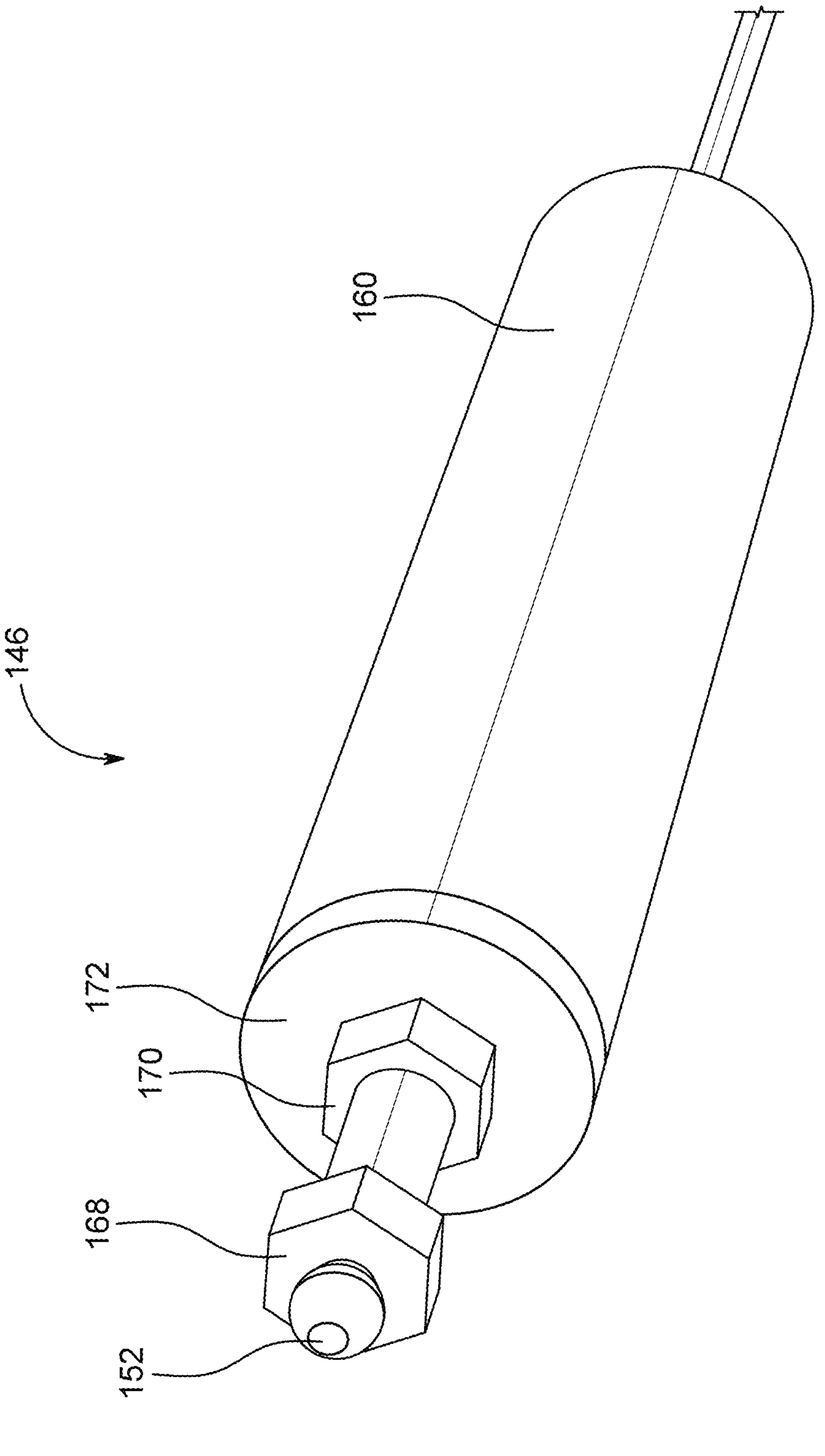
FIG. 90 schematically illustrates the anchoring assembly of the cable tensioning assembly of FIG. 82.
Figure 91:
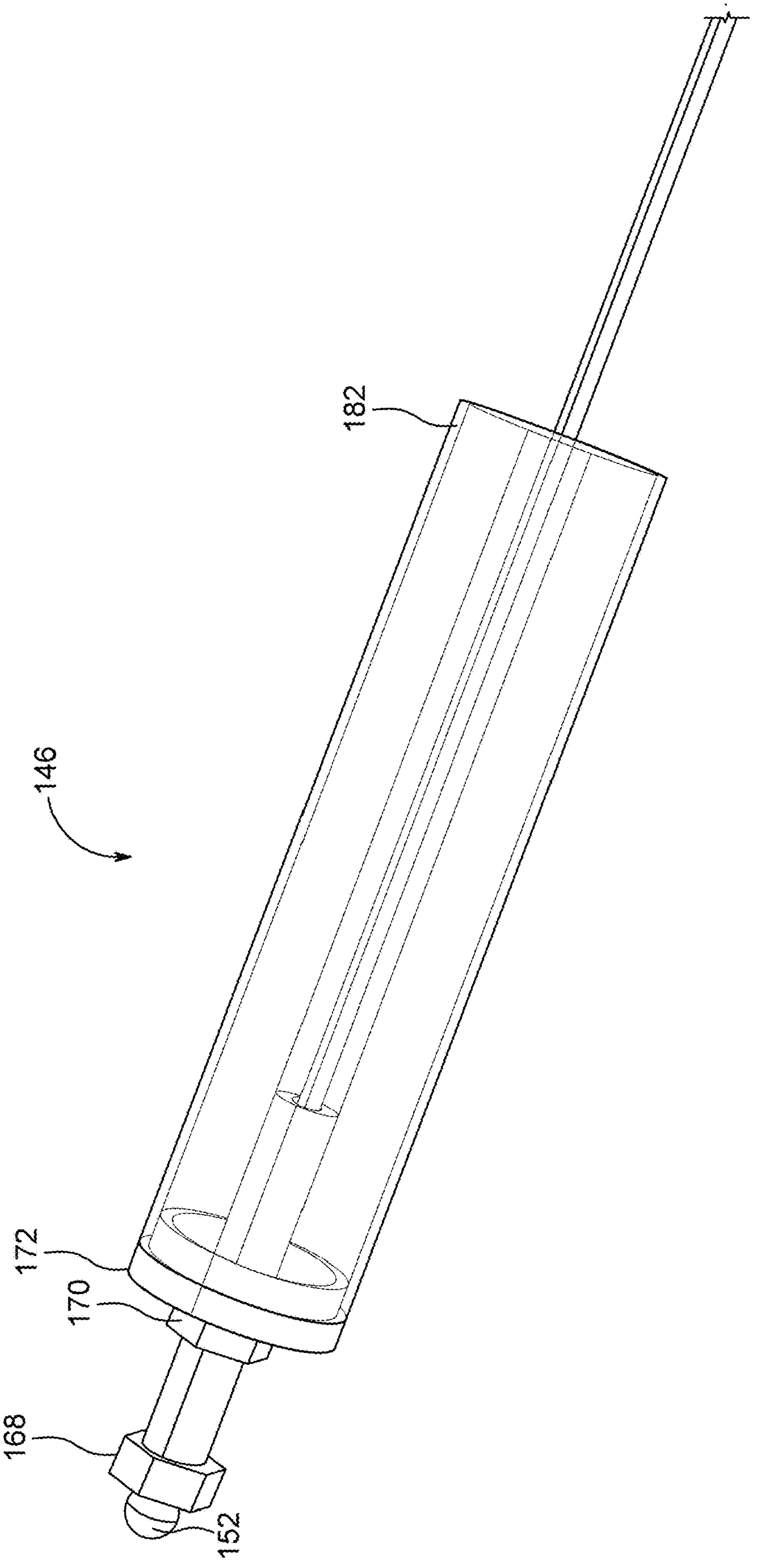
FIG. 91 schematically illustrates the anchoring assembly of the cable tensioning assembly of FIG. 82 with a transparent anchor sleeve.
Figure 92:
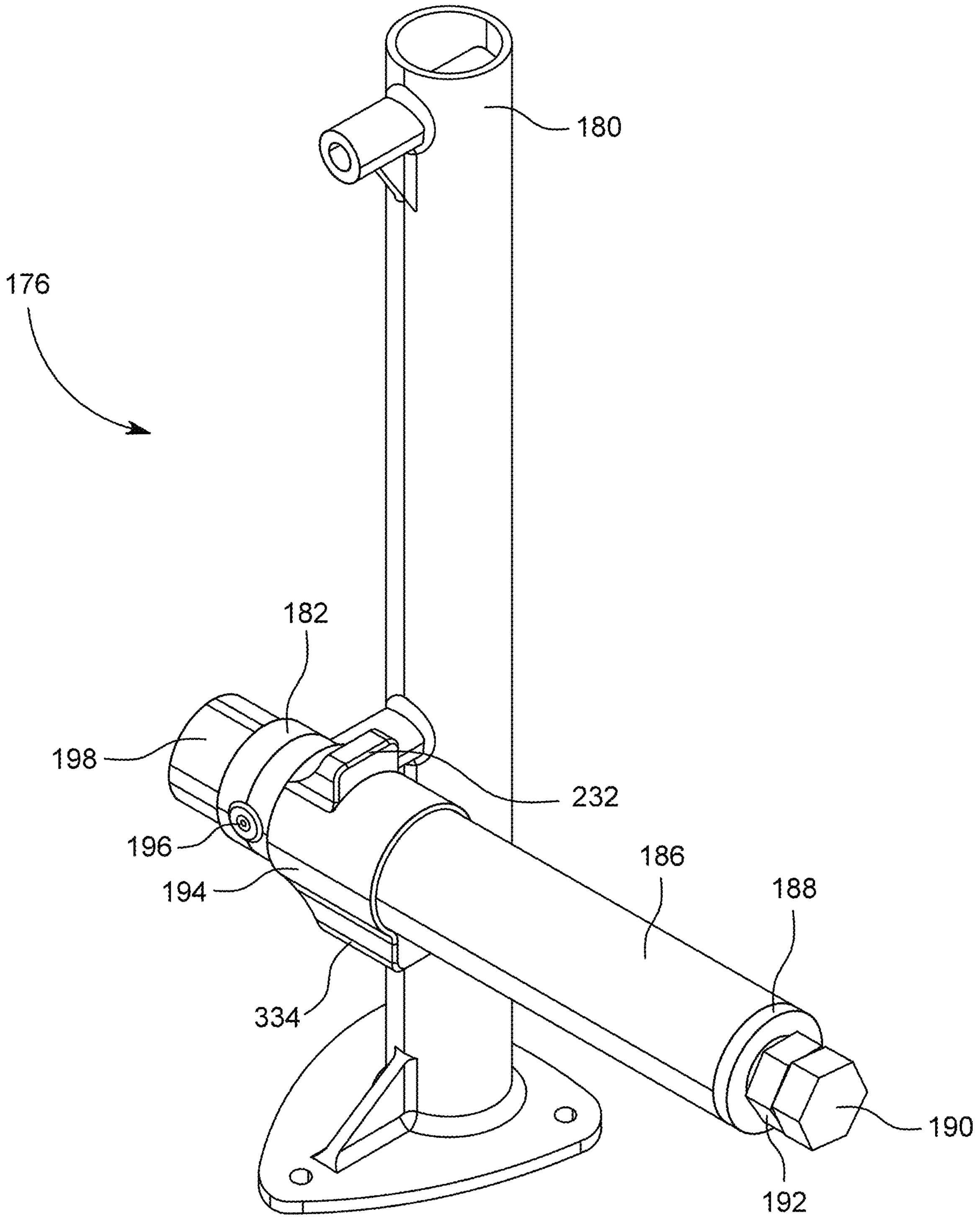
FIG. 92 schematically illustrates a perspective view of a tensioning assembly secured to a terminal post.
Figure 93:
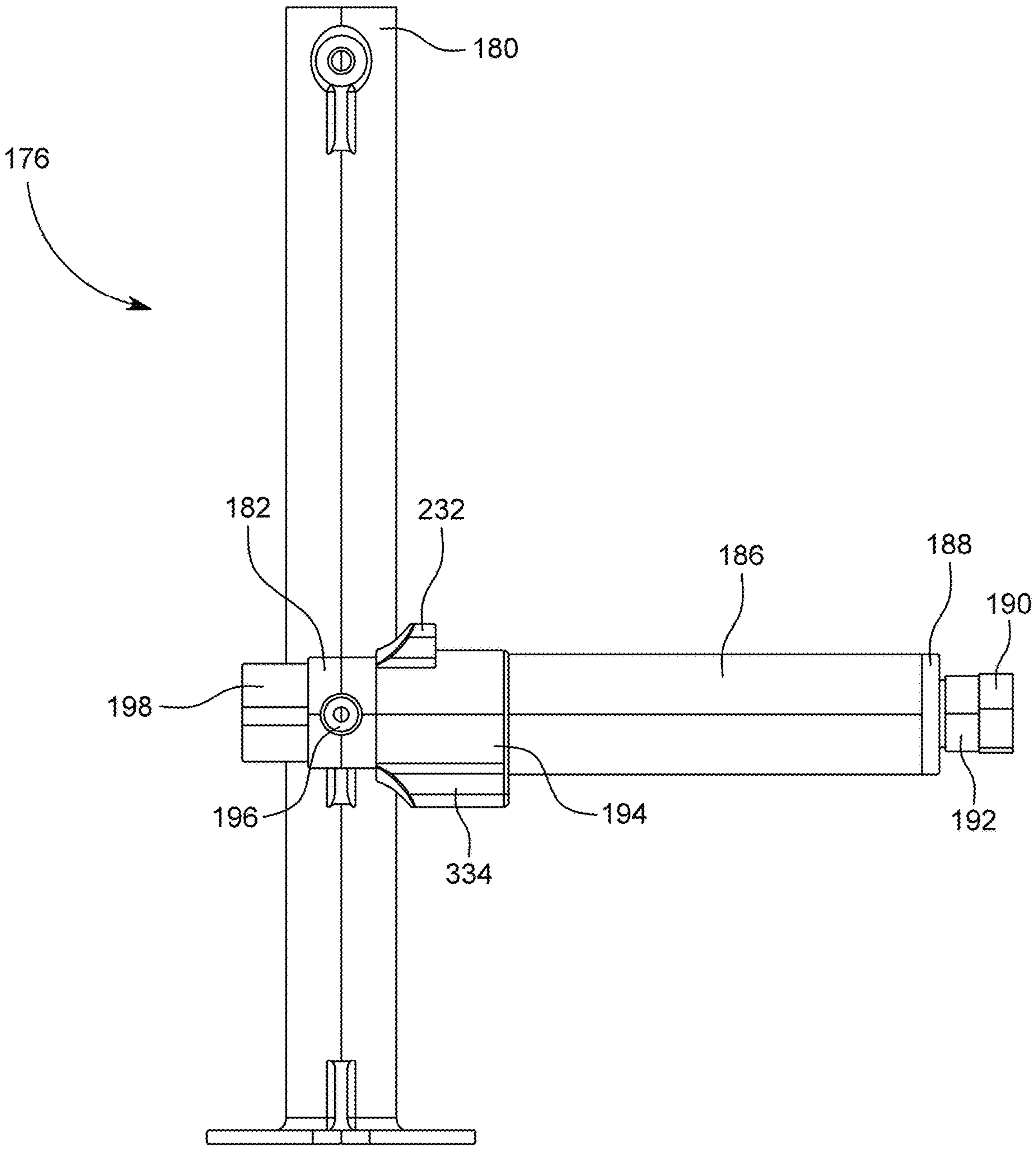
FIG. 93 schematically illustrates a plan side view of the tensioning assembly secured to a terminal post.

The anchor assembly 146 includes an anchor bolt 168, an anchor nut 170, an anchor end flange 172, and an anchor sleeve 174. The anchor bolt 168 is externally threaded to accommodate the anchor nut 170 and includes a hollow shaft that accommodates the cable 144. As illustrated in FIG. 90, the cable 144 is accommodated in the anchor bolt 168 such that the ball shank 152 is outside the head of the anchor bolt 168 and the cable 144 passes through the hollow shaft of the anchor bolt 168 (the anchor sleeve 174 is transparent in FIG. 91 to reveal the positioning of the cable 144 within the anchor bolt 168). The anchor assembly 146 is assembled onto the cable 144 prior to the ball shanks 150, 152 being secured to the cable 144. As will be appreciated, because of the placement of the ball shanks 150, 152, the anchor assembly 146 cannot be mounted onto the cable 144 after the ball shanks 150, 152 are secured to the cable 144.

An exemplary process for assembling the cable tensioning assembly 142 is described as follows. In one example, an installer measures the approximate overall length of the cable tensioning assembly 142 required for securing the desired multiple modular rail assembly components together and calculates the appropriate amount of additional length needed to accommodate the anchor assembly 146 and the tension assembly 148. The installer then trims the cable 144 at one of the series of ball shanks 150 that results in a length of cable 144 that exceeds the required overall length calculated by the installer. In another example, various standard lengths of the cable 144 are predetermined and provided based on common features of residential home staircases such as ceiling height, slope of stairs, number and length of landings, whether the installation is on the lefthand or righthand sided of a stair case with landings (i.e., whether it is an “inside” installation or an “outside” installation with reference to the turns of the staircase), whether the rail system will end at the top and/or bottom of the staircase or will be extended past the top and/or bottom of the staircase, and other such considerations. In this example, the installer will select the predetermined length that best suits the specific installation. In another example, shorter lengths of cable can be provided with ball shanks positioned along the length of cable. Additional components can be provided such as adapters that are used to couple a number of such shorter cable lengths together to customize the overall length of the cable to the specific installation.

As will be appreciated, the ball shanks 150 are positioned equidistant from each other, in this example, approximately 3 inches apart, such that the cable 144 can be trimmed to multiple lengths leaving a ball shank 150, 152 on each end of the cable 144 to accommodate a number of installations. It will be understood that the 3 inch distance is exemplary only and any number of different distances can be used based on practical considerations or preference. Once the appropriate length of cable 144 is selected, the cable 144 is generally trimmed (leaving some slack to adjustments), the tensioning bolt 154 is arranged so that the head of the tensioning bolt 154 is positioned next to the tensioning nut 156, and the anchor bolt 168 is arranged so that the head of the anchor bolt 168 is positioned next to the anchor nut 170. As will be appreciated, such positioning provides for the maximum travel outward of both the tensioning bolt 154 and anchor bolt 168 during the tensioning process. The assembly typically begins with assembling components in order from the bottom of the staircase to the top of the staircase and feeding the end of the cable 144 with the multiple ball shanks 150 through each component in order. The first components assembled are the anchor assembly 146 components, which will be positioned at the bottom of the staircase, with ball shank 152 at the opposite end of the cable 144 positioned adjacent to the head of the anchor bolt 168. The cable 144 is fed through each additional component of the rail system and, as applicable, each of those components are connected to each other and/or secured to a post. The components of the tensioning assembly 148 are the last to be assembled. The cable 144 on its free end at the top of the staircase is trimmed at the ball shank 150 that best meets the overall length of the rail system. The last ball shank 150 at the cut end of the cable 144 is placed into the slot 162 of the tensioning bolt 154 and secured within the slot 162. The cable tensioning assembly 142 is then tensioned. In one example, the anchor bolt 168 is rotated in a counterclockwise direction to move the head of the anchor bolt 168 away from the anchor nut 170 until all excess slack is removed from the cable 144. If required, the tensioning bolt 154 is rotated in a counterclockwise direction to move the head of the tensioning bolt 154 away from the tensioning nut 156 until the desired tension is applied to the cable 144. During such a process, during the rotation of the anchor bolt 168 and/or the tensioning bolt 154, the cable 144 is preferably not spun or twisted. In another example, the anchor nut 170 is rotated in a clockwise direction to move the head of the anchor bolt 168 away from the anchor nut 170 until all excess slack is removed from the cable 144. If required, the tensioning nut 156 is rotated in a clockwise direction to move the head of the tensioning bolt 154 away from the tensioning nut 156 until the desired tension is applied to the cable 144. During such a process, during the rotation of the anchor nut 170 and/or the tensioning nut 156, the cable 144 will not be spun or twisted. It will be appreciated that the anchor bolt 168 and anchor nut 170 can include course threads and the tensioning bolt 154 and tensioning nut 156 can include comparatively fine threads. This arrangement facilitates the anchor bolt 168 and anchor nut 170 adjustments providing for gross adjustment of the tension of the cable 144 and the tensioning bolt 154 and tensioning nut 156 providing precise or fine tuning of the tension on the cable 144.

General instructions can be provided to installers for the use of the cable tensioning assembly 142 during installation. Such instructions can prevent damage to components due to over tightening and ensure that the actual forces applied are effective in providing structural support to the modular rail assemblies. For example, installation instructions can include a preset torque value. A torque measuring device such as a torque wrench or other similar device can then be used during installation to measure the torque applied to the tensioning bolt 154 or tensioning nut 156 and/or the anchor bolt 168 or anchor nut 170 during installation. The installer will then apply the torque to the tensioning bolt 154 or tensioning nut 156 and/or the anchor bolt 168 or anchoring nut 170 in accordance with the preset torque value of the installation instructions.

Figure 94:
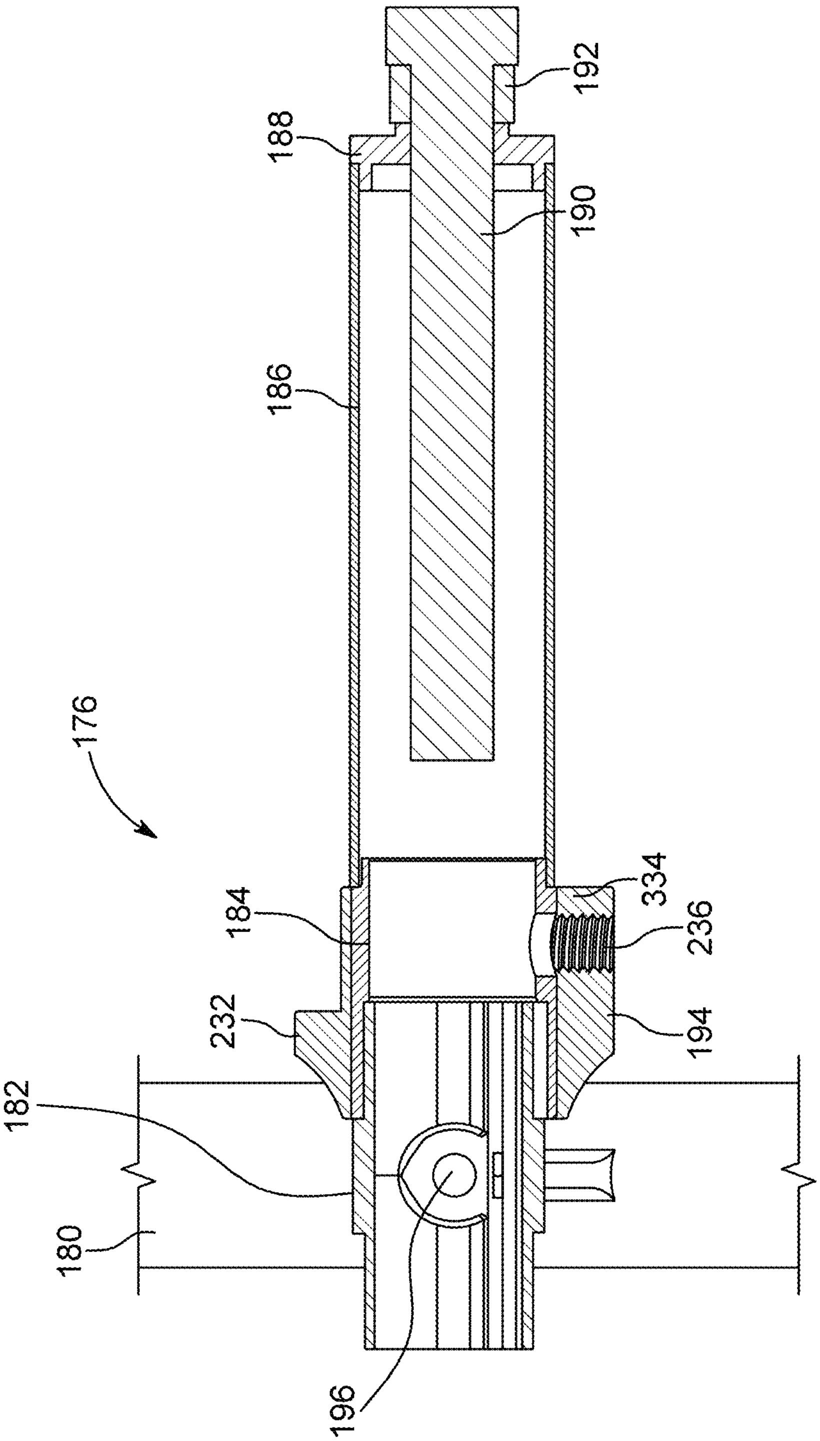
FIG. 94 schematically illustrates a cross-sectional view of the tensioning assembly secured to a terminal post.
Figure 95:
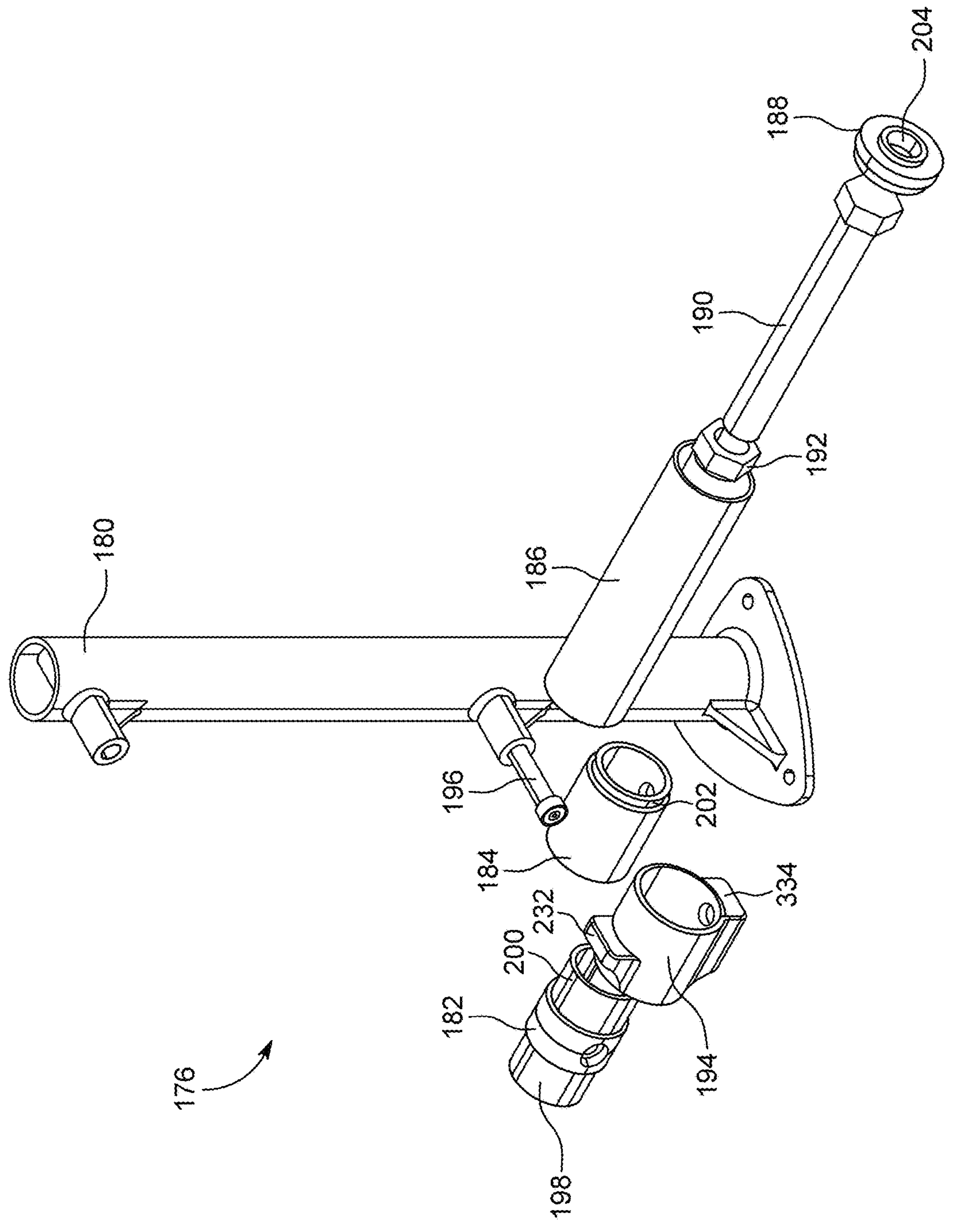
FIG. 95 schematically illustrates an exploded view of the tensioning assembly secured to a terminal post.
Figure 96:
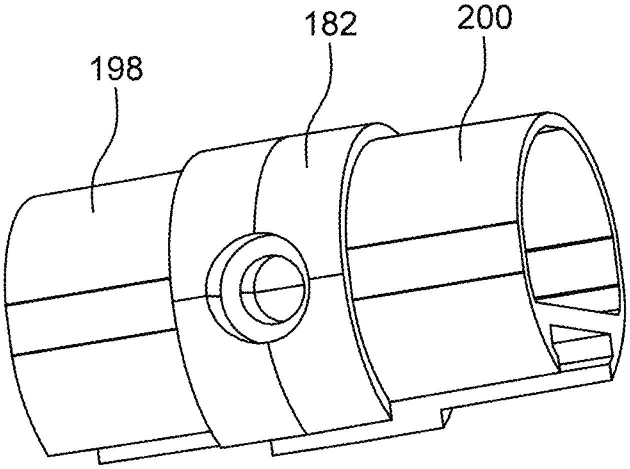
FIG. 96 schematically illustrates a perspective view of a rail connector.
Figure 97:
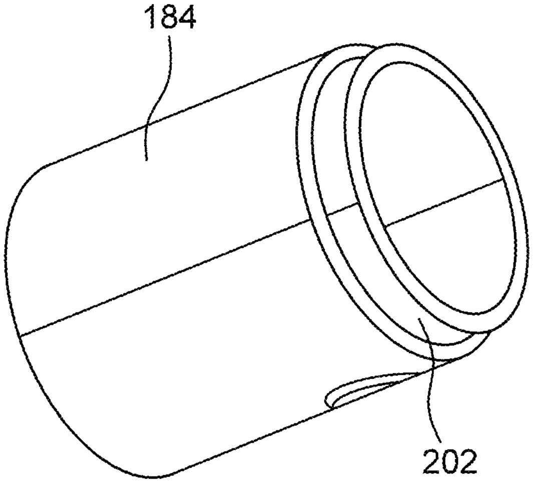
FIG. 97 schematically illustrates a perspective view of a tensioning end stop adaptor.

FIGS. 92-114 illustrate other embodiments of subassemblies and components of a cable tensioning assembly. In a first embodiment, a cable tensioning assembly includes a tensioning assembly 176 and an anchoring assembly 178. The tensioning assembly 176 and the anchoring assembly 178 are located at opposite ends of a stair lift system and facilitate the positioning and tensioning of a cable to support the structural integrity and alignment of a modular rail assembly. The tensioning assembly 176 is illustrated in FIGS. 92-99. The tensioning assembly 176 can be coupled to a terminal post 180 positioned at one end of the stair lift system by a rail connector 182. The tensioning assembly 176 incudes a tensioning end stop adapter 184, a tensioning rail extension 186, a tensioning bolt cap 188, a tensioning bolt 190, a tensioning nut 192, and a tensioning end stop 194. The tensioning end stop adapter 194, tensioning rail extension 196, and tensioning bolt cap 198 are cylindrical components that generally conform to the shape of a modular rail segments and form an extension of the modular rail assembly. The rail connector 182 is arranged to connect on a first end to a rail segments of a modular rail assembly and connect on a second and opposite end to a tensioning assembly 176. The rail connector 182 is further arranged to be secured to the terminal post 180 by a bolt 196, thus securing the rail segment and the tensioning assembly 176 to the terminal post 190. The rail connector 182 can be attached to the terminal post 180 in a manner that allows for rotational adjustment of the rail connector 182 relative to the terminal post 180 so that components can be aligned during installation based on the particular circumstances of the staircase. The rail connector 182 includes a pair of recessed cylindrical surfaces 198, 200, one on each end of the rail connector 182. These recessed cylindrical surfaces 198, 200 are arranged to accommodate an inner diameter of a rail segment (not illustrated) and an inner diameter of the tensioning end stop adapter 184 (illustrated in cross-sectional view FIG. 94). The tensioning end stop adapter 184 also includes a recessed cylindrical surface 202, which is arranged to accommodate an inner diameter of the tensioning rail extension 186 (illustrated in cross-sectional view FIG. 94). The tensioning bolt cap 188 is arranged to be inserted into the opposite end of the tensioning rail extension 186. The tensioning bolt cap 188 includes a centrally located aperture 204, which accommodates the tensioning bolt 190 passing through the aperture 204. The tensioning nut 192 is positioned onto the tensioning bolt 190 to generally complete the tensioning assembly 176 (the addition of the tensioning end stop 194 will be further discussed herein). As illustrated in FIG. 94, once assembled, the components of the tensioning assembly 176 form a solid cylindrical assembly with a central passage. This central passage is colinear with a passage passing through the modular rail assembly. It will be appreciated that such a passage that can accommodate a tensioning cable, one or more power cables, and wiring that can span the stair lift system.

Figure 101:
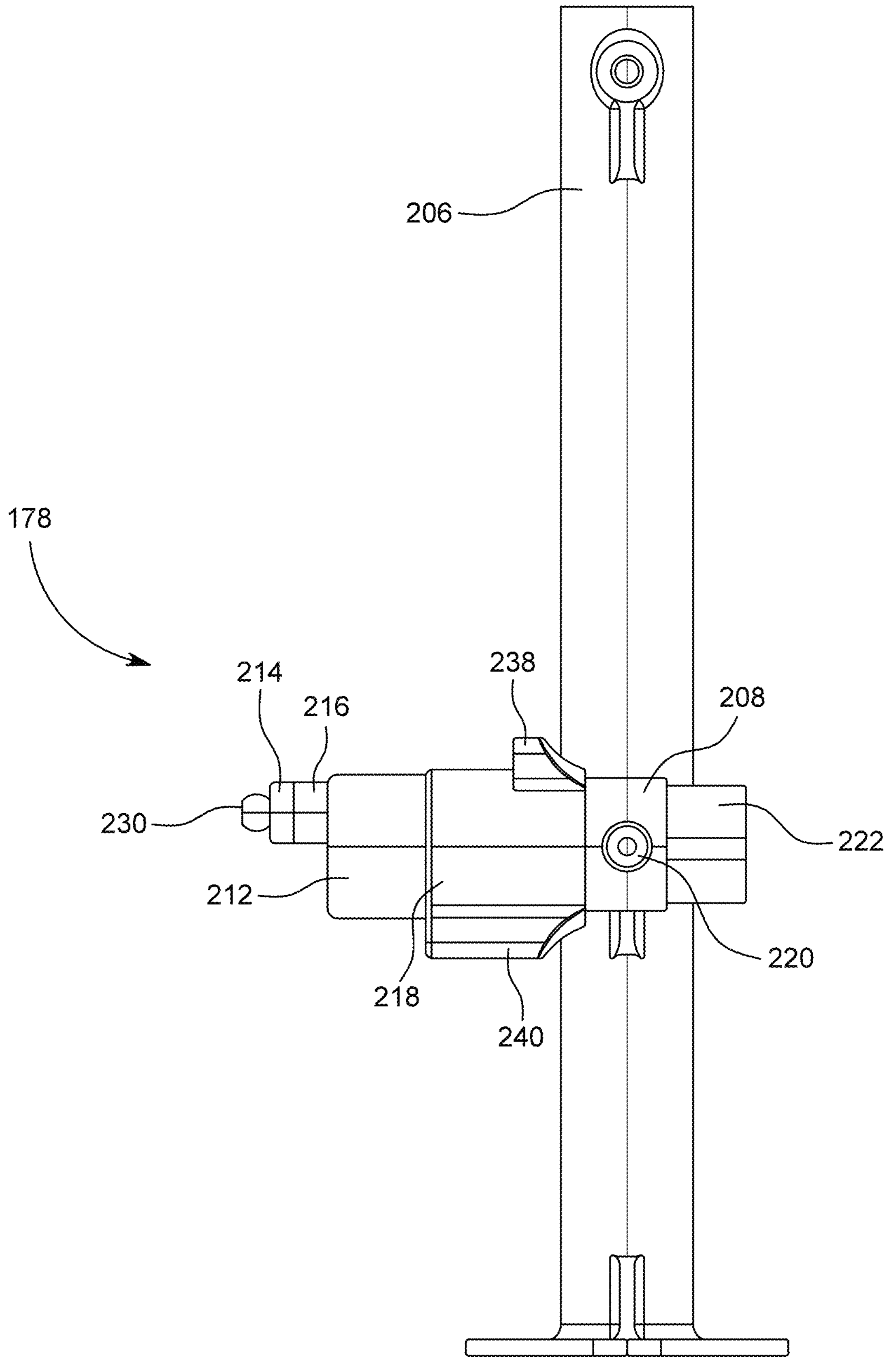
FIG. 101 schematically illustrates a plan side view of the anchoring assembly secured to a terminal post.
Figure 102:
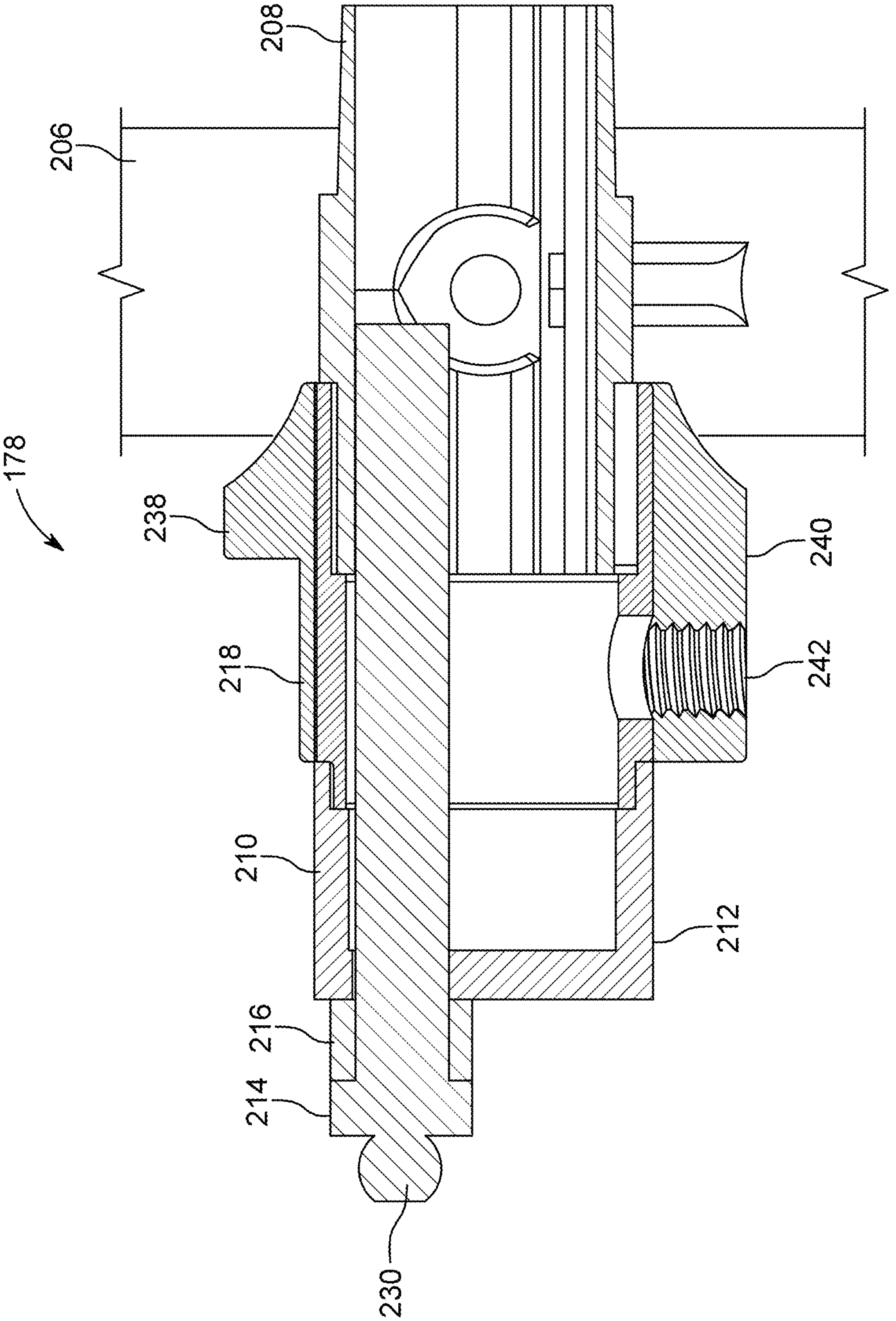
FIG. 102 schematically illustrates a cross-sectional view of the anchoring assembly secured to a terminal post.
Figure 103:
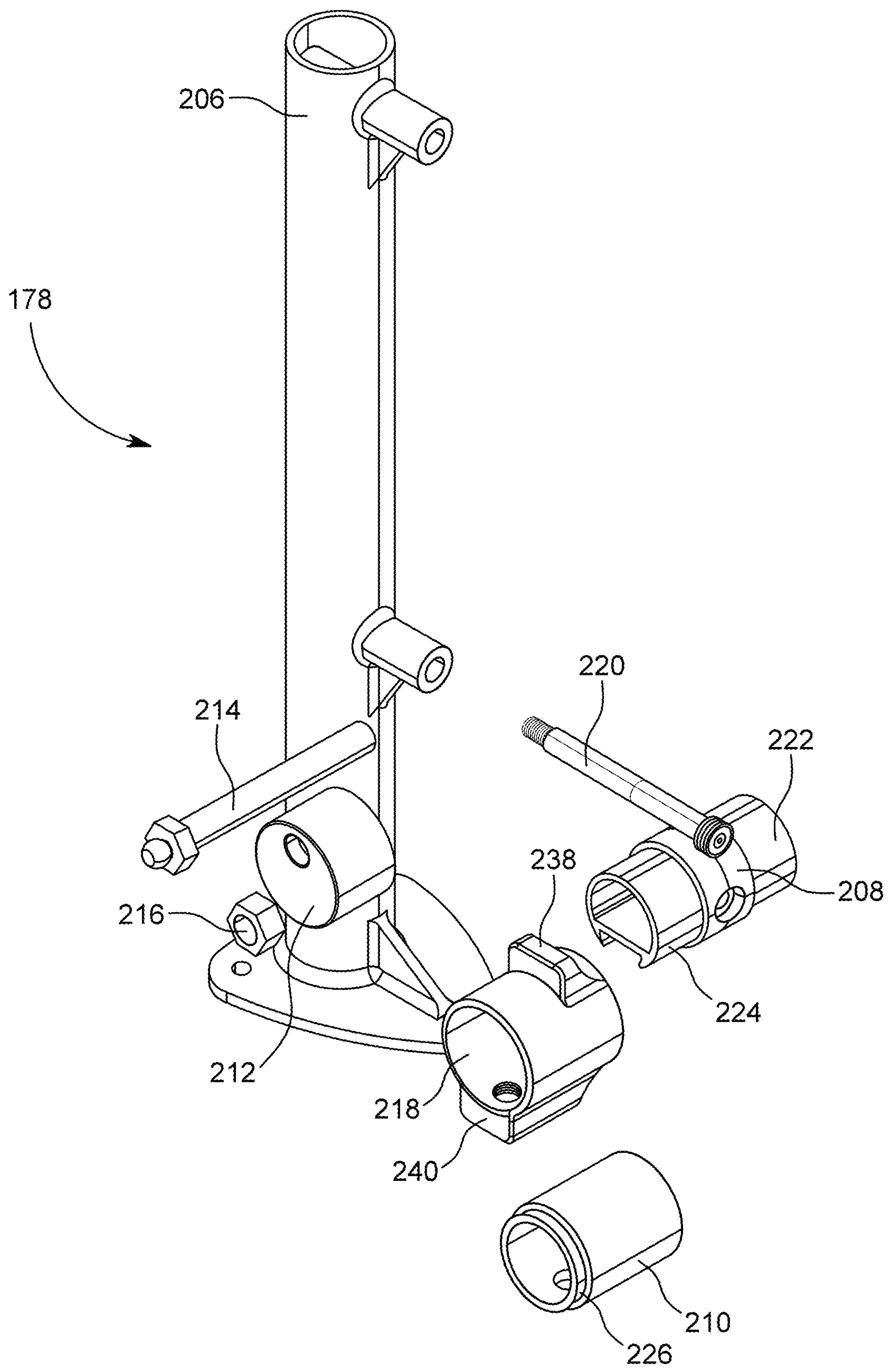
FIG. 103 schematically illustrates an exploded view of the anchoring assembly secured to a terminal post.
Figure 104:
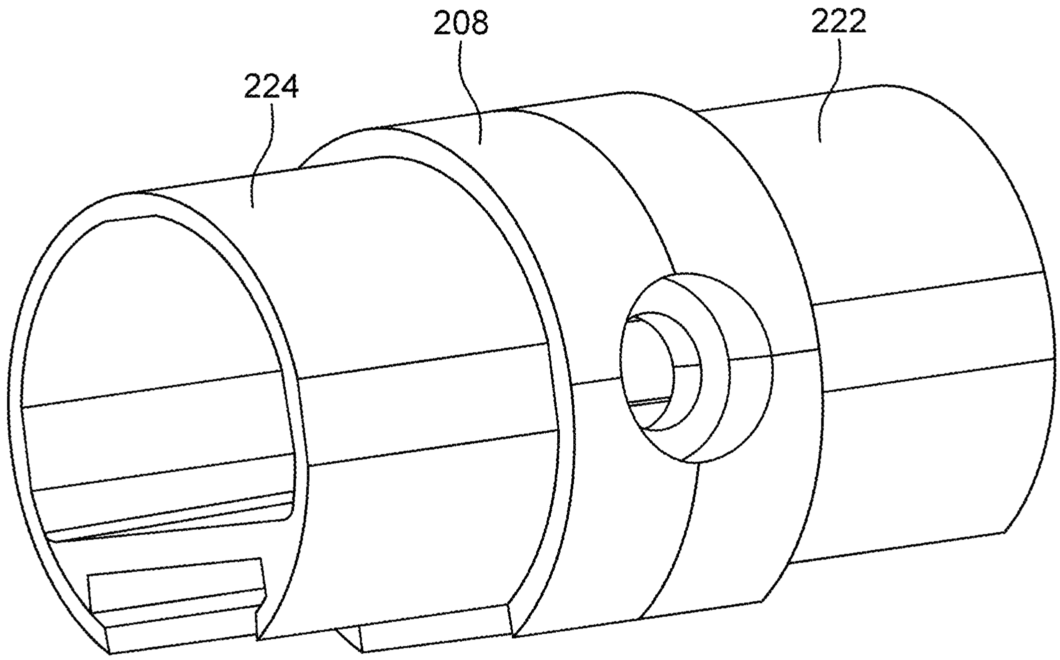
FIG. 104 schematically illustrates a perspective view of a rail connector.
Figure 105:
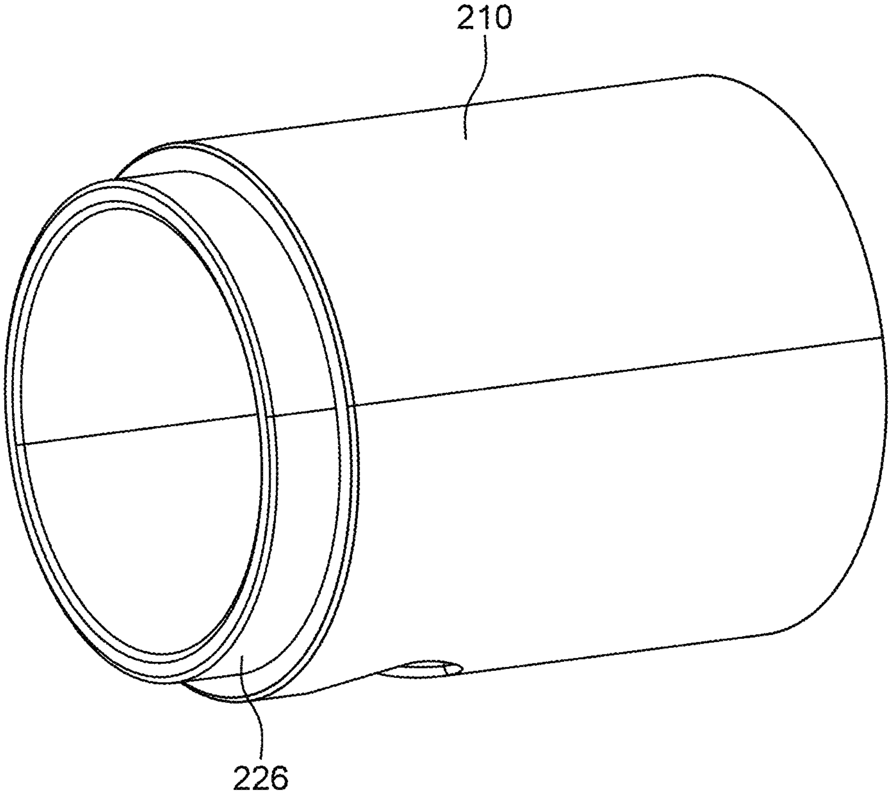
FIG. 105 schematically illustrates a perspective view of an anchoring end stop adapter.

An embodiment of an anchoring assembly 178 is illustrated in FIGS. 100-107. The anchoring assembly 178 can be coupled to a terminal post 206 positioned at an opposite end of the stair lift system from the tensioning assembly 176 by a rail connector 208. The anchoring assembly 178 includes an anchoring end stop adapter 210, an anchoring bolt cap 212, an anchoring bolt 214, an anchoring nut 216, and an anchoring end stop 218. The anchoring end stop adapter 210, anchoring bolt cap 212 and anchoring end stop 218 are all generally cylindrical components that generally conform to the shape of a modular rail segments and form an extension of the modular rail assembly. The rail connector 208 is arranged to connect on a first end to a rail segments of a modular rail assembly and connect on a second and opposite end to an anchoring assembly 178. The rail connector 208 is further arranged to be secured to the terminal post 206 by a bolt 220, thus securing the rail segment and the anchoring assembly 178 to the terminal post 206. The rail connector 208 can be attached to the terminal post 206 in a manner that allows for rotational adjustment of the rail connector 208 relative to the terminal post 206 so that components can be aligned during installation based on the particular circumstances of the staircase. The rail connector 208 includes a pair of recessed cylindrical surfaces 222, 224, one on each end of the rail connector 208. These recessed cylindrical surfaces 222, 224 are arranged to accommodate an inner diameter of a rail segment (not illustrated) and an inner diameter of the anchoring end stop adapter 210 (illustrated in cross-sectional view FIG. 102). The anchoring end stop adapter 210 also includes a recessed cylindrical surface 226, which is arranged to accommodate an inner diameter of the anchoring bolt cap 212 (illustrated in cross-sectional view FIG. 102). The anchoring bolt cap 212 includes an offset aperture 228, which accommodates the anchoring bolt 210 passing through the offset aperture 228. The anchoring nut 216 is positioned onto the anchoring bolt 214 and the anchoring bolt 214 is passed through the offset aperture 228 to generally complete the anchoring assembly 178 (the addition of the anchoring end stop 218 will be further discussed herein). As illustrated, the aperture 228 is offset such that it is not located in the center of the anchoring bolt cap 212 but is set off to one side near the perimeter of the anchoring bolt cap 212. As illustrated in FIG. 102, once assembled, the components of the anchoring assembly 178 form a solid cylindrical assembly with a central passage that can accommodate a cable and, this central passage is colinear with the passage passing through the modular rail assembly.

During installation of a stair lift system, the tensioning assembly 176 and anchoring assembly 178 are assembled as follows. Starting with the anchoring assembly 178, the rail connector 208 is engaged with the last rail segment of the modular rail assembly by sliding the end of the rail segment over the recessed surface 222 of the rail connector 208. The rail connector 208 is then secured to the terminal post 206 using the bolt 220. The bolt 220 is not fully tightened, allowing for some rotational motion of the rail connector 208 relative to the terminal post 206. The anchoring end stop adaptor 210 is then slid over the opposite recessed surface 224 of the rail connector 208. It will be understood that the rail segment and anchoring end stop adaptor 210 can be secured to the rail connector 208 by a number of mechanism including a set screw, adhesives, friction fits, and the like. The anchoring bolt cap 212 is then slid over the recessed surface 226 of the anchoring end stop adapter 210. Similar to prior description, it will be understood that the anchoring bolt cap 212 can be secured to the anchoring end stop adapter 210 by a number of mechanism including a set screw, adhesives, friction fits, and the like. The anchoring nut 216 is threaded onto the anchoring bolt 214. One end of the cable (which is passed through the modular rail segments such that one of the cable is positioned near the end of the anchoring assembly 146) is then secured to the anchoring bolt 214 as previously described. For example, the anchoring bolt 214 can have a hollow shaft and an aperture in its head such that the cable is secured to the anchoring bolt 214 through a ball shank 230 positioned at the end of the cable (as illustrated in FIGS. 100-103). The anchoring bolt 214 is then inserted into the aperture 228 in the anchoring bolt cap 212. As will be subsequently described, the offset nature of the aperture 228 can facilitate both the installation of the stair lift system and accommodate additional components positioned within the passage through the modular rail assembly.

Once the anchoring assembly 178 is assembled as described, the cable end with the series of ball shanks is fed through all other components of the rail system and those components are assembled. Than the tensioning assembly 176 is assembled as follows. The rail connector 182 is engaged with the last rail segment of the modular rail assembly by sliding the end of the rail segment over the recessed surface 198 of the rail connector 182. The rail connector 182 is then secured to the terminal post 180 using the bolt 196. The bolt 196 is not fully tightened, allowing for some rotational motion of the rail connector 182 relative to the terminal post 180. The tensioning end stop adaptor 184 is then slid over the opposite recessed surface 200 of the rail connector 182. It will be understood that the rail segment and tensioning end stop adaptor 184 can be secured to the rail connector 182 by a number of mechanism including a set screw, adhesives, friction fits, and the like. The tensioning rail extension 186 is then slid over the recessed surface 202 of the tensioning end stop adapter 184 and the tensioning bolt cap 188 is inserted into the free end of the tensioning rail extension 186. It will be understood that the tensioning rail extension 186 and the tensioning bolt cap 188 can be secured by a number of mechanism including a set screw, adhesives, friction fits, and the like. The tensioning nut 192 is threaded onto the tensioning bolt 190. The free end of the cable is then secured to the tensioning bolt 190 as previously described. For example, the tensioning bolt 190 can include a slot that secures a ball shank of the end of the cable. The tensioning bolt 190 is then inserted into the aperture 204 in the tensioning bolt cap 188. As previously described, the installer can use the tensioning bolt 190 and tensioning nut 192 and the anchoring bolt 214 and anchoring nut 216 to apply an appropriate force on the cable to secure and align the modular rail assembly. Once the force is applied and all components are aligned, the bolts 196, 220 for the two rail connectors 182, 208 can be fully tightened to secure all components.

Figure 98:
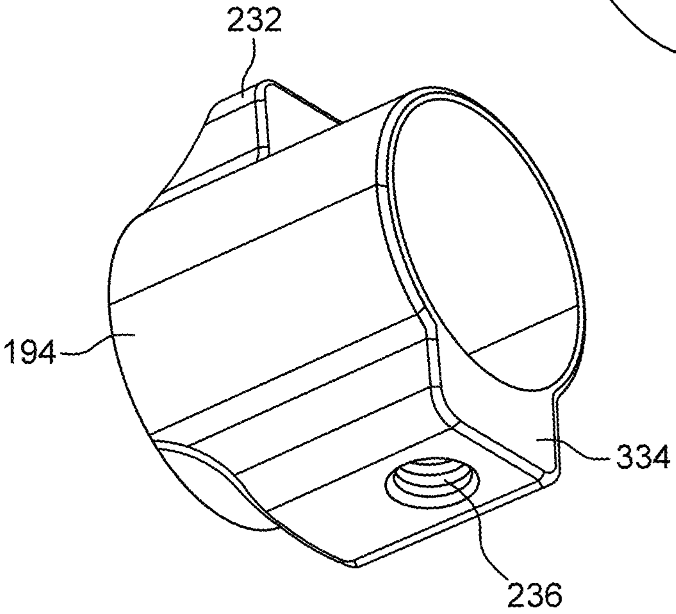
FIG. 98 schematically illustrates a perspective view of a tensioning end stop.
Figure 99:
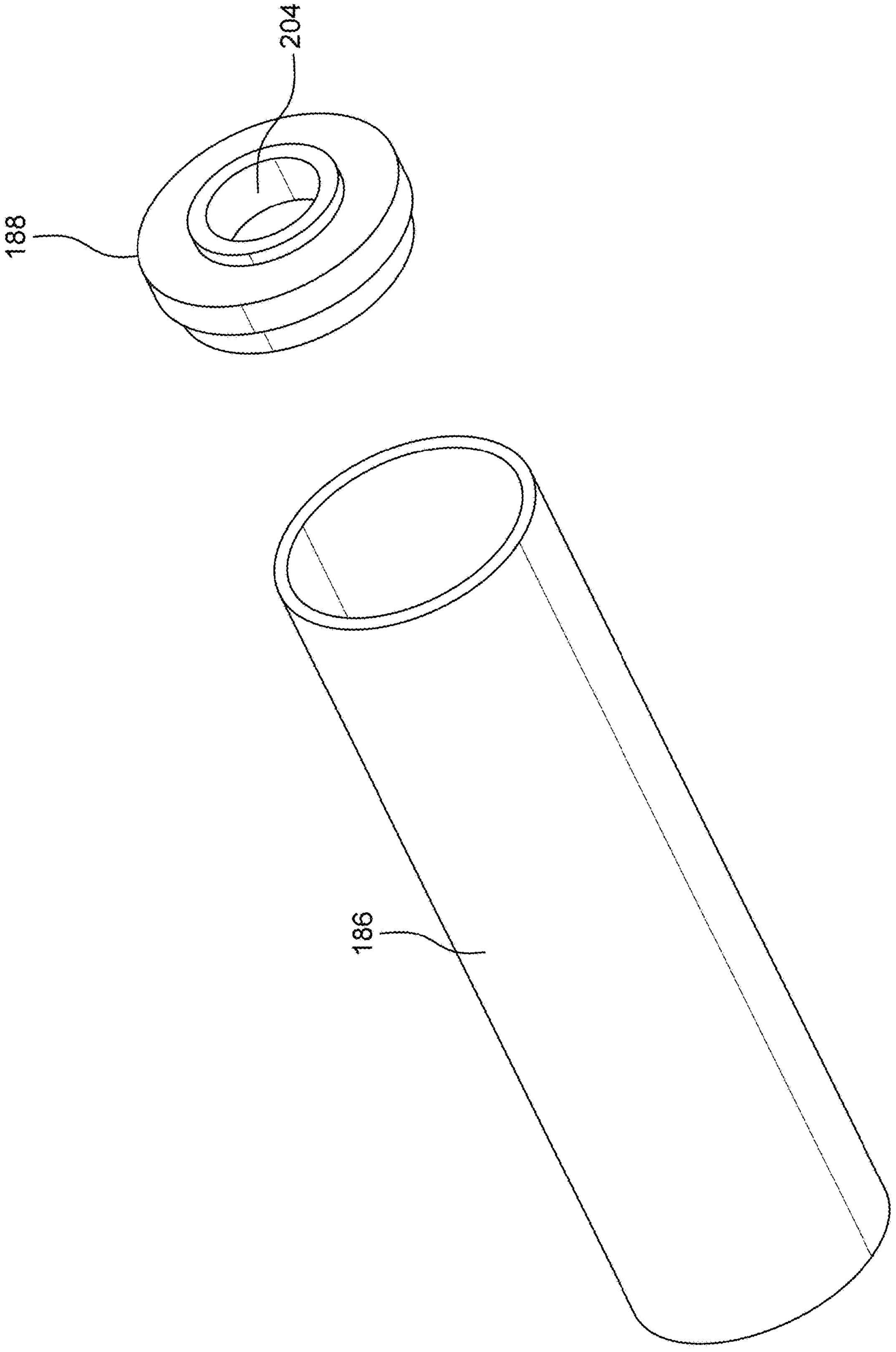
FIG. 99 schematically illustrates a perspective view of a tensioning rail extension and a tensioning bolt cap.
Figure 100:
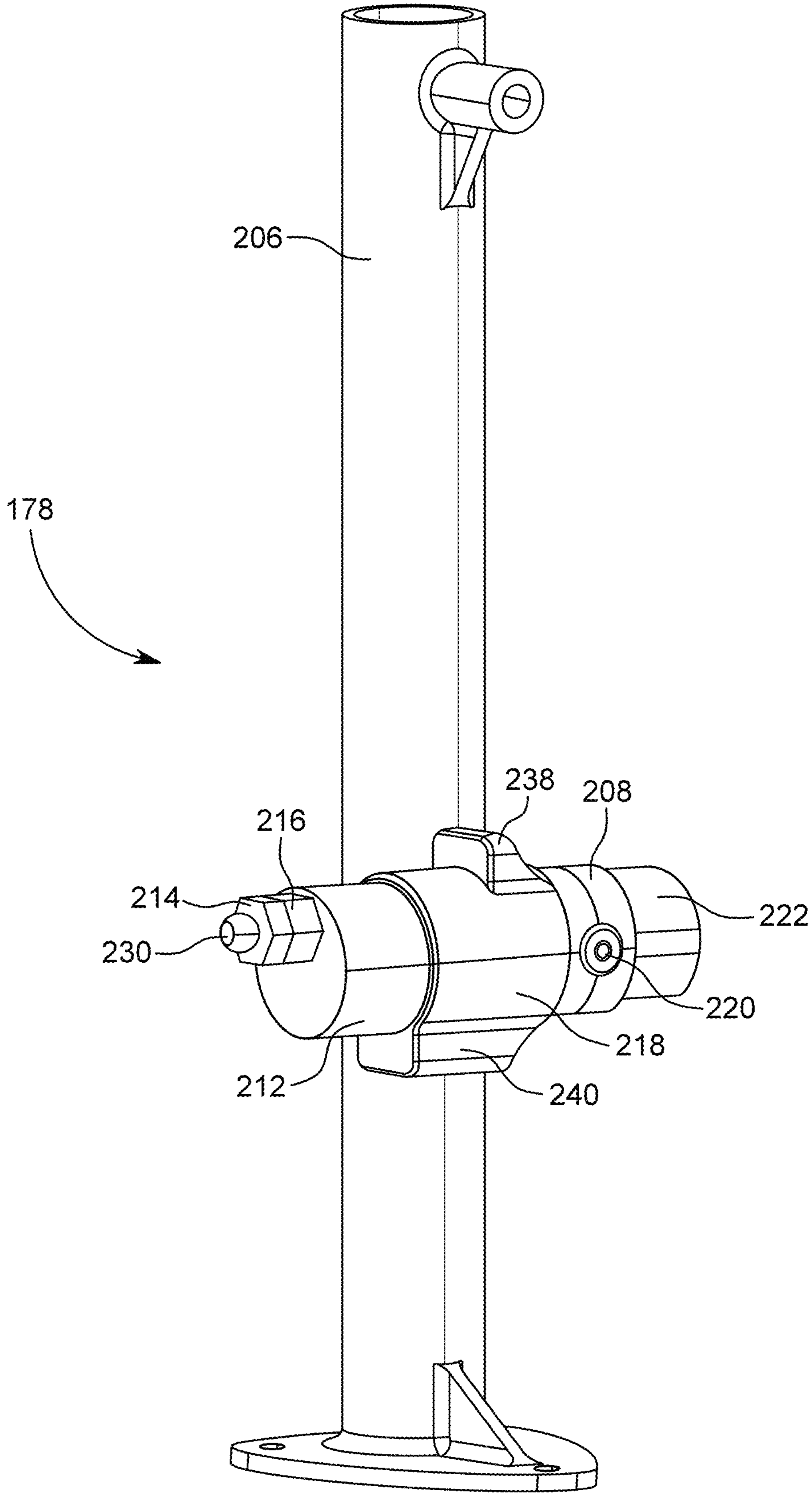
FIG. 100 schematically illustrates a perspective view of an anchoring assembly secured to a terminal post.
Figure 106:
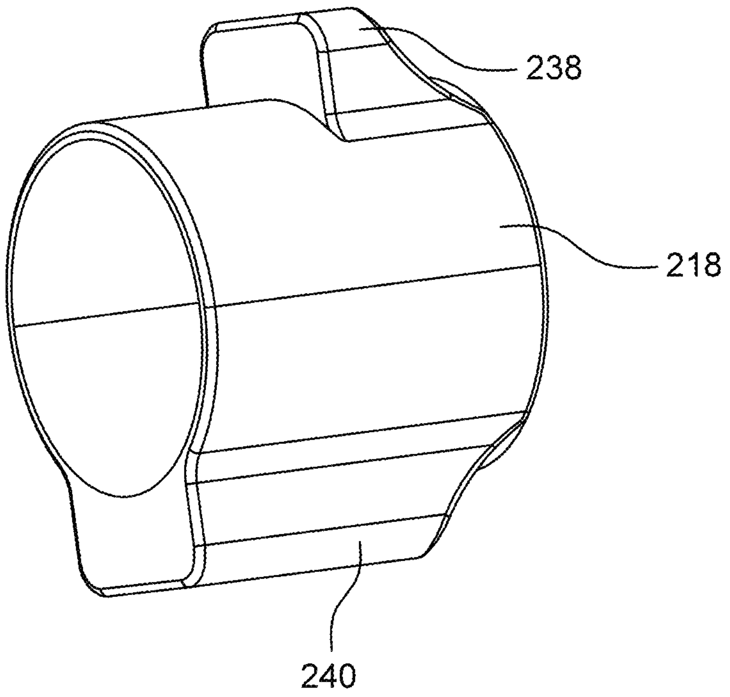
FIG. 106 schematically illustrates a perspective view of an anchoring end stop.
Figure 107:
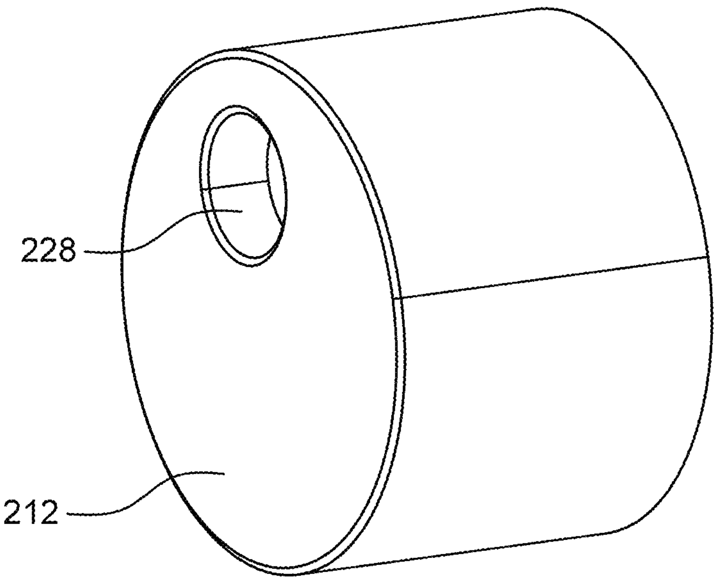
FIG. 107 schematically illustrates a perspective view of an anchoring bolt cap.
Figure 108:
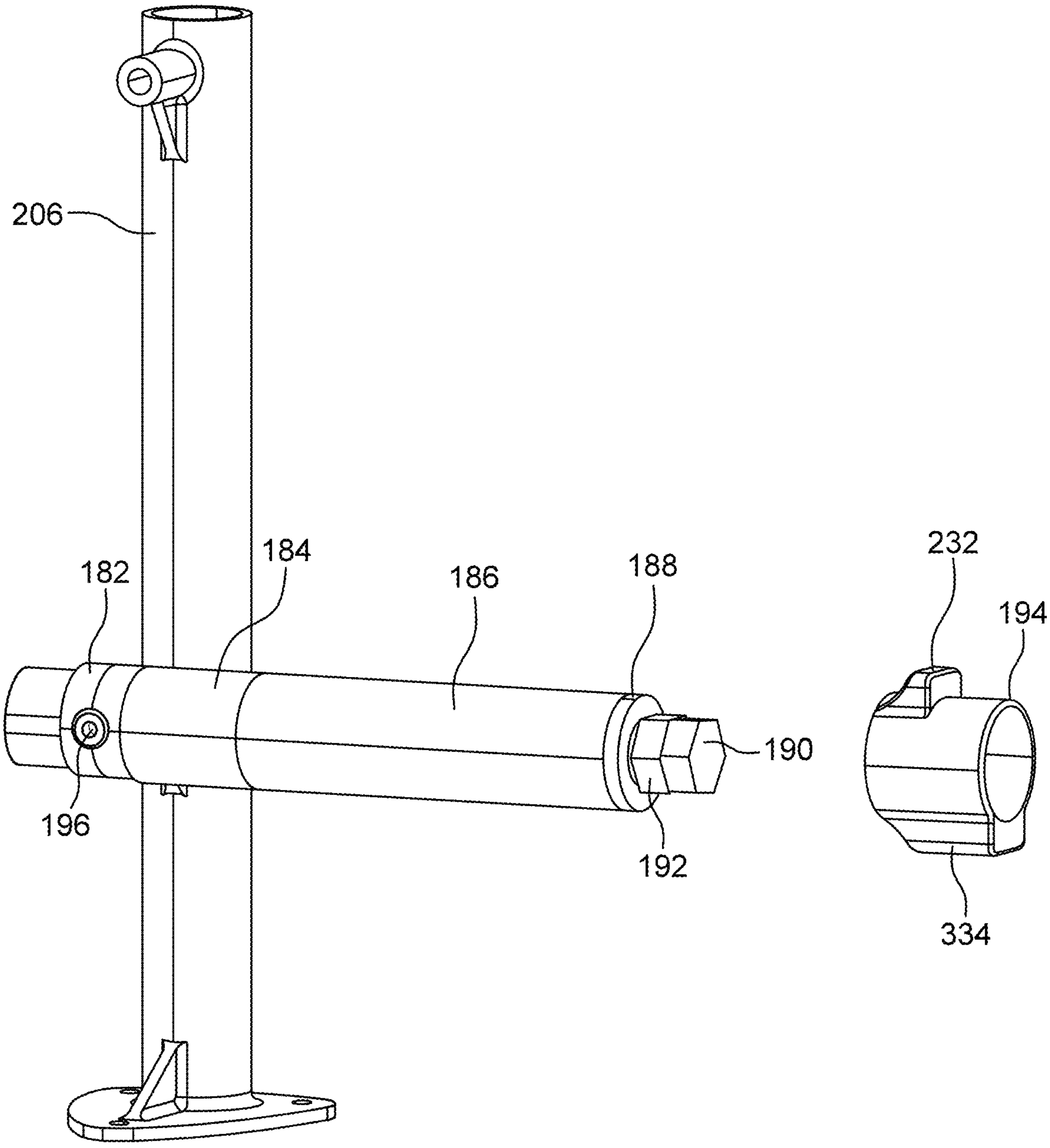
FIG. 108 schematically illustrates a perspective view of the tensioning assembly secured to a terminal post with the tensioning end cap unassembled.
Figure 109:
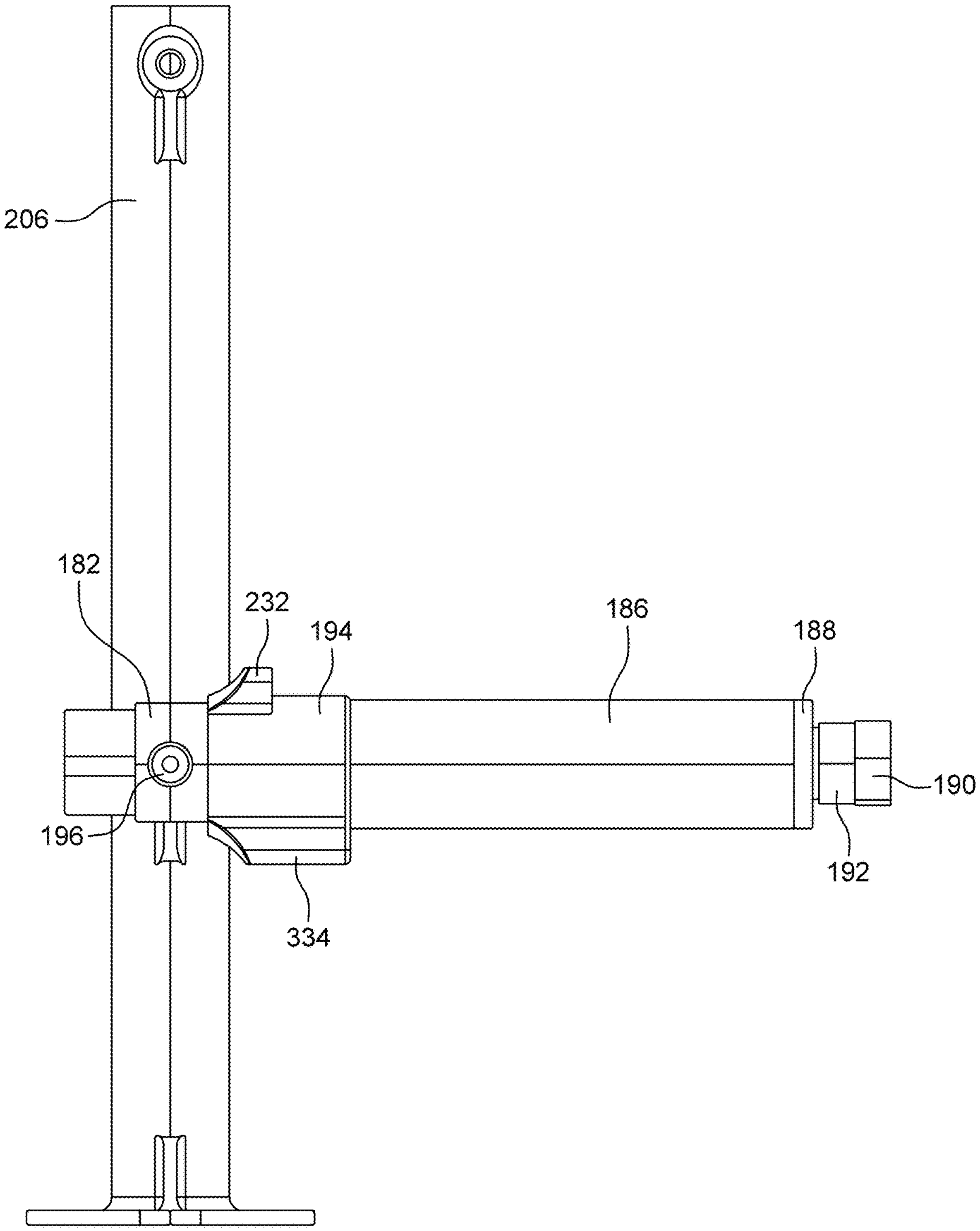
FIG. 109 schematically illustrates a side view of the tensioning assembly secured to a terminal post with the tensioning end cap assembled.
Figure 110:
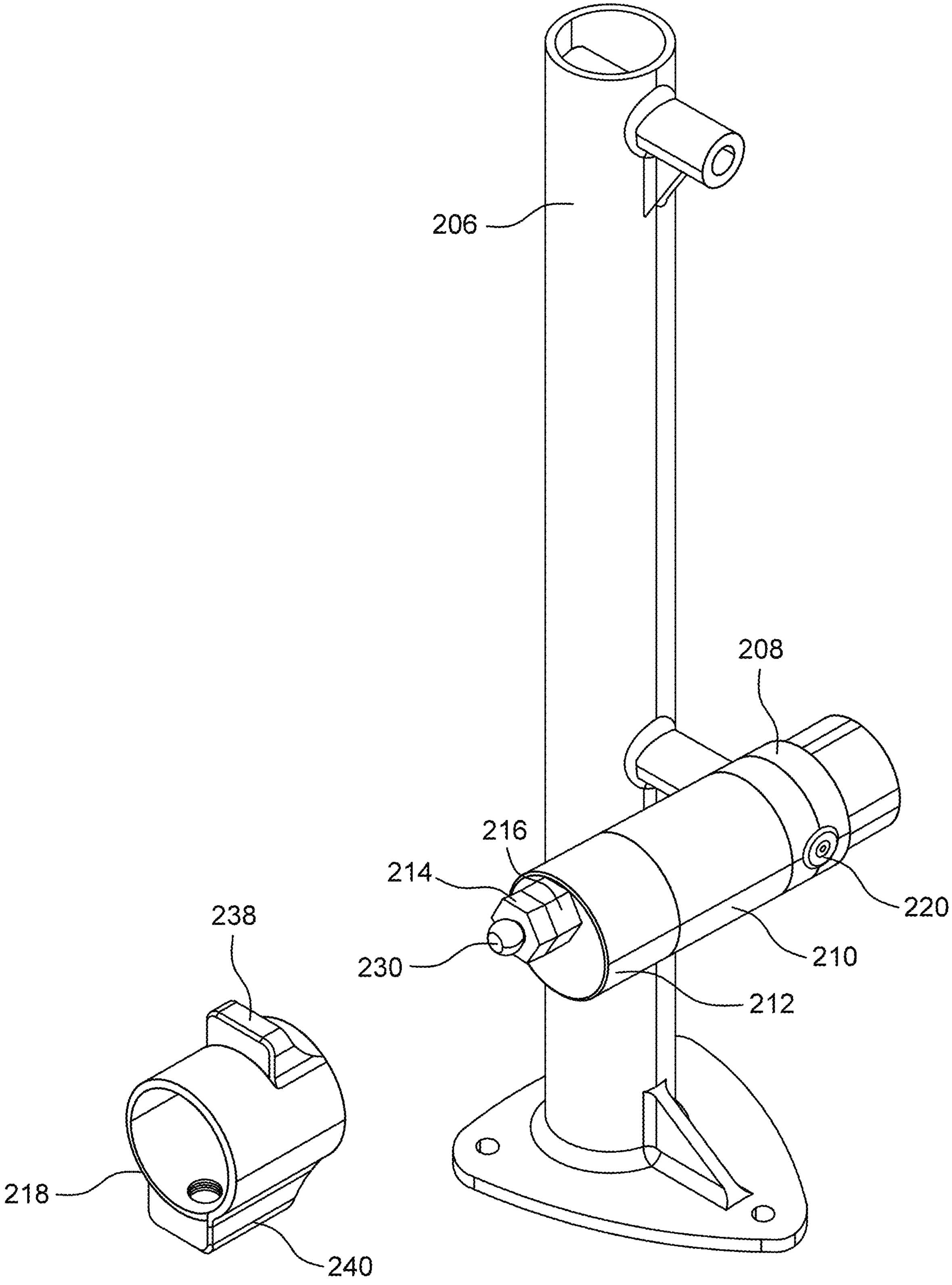
FIG. 110 schematically illustrates a perspective view of the anchoring assembly secured to a terminal post with the anchoring end cap unassembled.
Figure 111:
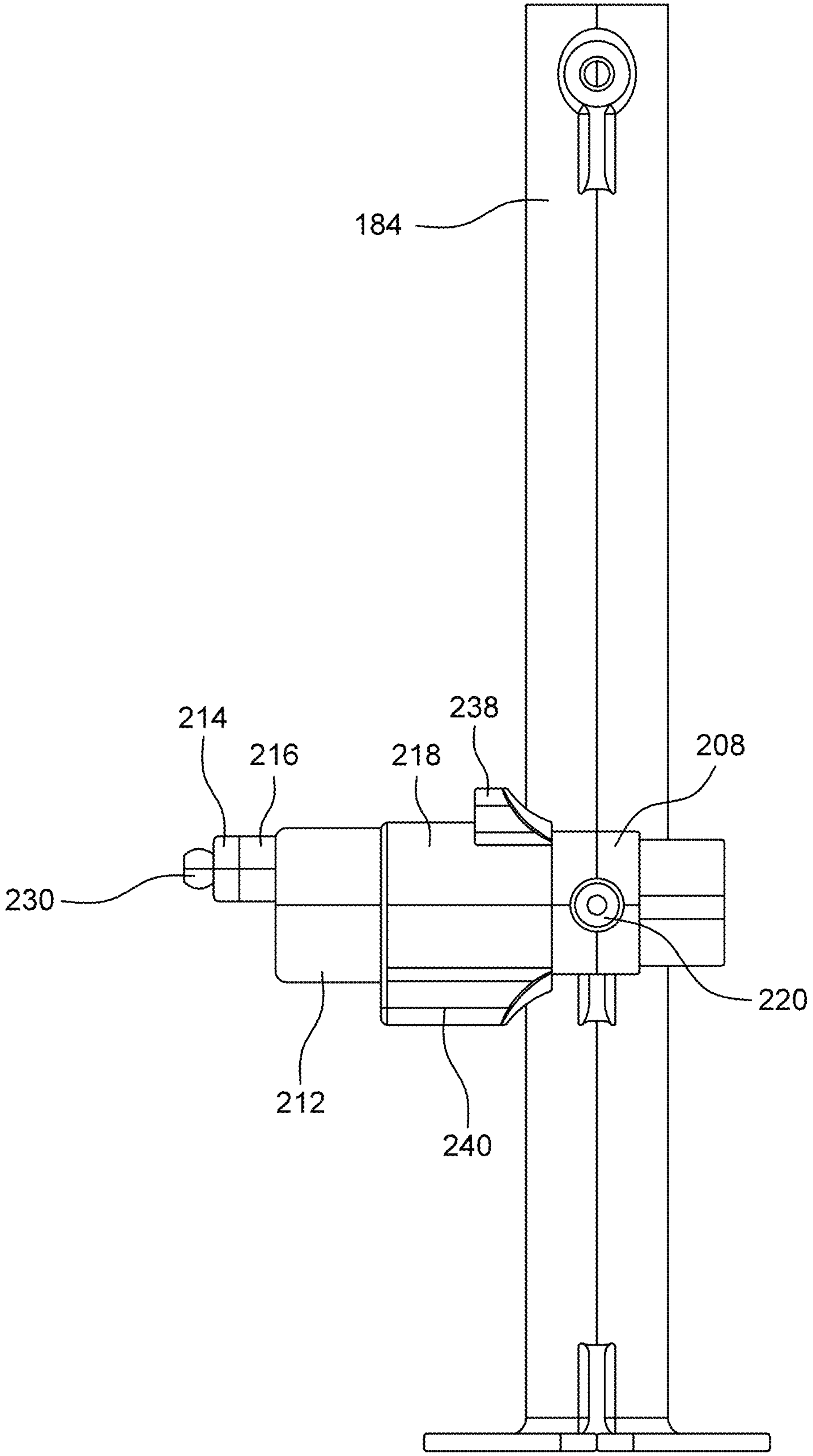
FIG. 111 schematically illustrates a side view of the anchoring assembly secured to a terminal post with the tensioning end cap assembled.

Once the anchoring assembly 178 and tensioning assembly 176 are installed as described above, the cable is properly tensioned, all fasteners are tightened, and all components are checked for proper installation. The chair assembly is then ready to be mounted on the rail system to complete the stair lift system. The chair assembly can be mounted from either the anchoring assembly 178 side or the tensioning assembly 176 side. As is illustrated in FIGS. 108 and 110, the tensioning end stop 194 and the anchoring end stop 218 are left unassembled (depending on what side the chair assembly is to be mounted) until the chair assembly is mounted on the rail system. Because the outer diameter of the anchoring assembly 178 and tensioning assembly 176 are arranged to match the outer diameter of the modular rail system, the chair assembly can be mounted onto either the anchoring assembly 178 or tensioning assembly 176 and driven over the rail connector 182, 208 onto modular rail system. Once the chair assembly is positioned on the modular rail system, the tensioning end stop 194 can be slid over the tensioning assembly 176 and/or the anchoring end stop 218 can be slid over the anchoring assembly 178 to complete the assembly. As illustrated in FIG. 98, the tensioning end stop 194 includes a first wedge extension 323, a second wedge extensions 234 and a threaded aperture 236, and as illustrated in FIG. 106, the anchoring end stop 218 includes a first wedge extensions 238, a second wedge extension 240, and a threaded aperture 242. Once the chair assembly is mounted onto the modular rail assembly, the tensioning end stop 194 is slid into position (as illustrated in FIG. 101) and secured in position with a set screw positioned in the aperture 236, and the anchoring end stop 218 is slid into position (as illustrated in FIG. 108) and secured in position with a set screw positioned in the threaded aperture 242. Once the tensioning end stop 194 and anchoring end stop 218 are positioned as illustrated in FIGS. 109 and 111, the wedge extensions 232, 234, 238, 240 are positioned to function as mechanical stops to prevent the chair assembly from moving past the tensioning end stop 194 or the anchoring end stop 218. Such an arrangement provides an additional layer of safety and security during operation of the stair lift system.

In addition to the cable passing through the passage formed through the modular rail assembly, other components can also pass through the passage. For example, wiring and power cables can be positioned within the passage through the modular rail assembly. As is described herein, there are embodiments where several sensors and charging devises are positioned along a stair lift system. Each sensor and charging device can require power and/or wiring.

Having the aperture 228 in the anchoring bolt cap 212 offset from center provides more flexibility for the installation of the rail system, particularly at the bottom of a staircase. As will be appreciated, there is limited room at the bottom of a staircase due to the rail system being positioned at a downward angle and the floor positioned just after the last step. With the offset aperture 228 being located near the top of the anchoring bolt cap 212, it provides the maximum room for using the anchoring assembly 178 to take slack out of the cable tensioning assembly 142. It will also be appreciated that prior to tensioning the cable, it is advantageous to have the anchoring bolt 214 positioned as far into the anchoring bolt cap 212 as possible, this provides the anchoring bolt 214 with the maximum unobstructed travel during the tensioning process.

The methods of assembly above describe an installation where the anchoring assembly 178 is assembled first followed by the tensioning assembly 176. However, it will be understood that in certain embodiments, the installation method can include assembling the tensioning assembly 176 first followed by assembling the anchoring assembly 178. Such decisions can be made by installers based on the arrangement of the staircase and other specific circumstances and factors of the installation location.

Figure 112:
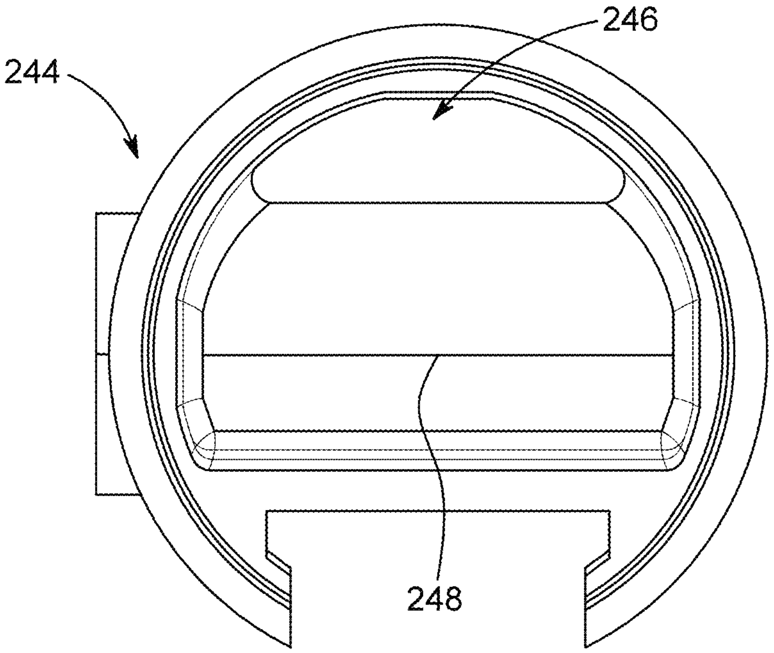
FIG. 112 schematically illustrates a front plan view of a rail connector for use with a rail system.
Figure 113:
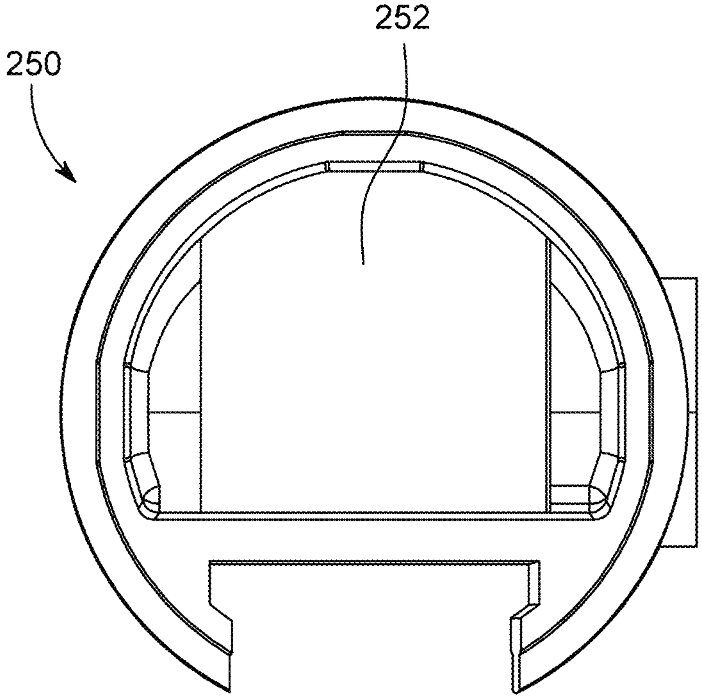
FIG. 113 schematically illustrates a front plan view of another rail connector for use with a rail system.
Figure 114:
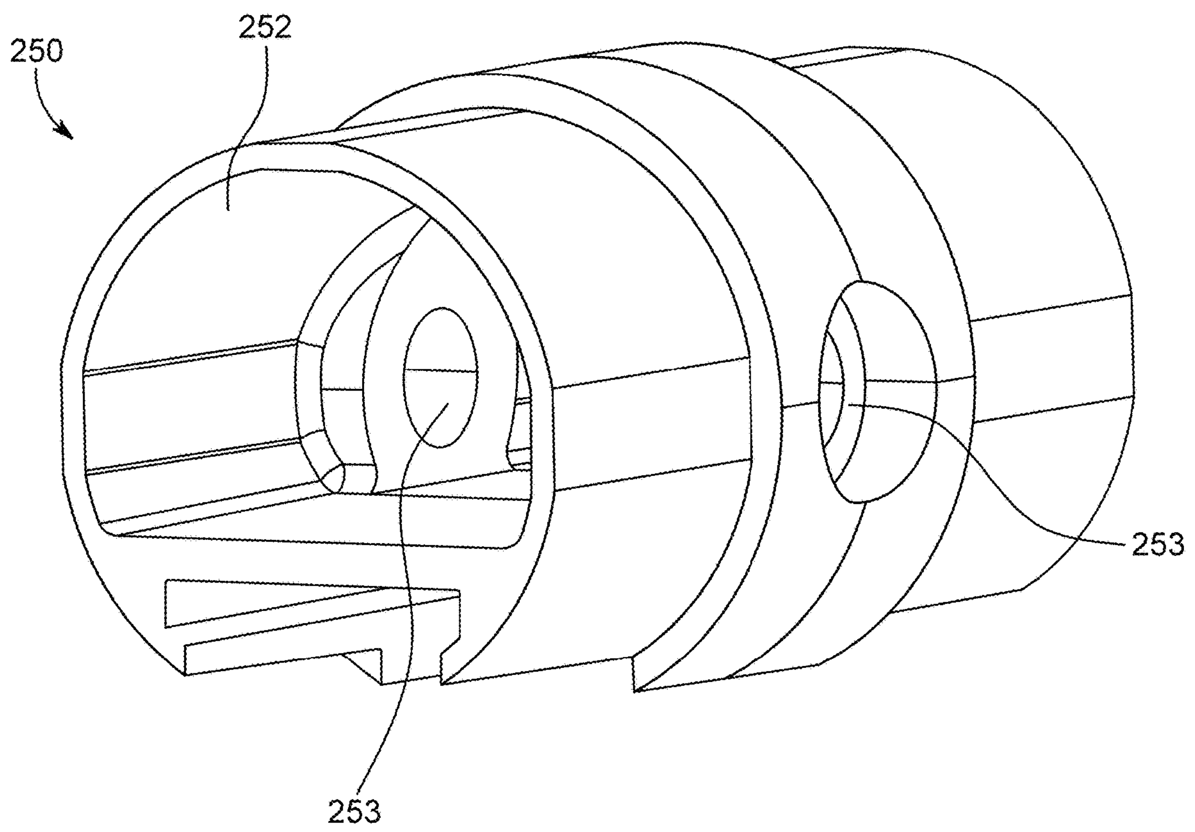
FIG. 114 schematically illustrates a perspective view of the rail connector of FIG. 113.

FIGS. 112-114 schematically illustrate two versions of rail connectors for use with rail systems. The rail connector 244 of FIG. 112 includes an upper aperture 246 and a sleeve 248 passing horizontally through the interior of the rail connector 244. The sleeve 248 serves as a guide for a bolt passing through the sleeve 248 to secure the rail connector 244 to a post. The rail connector 250 of FIGS. 113 and 114 includes a large aperture 252 and two through holes 254, 255 that can accommodate a bolt or other such fastener. The rail connector 250 can be secured to a post similar to rail connector 244 by passing a bolt horizontally through both through holes 254, 255 of the rail connector 250. Alternatively, a single fastener can be passed through the through holes 254, 255 that is positioned proximate to the post to secure the rail connector 250 to the post. In either fastening embodiment of the rail connector 250 of FIGS. 113 and 114, the aperture 252 provides significant space to accommodate a tensioning cable, power cords, wiring, and other such components that need to span a portion or all of a rail system.

Figure 115:
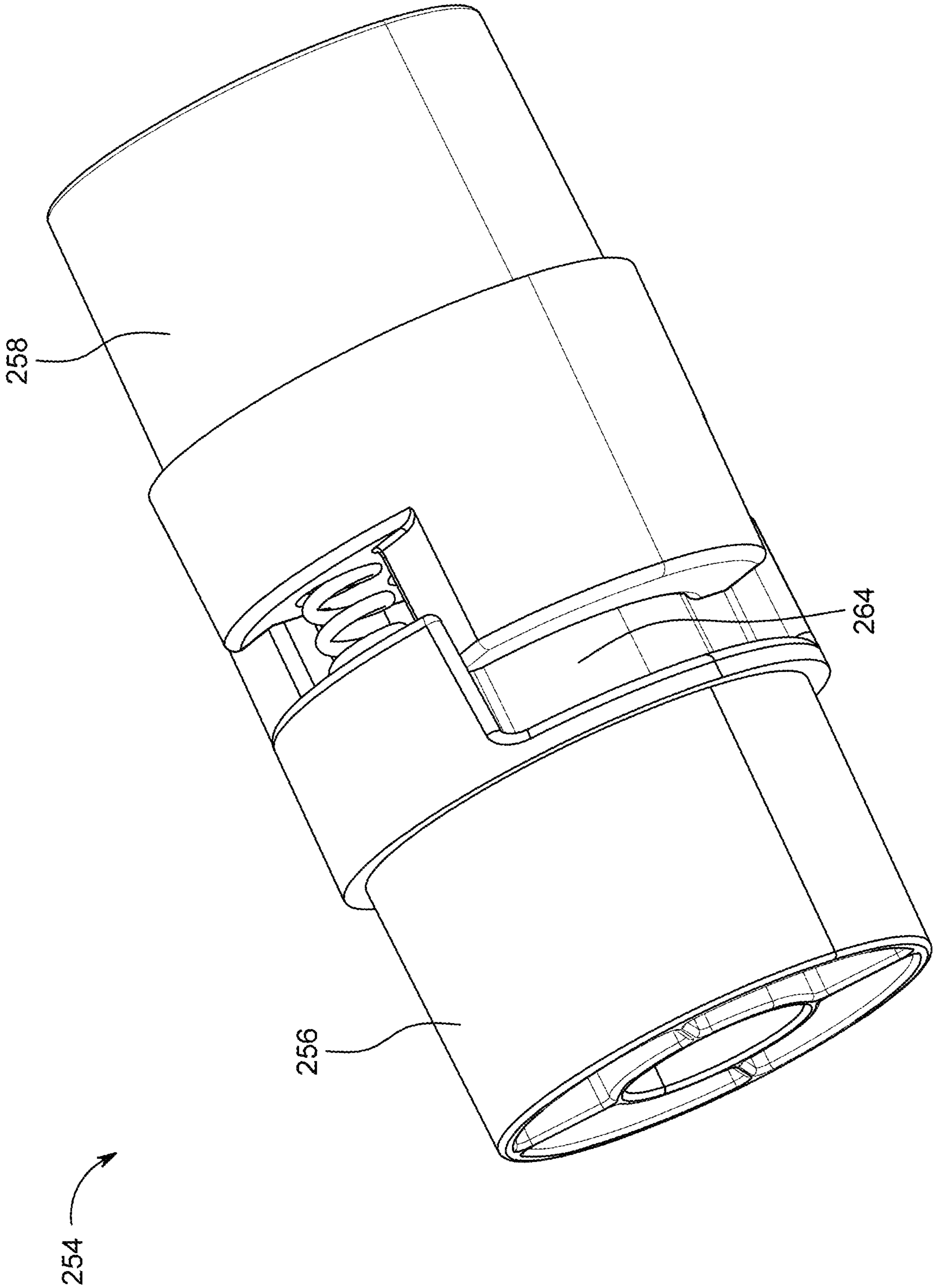
FIGS. 115-117 schematically illustrate an indicator coupler for use with a modular rail assembly.
Figure 116:
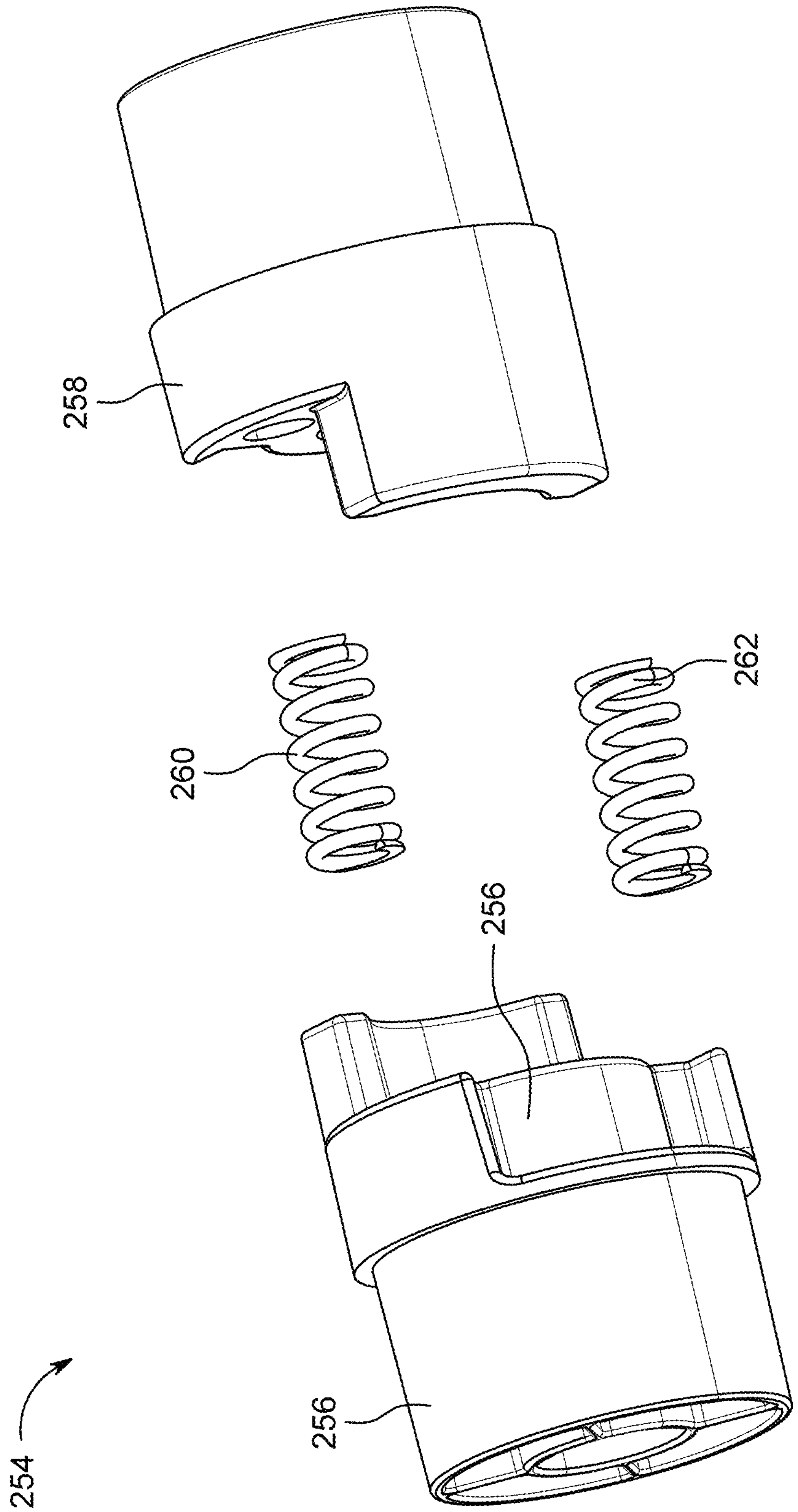
Figure 117:
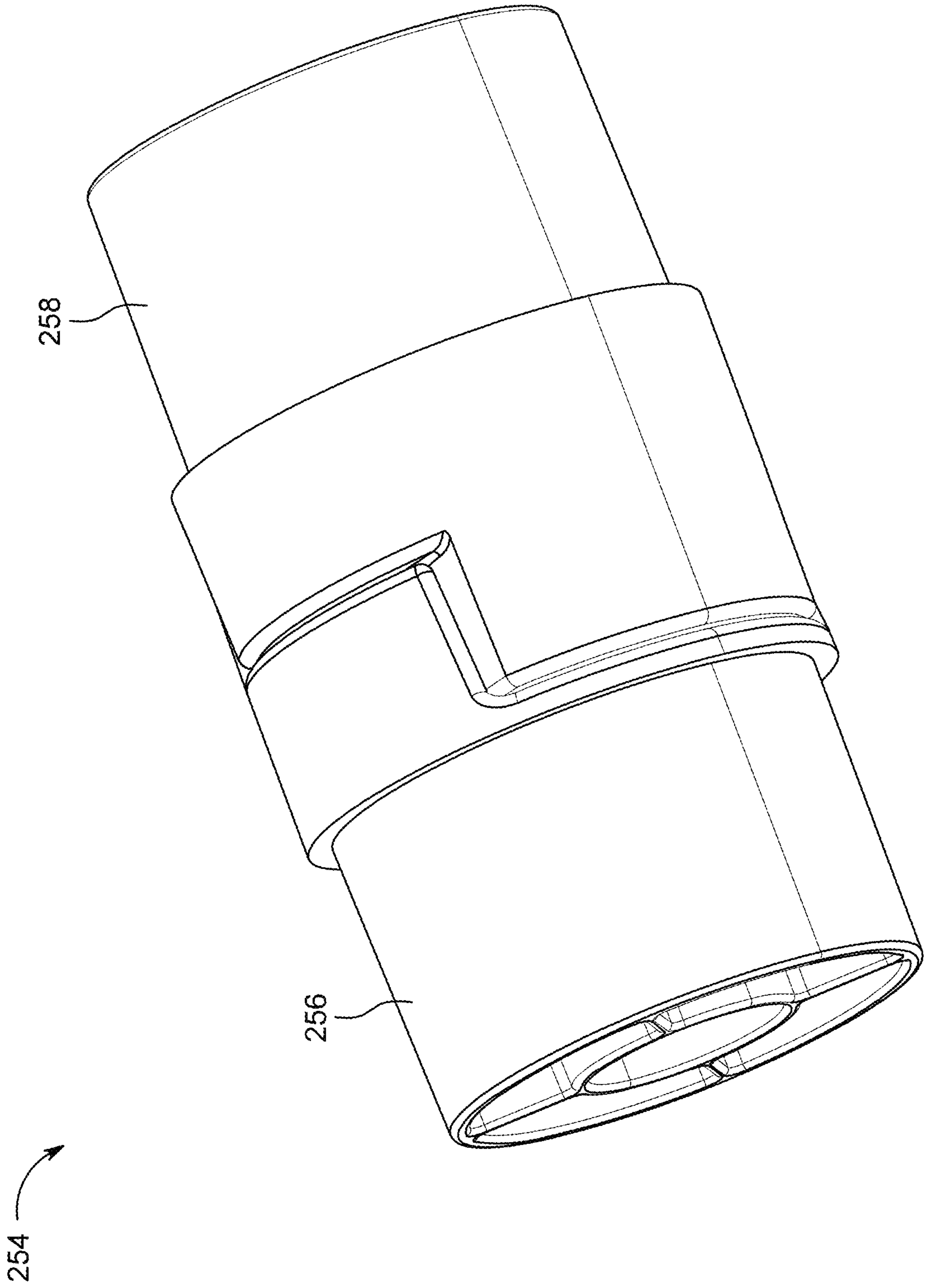

In addition to corner rail segments and straight rail segments, other components can be useful when used with the modular rail assembly. FIGS. 115-117 illustrate an indicator coupler 254 for use with modular rail assemblies. The indicator coupler 254 is designed to indicate whether a modular rail assembly is sufficiently tightened by a cable or other such device. The indicator coupler 254 includes a first section 256, a second section 258, and a pair of springs 260, 262 positioned between the first 256 and second 258 sections that apply a force that encourages the first 256 and second 258 sections to move apart. Importantly, the first section 256 includes a visual indication section 264. In one example, this visual indication section 264 is red in color so that it can be easily seen by an observer if the first 256 and second 258 sections are separated so that there is a gap between the first 256 and second 258 sections.

As illustrated in FIG. 115, the natural state of the indicator coupler 254 is that the first 256 and second 258 sections are separated by the springs 260, 262 such that the visual indication section 264 is visible to an observer. The indictor coupler 264 can be included between two components of a modular rail assembly. For example, the indictor coupler 264 can be positioned between a straight rail segment and a connector of a modular post assembly. In such an arrangement, the springs 260, 262 can be arranged such that the force applied by the springs 260, 262 is overcome only when the modular rail assembly is sufficiently secured as an assembly. For example, as noted above, a cable can be passed through the components of the modular rail assembly, and the cable can be placed under tension to draw all the components together. Such a tension force will apply a compression force on the indictor coupler 254 such that the force of the springs 260, 262 is overcome, and the gap between the first 256 and second 258 sections is closed. Once the gap is closed, the visual indicator section 254 is hidden from an observer. Such an arrangement is illustrated in FIG. 117. It will be understood that the indicator coupler 254, and specifically the springs 260, 262 are arranged so that when the proper tension force is applied to the cable, the gap of in the indicator coupler 254 will close. The installer can monitor the indicator coupler 254 as tension is applied to the cable and once the gap is closed and the visual indicator section 264 is no longer visible, the installer is informed that the modular rail assembly is now sufficiently tightened and thus secure and stable.

Another component that can be used with the modular rail assembly is a trigger control component. Such a component can be inserted between two other components of the modular rails assembly at a specified position to facilitate a change in the behavior of the stair lift system. In one example, the installer may want to slow the chair down as it traverses a ninety or 180 degree turn. The installer can insert a trigger control component just before the beginning of the turn. The trigger control component can be arranged so that a button or other similar device is depressed as the chair passes the trigger control component. When such a button is depressed, a signal is sent to a system controller that slows the speed of the chair. Another useful component can be a charging component. A chair may include a rechargeable battery to power the chair. At both the bottom and the top of the staircase (where the chair often is positioned for long periods of time), the modular rail assembly can include a charging component that engages with the chair when at rest to charge the onboard battery.

Figure 118:
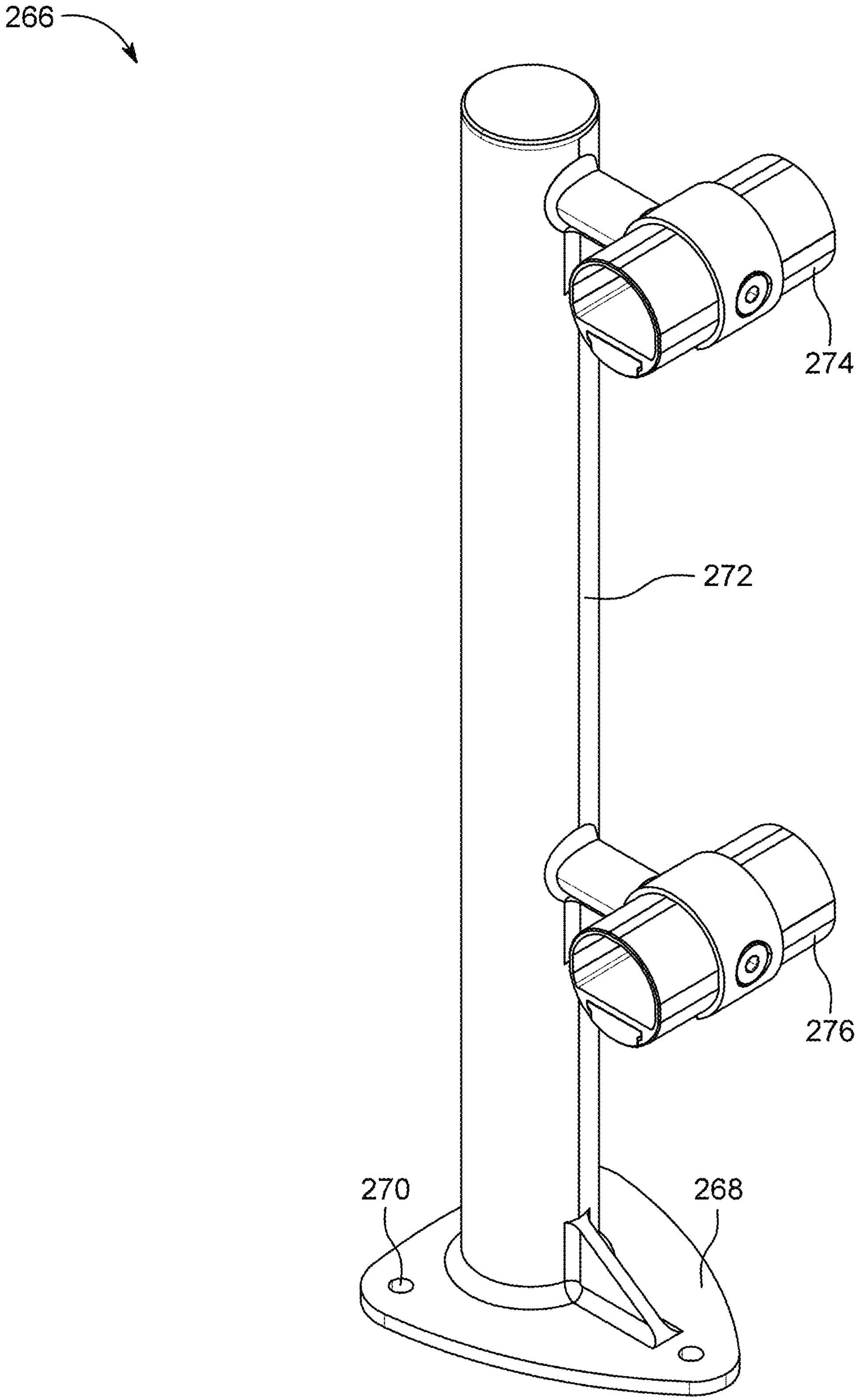
FIGS. 118-119 schematically illustrate a modular post component for use with a modular rail assembly.
Figure 119:
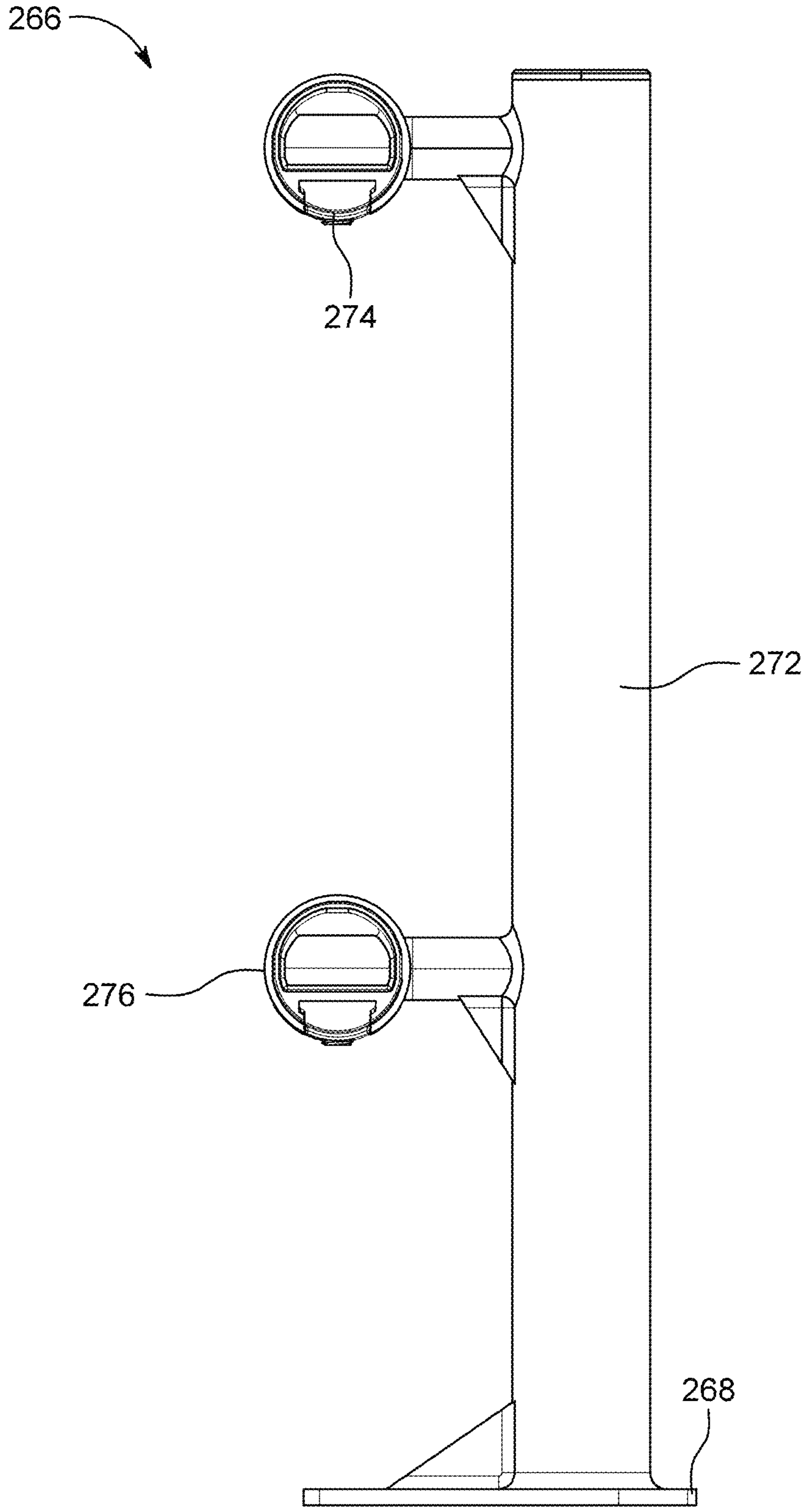

FIGS. 118-119 illustrates an embodiment of a modular post component 266 arranged to be secured to the treads of the staircase, or a floor at the top, bottom, or landing of the staircase. In one embodiment, the post component 266 of FIGS. 118-119 are used as termination posts. That is to say that such post components 266 are positioned at the bottom and top of the staircase. The post component 266 is further arranged to secure the modular rail assembly. The post component 266 includes a base 268 with three apertures 270 passing through the base 268, a cylindrical post 272 extending upwards from the base 268, an upper connector 274, and a lower connector 276. The upper 274 and lower 276 connectors are attached to the cylindrical post 272 such that the upper 274 and lower 276 connectors can swivel or otherwise rotate relative to the cylindrical post 272. The modular post component 266 can be secured to the floor proximate to the staircase by passing fasteners, such as screws, through the apertures 270. In one specific embodiment, lubricated lag screws are used to secure the modular post component 266 to the floor proximate to the staircase. Such a lubricated lag screw can make it easier to penetrate the tread, but also can resist any splitting of wood whether in the tread or in a substrate of floor. The base 268 is designed such that its edge opposite the upper connector 274 and lower connector 276 can butt up against the wall, trim, or edge of the stair tread where the post is to be installed. This is critical in minimizing the overall space that the fully installed stair lift system occupies in the staircase. It is also important to note that the position of the apertures 270 are designed such that in the exemplary case where the base 268 is at the extreme position of where it can be installed, the location of the final lag screw through the aperture 270 is far enough away from the edge of the stair tread that there is minimal chance of splitting the wood or degrading the holding strength of the screw once in the stair tread substrate.

Figure 120:
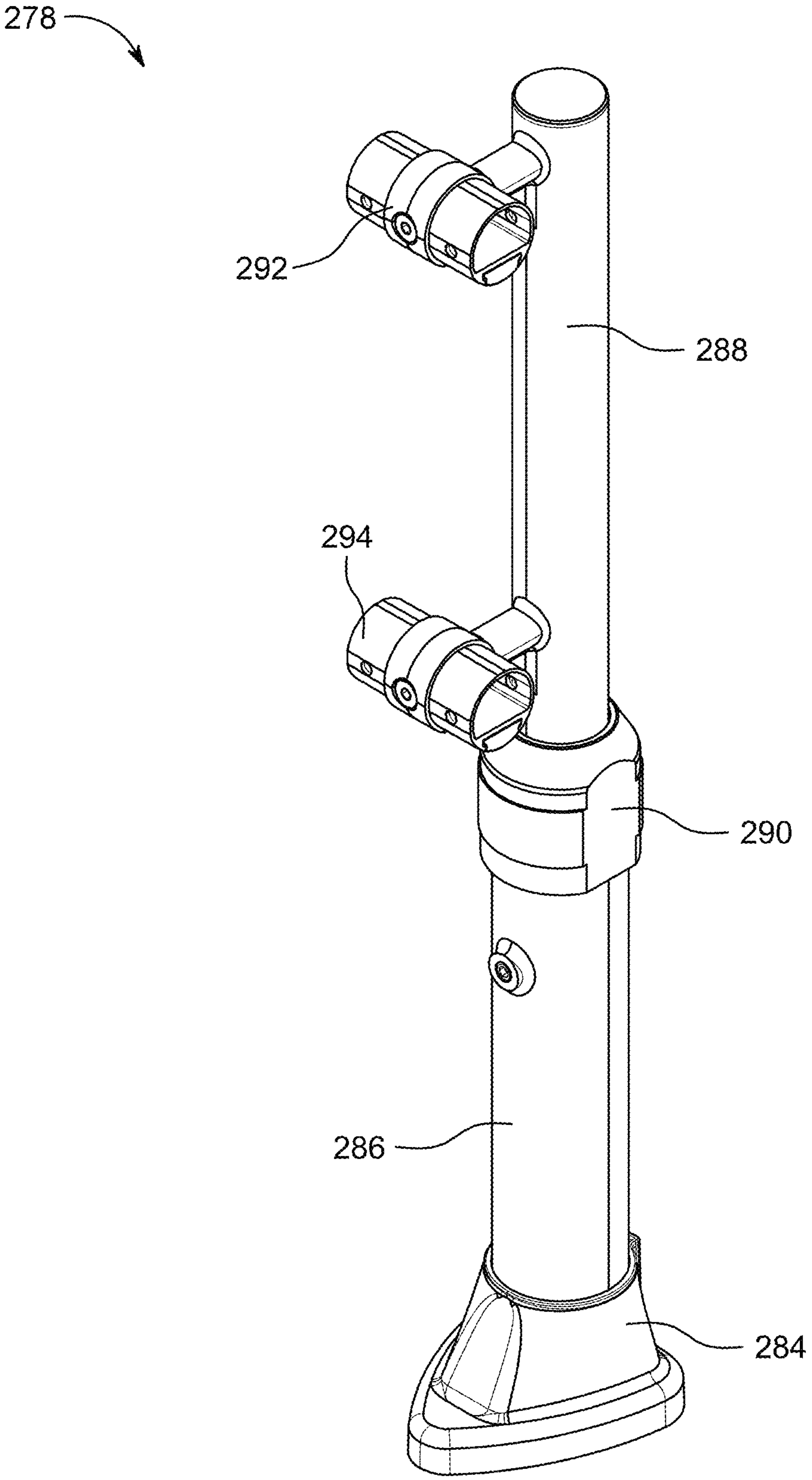
FIGS. 120-122 schematically illustrate an adjustable modular post for use with a modular rail assembly.
Figure 121:
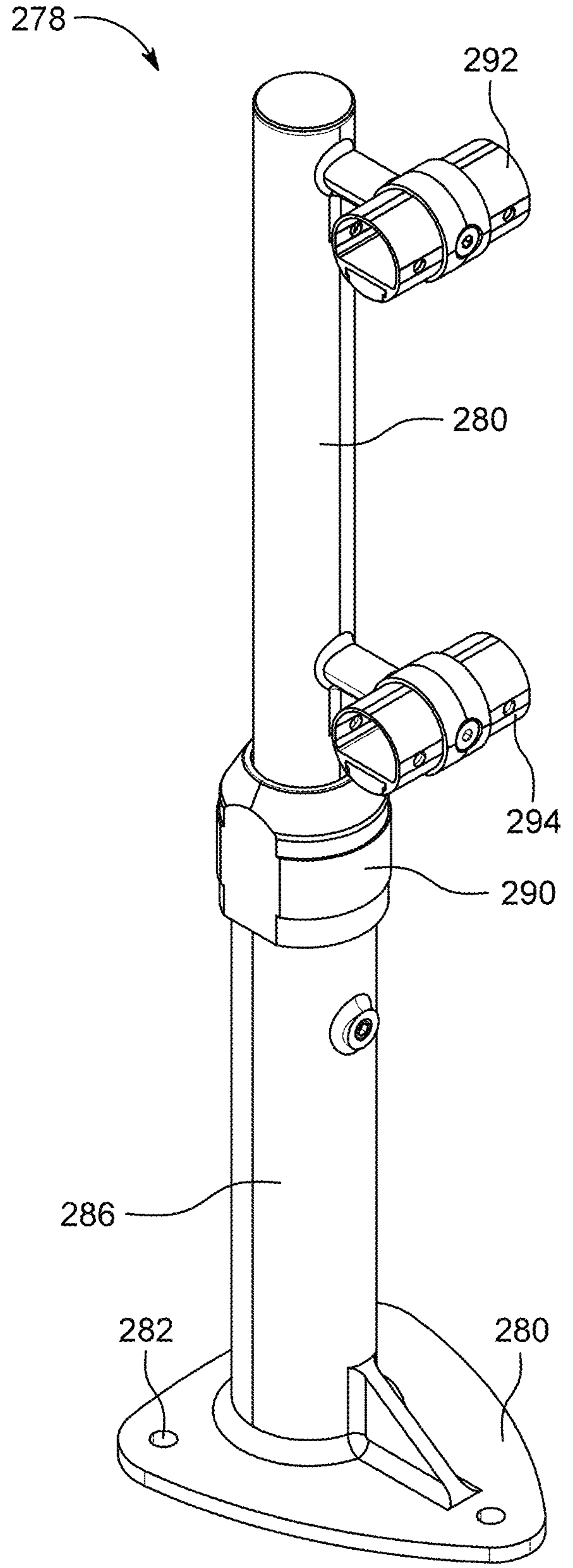
Figure 122:
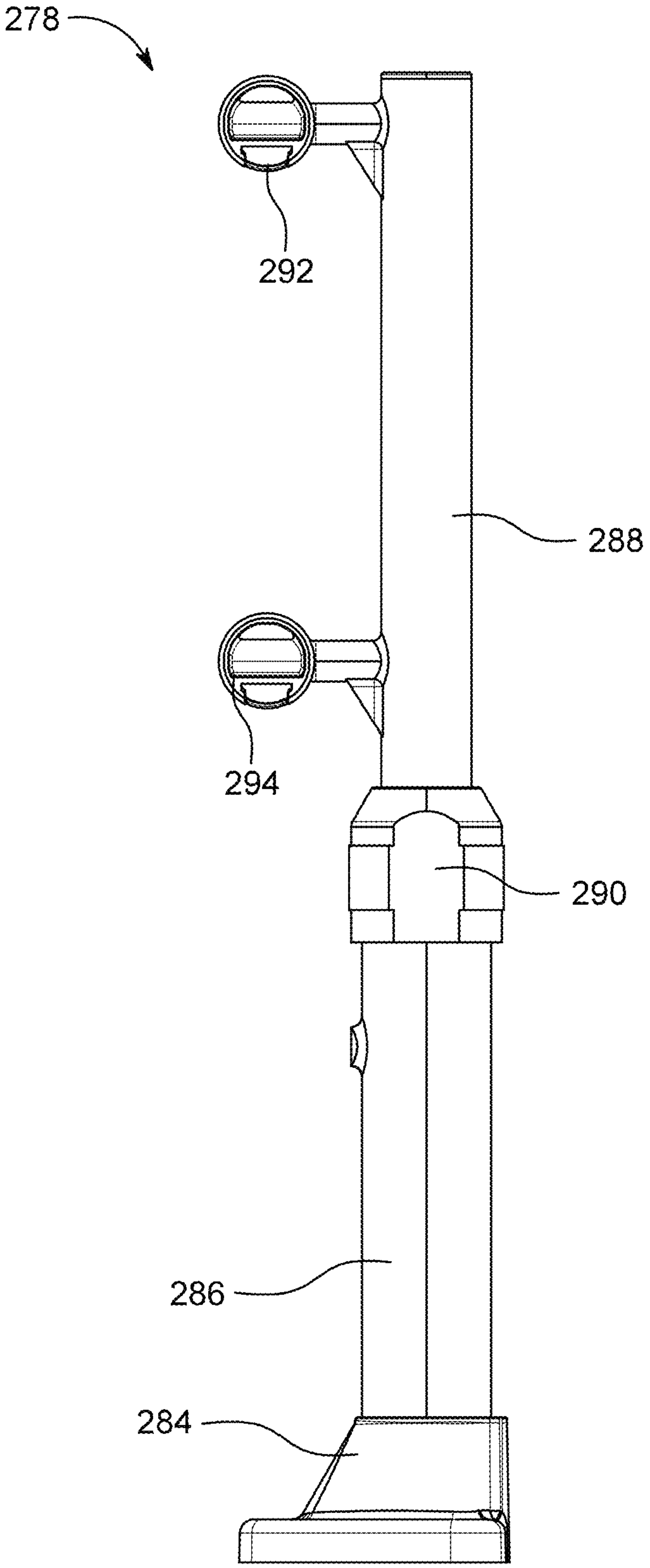

FIGS. 120-122 illustrates an embodiment of an adjustable post 278 arranged to be secured to the treads of the staircase, or a floor at the top, bottom, or landing of the staircase. In one embodiment, the adjustable posts 278 of FIGS. 120-122 are used as intermediate posts. That is to say that such adjustable posts 278 are positioned on the treads of the staircase between the terminal posts. The adjustable post 278 is further arranged to secure the modular rail assembly. The adjustable post 278 includes a base 280 with three apertures 282 passing through the base 280, a base cover 284, a first cylindrical post 286 extending upwards from the base 280, a second cylindrical post 288 positioned telescopically within the first post 286, a collar 290 arranged to secure the second cylindrical post 288 relative to the first cylindrical post 286, an upper connector 292, and a lower connector 294. The upper 292 and lower 294 connectors are attached to the second cylindrical post 288 such that the upper 292 and lower 294 connectors can swivel or otherwise rotate relative to the second cylindrical post 288. The base cover 284 is designed such that it can be lifted up and then rotated both horizontally and vertically during installation of the lag screws. This is important because in order to get a standard power drill and drive socket into the space required to drive the lag screw, the cover needs to be rotated horizontally and out of the way. Second, the vertical rotation of the base cover 284 allows it to hold itself in place against the first cylindrical post 286 using the forces of friction and gravity. This allows the installer of the post to have both hands free when driving the lag screws through the apertures 282 and into the stair tread. The adjustable post 278 can be secured to a tread of a staircase by passing fasteners, such as screws, through the apertures 282. As with an earlier description, lubricated lag screws are used to secure the adjustable post 278 to a tread of the staircase. Such a lubricated lag screw can make it easier to penetrate the tread, but also can resist any splitting of wood whether in the tread or in a substrate of floor. It will be understood that the height of the adjustable post 278, and specifically the height of the upper 282 and lower 284 connectors, can be adjusted by an installer to accommodate the specific circumstances of a pre-existing staircase. The installer can loosen the collar 290, which provides for the second cylindrical post 288 to move relative to the first cylindrical post 286. The installer can then move the second cylindrical post 288 to a desired position, and the installer can tighten the collar 290 to fix the position of the second cylindrical post 288 relative to the first cylindrical post 286.

As in earlier base 268 descriptions, the base 280 is designed such that its edge opposite the upper connector 292 and lower connector 294 can butt up against the wall, trim, or edge of the stair tread where the post is to be installed. This is critical in minimizing the overall space that the fully installed stair lift system occupies in the staircase. It is also important to note that the position of the apertures 282 are designed such that in the exemplary case where the base 280 is at the extreme position of where it can be installed, the location of the final lag screw through the aperture 282 is far enough away from the edge of the stair tread that there is minimal chance of splitting the wood or degrading the holding strength of the screw once in the stair tread substrate.

Figure 123:
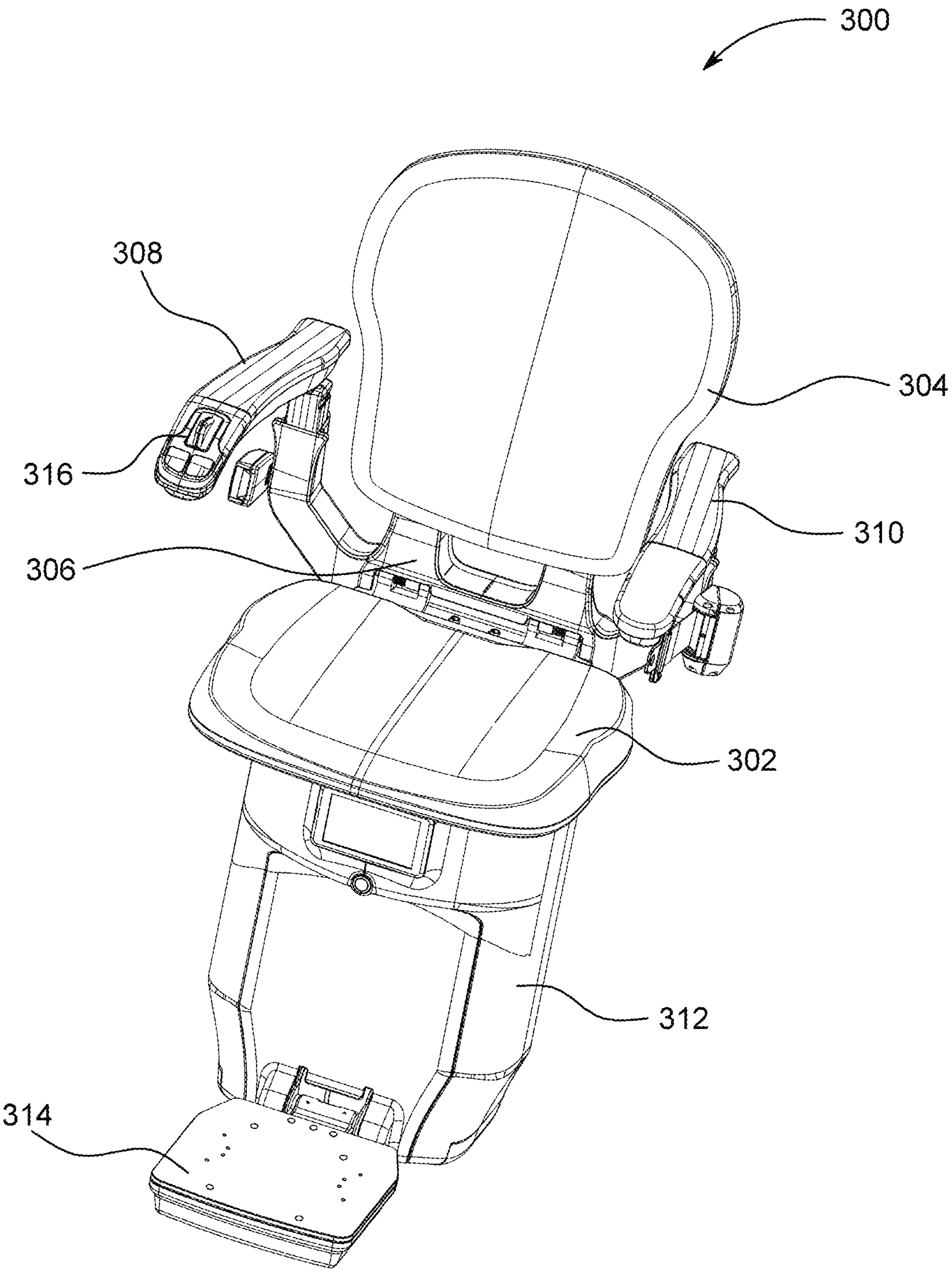
FIGS. 123-125 schematically illustrate a chair for use with a stair lift system.
Figure 124:
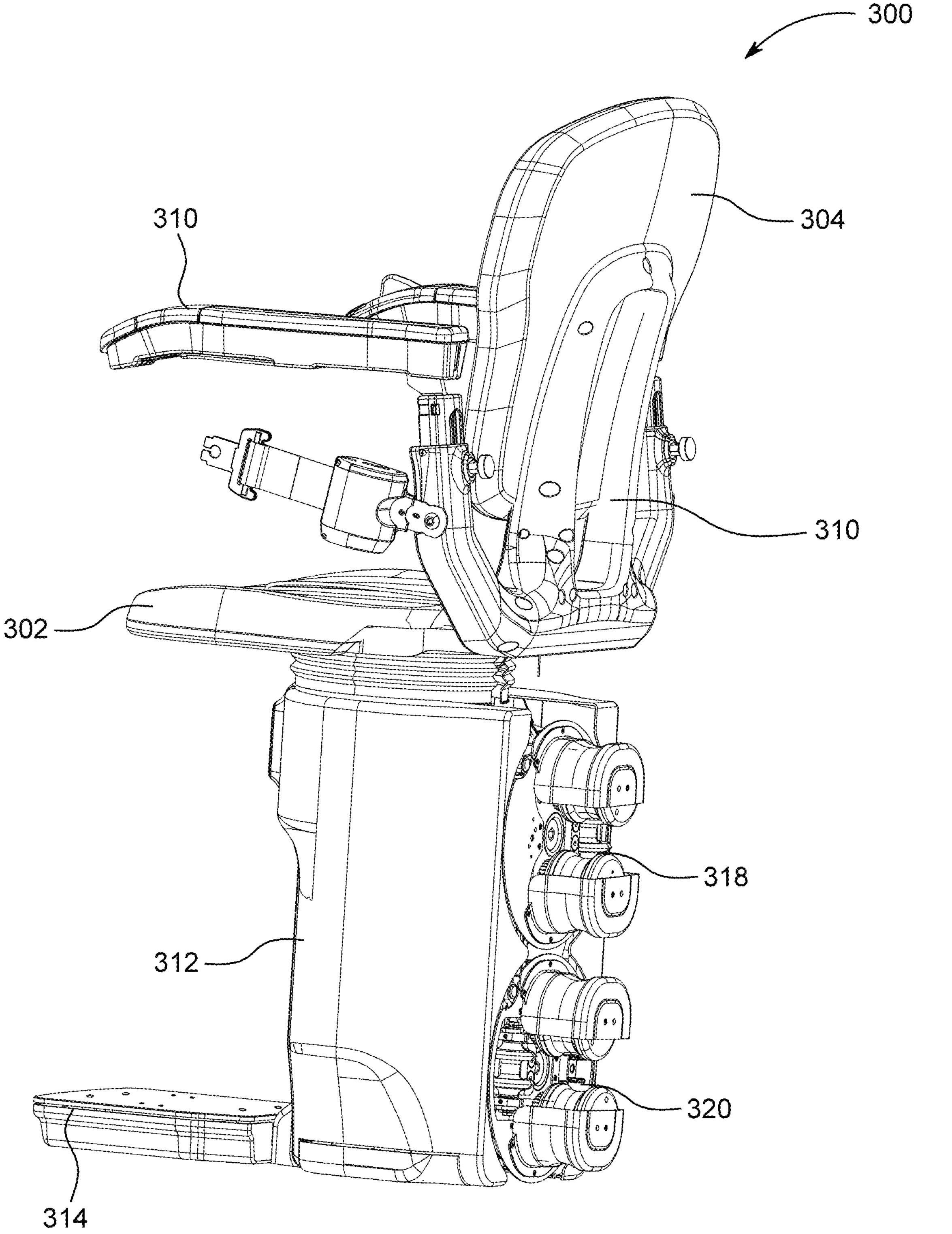
Figure 125:
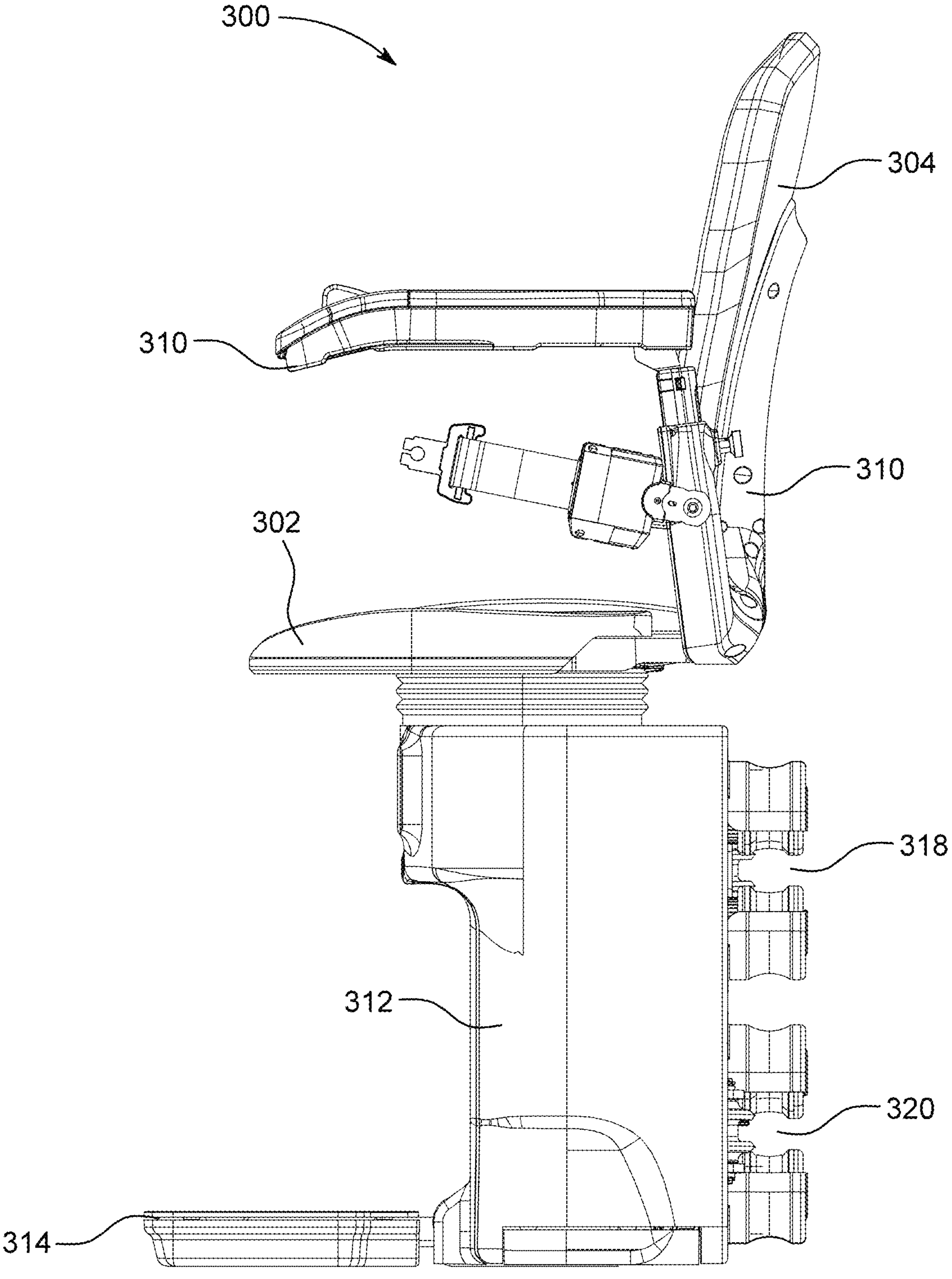

FIGS. 123-125 illustrate a chair 300 for use with the stair lift system. As is illustrated, the chair 300 includes a fairly limited profile such that it can navigate a tight or cramped staircase without difficulty. The chair 300 includes a seat 302, a chair back 304 with a gap 306 between the seat 302 and chair back 304, a pair of armrests 308, 310, a pedestal 312, and a footrest assembly 314. The chair 300 is designed to include several ergonomic features. For example, the armrests 308, 310 are adjustable in height to the user's preference. Additionally, the armrests 308, 310 slope downward at the leading edge to better conform to the nature position of a user's hands. For users with a high body mass, the gap 306 between the seat 302 and the chair back 304 may result in a more comfortable and accommodating seating area that results in safer use conditions. The seating cushions and armrest cushions are comfortable and supportive. An electrical controller 316 with a number of buttons and features is located at the end of one of the armrests 308. One specific functional button is a reset button that can reboot the stair lift system when necessary. The positioning of this electrical controller 316 provides the user with a convenient method of controlling the stair lift system. The electrical controller 316 is modular and can be quickly and easily changed by an installer or homeowner from the right armrest to the left armrest or vice versa to accommodate user preference or physical limitations of the homeowner. A rechargeable battery and additional controls are located in the pedestal 312. Specifically, the face of the pedestal 312 includes a touchscreen that allows for precise programing of the stair lift system. The chair 300 is configured to give voice commands to the user in the event of an error of condition the user should know about. In one embodiment, a voice command can alert the user of a low battery level by stating: "running low on battery, move to charging station." In another embodiment, a voice command can alert the user of an obstruction by stating: "left obstruction sensor activated, remove obstruction to continue." These examples are but a few examples that illustrate the concept and do not include all possible voice commands available to the stair lift system. The stair lift system can include any number of voice commands that can be issued the user. The ability to give voice commands to the user will be unique to the market and is important to consumers for both safety reasons and for users to gain an understanding on how to optimally operate their stair lift system.

The chair 300 includes a pair of upper rollers 318 and a pair of lower rollers 320. The upper rollers 318 engage with the upper rail subassembly and the lower rollers 320 engage with the lower rail subassembly. The upper 318 and lower 320 rollers are arranged such that the chair remains level even when climbing up or down the staircase. This is facilitated by controls that propel the upper rollers 318 and lower rollers 320 at different speeds depending on the specific circumstances so that either the upper rollers 318 or lower rollers 320 move more quickly along the rail assembly than the other pair of rollers. With such controls, the chair can be maintained level as the chair transverses from the top to the bottom of the staircase and vice versa.

The chair 300 includes one or more gas springs that are used to adjust height of the chair 300 to the user's preference. The chair 300 is arranged so that the seat 302 swivels both to the right and left, which provides the user with an easy method for mounting and dismounting the chair 300. The swivel of the chair is powered and can be activated at the push of a button. Once in a safe ingress or egress position, the chair locks itself into place so the user can safely enter or exit the stair lift system. Upon resuming the use of the lift, the stair lift will unlock and then swivel back to a safe riding position.

The packaging of the chair 300 can be arranged such that once the chair 300 is unpacked, the packaging itself can serve as a support that positioned the chair 300 at a vertical location such that the installer can slide the chair onto the modular rail assembly. It will be understood that such an arrangement can make assembling the stair lift system significantly easier on the installer, limit unintended damage to the chair 300 and other components, and facilitate a quicker installation process.

Figure 126:
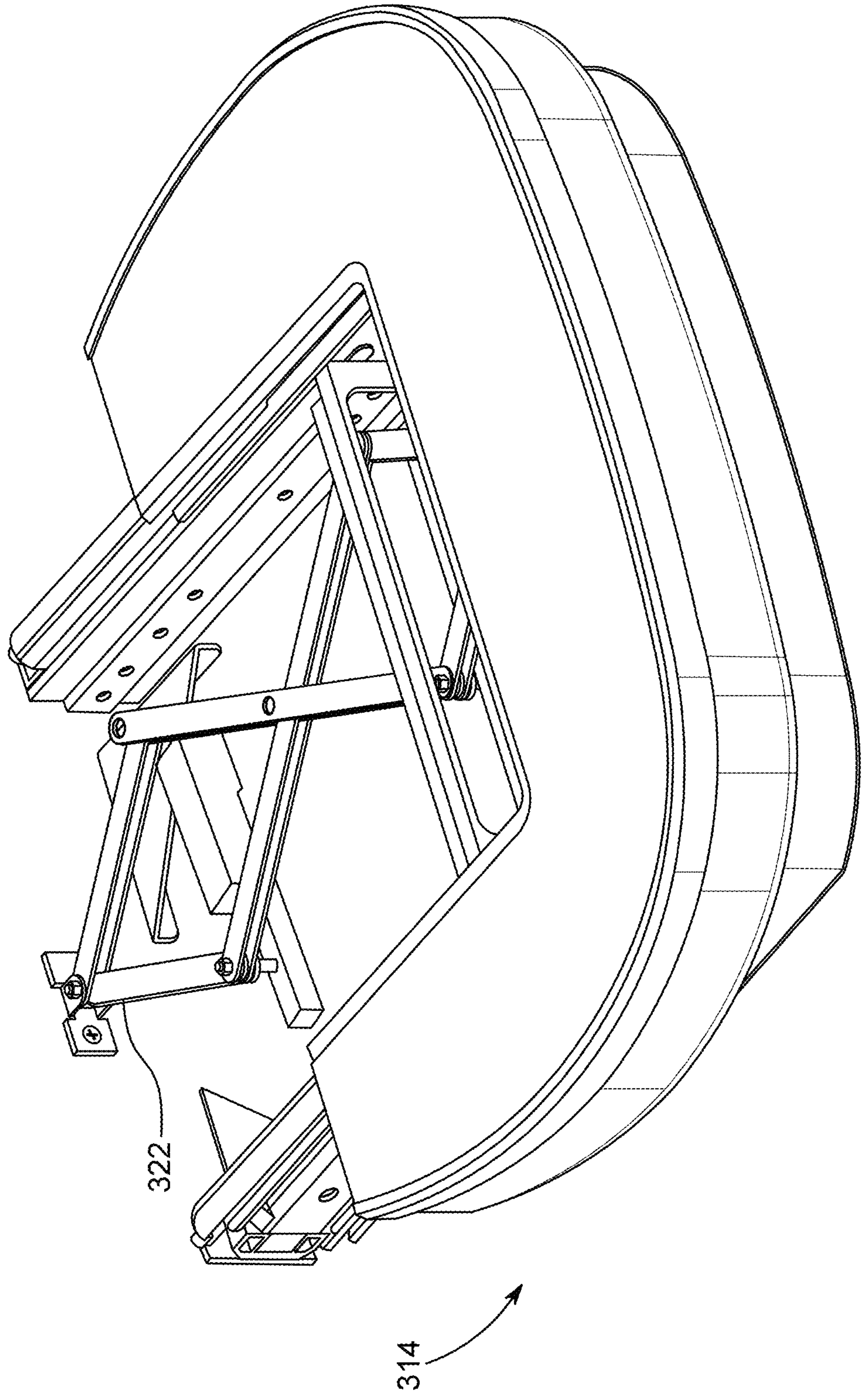
FIG. 126 schematically illustrates a footrest subassembly.

FIG. 126 schematically illustrates the footrest assembly 314. The footrest assembly can be extended and retracted to accommodate the user's preference. In one embodiment, the extension and retraction can be accomplished by an automated scissor mechanism 322. Such extension and retraction occurs linearly in a horizontal plane. The scissor mechanism 322 can be comprised of a number of rigid members secured together with fasteners that allow for such rigid members to pivot about each other. When the pivot points are brought closer together, the footrest assembly 314 extends away from the body of the chair, Conversely, when the pivot points are moved away from each other, the footrest assembly 314 retracts toward the chair. In most prior art chairs, the footrest folds down to be deployed and then folds up when retracted. The inherent issue with such an arraignment is that the user's feet and legs are in the way of such folding action. Thus, if a user sits down on the chair with the footrest in the folded up position, it is difficult or impossible to deploy the footrest from the folded up position to the folded down position because the user's legs are in the way. This same issue occurs when the footrest is in the deployed or folded down position and the user is seated on the chair but wants to fold the footrest up. As will be appreciated, the design illustrated FIG. 126 with the scissor mechanism 322 extending and retracting the footrest assembly 314 avoids the issues of prior art footrests.

Figure 127:
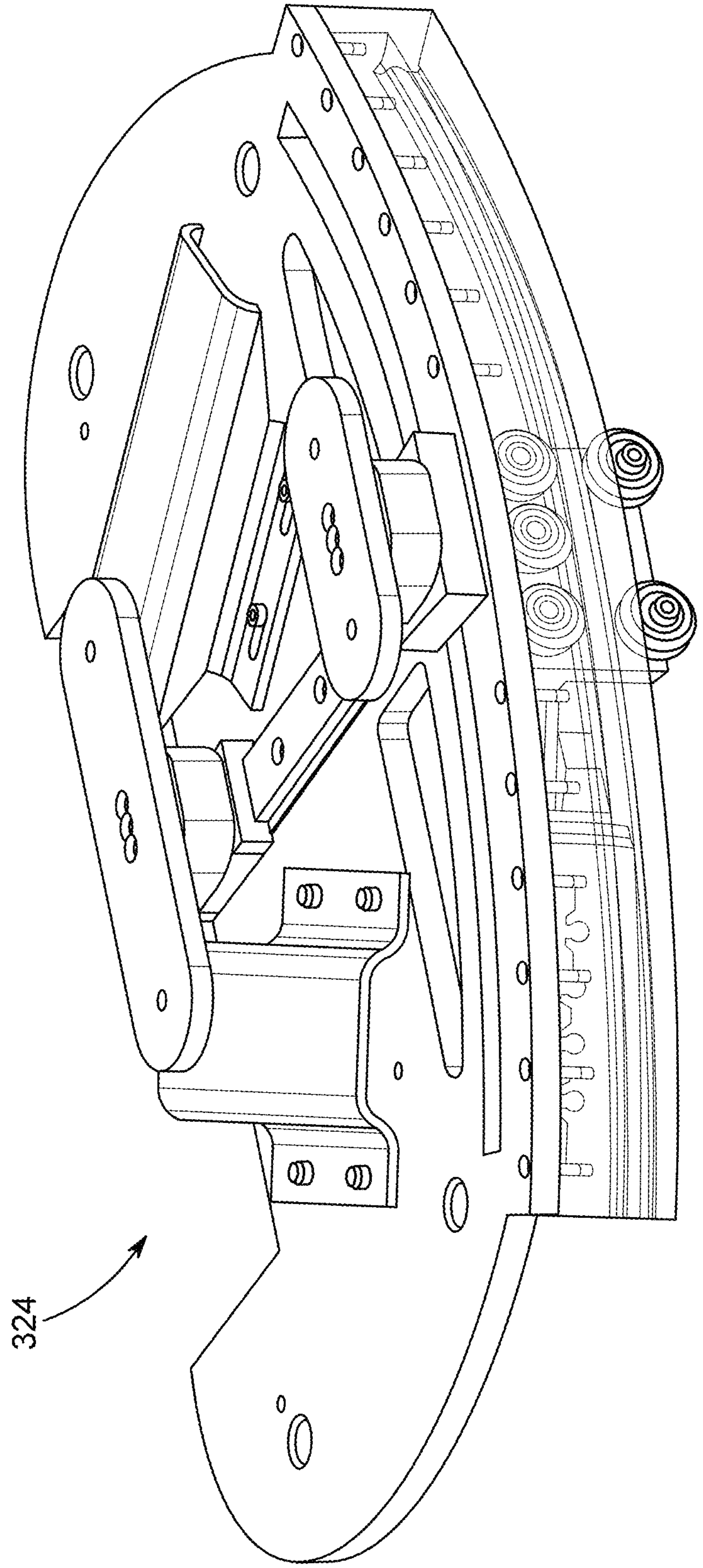
FIG. 127 schematically illustrates a swivel set subassembly.

FIG. 127 schematically illustrates a portion of a seat assembly 324 for use with the stair lift system. The seat assembly 324 provides for the seat to swivel both to the right and left without the seat engaging with the rail or the wall of the staircase positioned behind the chair. In one embodiment, the seat assembly 324 can be swiveled both to right and left by a dual track and cart mechanism. In this example, as the seat assembly 324 swivels either to the right or left, the seat assembly 324 slides forward and away from the rails or wall behind the chair. This provides for the seat assembly 324 to change the position of the pivot point of the seat to move it forward to avoids contact between the seat and the rail or wall. Such swiveling left and right allows the user to be seated on the chair safely and comfortably. When the seat needs to be rotated back to its safe riding position, with the user facing forward, the rear slide moves along a linear line toward the back of the chair while the front slide moves along the curved rail track until the front cart is positioned at the center of the curved track. This set of motions moves the user backwards and centers the user facing forward on top of the body.

In another embodiment, the swivel mechanism is a set of tracks machined into a plate and a set of roller ball assemblies. The motion and mechanics are the same as described above with regard to moving the user forward while swiveling right or left, and them moving the user backwards while returning the swiveled seat to the neutral position.

Figure 128:
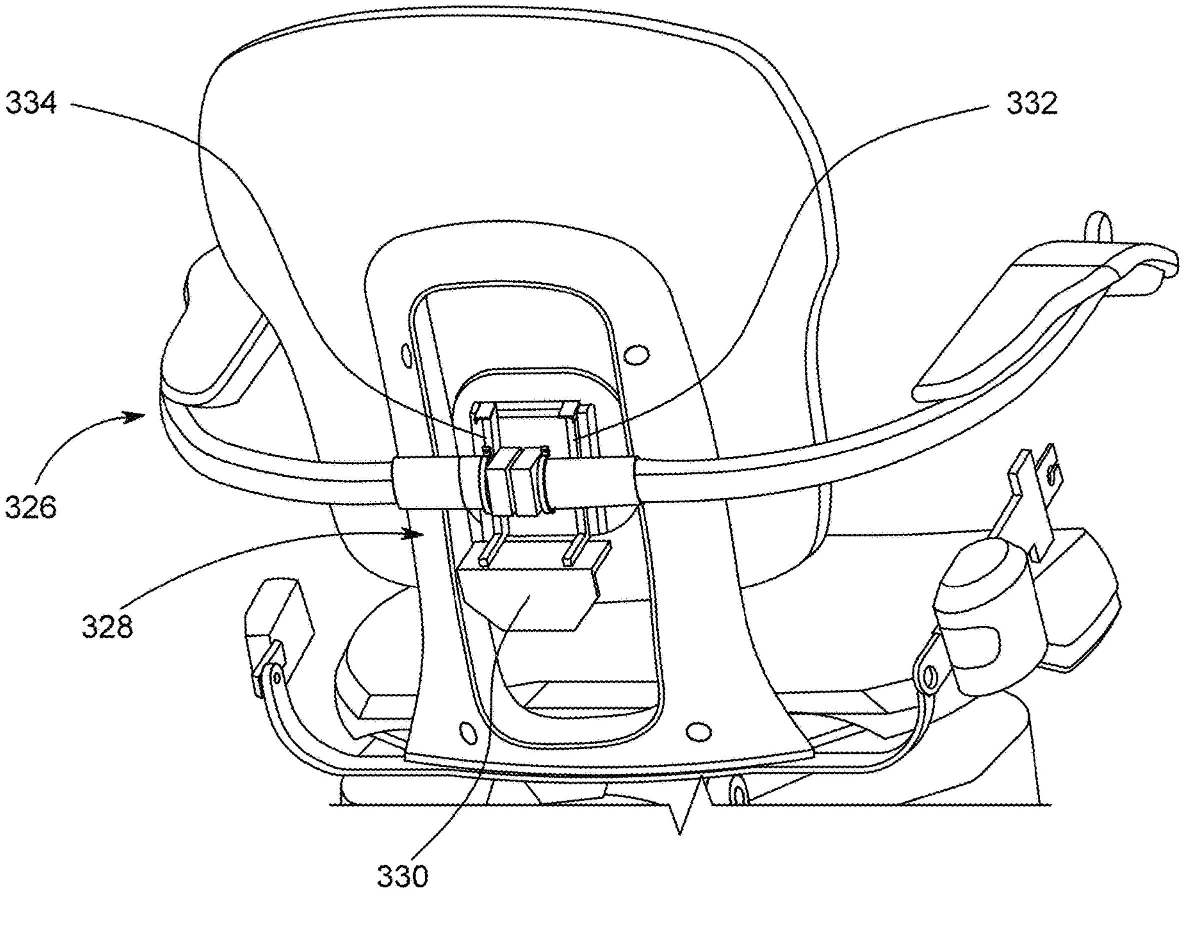
FIG. 128 schematically illustrates the armrest subassembly.
Figure 129:
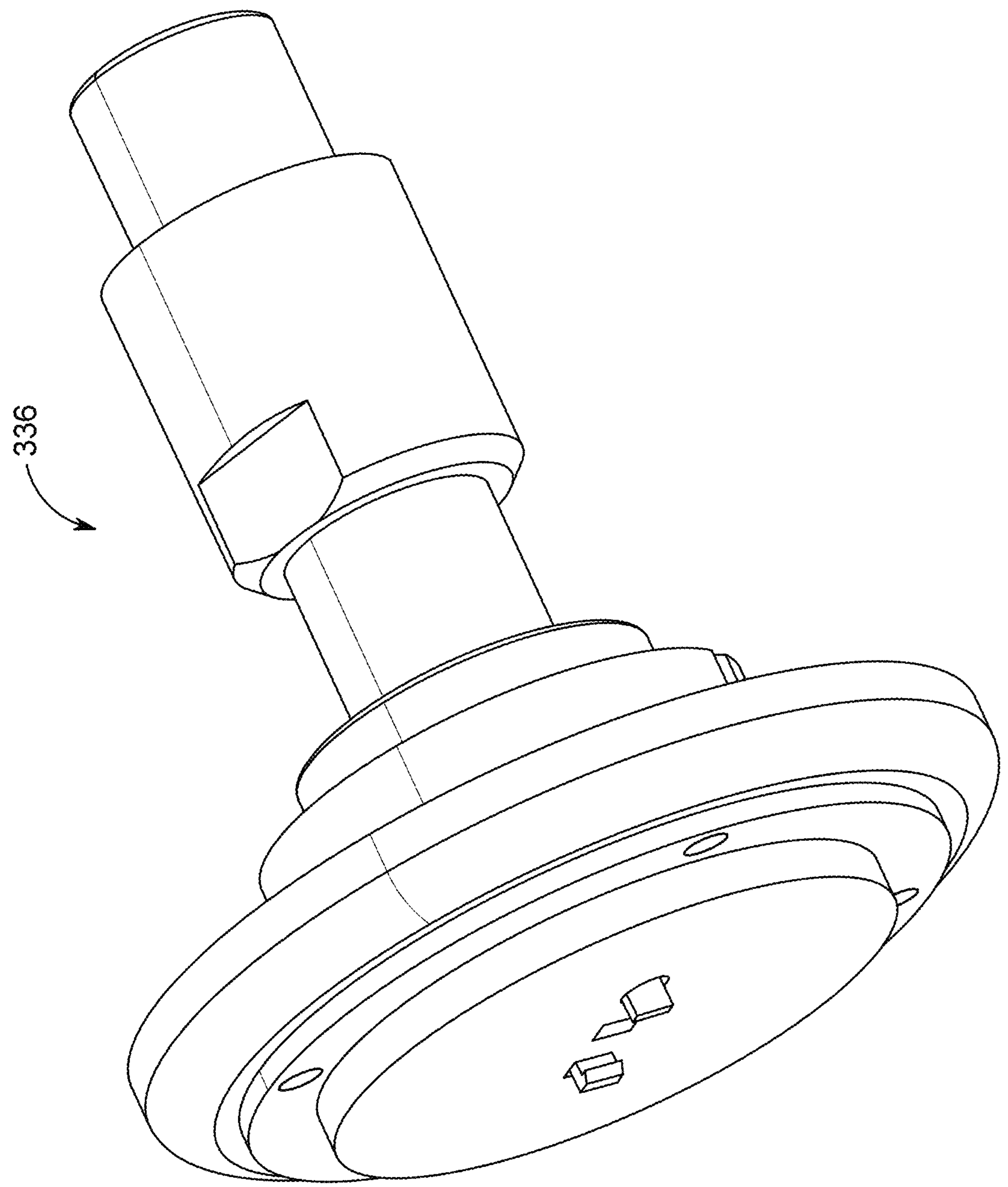
FIG. 129 schematically illustrates a perspective view of a safety braking system for use with stair lift systems.

FIG. 128 schematically illustrates the armrest subassembly 326 and method of adjusting the height of the armrests. In one embodiment, an adjustment mechanism 328 is positioned behind the back of the chair, which provides for the user to pull a handle 330 to disengage a locking mechanism 332 (such as a pair of hooks) from a rack 334. Once the locking mechanism is disengaged, the user can manually lift or lower the armrest assembly to the desired height and subsequently release the handle 330 to allow the locking mechanism to re-engage with the rack. In this embodiment, the armrests themselves could rotate up and down either together or separately.

The chair 300 can include a safety braking systems designed to stop the chair 300 from rolling down the rail system at an excessive speed when there is a mechanical issue, malfunction, user error, or other situation that causes the chair 300 to operate other than as intended. FIGS. 129-140 illustrate two embodiments of such safety braking systems. These braking systems are mechanical in nature meaning they do not need any electrical power in order to operate as intended to stop the chair 300 when it reaches a specified speed. As will be explained, these safety braking systems will initiate emergency braking when certain forces caused by the speed of the chair on certain components of the safety braking system cause those certain components to move and engage other components to stop the movement of the chair 300 relative to the rail system. The safety braking system can be incorporated into one or more of the pairs or rollers (318, 320). For example, a first safety braking system can be incorporated into the top upper roller 318 and a second (and identical) safety braking system can be incorporated into the top lower roller 320. Such redundancy can provide added safety along with a smoother slowing and stopping of the chair 300 when the safety braking system needs to be deployed.

Figure 130:
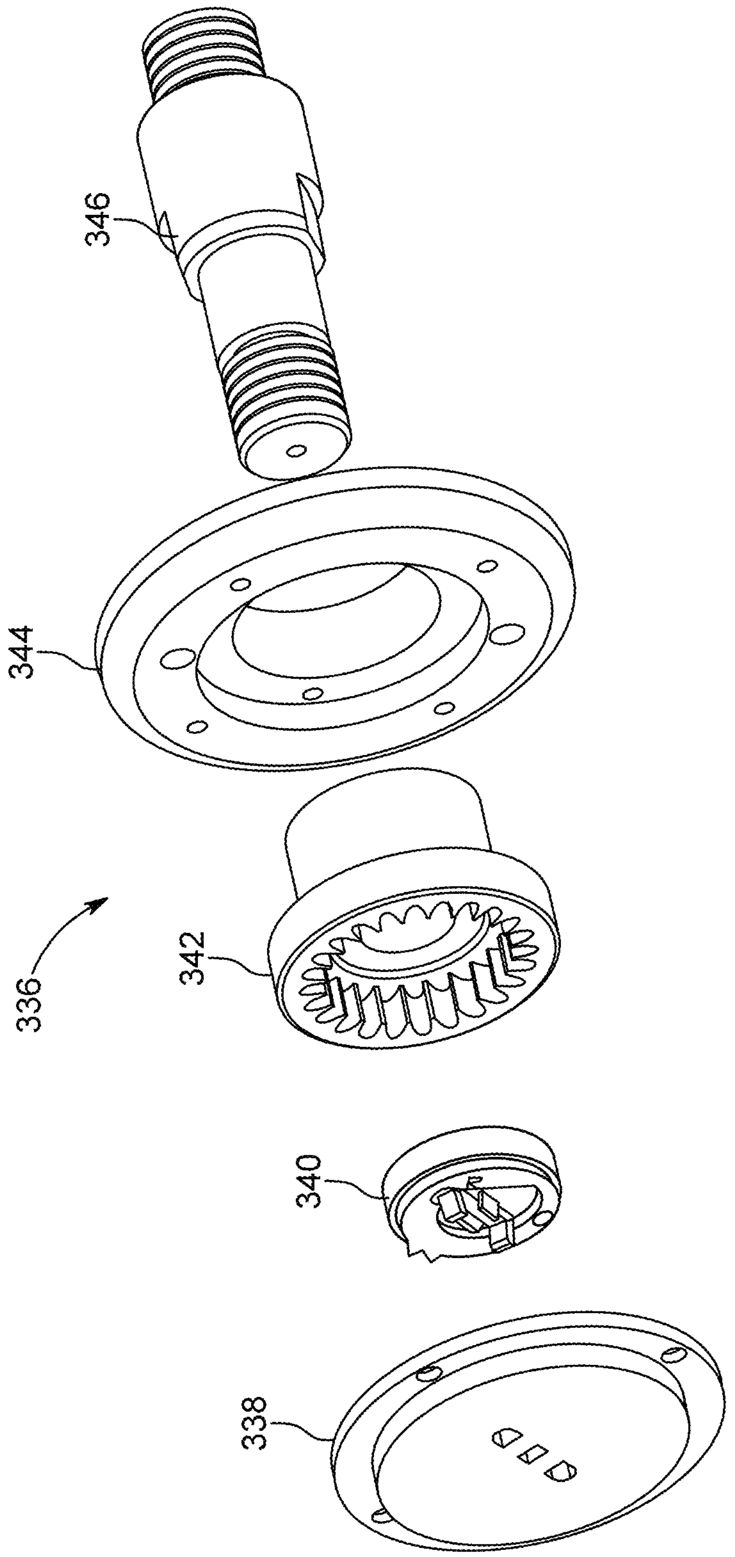
FIG. 130 schematically illustrates an exploded view of the safety braking system of FIG. 129.
Figure 131:
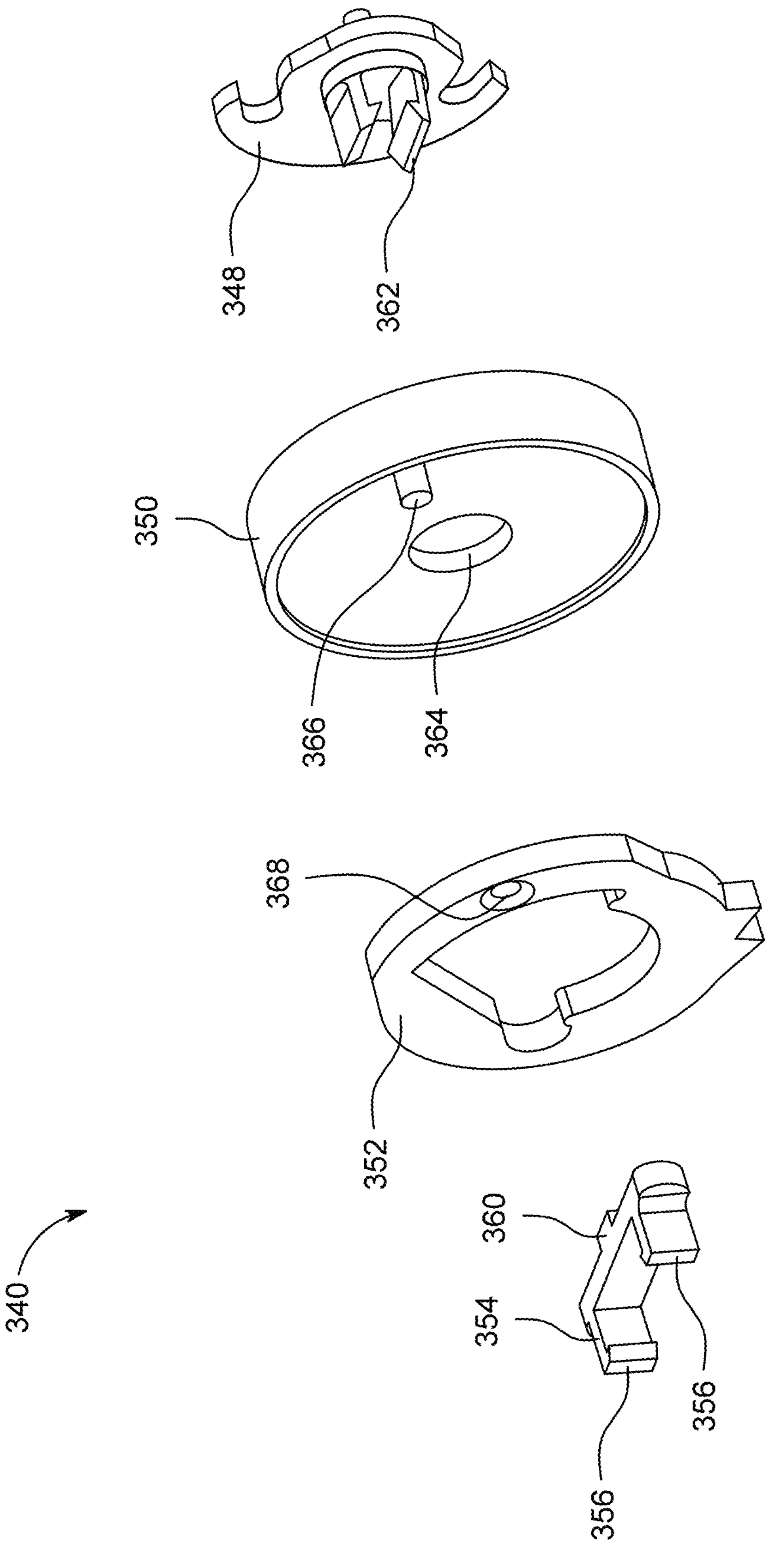
FIG. 131 schematically illustrates an exploded view of a locking mechanism for use with the safety braking system of FIG. 129.
Figure 132:
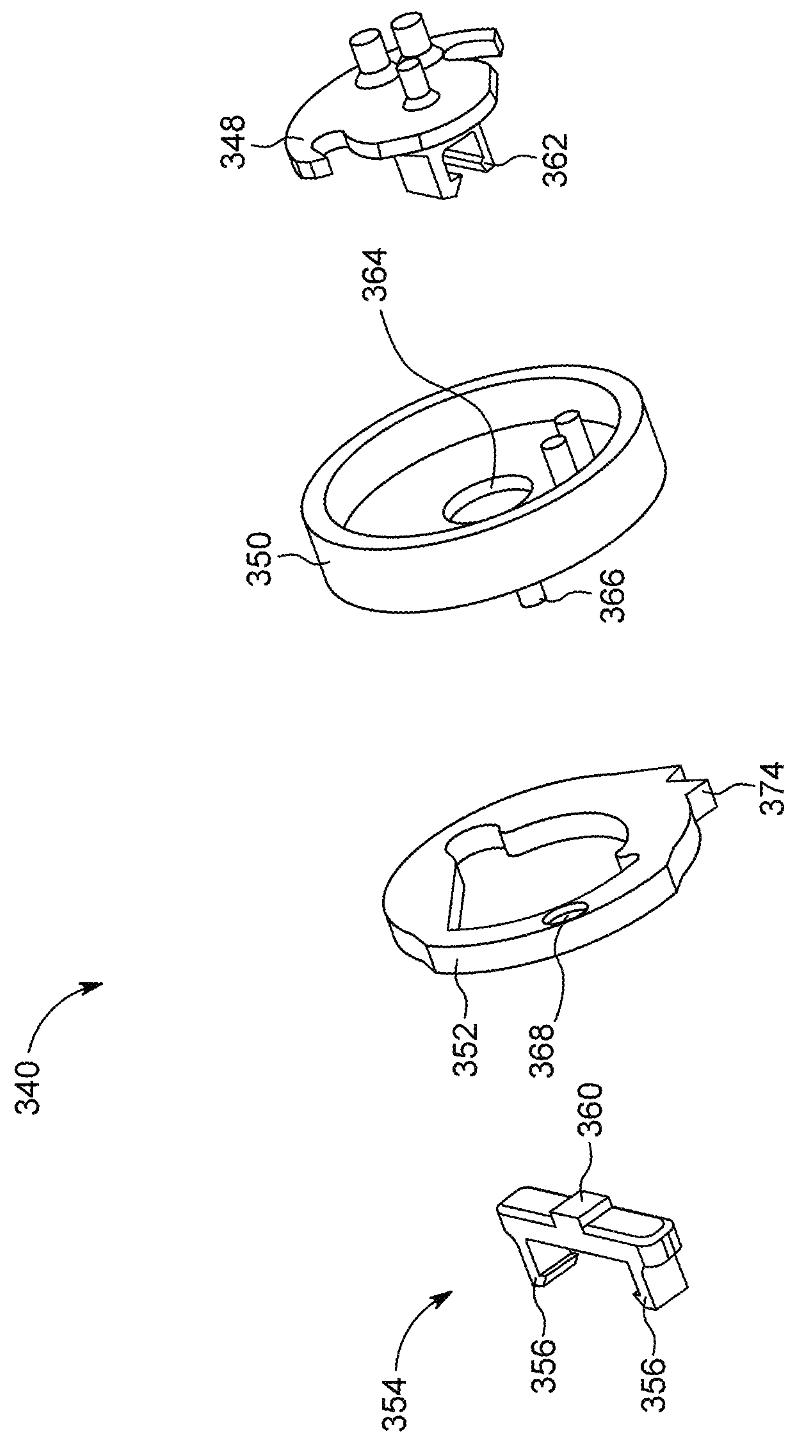
FIG. 132 schematically illustrates another exploded view of a locking mechanism for use with the safety braking system of FIG. 129.
Figure 133:
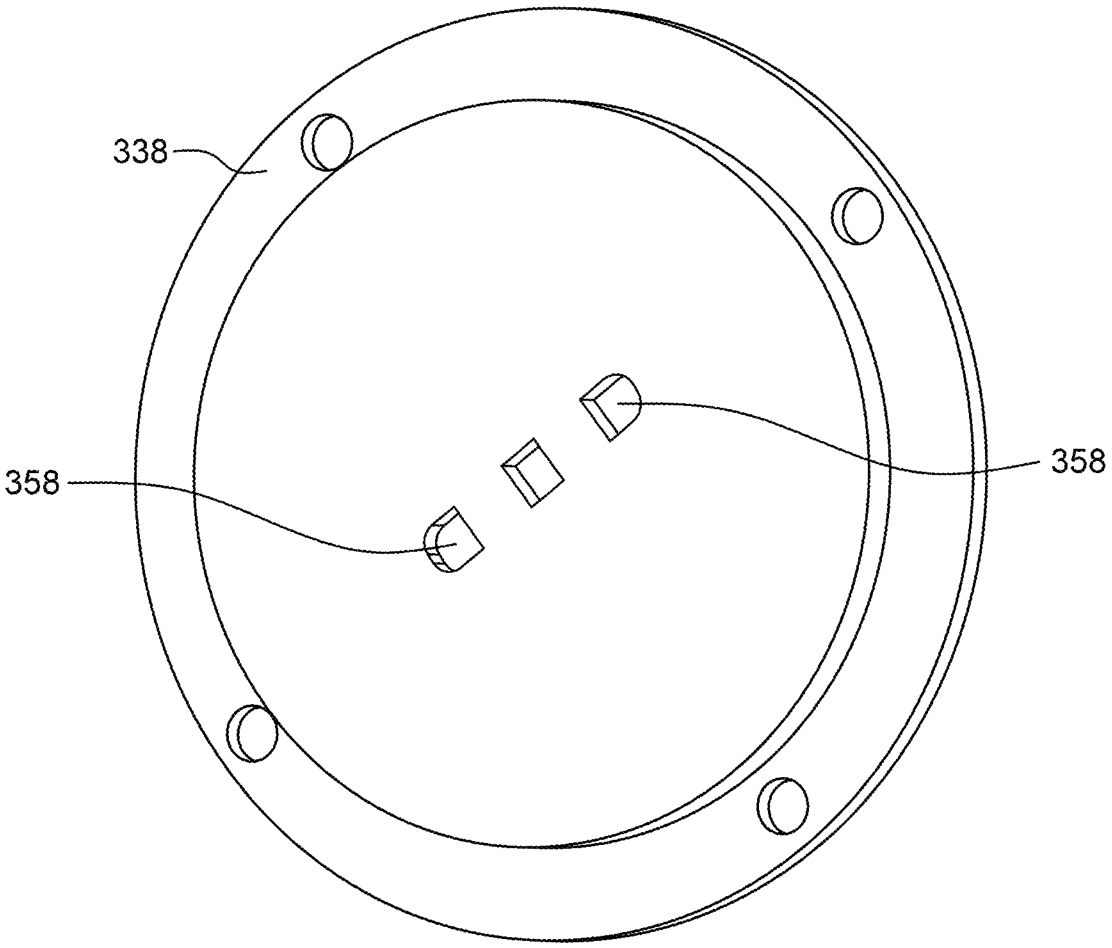
FIG. 133 schematically illustrates as perspective view of a cover for use with the safety braking system of FIG. 129.
Figure 134:
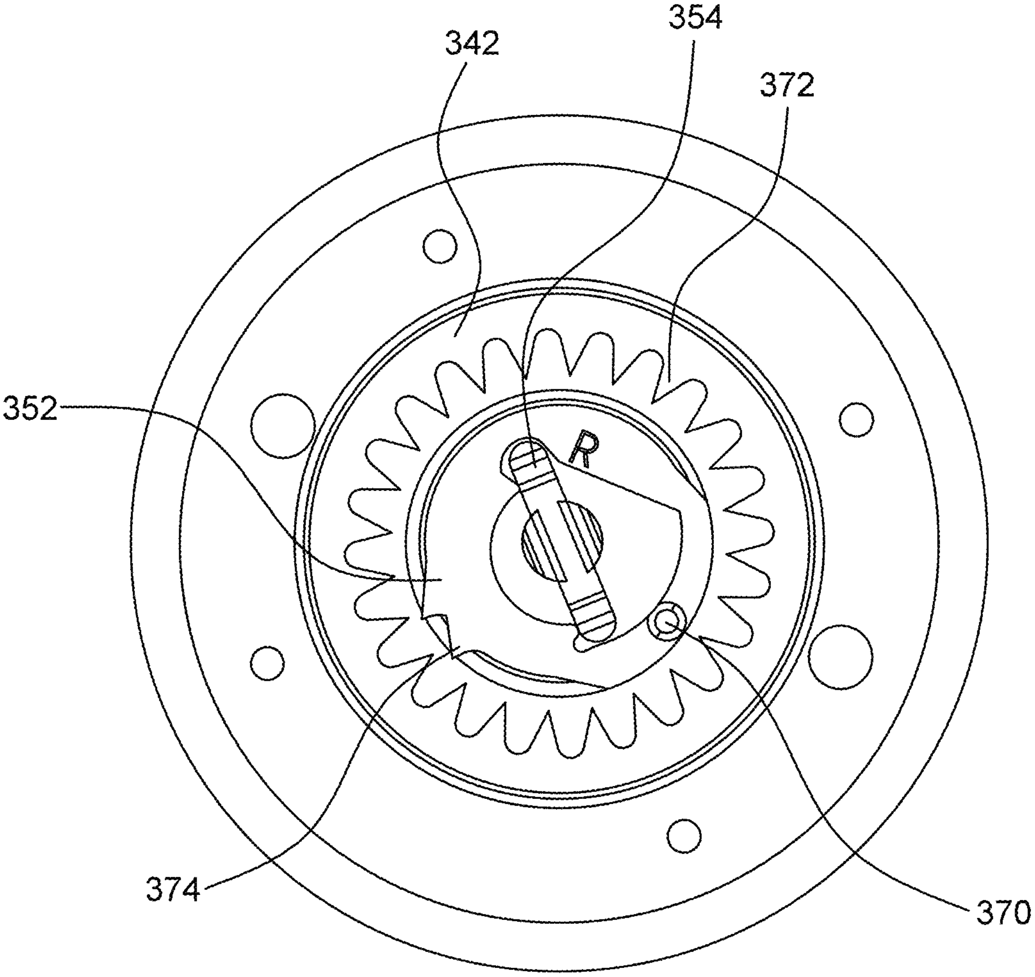
FIG. 134 schematically illustrates a top view of the locking mechanism with the cover removed with the locking mechanism in an unengaged position.
Figure 135:
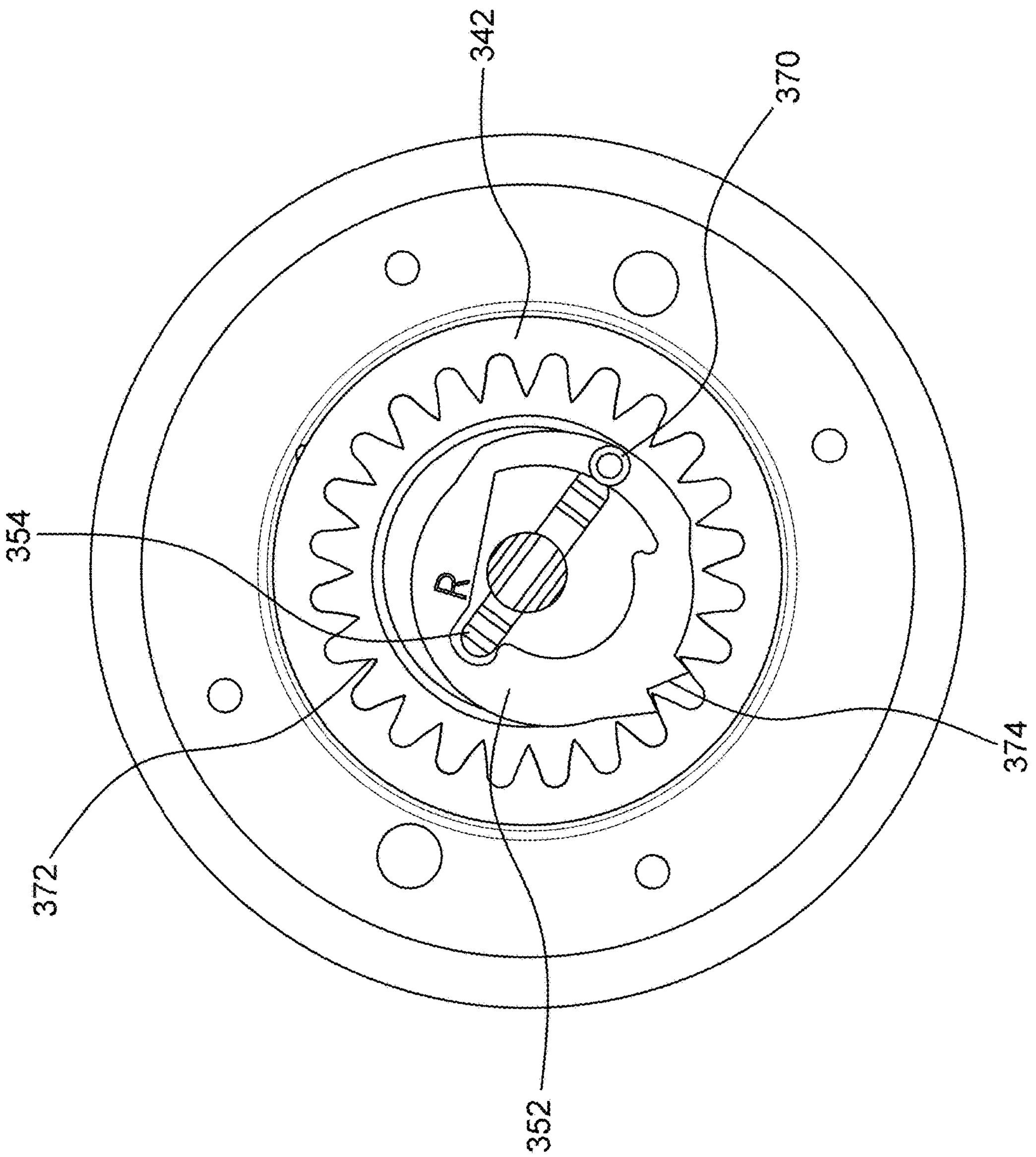
FIG. 135 schematically illustrates a top view of the locking mechanism with the cover removed with the locking mechanism in an engaged position.

FIGS. 130-137 illustrate components for use with a first embodiment of a safety braking system 336. As illustrated in FIG. 130, the safety braking system 336 includes a cover 338, a locking mechanism 340, an outer locking gear 342, and a roller flange 344. Also illustrated is a roller shaft 346, which is part of the mechanism that supports the rollers (318, 320) during operation. The roller flange 344 is attached to the appliable roller (318, 320), which secures the safety braking system 336 to the roller (318, 320). The roller flange 344 rotates with the roller (318, 320), while the roller shaft 346 and outer locking gear 342 remain stationary while the chair 300 moves up and down the rail system. The locking mechanism 340 is attached to the cover 338, and the cover 338 is attached to the roller flange 344. Thus, the cover 338 and locking mechanism 340 rotate along with the applicable roller (318, 320). FIGS. 131 and 132 illustrate exploded views of the locking mechanism 340; FIG. 134 illustrates the safety braking system 336 (with the cover 338 removed) in an unlocked arrangement, meaning that chair 300 is allowed to freely move relative to the rail system; and FIG. 135 illustrates the safety braking system 336 (with the cover 338 removed) in a locked arrangement, meaning that motion of the chair 300 relative to the rail system is ceased (i.e., the chair 300 reached is maximum allowable speed and the emergency brake is engaged).

The locking mechanism 340 includes a spring plate 348, a middle body 350, an inner locking gear 352, and a driving shaft 354. The spring plate 348 is positioned on one side of the middle body 350. The inner locking gear 352 and driving shaft 354 are positioned on the opposite side of the middle body 350. The driving shaft 354 includes a pair of clips 356 that engage with apertures 358 in the cover 338 to secure the locking mechanism 340 to the cover 338, which facilitates the locking mechanism 340 rotating along with the cover 338. The driving shaft 354 also includes a nub 360, and the spring plate 348 includes a clip 362, whereas when the locking mechanism 340 is assembled, the clip 362 of the spring plate 348 passes through an aperture 364 in the middle body 350 to engage with the body of the driving shaft 354 to secure the two components together. The nub 360 interacts with the clip 362 to facilitate the central positioning of the driving shaft 354 relative to the spring plate 348 when the locking mechanism 340 is assembled. Once the locking mechanism 340 is assembled, it is positioned within the outer locking gear 342.

As illustrated in FIGS. 131 and 132, the middle body 350 includes a post 366 and the inner locking gear 352 includes an aperture 368. When the inner locking gear 352 is assembled with the middle body 350, the post 366 is positioned in the aperture 368 forming a pivot point 370 (illustrated in FIGS. 134 and 135) around which the inner locking gear 352 can pivot relative to the outer locking gear 342. The outer locking gear 342 include a series of inner facing teeth 372, and the inner locking gear 352 includes a pair of teeth 374. During normal operation (as illustrated in FIG. 134) the pair of teeth 374 of the inner locking gear 352 are disengaged from the inner facing teeth 372 of the outer locking gear 342, which allows the chair 300 to move normally. However, then a preset speed threshold is reached, the inner locking gear 352 pivots and the pair of teeth 374 of the inner locking gear 352 engage with the inner facing teeth 372 of the outer locking gear 342 and all movement of the chair 300 is stopped. The inner locking gear 352 is maintained in a normal operating position (i.e., disengaged) by the spring plate 348 with includes a torsion spring. The engagement of the spring plate 348 (with its torsion spring) and the inner locking gear 352 resists the force of gravity and the centrifugal force of normal operation of the chair 300 to maintain the disengaged position of the inner locking gear 352. However, when the preset speed is reached, the centrifugal force overcomes the force of the torsion spring of the spring plate 348, the inner locking gear 352 rotates about the pivot point 370, the teeth 374 of the inner locking gear 352 engage the teeth 372 of the outer locking gear 342, and the movement of the chair 300 is stopped. Specifically, the locking of the teeth (372, 374) of the outer locking gear 342 and the inner locking gear 352 stop the rotation of the driving shaft 354, which stops the rotation of the cover 338, roller flange 344, and the roller (318, 320) of the chair 300. Once the movement of the chair 300 is stopped, the safety braking system 336 will remain engaged and locked until the chair 300 is moved upwards on the rail system. This action will disengage the teeth (372, 374) of the outer locking gear 342 and the inner locking gear 352 and again allow free movement of the chair 300 within the appropriate speed range.

Figure 137:
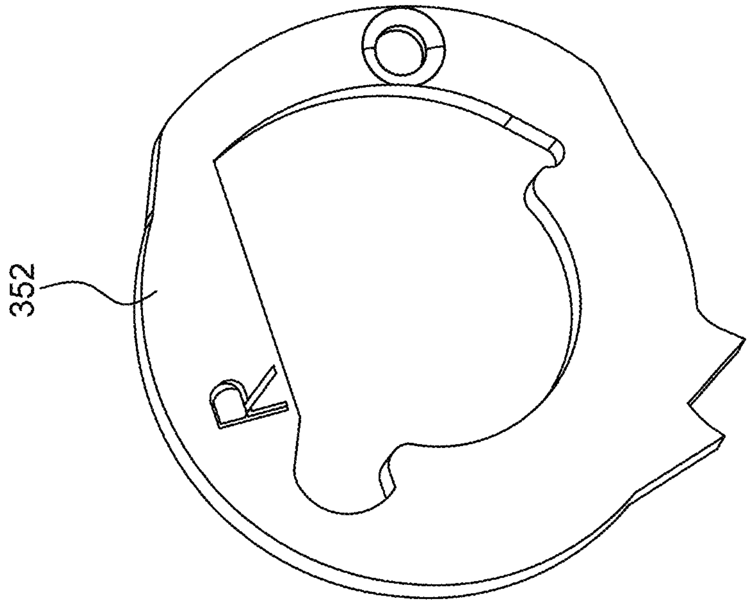
FIG. 137 schematically illustrates another perspective view of the inner locking gear for use with the safety braking system of FIG. 129.
Figure 136:
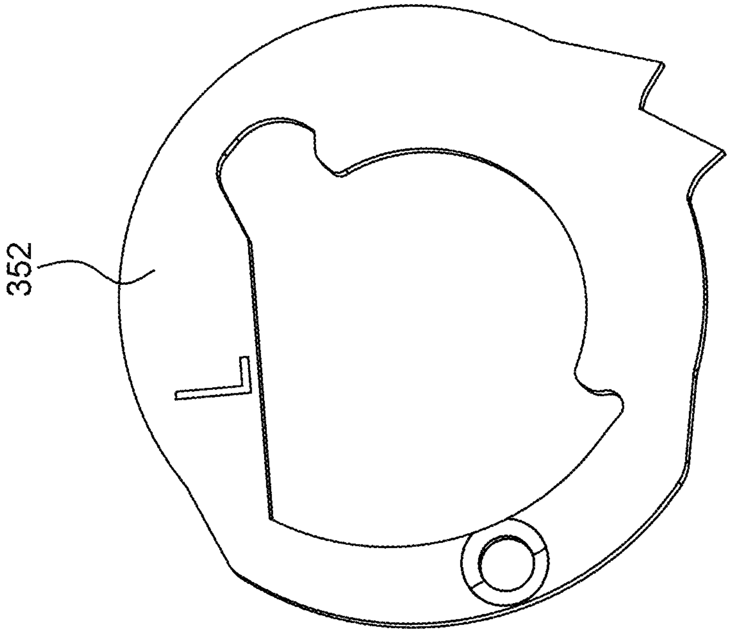
FIG. 136 schematically illustrates a perspective view of the inner locking gear for use with the safety braking system of FIG. 129.

The embodiment of the safety braking system 336 illustrated in FIGS. 130-137 will be arranged depending on which side of a stair case the stair lift system is installed. It will be appreciated that only the downward movement of a chair 300 along a rail system requires emergency braking. Thus, when a stair lift system is installed on the left side of a stair case (as viewed from the bottom of the staircase), the counterclockwise rotation of the rollers is of safety concern, and when a stair lift system is installed on the right side of a stair case, the clockwise rotation of the rollers is of safety concern. Therefore, as illustrated in FIGS. 136 and 137, the inner locking gear 352 is designed so that it can be oriented (i.e., flipped) as required to accommodate the specific installation. When a stair lift system is installed on the left side of the staircase, the face of the inner locking gear 352 marked with an “L” will be assembled facing away from the roller (318, 320), and when a stair lift system is installed on the right side of the staircase, the face of the inner locking gear 352 marked with an “R” will be assembled facing away from the roller (318, 320). In one embodiment, the chair 300 can be manufactured as a “right side” chair or as a “left side” chair. So that the assembly of the inner locking gear 352 can be managed at the manufacturing facility. In another embodiment, the chair 300 can be altered at the installation site to be a “right hand” chair or a “left hand” chair. In any event, the versatility of the locking gear 352 demonstrates yet another configurable aspect of the present disclosure that provides for limiting the number of component and system required to accommodate a large variety of circumstances.

Figure 139:
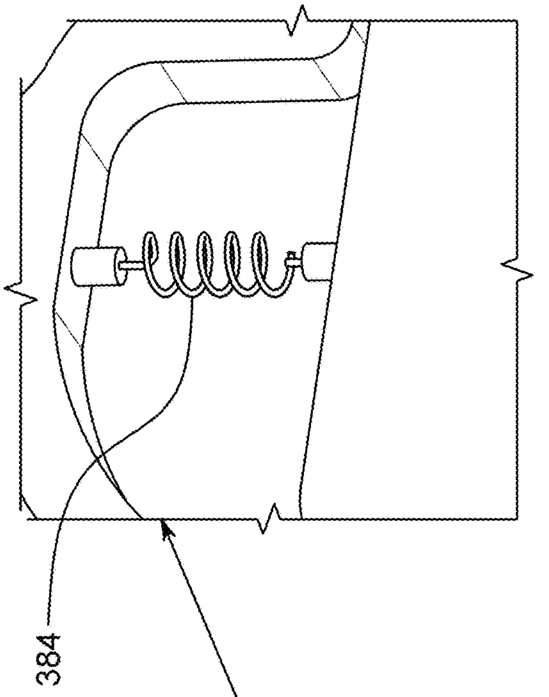
FIG. 139 schematically illustrates an enhanced view of a spring for use with the locking mechanism of FIG. 138.
Figure 138:
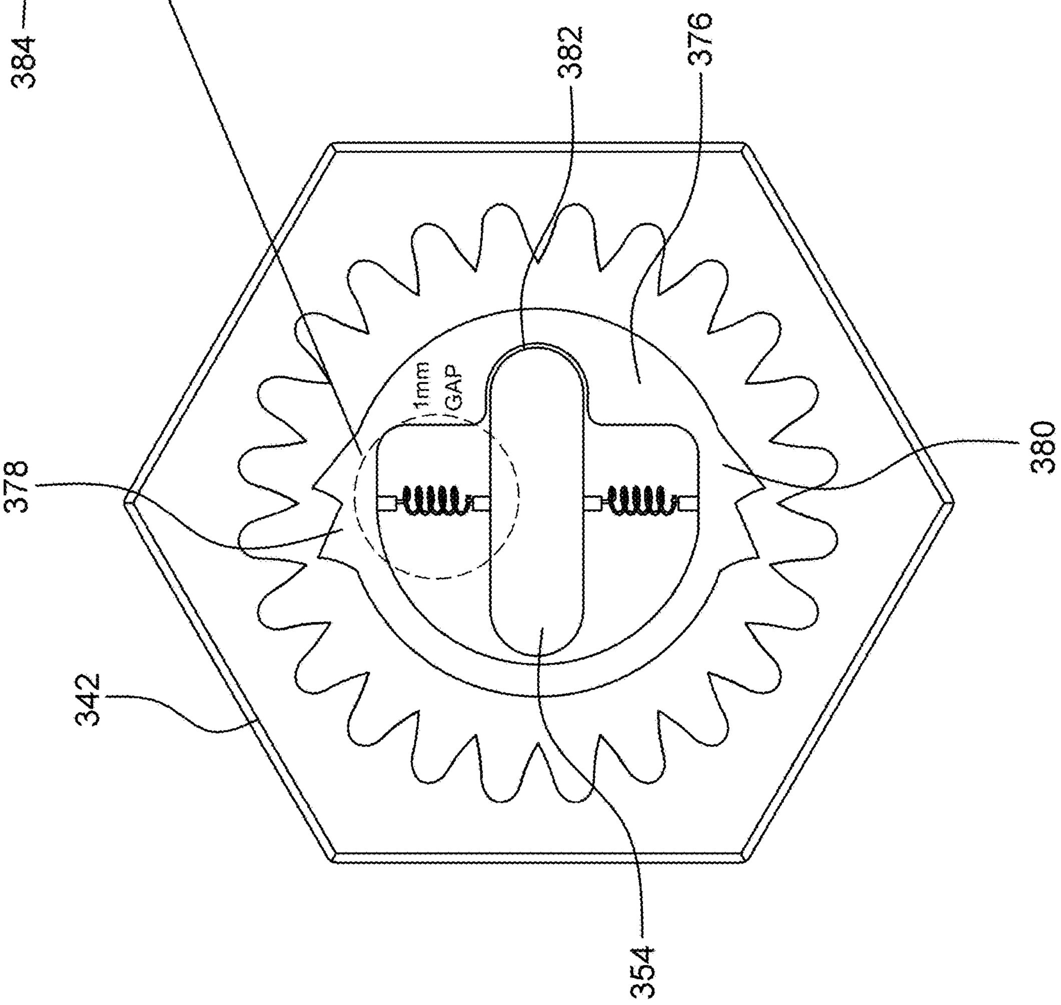
FIG. 138 schematically illustrates another locking mechanism for use with the safety braking system of FIG. 129.
Figure 140:
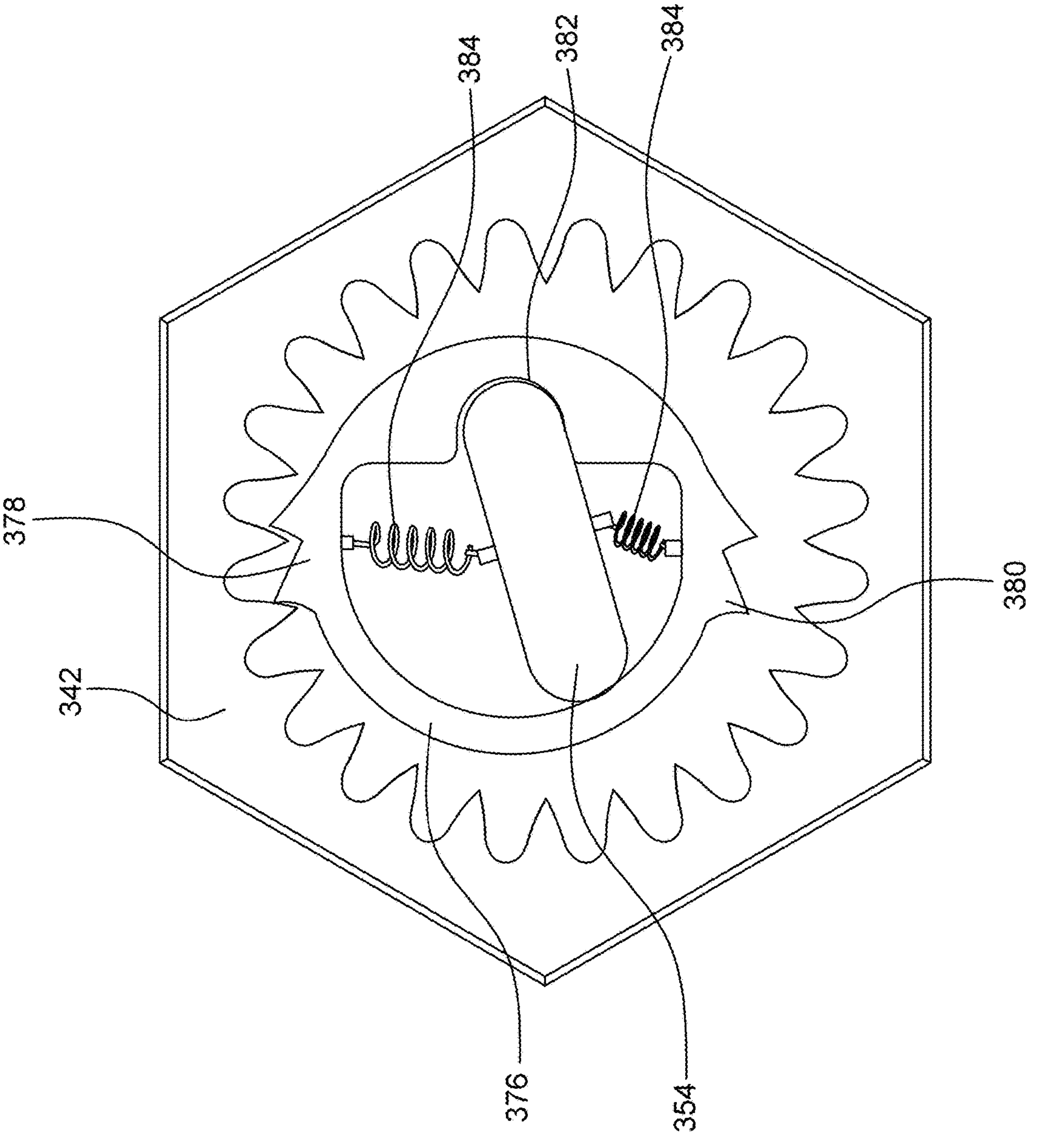
FIG. 140 schematically illustrates the locking mechanism of FIG. 138 in an engaged position.

FIGS. 138-140 illustrate another embodiment of a safety brake system. The components are the same as the safety brake system 336 discussed above except for the inner locking gear. In this embodiment, the inner locking gear 376 includes two pairs of teeth (378, 380) and has a centrally located notch 382 to accommodate the driving shaft 354. The driving shaft 354 is attached to the inner locking gear 376 by a pair of springs 384. During normal operation, the arrangement of the driving shaft 354, inner locking gear 376, and springs 384 maintains the inner locking gear 376 such that its teeth (378, 380) are disengaged from the teeth 372 of the outer locking gear 342. However, as the speed of the chair 300 reaches the preset limit, the centrifugal force overcomes the force applied by the springs 384, the inner locking gear 376 rotates, and one of the sets of teeth (378, 380) of the inner locking gear 376 engage with the teeth 372 of the outer locking gear 342 (as illustrated in FIG. 140), which stops the movement of the chair 300. It will be appreciated that this design is agnostic with regard to which side of the staircase the stair lift system is installed. One of the two sets of teeth (378, 380) will engage the teeth 372 of the outer locking gear 342 whether the rollers (318, 320) are rotating clockwise or counterclockwise.

The safety braking systems illustrated in FIGS. 129-140 can be used with any variation of stair lift system disclosed herein. This includes use with a stair lift system with a straight rail system and use with a stair lift system with a curved rail system.

Figure 141:
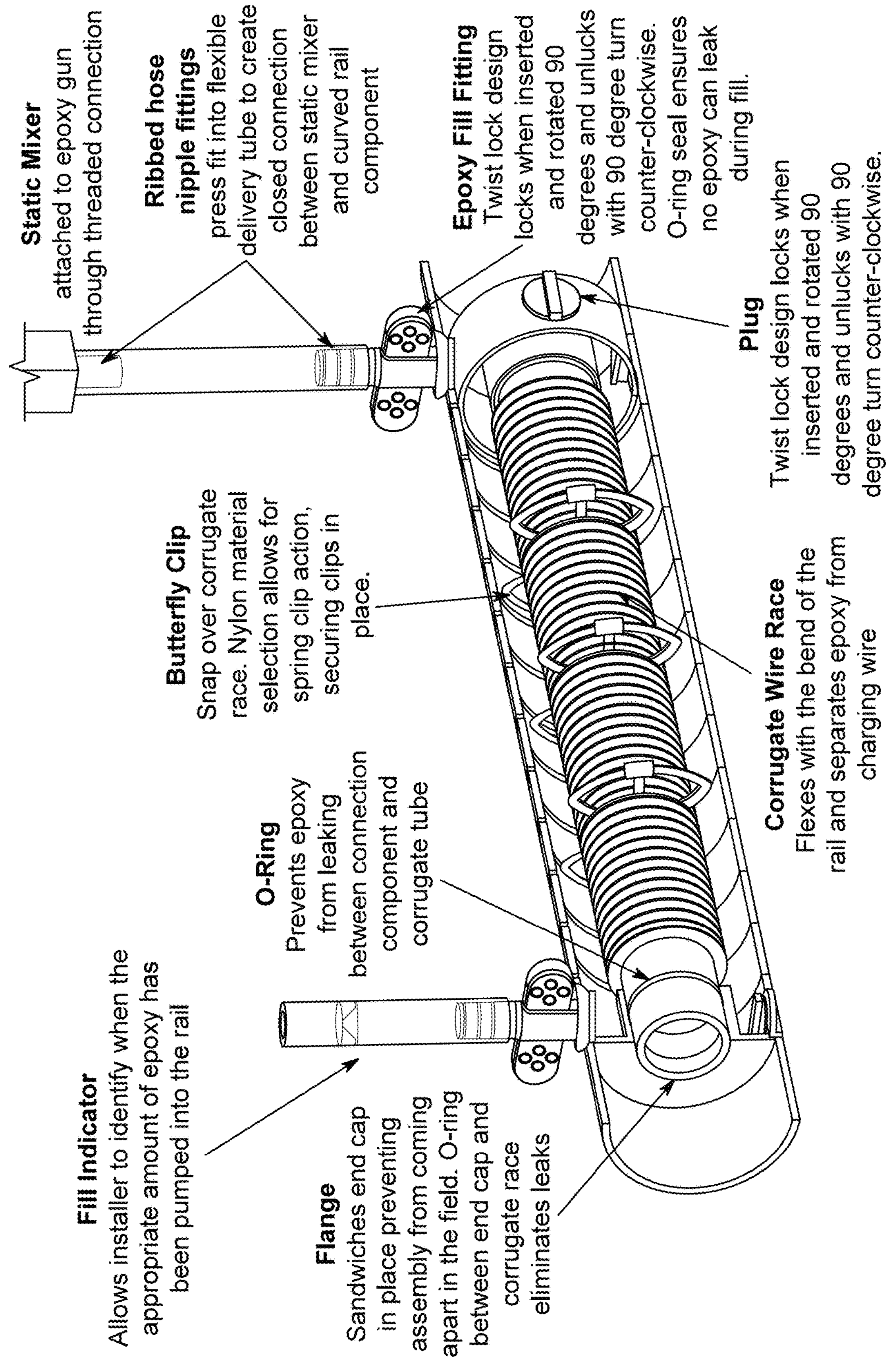
FIGS. 141-146 illustrate a number of arrangements for rails for use with stair lift systems.

FIGS. 141-158 illustrate a number of rail segments that can be used with the stair lift systems disclosed herein. FIG. 141 schematically illustrates an embodiment of an epoxy filled laser cut corner segment in which a two-part epoxy is used. This epoxy can cure, harden, and re-strengthen the rail segment. The epoxy can be injected into the rail segment using an epoxy gun and the fill port system illustrated. In another embodiment, the two-part epoxy can be provided in a membrane that has an internal barrier that separates the two parts of the epoxy system. The membrane is prepared by breaking the barrier between the two parts of the epoxy system, which causes the two parts to mix, react, and begin to cure. The membrane is then inserted into the rail segment as one unit to cure in place and fit the internal dimensions of the rail segment, without the need for any method to inject or fill the rail segment. In another embodiment, a two-part foam is used instead of a two-part epoxy. Closed and open cell foam can be used to strengthen the laser cut rail segments. This foam can be polyurethane or any other appropriate high strength and density foam. In another embodiment, concrete is mixed and injected into the rail segment as a way to harden and strengthen the laser cut rail segment. In another embodiment, an inflatable rubber inner tube is inserted into the rail segment. This innertube is then pressurized with air to provide rigidity and structure to the rail segment.

Figure 142:
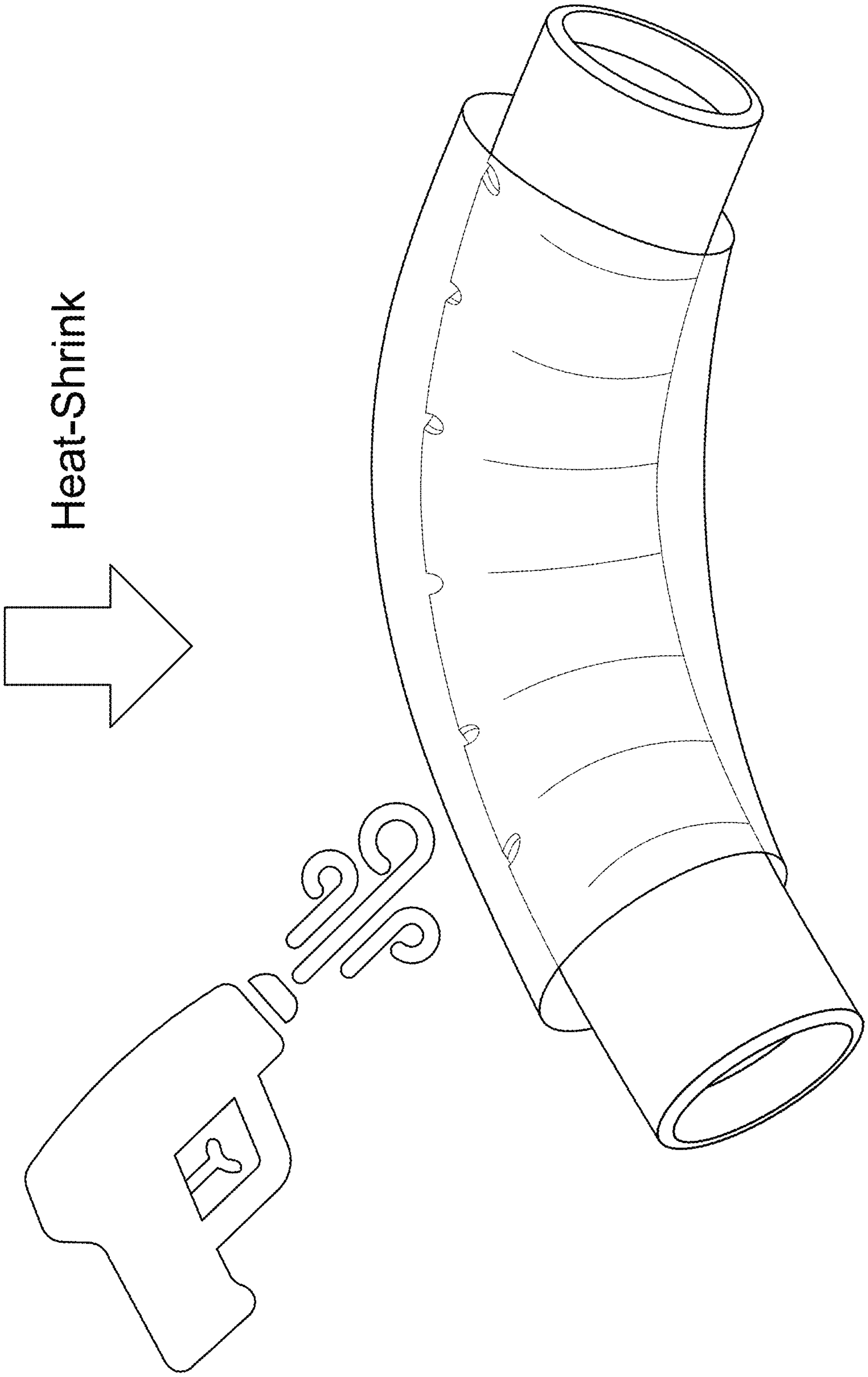
Figure 143:
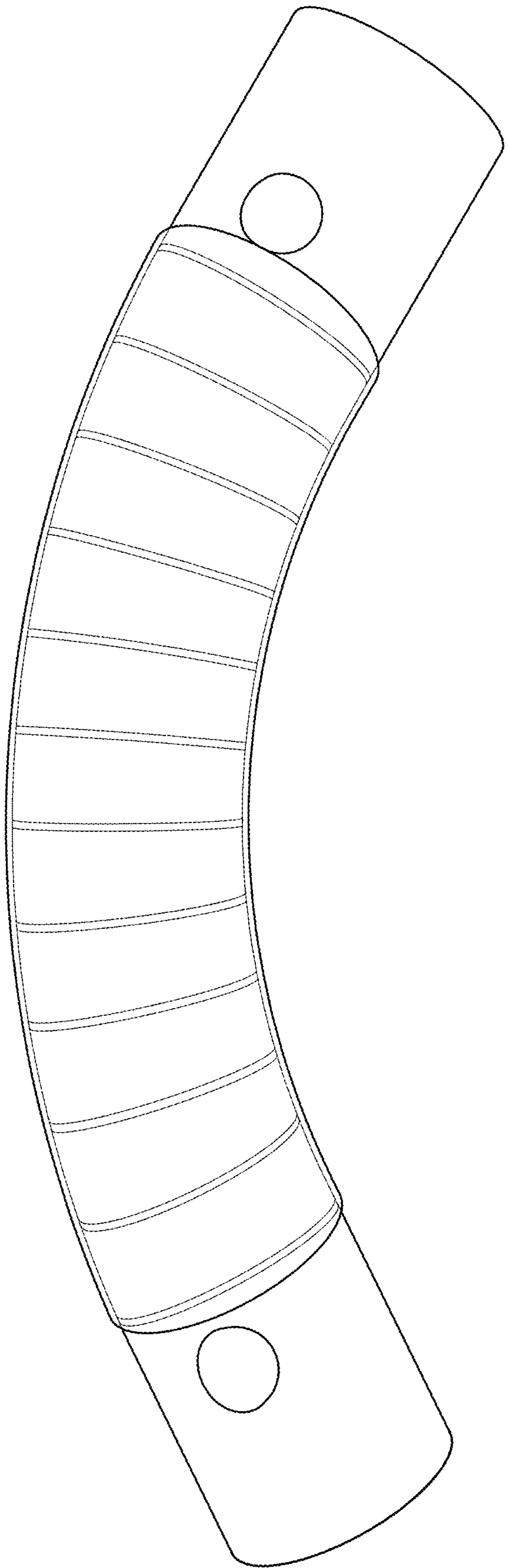

In a number of embodiment discussed and illustrated herein, an interior membrane is used and filled with a substance until it presses against the inner diameter of the rail segment. Such arrangement and methods provide for the filling substance to be contained within the desired internal space, strengthening the rail segment, while leaving a clean outer surface of the rail segment for the stair lift to ride along. In other examples, an exterior membrane can be used to contain the hardening substances within the rail segment. In one example, an exterior membrane made from a polymer, such as latex, or other material that fit snuggly against the outside diameter of the rail segment. As illustrated in FIGS. 142 and 143, one method of snuggly fitting the exterior membrane to the outside diameter of the rail segment is to use heat to shrink the exterior membrane. Once a filler substance is inserted into the interior of the rail segment and hardened, the exterior membrane can be removed. Such an arrangement contains the filling substance within the desired space in the rail segment and provides for a clean outer surface of the rail segment for the stair lift to ride along.

Figure 144:
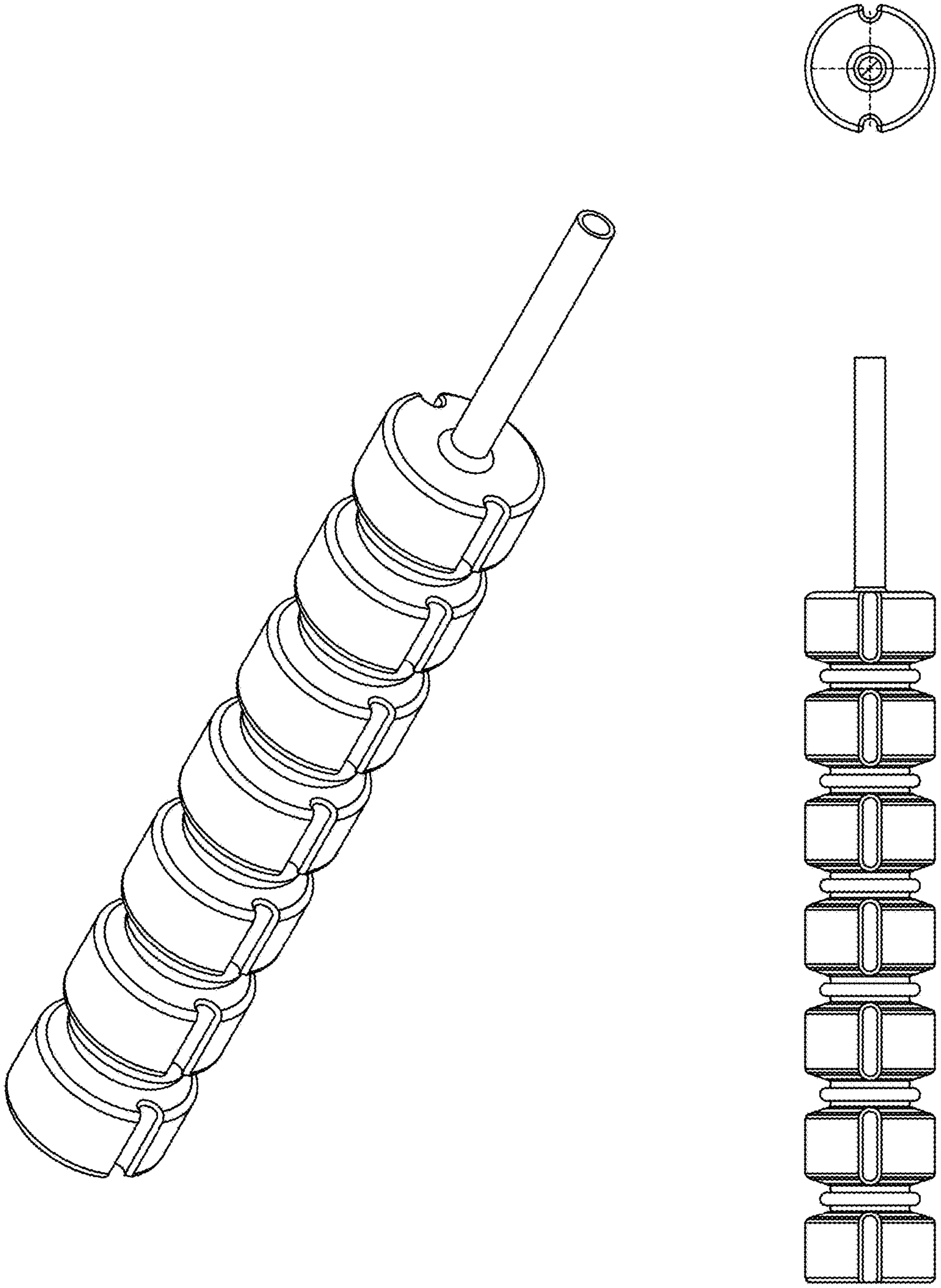
Figure 145:
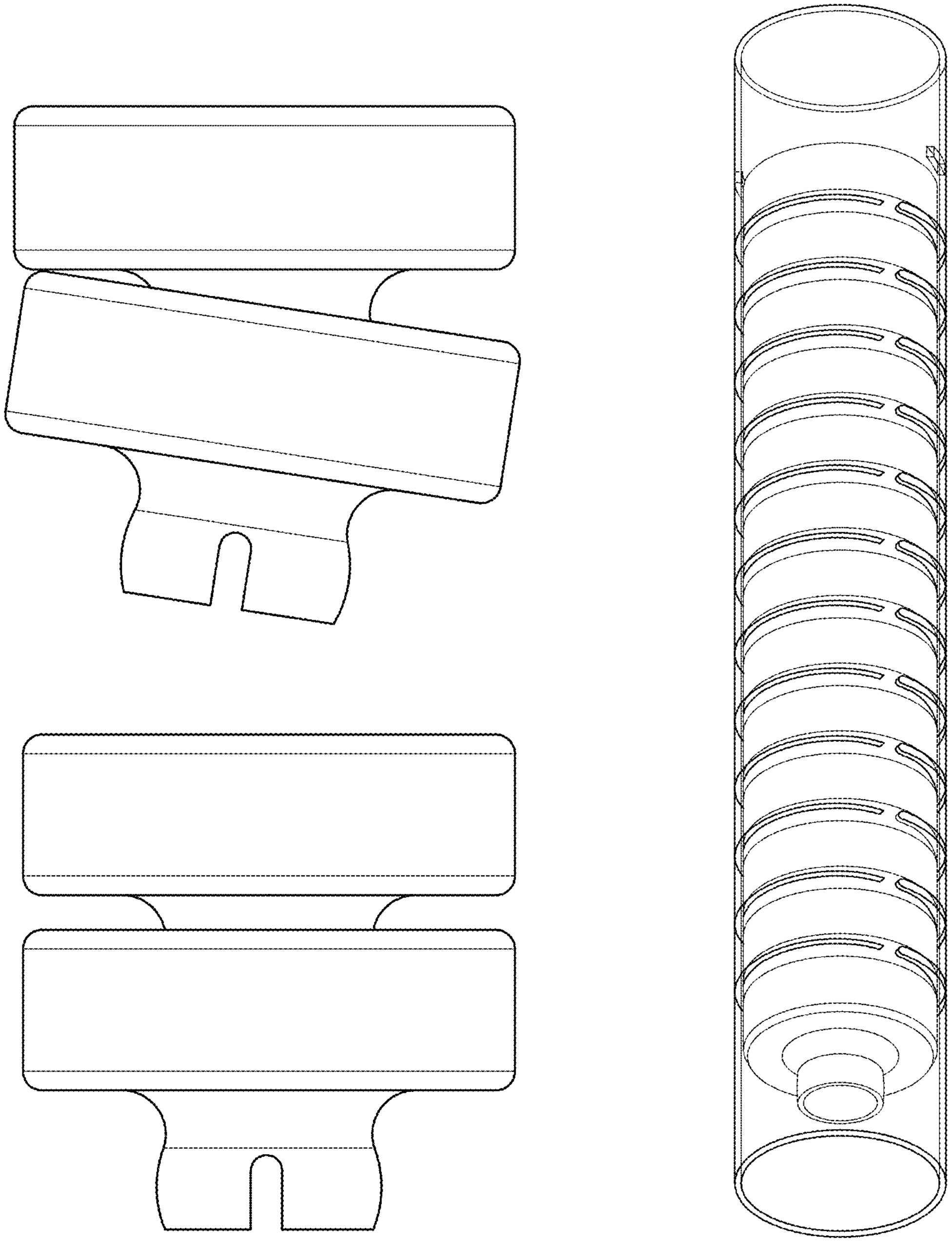
Figure 146:
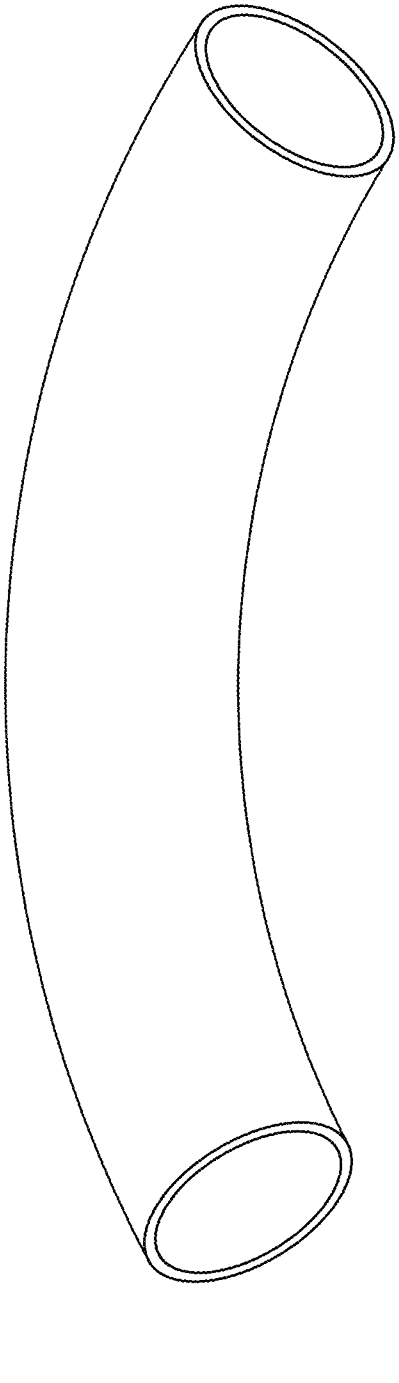
Figure 147:
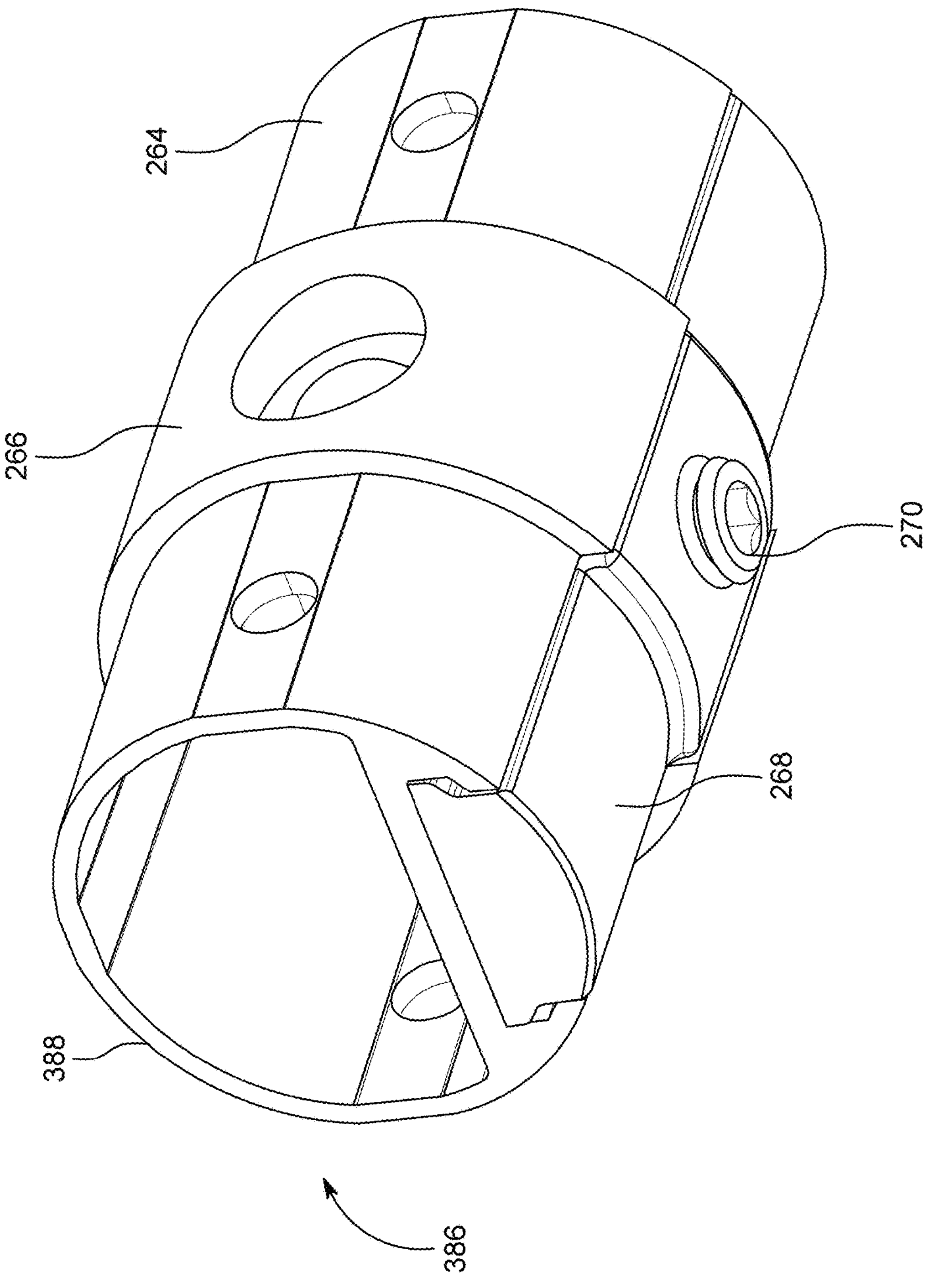
FIG. 147 schematically illustrates a perspective view of a connection component for use with stair lift systems.
Figure 148:
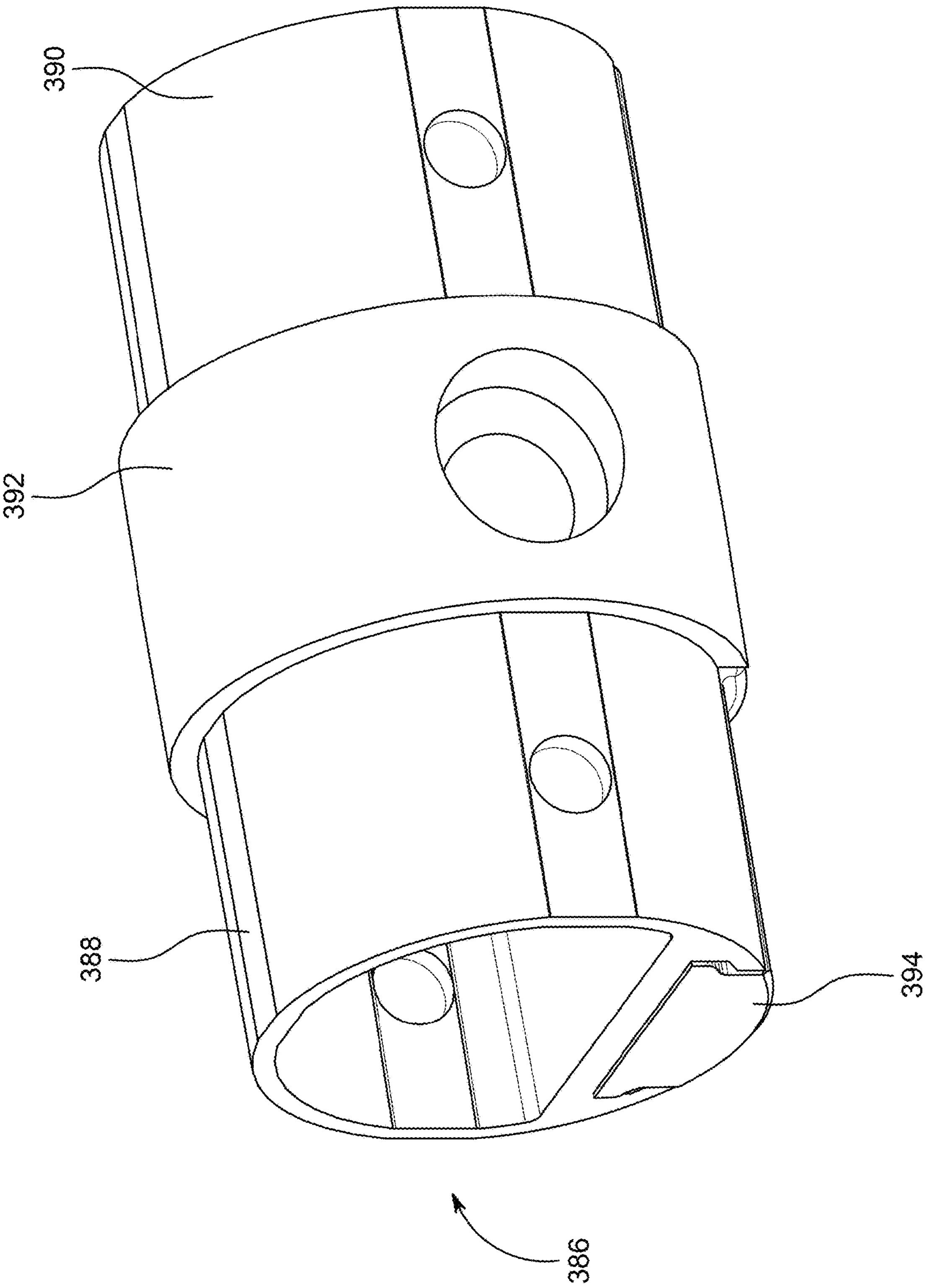
FIG. 148 schematically illustrates another perspective view of the connection component of FIG. 147.
Figure 149:
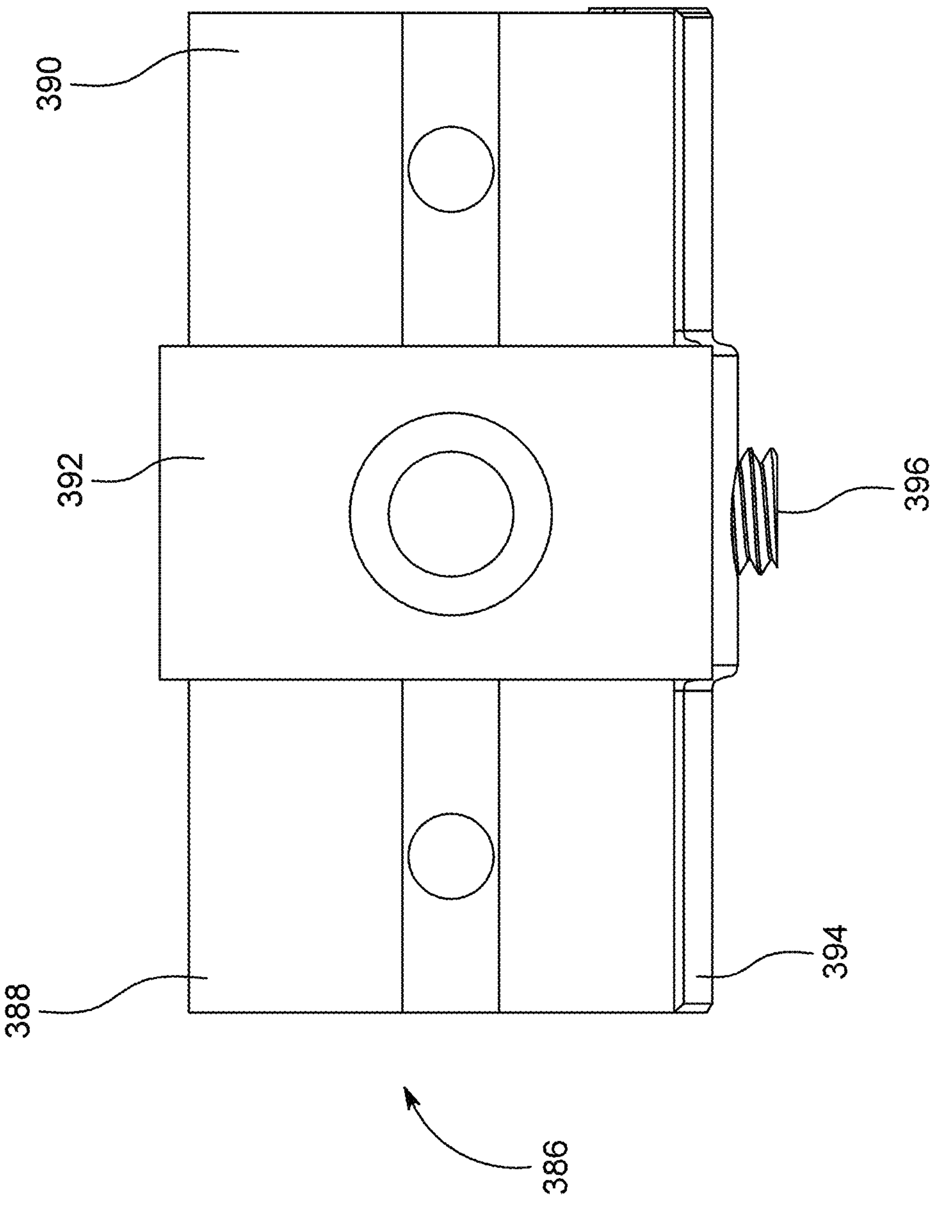
FIG. 149 schematically illustrates a plan view of the connection component of FIG. 147.

As illustrated in FIGS. 144 and 145, curved rail segments can be formed for subcomponents. In one embodiment, a set of rings that each include a ball and socket arrangement, has a ball feature on one side and a matching socket feature on the opposite side. When these rings are assembled together, the ball of one ring is engaged with a socket of another ring, and such a set of rings can each be free to rotate to mimic the bent curve of the laser cut rail segment. Such an arrangement is solid in the direction of force applied as a component of a stair lift system. In another embodiment of a curved rail segment, as illustrated in FIG. 146, the curved rail segment can be arranged as a pre-bent solid tubes at various angles such as, but not limited to, 30 degrees, 60 degrees, and 90 degrees. Then, depending on the need at installation, the appropriate angled solid rail segment can be used to traverse the requirements of the staircase.

The materials and diameter and thickness of the rail segments are selected to optimize and maximize rail span of up to four feet between each modular upright post without sacrificing its strength and while maintaining the rail segment's straightness.

A number of different connection components can be used to secure rail segments to modular posts 266 and adjustable posts 268 as those post components are described above. One such connection component 386 is illustrated in FIGS. 147-151. This connection component 386 is useful as either the upper connectors (274, 292) or lower connectors (276, 294) described above and illustrated in FIGS. 125-129. In the embodiment of a connection component 386 illustrated in FIGS. 147-151, a friction fit metal on metal arrangement is used. The connection component 386 includes a first portion 388, a second portion 390, a collar 392, an internal clamp 394, and a set screw 396. The collar 392 is arranged such that the connection component 386 can be secure to either a modular post 266 or adjustable post 278. The first portion 388 and second portion 390 are arranged so that their outer diameter is sized such that the first portion 388 or second portion 390 can be inserted into the inner passage of a straight or curved rail segments. As will be described, the first portion 388 and second portion 390 are secured within the inner passage of a straight or curved rail segment via a friction fit arrangement.

Figure 150:
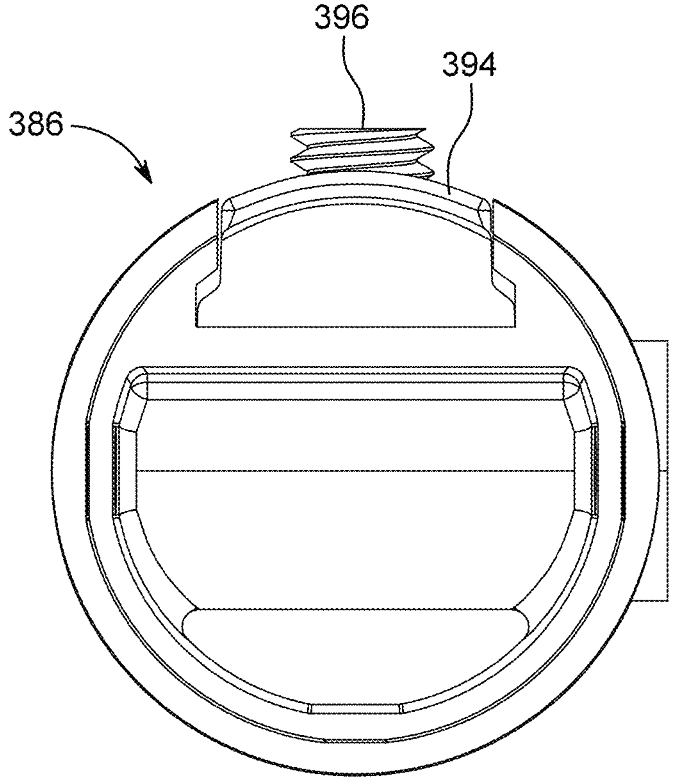
FIG. 150 schematically illustrates a plan view of the connection component of FIG. 147 with an internal clamp in a retracted position.
Figure 151:
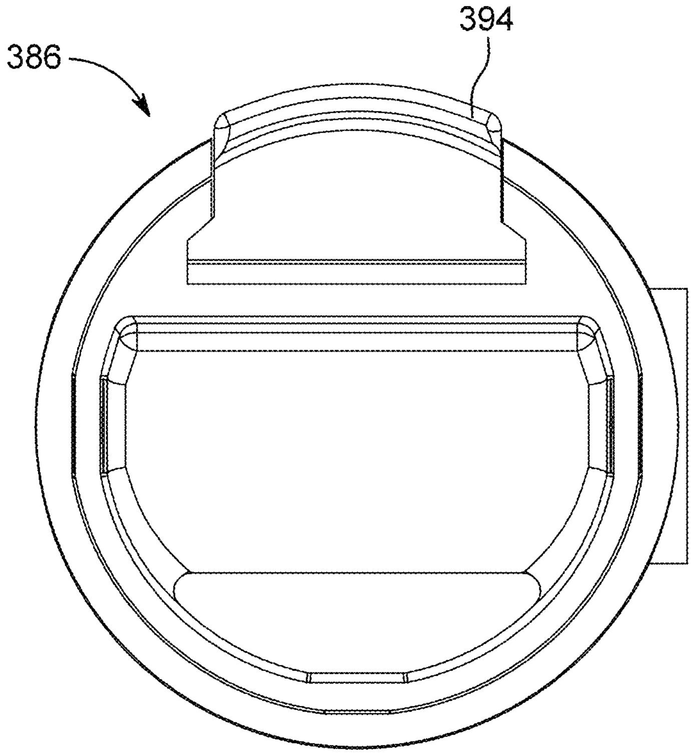
FIG. 151 schematically illustrates a plan view of the connection component of FIG. 147 with an internal clamp extended position.

The internal clamp 394 is engaged with one or more set screws 396. The engagement of the internal clamp 394 with the set screw 392 is arranged such that as when the set screw 392 is rotated in a clockwise direction (i.e., tightened), the internal clamp 394 moves outward and away from the surface of the first 388 and second 390 portions of the connection component 386. FIG. 150 illustrates the connection component 386 with the internal clamp 384 in a "retracted position" (i.e., set screw 396 not tightened), and FIG. 151 illustrates the connection component 386 in an extended position (i.e., the set screw 396 tightened such that the internal clamp 394 is moved outward and away from the surface of the first 388 and second 390 portions). Thus, during installation, an installer can place the first portion 388 into the inner passage of a rail segment and place the second portion 390 into the inner passage of another rail segment. The installer can then tighten the set screw 396 until the internal clamp 394 is sufficiently engaged in a friction fit with the inner surfaces of the inner passages of the rail segments, which will secure the rail segments to the modular or adjustable post as applicable. In such an arrangement, the ends of the two rail segments are abutted to the collar 392 leaving no gap between the ends of the two rail segments and the collar 392. This provides for proper positioning of the rail segments to the connection component 386 and a more structurally stable connection.

In another embodiment, the connection component 386 is engaged with straight or curved rail segments using the friction fit arrangement described above, and additionally, an epoxy is applied to the outer surface of the internal clamp 268, the first portion 388, and second portion 390 portion of the connection component 260. When the internal clamp 394, first portion 388, and second portion 390 are inserted into rail segments and the internal clamp 394 is deployed, the epoxy will adhere the connection component 386 to the surface of the inner passage of the rail segments to further secure the engagement of the connection component 386 and the rail segments.

Figure 152:
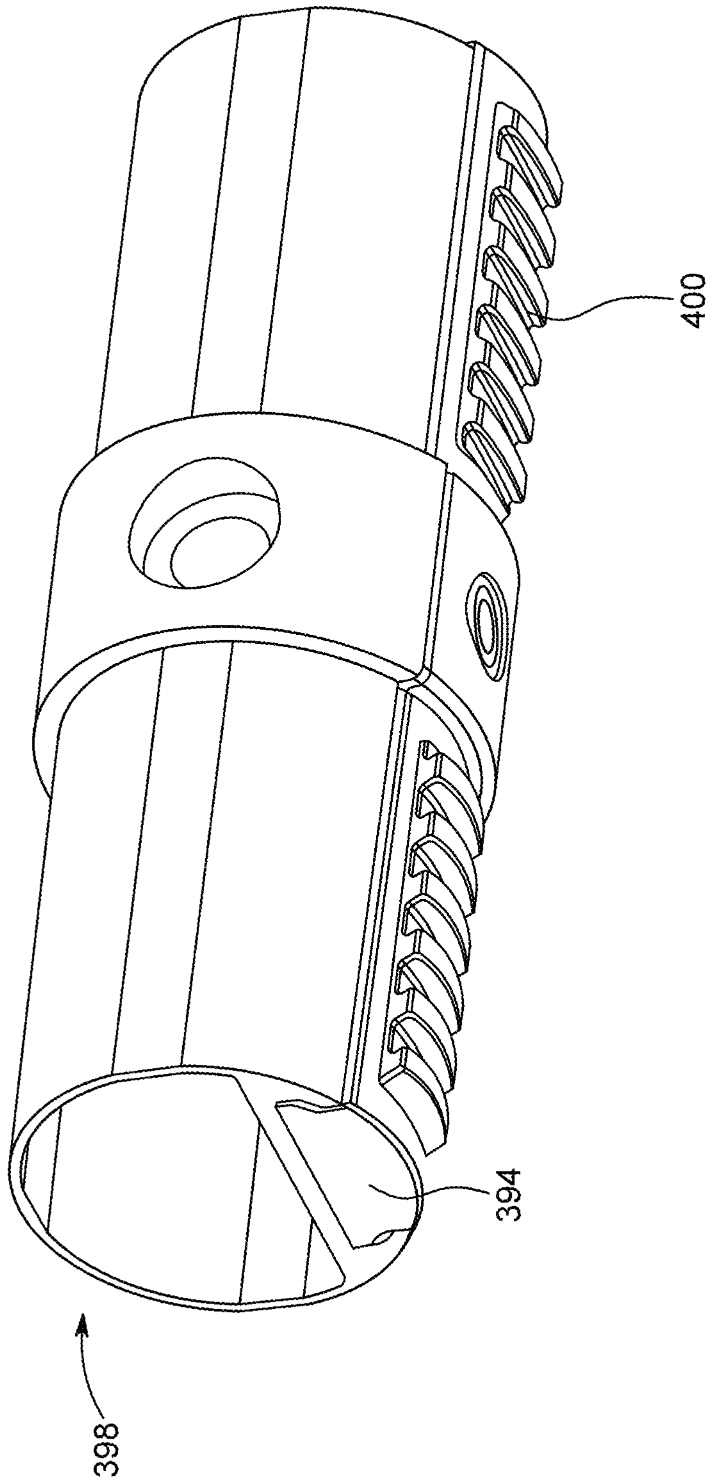
FIG. 152 schematically illustrates a rubber connection component.

FIG. 152 illustrates another embodiment of a connection component 398. This connection component 398 is generally as described above for connection component 386 of FIGS. 147-148. However, this embodiment of the connection component 398 includes an additional friction component 400 secured to the internal clamp 402. In one example, the friction component 400 is a rubber pad positioned on the exterior surface of the internal clamp 402. As will be appreciated, when the internal clamp 402 is deployed, the addition of a friction component 400 such as a rubber pad will increase the friction fit between the connection component 398 and the surface of the inner passage of a rail segment to further secure the engagement of the connection component 398 and the rail segments.

In another embodiment, connection components secure straight or curved rail segments to modular or adjustable posts using the friction methods as described above, but the lengths of the first portion, second portion, and inner clamp of the connection component are increased to enhance the contact surface with the rail segments. In one example, the lengths of the first portion, second portion, and inner clamp are doubled, which doubles the contact surface between the inner clamp and the surface of inner passages of rail segments. It will be appreciated that such an increase in contact surface will increase the amount of friction between the such an elongated connection component and internal surfaces of mating rail segment.

Figure 153:
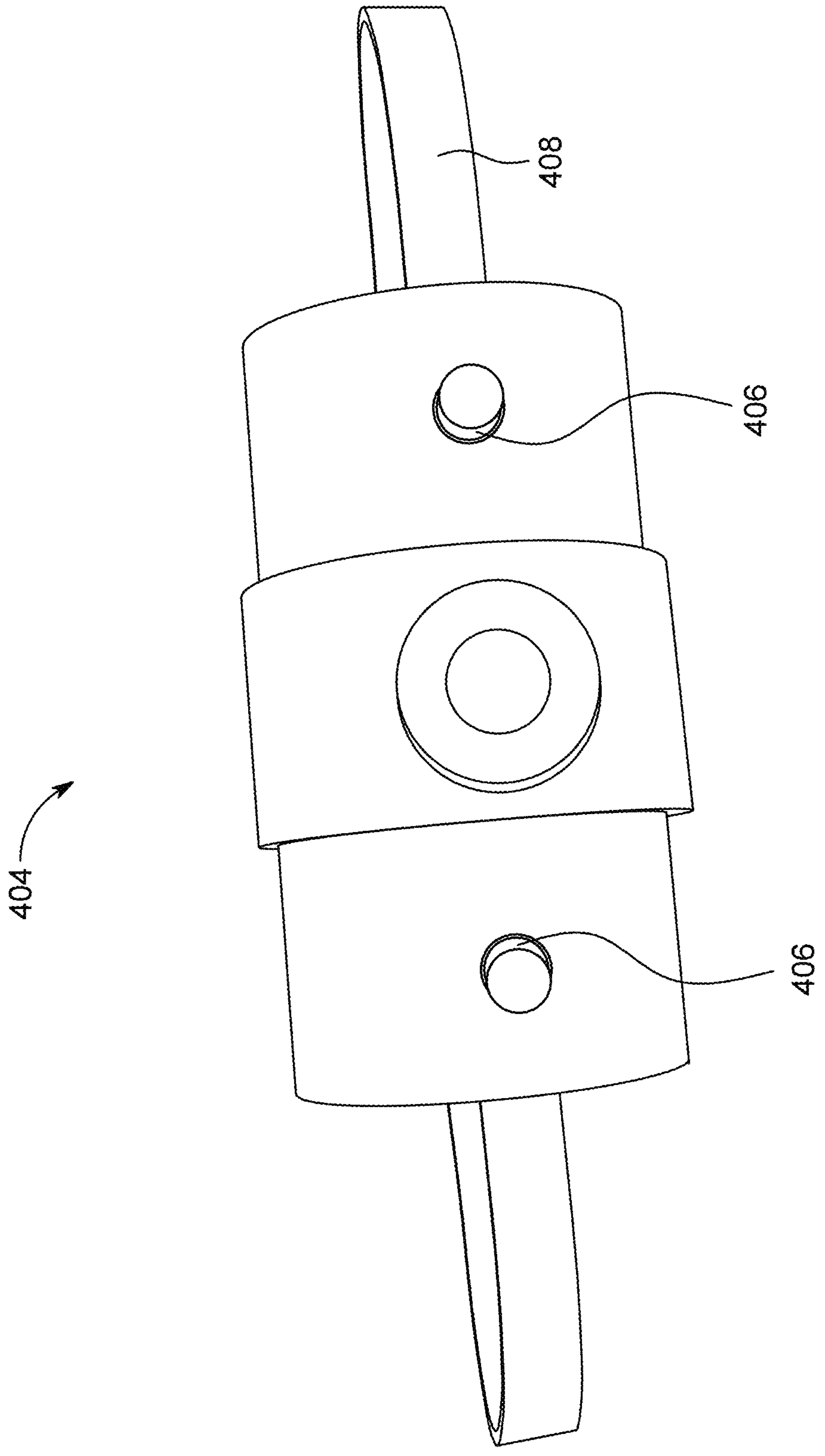
FIG. 153 illustrates a push-pin spring mechanism for use with connection components and rail segments.

In another embodiment of a connection component 404, illustrated in FIG. 153, the friction fit method described above is used but further includes drilling holes 406 in the connection component 404 and matching holes (not illustrated) in the mating rail segments. The holes 406 can be drilled such that a push-pin spring mechanism 408 can be positioned so that it mechanically locks the connector component 404 and rail segment together adding an incremental securing force in addition to the friction fit method provided by engagement of the internal clamp. In yet another embodiment, a connection component can include only the push-pin spring mechanism and drilled holes.

Figure 154:
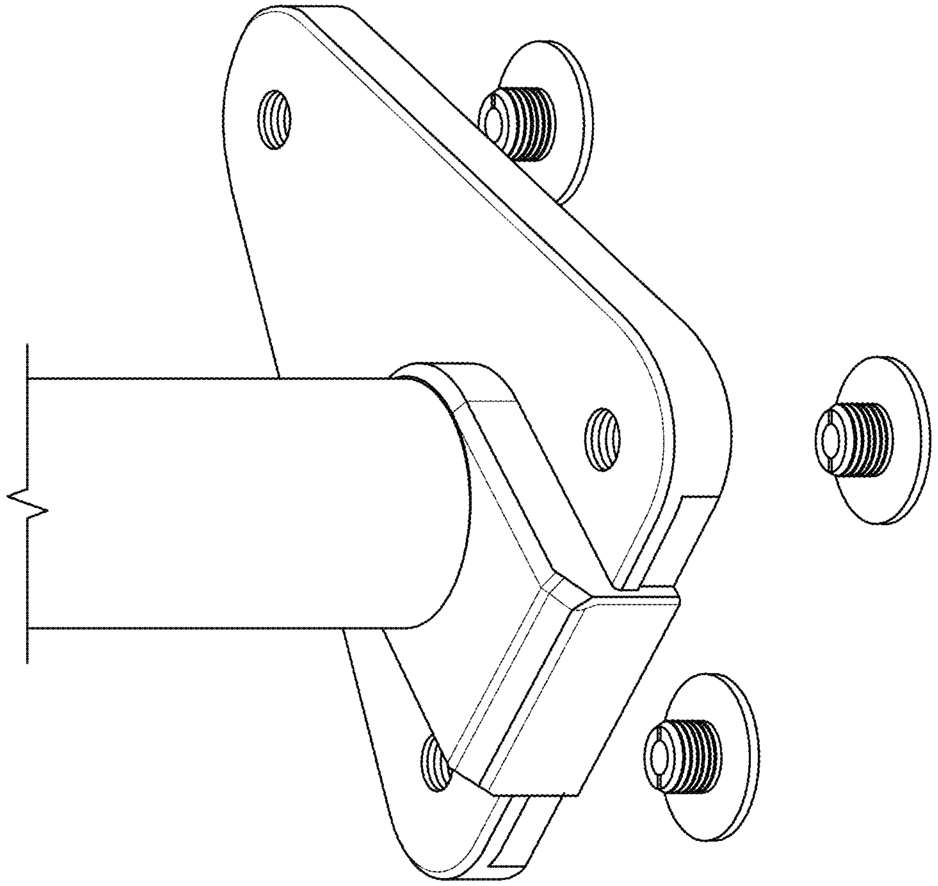
FIGS. 154-156 schematically illustrate an upright foot assembly for a modular post.
Figure 154:
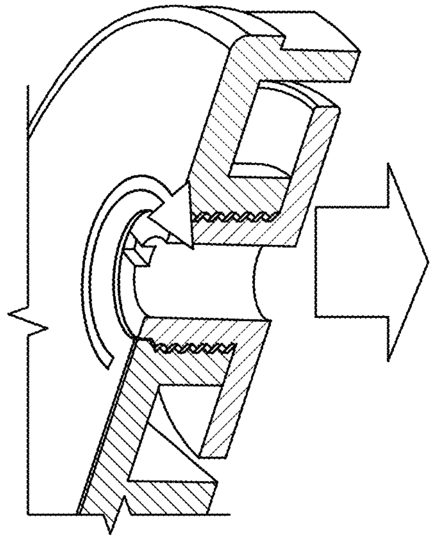
Figure 155:
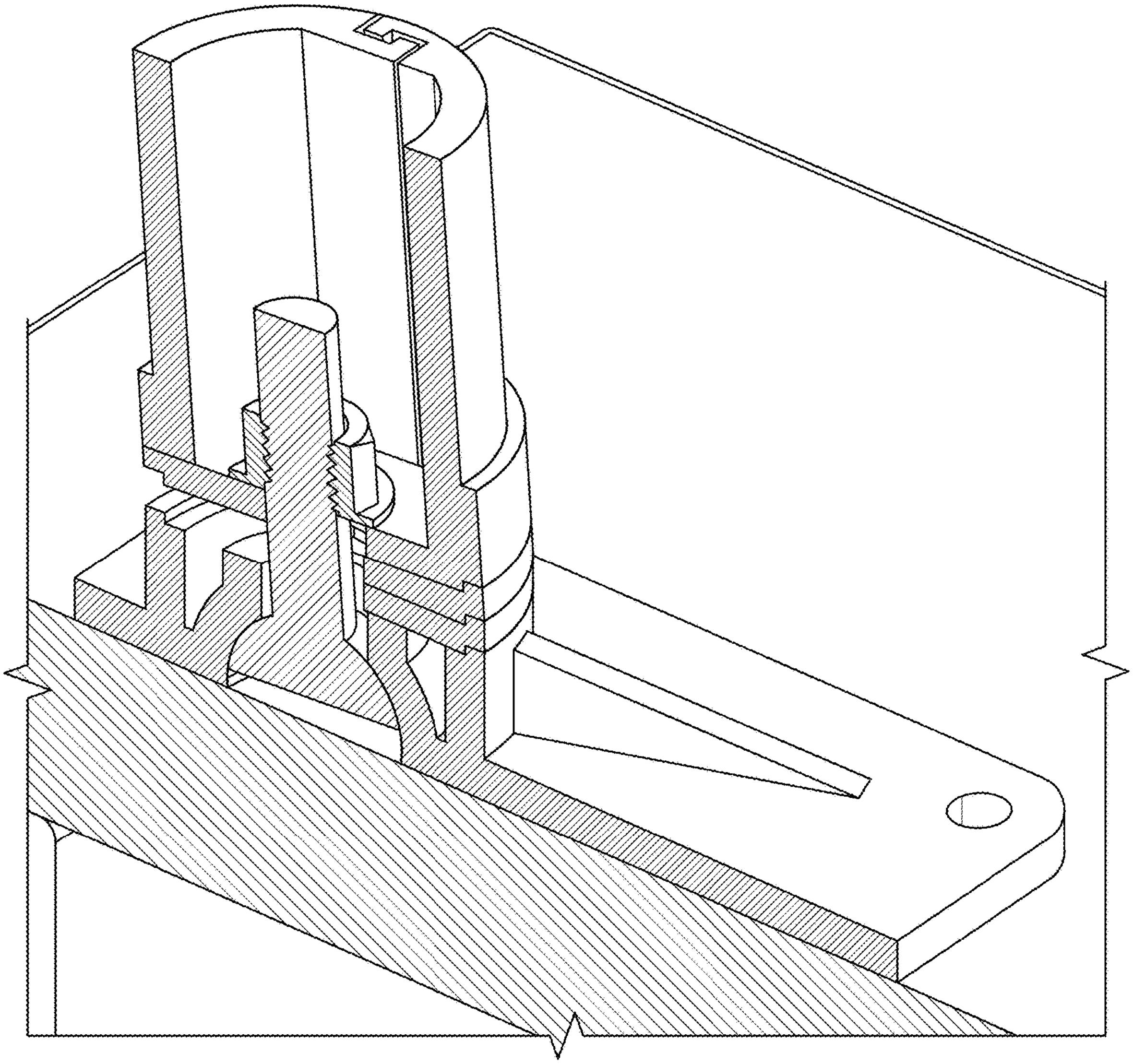
Figure 156:
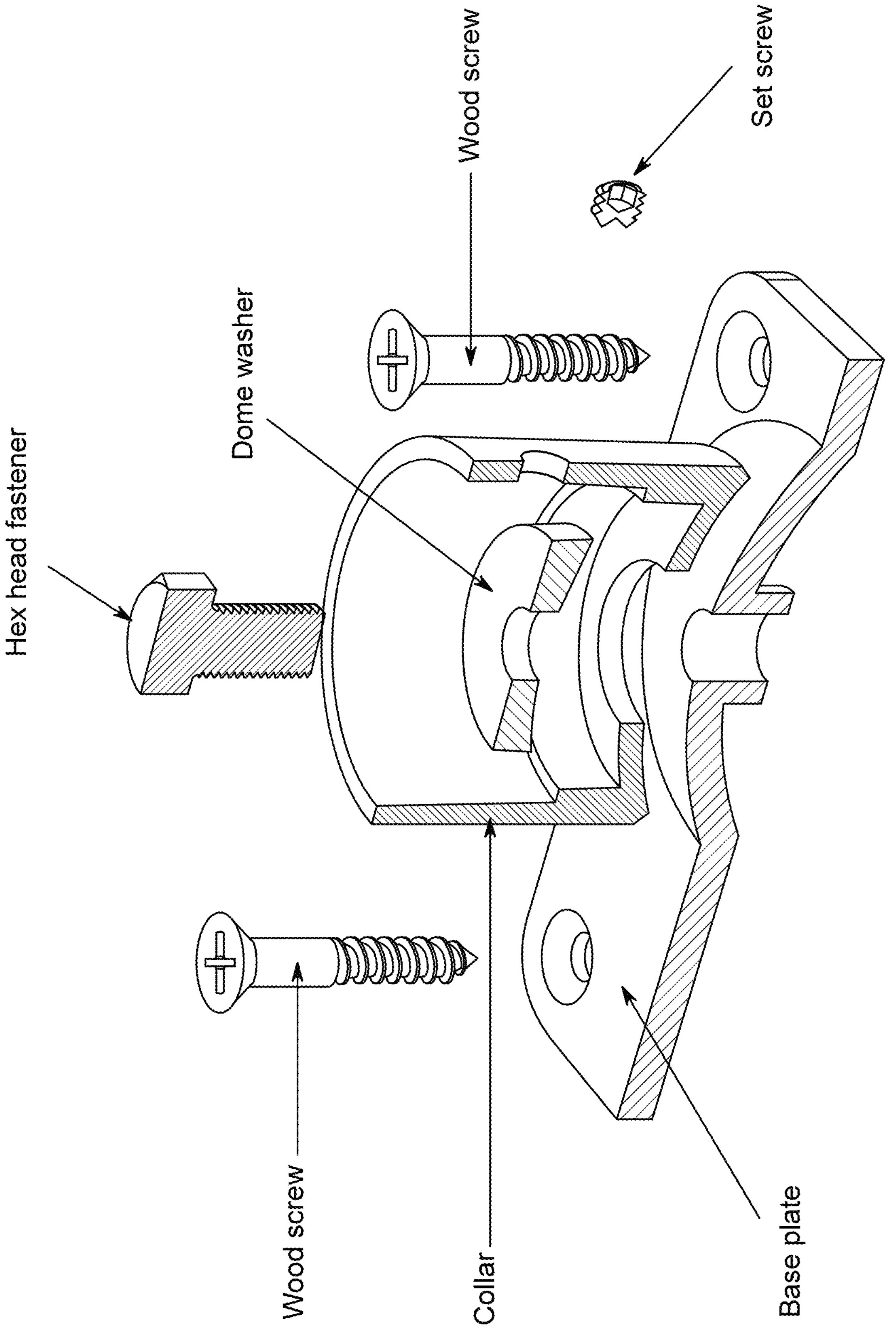

FIGS. 154-156 schematically illustrate an upright foot assembly for a modular post or adjustable post. In one embodiment, the base of the post can be designed such that as it connects to a first tube of an adjustable post or to a modular post, there can be relative three-dimensional movement between the tube or post and the upright foot assembly. This is to say that the tube or post can rotate, pivot and self-adjust relative to the upright foot assembly to ensure that when the modular or adjustable post is fully installed, the orientation of the post is both level and plumb.

Generally, for the modular and adjustable posts, collets used are self-centering so as to keep the rail segments concentric, minimize the space required between wall and stair lift, i.e., provide for a narrow profile, and keep a distance from edge of stair tread as not to crack the wood of the stair tread, The upper post of an adjustable post is designed to be reusable in that an addition of a welded plate transforms the upper post into a terminating post.

Figure 157:
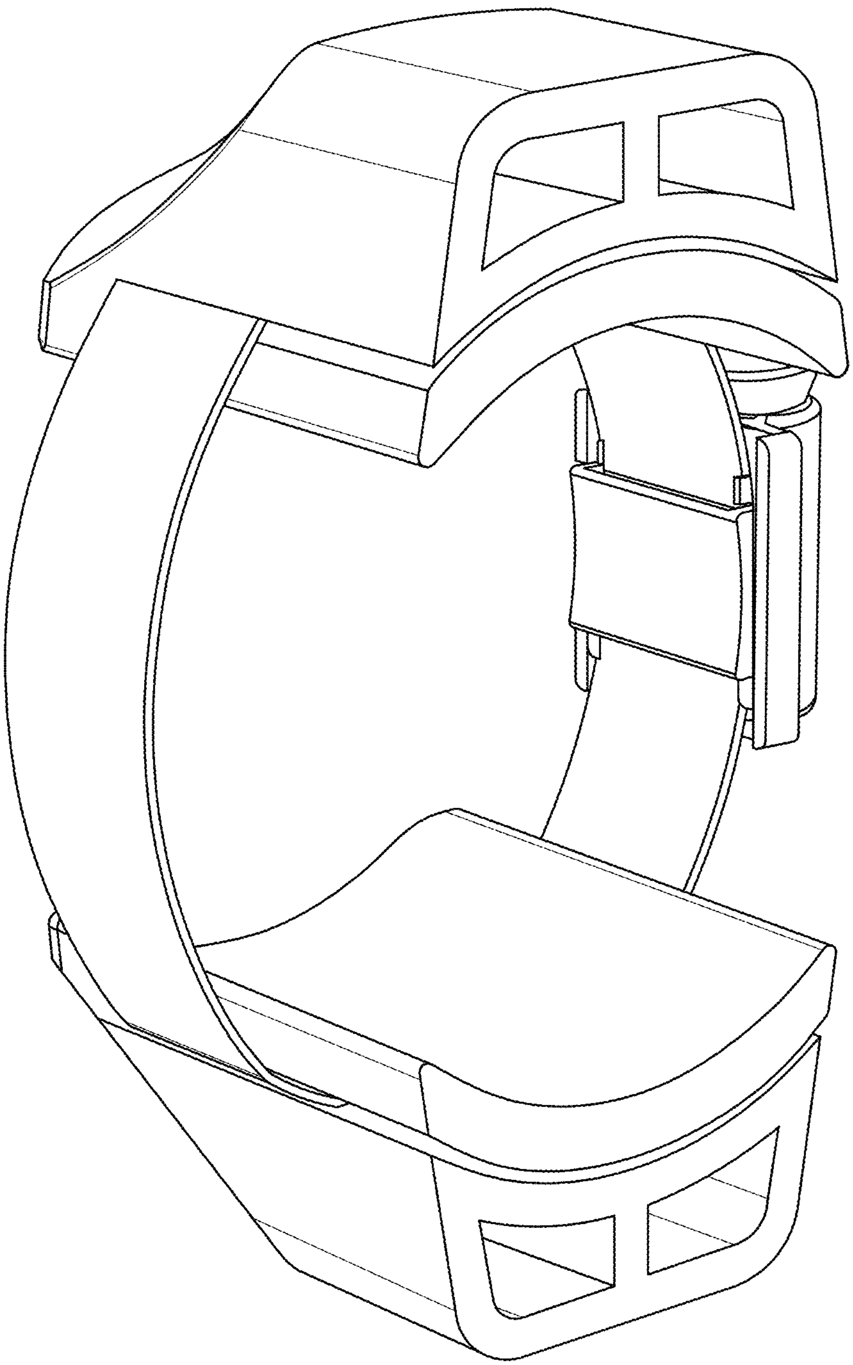
FIG. 157 schematically illustrates a stop mechanism.

In one embodiment, a mechanical end stop mechanism is attached using a hose clamp to each end of a rail, one at the top of the staircase and one at the bottom of the staircase to physically limit the travel of a chair traveling along the rail. Such physical limits or stops prevent the chair from continuing to move when the chair reaches the stop mechanism. The stop mechanism acts as a wedge, forcing each friction roller wheel to stop as it acts as an expansion of the diameter of the rail segment. The fiction roller cannot overcome this greater diameter, and the chair comes to rest. FIG. 157 illustrates such a stop mechanism.

Figure 158:
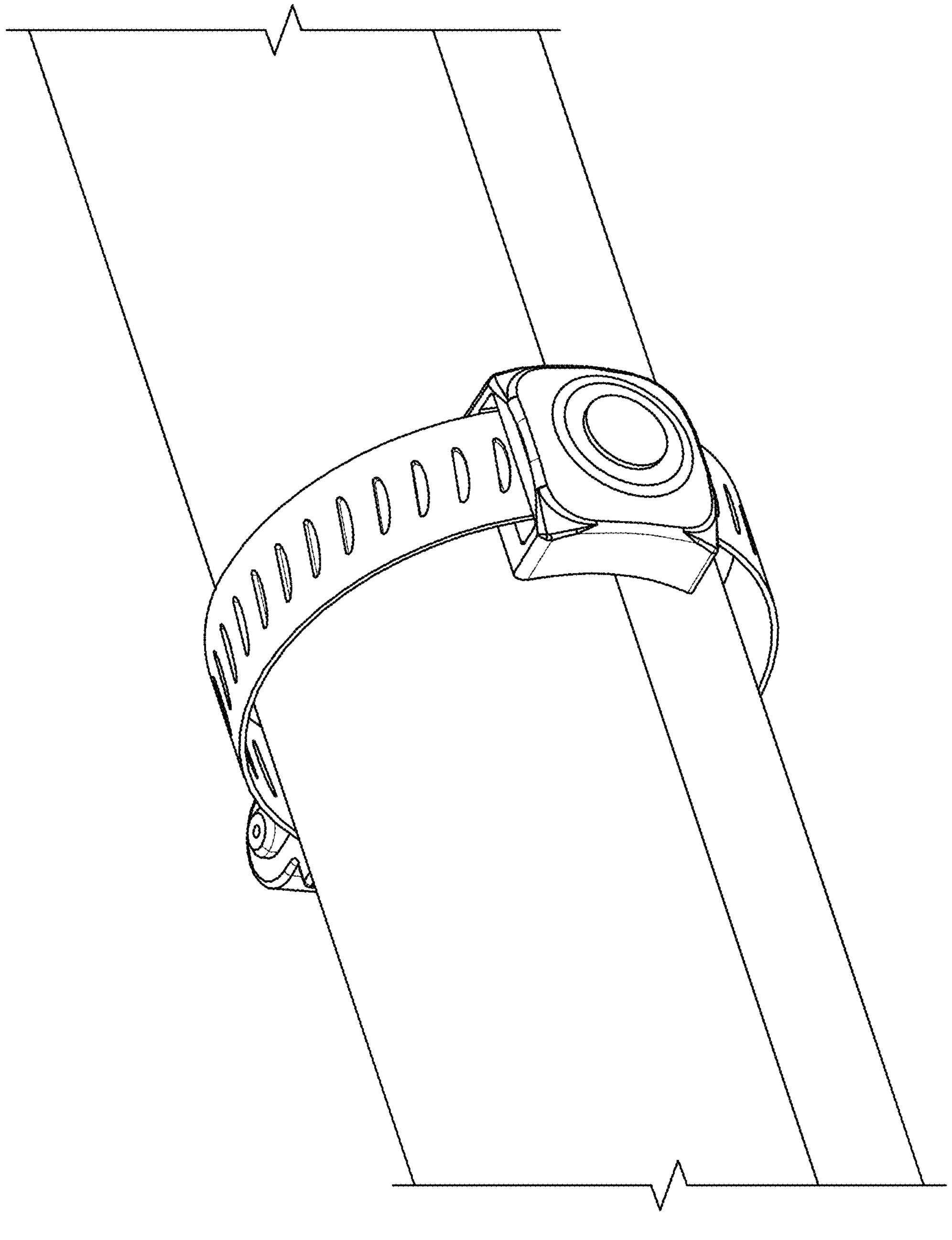
FIG. 158 schematically illustrates a rail proxy sensor.

FIG. 158 schematically illustrates a rail proxy sensor. In this embodiment, the mechanical proximity sensor is attached to a rail segment using a hose clamp at any desired location. This proximity sensor contains a magnet that works with a sensor on the chair to act as a beacon. These beacons signal to the stair lift system whether it should speed up, slow down, stop, allow for a seat swivel, determine the direction of the seat swivel, or otherwise change its behavior. These beacons are also useful in determining the position of the chair along the staircase and whether the chair is approaching or has reached the end of the rail assembly either at the top or bottom of the staircase.

In one embodiment, proxy sensors are installed along the rail assembly when the stair lift system is installed. The number and location of the proxy sensors can be determined by the requirements of the specific application of the stair lift system. In typical applications, proximity sensors can be installed before and after curved segments to slow down the speed of the chair relative to the rail system as the chair enters and exits the curved segments and increase the speed to normal speed when the chair exits the curved segments. Proximity sensors can be installed at the top and bottom of the rail system to provide a mechanism for the stair lift system to determine that the chair is approaching or arrived at an end of the rail system. With such a determination, the chair will be stopped and prevented from traveling further along the rail system. The proximity sensors can also be arranged to determine which direction the chair is traveling along the rail system. Such information can be used to determine which direction the seat can be swivel for safe ingress and egress of the chair. Proximity sensors can also be installed at a landing of a staircase to allow for the chair to be stopped at the landing. Proximity sensors can also be coupled with charging components to indicate that the chair is in a position to charge its onboard battery. The stair lift system can be programmed to stop travel such that such charging components can charge the onboard battery. In accordance with the overall modular design of the stair lifts systems described herein, the location and particular functionality of the proxy sensors can be determined at the time of installation by an installer based on customer preferences and customer requirements for each unique installation.

It will be understood that during installation, when a modular rail assembly is constructed and installed and the proxy sensors are positioned along the rail, the stair lift system can be programmed to efficiently and effectively use the proximity sensors in the operation of the stair lift system. This process begins by mounting the chair onto one end of the rail system and placing a touchscreen or other such device associated with the stair lift system into a programming sequencing mode. The chair is advanced along the rail system until the chair is in contact with a first proximity sensor. The touchscreen will indicate that the first proximity sensor is identified, and the installer can use the touchscreen to select what action or actions the chair needs to take at that specific location. Because this is the first proxy sensor located near an end of the rail system, the chair will need to be aware that this proximity sensor identifies when the chair is approaching an end of the rail system, and the chair will need to stop and further travel beyond the proximity sensor is the be prevented. Additionally, this first proximity sensor is used to determine that the chair is in position to be swiveled to accommodate safe egress or ingress of the chair. The direction of permitted swivel (left or right depending on the installation requirements and whether chairs is at the top or bottom of the staircase) can be programmed by the installer using the touchscreen. Such information can be programmed using the touchscreen via straightforward on-screen point and click button functionality. Once the information is programed for the first proximity sensor, the chair can then be driven along the rail system until the next proxy sensor is identified. Once again, the chair can be stopped at the proximity sensor and actions can be programmed via the touchscreen. For example, the stair lift system can be programmed to travel at the normal operational speed, slowed down, stopped, allowed to swivel (e.g., if the sensor is positioned at a landing that has a doorway, closet or other reason for user to dismount the chair), or strictly prevent swiveling of the chair (e.g., if this sensor was over a set of stairs where ingress or egress cannot be accomplished safely). It will be understood that during installation of the stair lift system, this process will be repeated until all the stair lift system is programmed to manage all proximity sensors.

Figure 159:
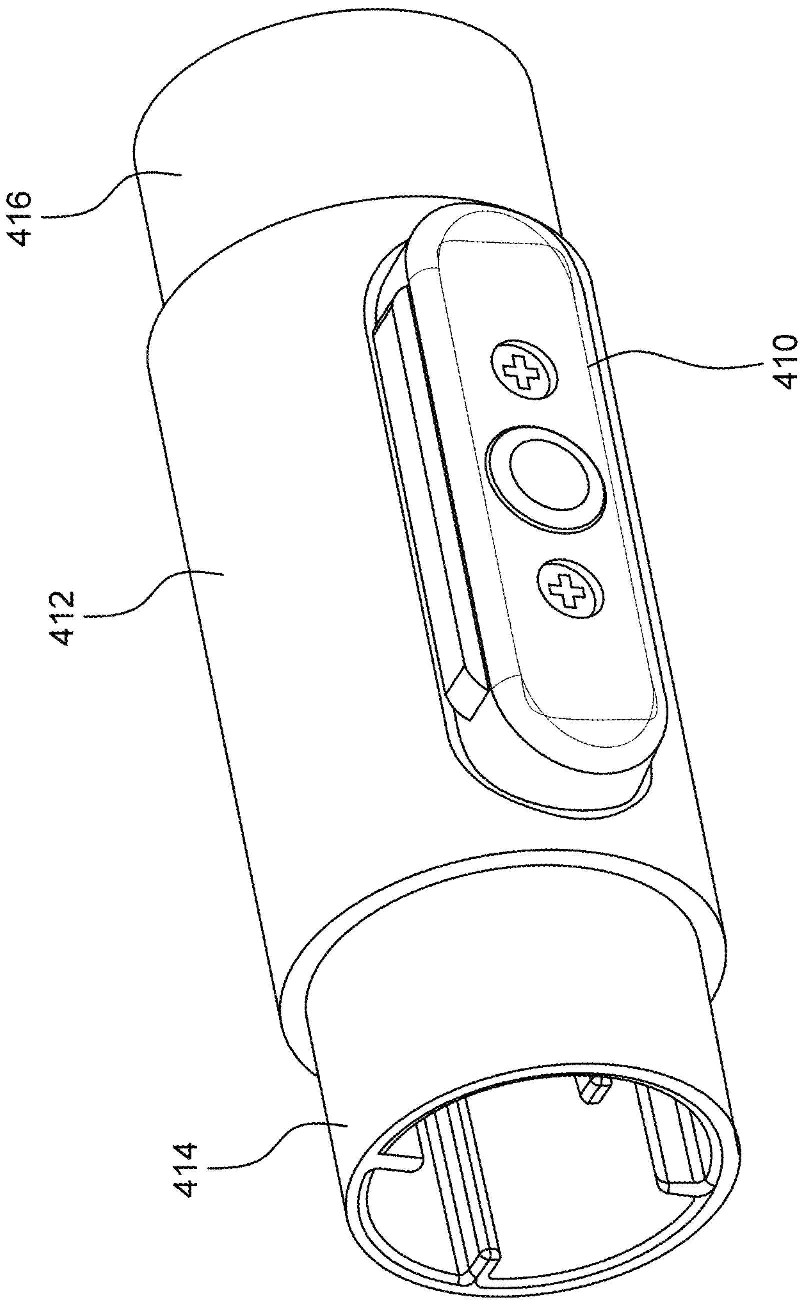
FIG. 159 schematically illustrates a charging pad attached to a rail segment.

FIGS. 159-175 schematically illustrates a number of charging systems for recharging the onboard battery of the stair lift system. The charging systems are designed to attach to different components and at different locations along the stair lift system. FIG. 159 illustrates one embodiment of an electro-mechanical charging pad 410 that is secured to a modular rail insert 412. The modular rail insert 412 is arranged to be incorporated into a modular rail system. The modular rail insert 412 includes a pair of recessed surfaces 414, 416 arranged to couple with modular rail segments (i.e., the recessed surfaces 414, 416 are arranged to fit into the inner diameter of the modular rail segments). With such an arrangement, the modular rail insert 412, and thus the charging pad 410, can be inserted in between two modular rail segments and incorporated into a modular rail assembly. The modular rail insert 412 can be incorporated into the modular rail assembly at a location where the chair assembly is typically at rest, such as at the top or bottom of the staircase. The chair assembly can be arranged such that when it comes to rest at the location of a charging pad 410, mechanisms in the chair assembly interact with the charging pad 410 to initiate charging of the onboard battery.

Figure 160:
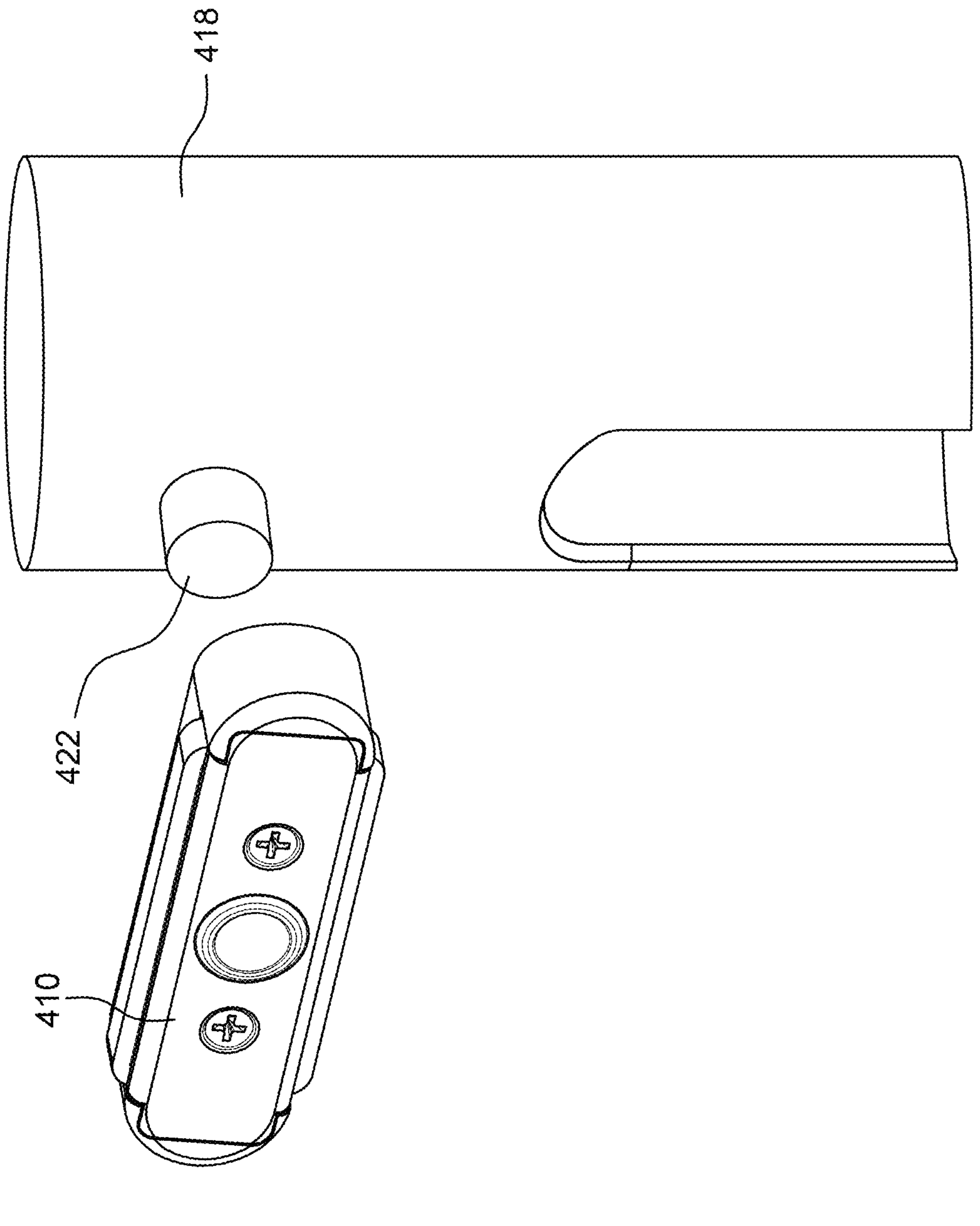
FIG. 160 schematically illustrates a charging pad and a post sleeve.
Figure 161:
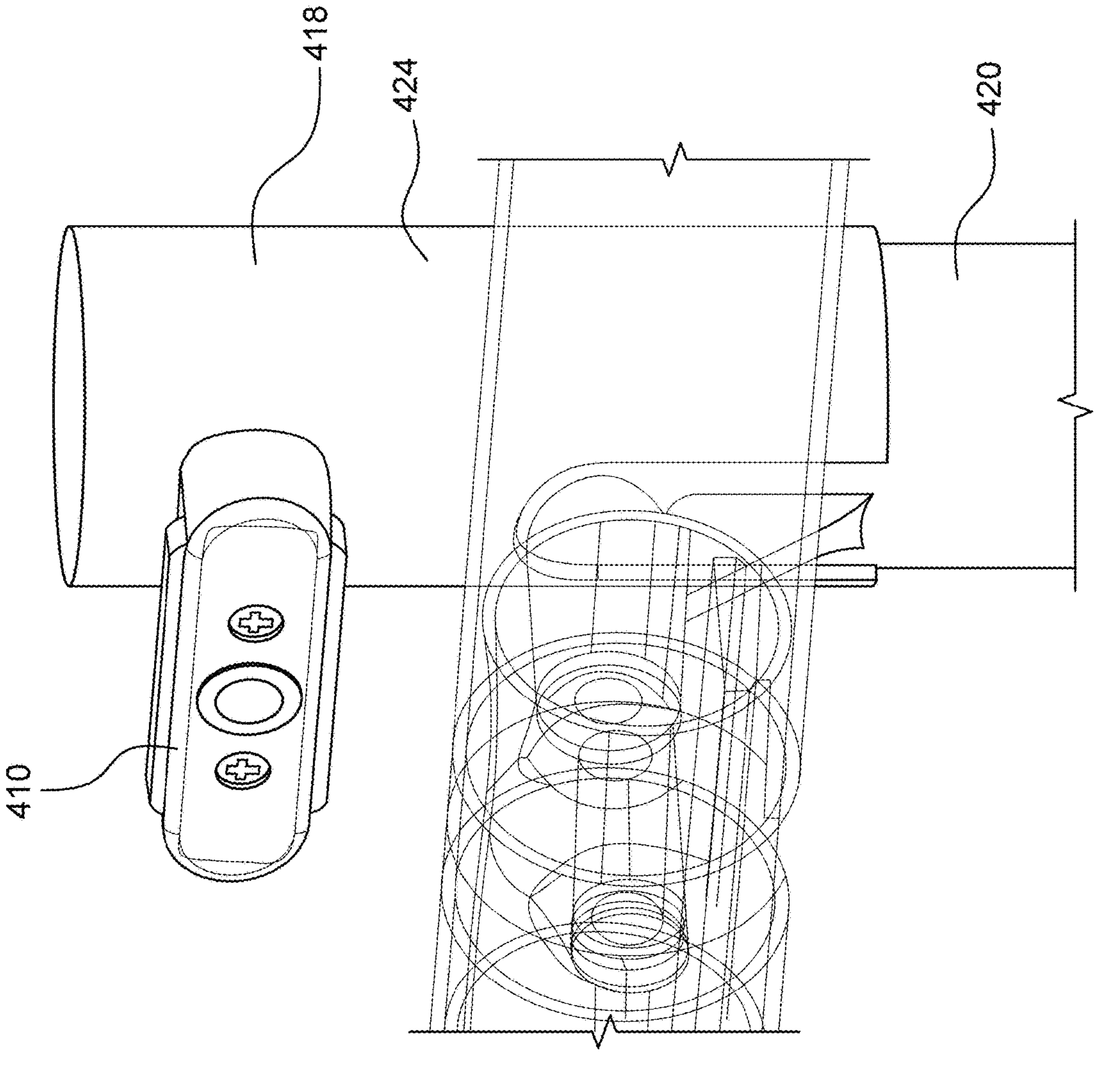
FIG. 161 schematically illustrates a charging pad attached to a post sleeve which is disposed on a post.
Figure 162:
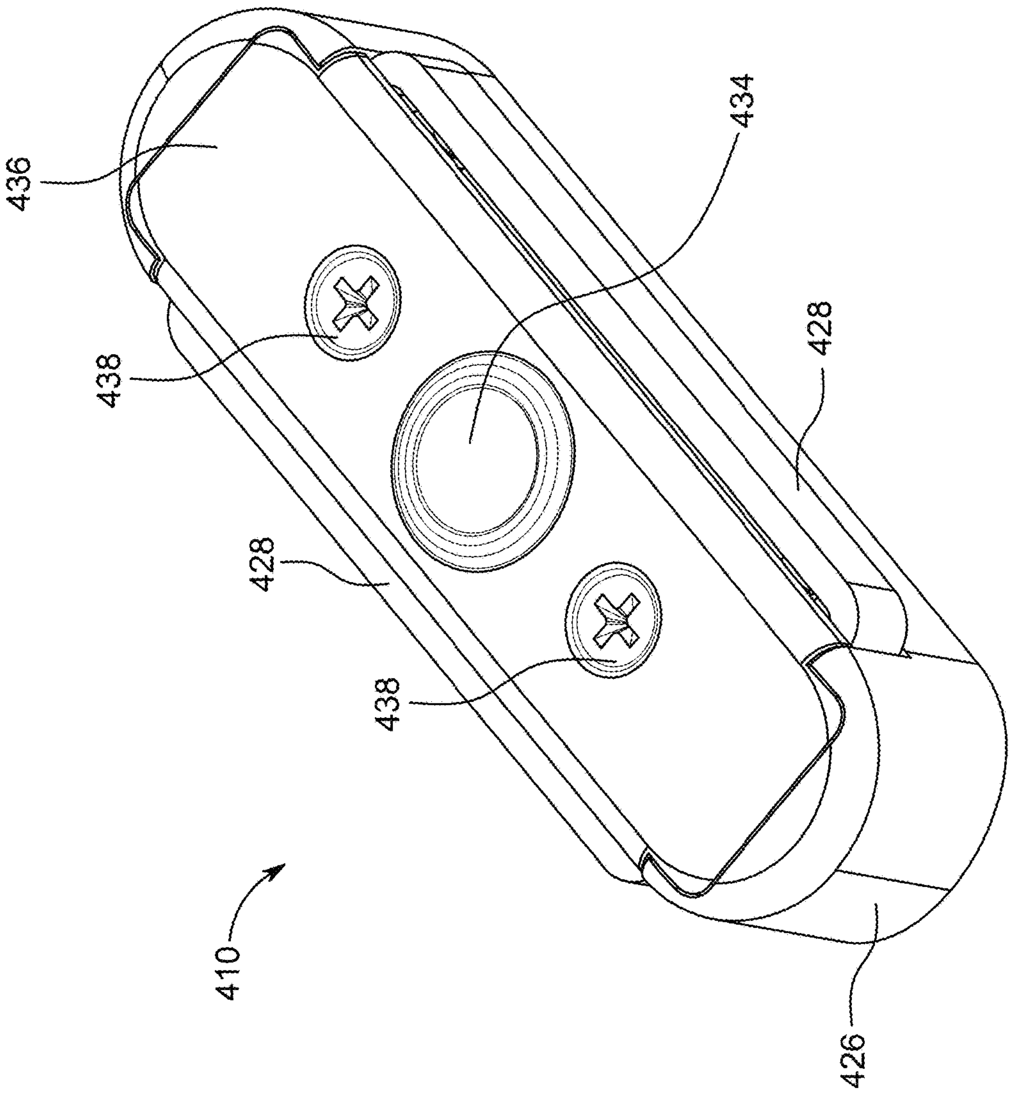
FIG. 162 schematically illustrates a perspective view of a charging pad

FIGS. 160 and 161 illustrate another embodiment of an electro-mechanical charging pad 410. In this embodiment, the charging pad 410 is arranged to be secured to a post sleeve 418, which is then placed over a terminal post 420 so that the charging pad 410 is positioned near where the chair assembly typically is at rest. such as at the top or bottom of the staircase. The post sleeve 418 includes a stub 422 to which the charging pad is secured. As illustrated in FIG. 161, the charging pad 410 is positioned near the rail segment 424 that supports the chair assembly and is aligned such that the charging pad 410 matches the angle of the rail segment 424. The chair assembly can be arranged such that when it comes to rest at the location of a charging pad 410, mechanisms in the chair assembly interact with the charging pad 410 to initiate charging of the onboard battery.

Figure 163:
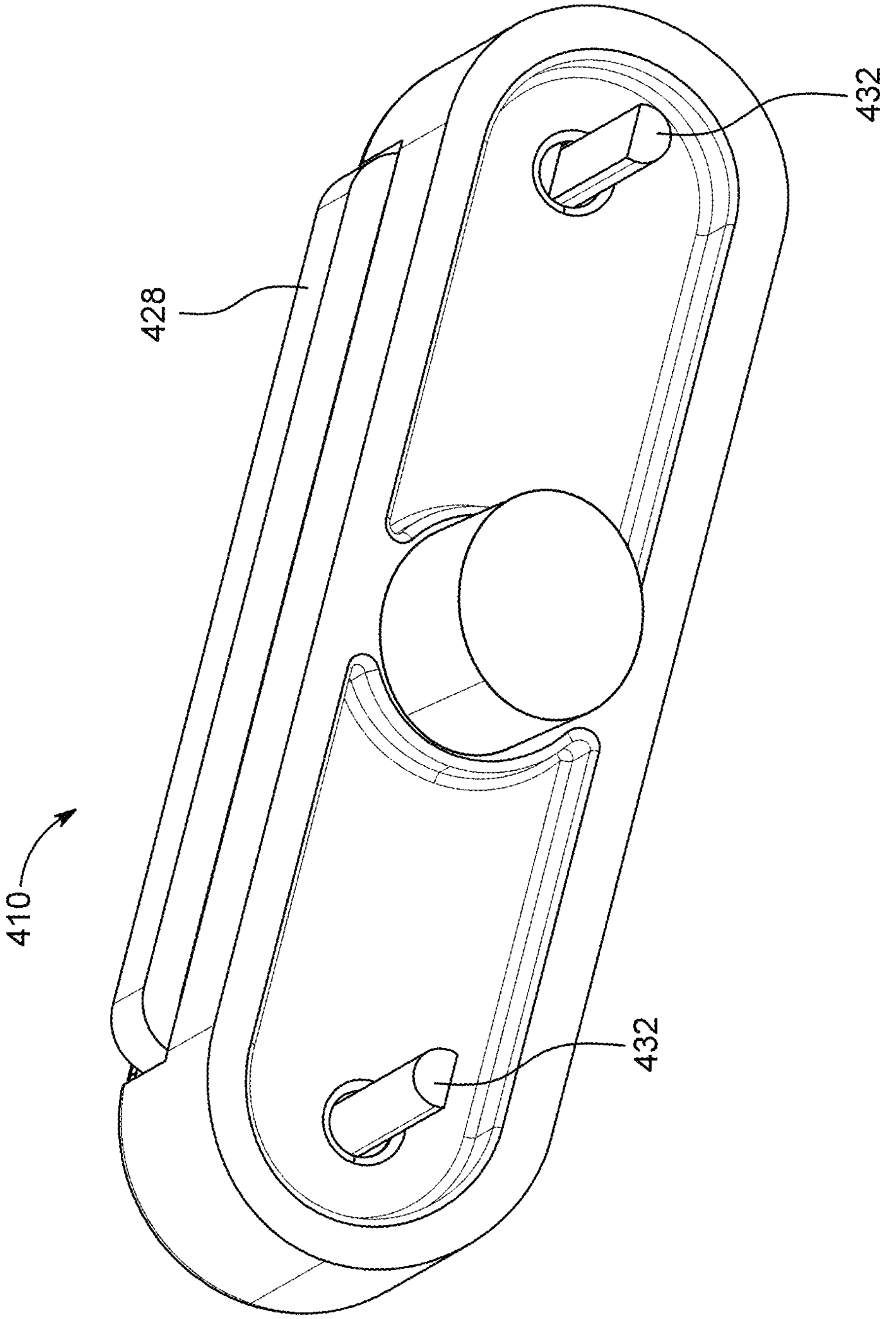
FIG. 163 schematically illustrates another perspective view of a charging pad.
Figure 164:
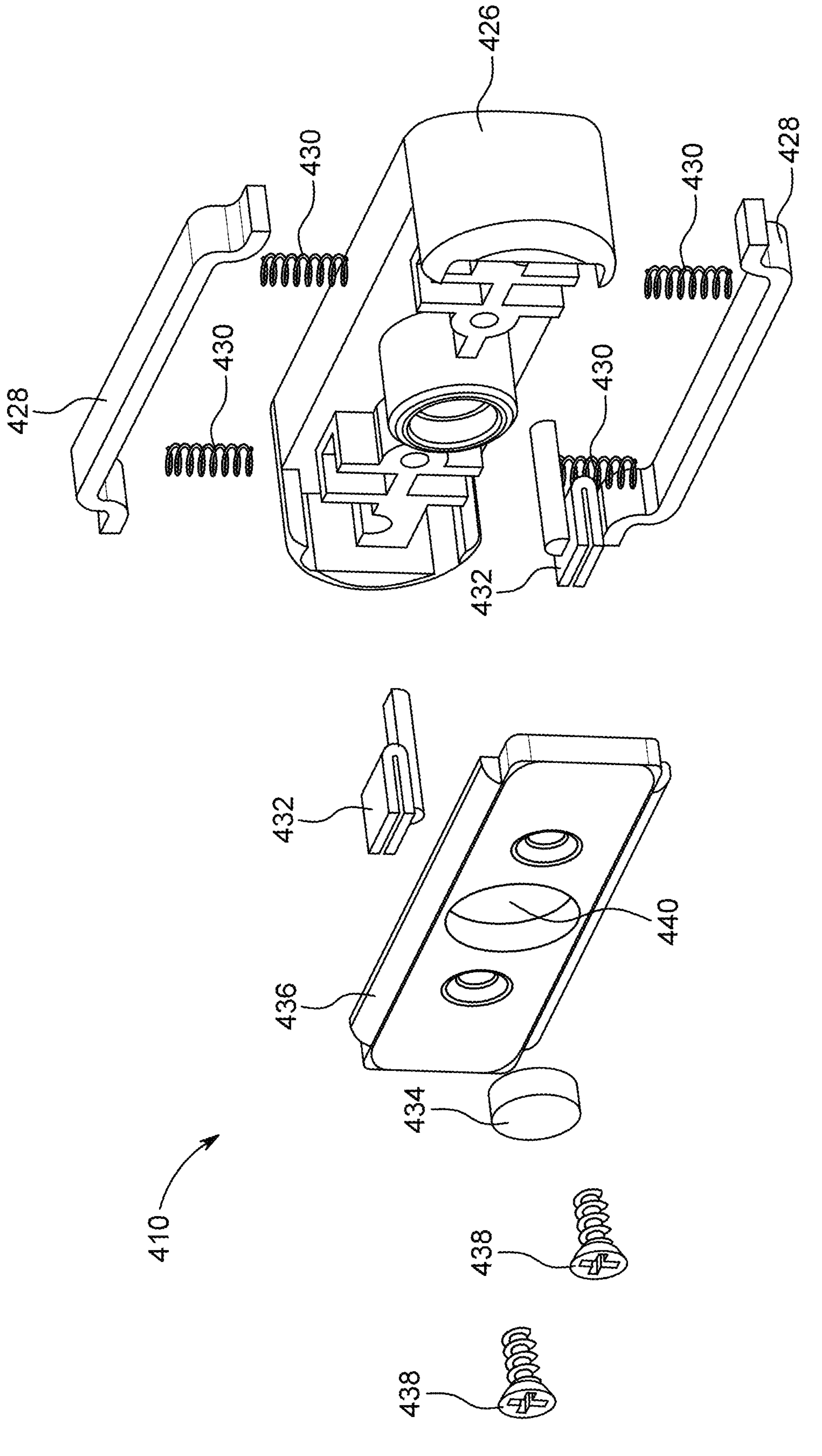
FIG. 164 schematically illustrates an exploded view of a charging pad.
Figure 165:
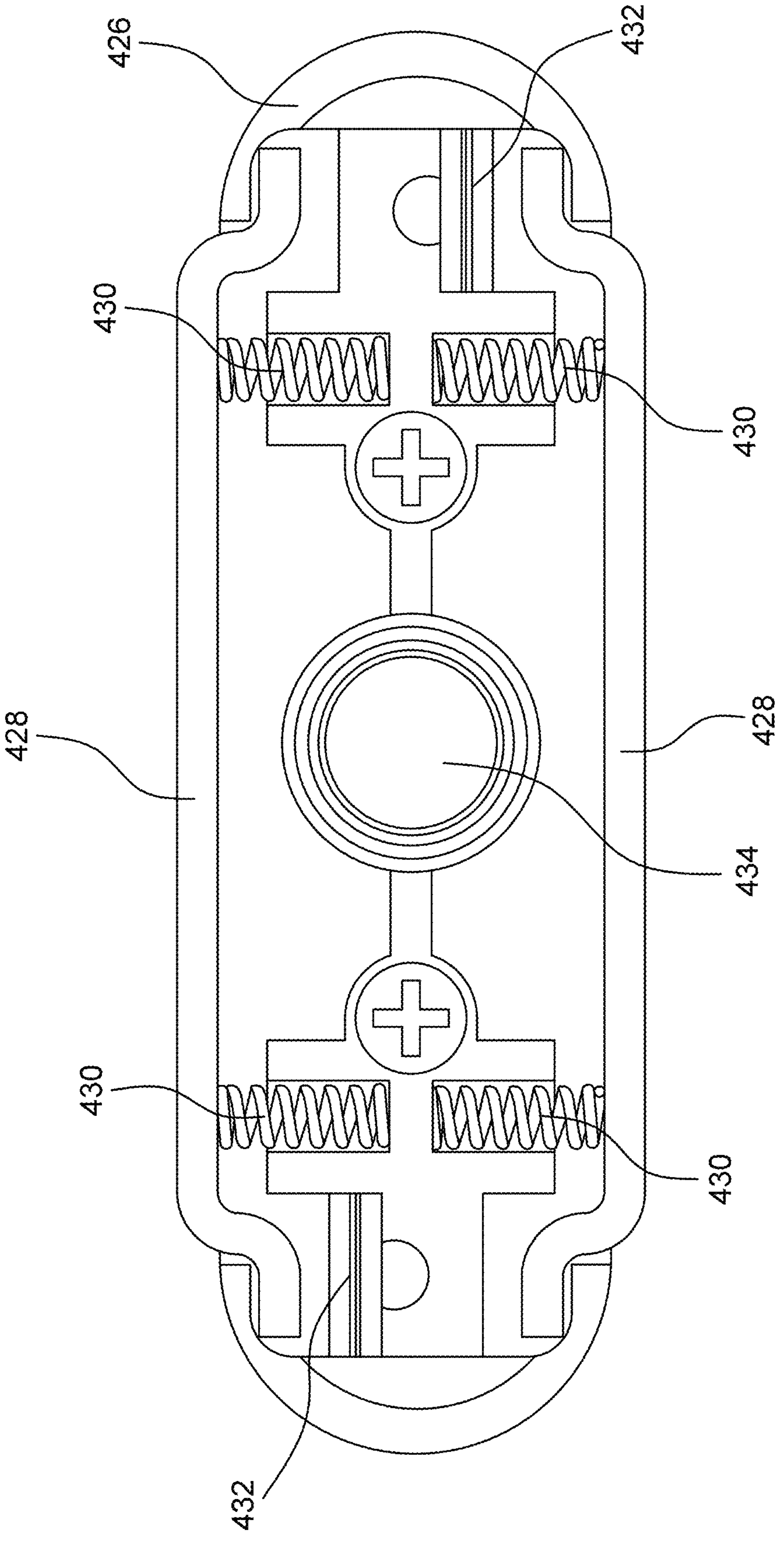
FIG. 165 schematically illustrates a top plan view of a charging pad with the cover removed.
Figure 166:
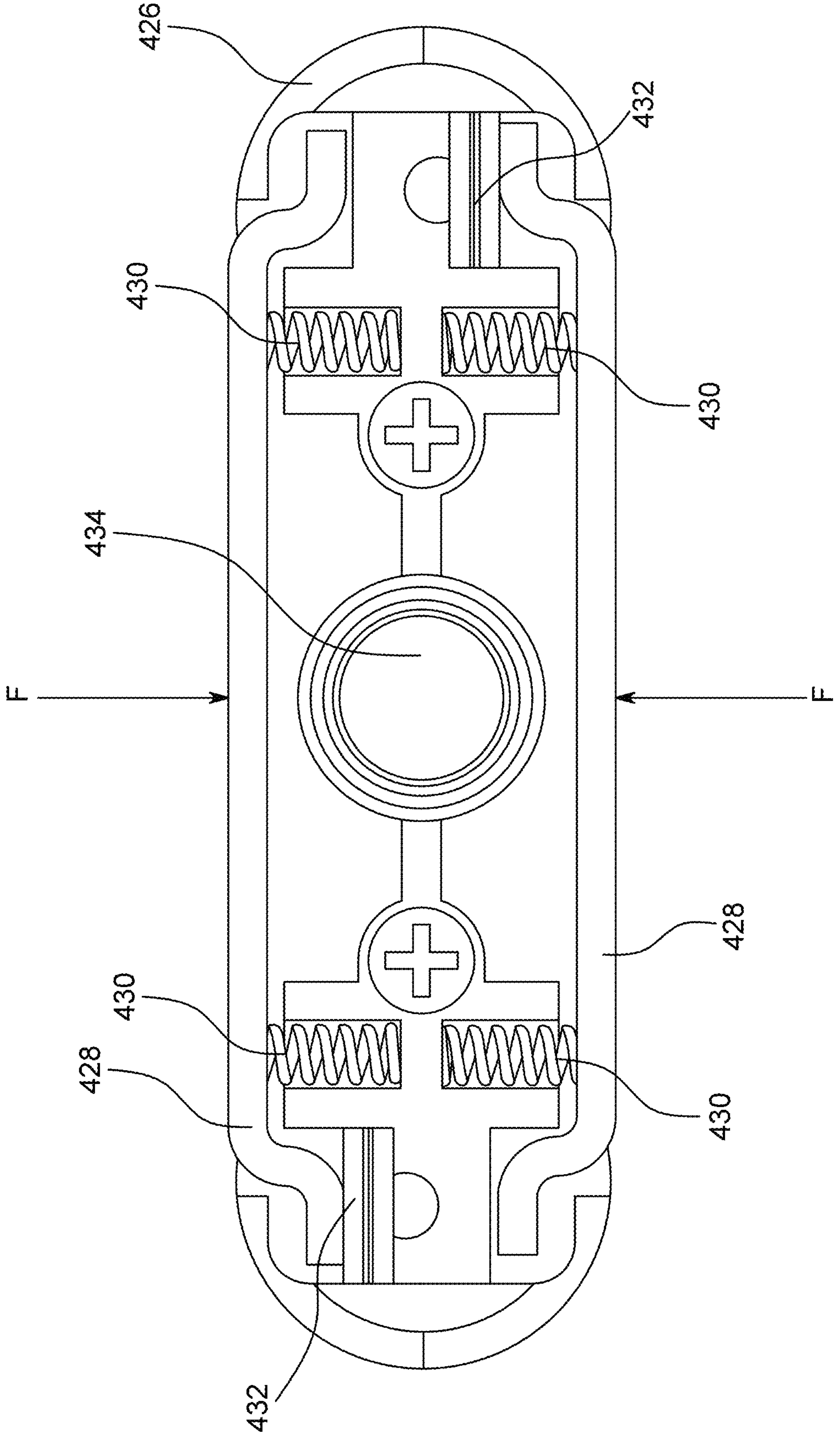
FIG. 166 schematically illustrates a top plan view of a charging pad with the cover removed and the contacting strips depressed.

FIGS. 162-166 illustrate various views of the charging pad 410. The charging pad 410 includes a housing 426, two contacting strips 428, four springs 430, two contacting rods 432, a beacon 434, a cover 436, and a pair of screws 438. The cover 436 can be secured to the housing 342 with the two screws 438 to secure the remaining components within the housing 426. One contacting strip 428 is positioned on each side of the charging pad 410, and each contacting strip 428 is engaged with two springs 430 biasing the contacting strips 428 away from the housing 426 of the charging pad 410. The two contacting rods 432 are statically positioned within the housing 426, with one contacting rod 432 positioned proximate to one of the contacting strips 428. The beacon 434 is positioned within the housing 426, with a portion of the beacon 434 exposed by an aperture 440 in the cover 436. As best illustrated in FIG. 165 (the charging pad 410 with the cover 436 removed), when there are no exterior forces applied to the contacting strips 428 of the charging pad 410, the springs 430 bias the contacting strips 428 outward and create a gap between the contacting strips 428 and each respective contacting rod 432. However, as best illustrated in FIG. 166, when there is an exterior force applied to the contacting strips 328 of the charging pad 410, the bias of the springs 430 is overcome and the contacting strips 428 move inward until the contacting strips 428 contact each respective contacting rod 432. Such contact completes an electrical circuit and allows current to flow through the contacting strips 428 and contacting rods 432. It will be appreciated that the power cable located in the modular rail system can be connected to the charging pad 410 to supply the electric current needed for the circuit. As best illustrated in FIG. 163, a portion of each contacting rod 432 extends through the backside of the charging pad 410. The power cable or other power supply can be coupled to the portions of the contacting rods 432 extending from the backside of the charging pad 410 to supply electrical power to the charging pad 410 and ultimately to an onboard battery of the stair lift system.

Figure 167:
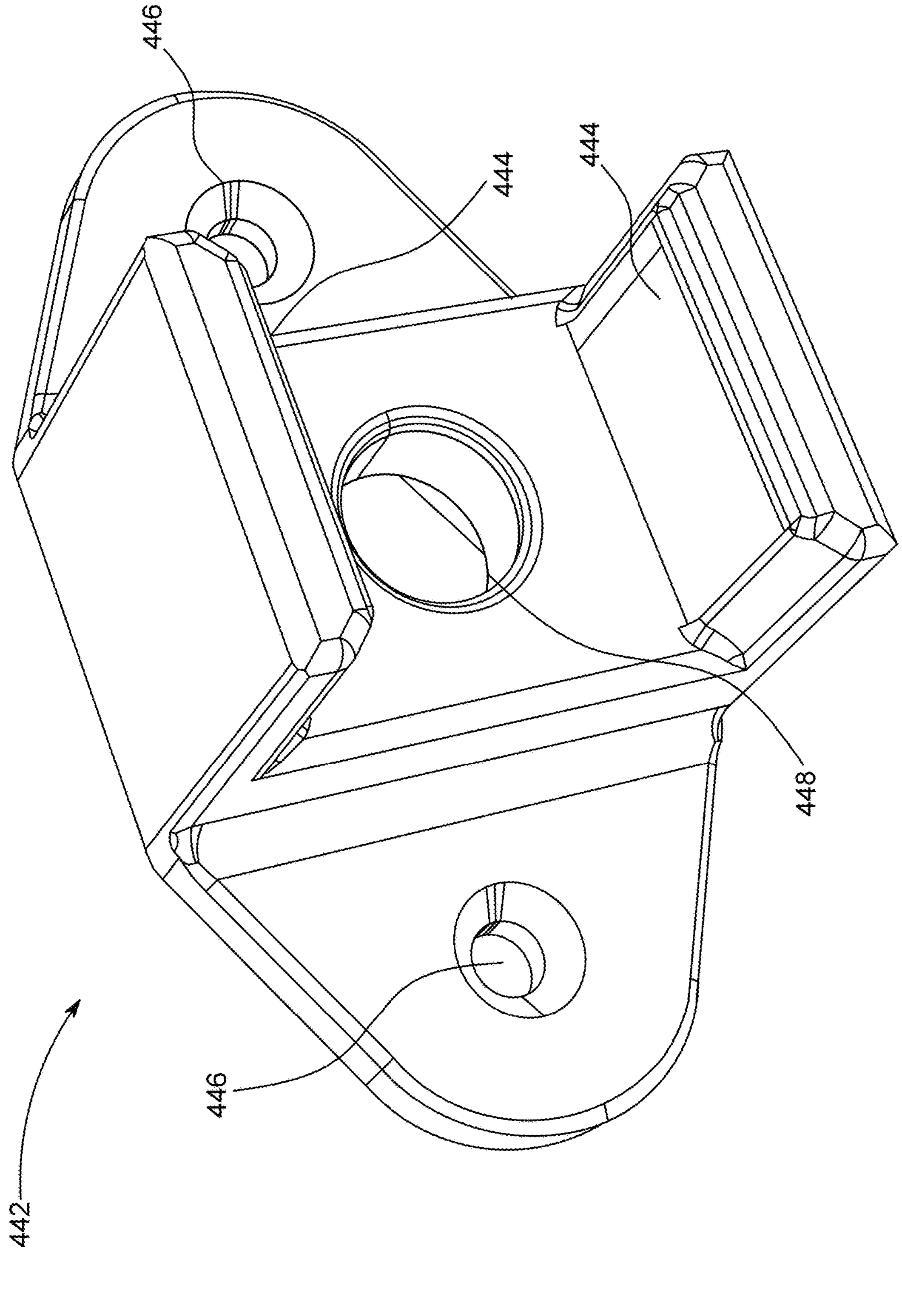
FIG. 167 schematically illustrates a perspective view of a charging bracket.
Figure 168:
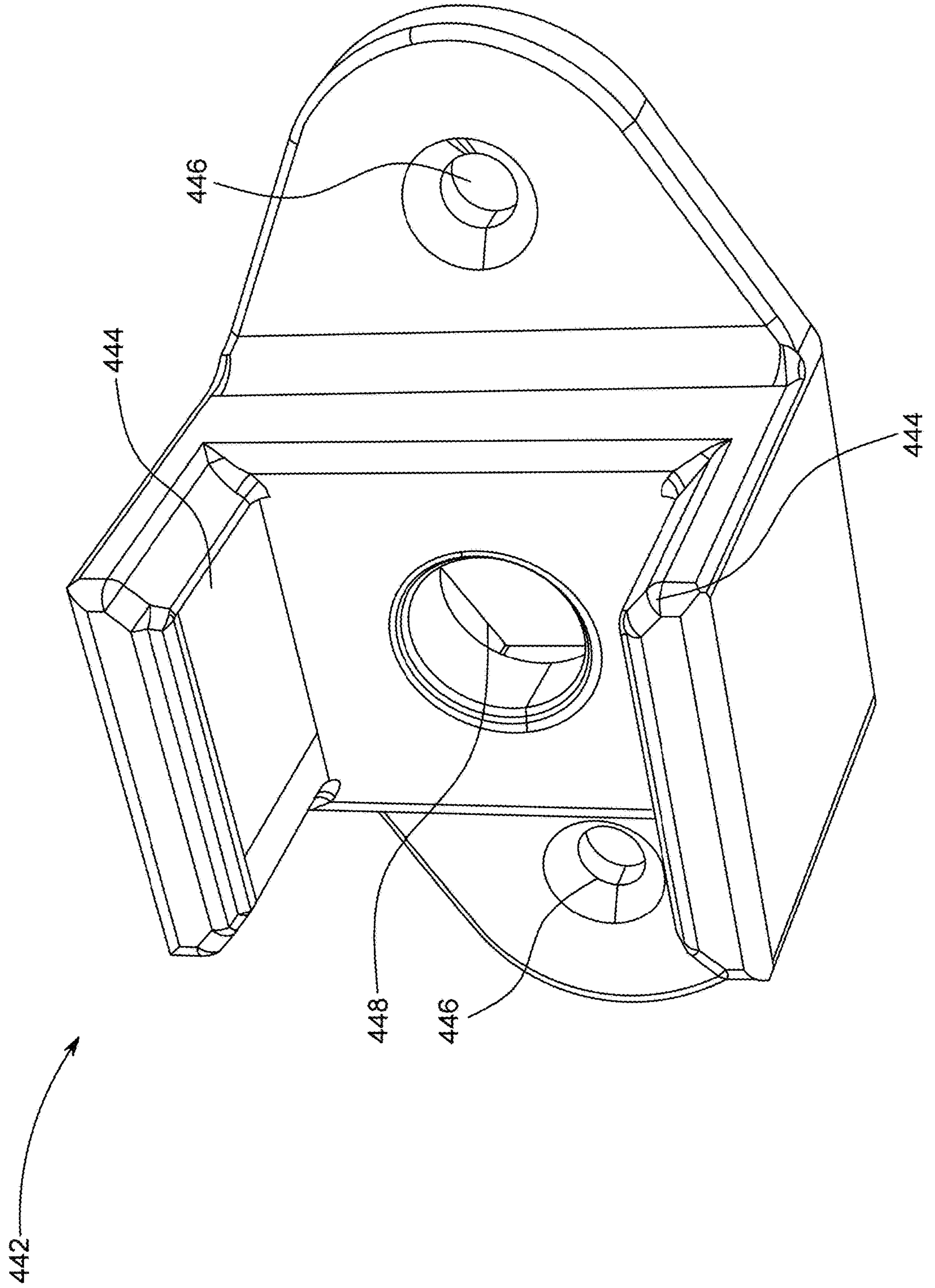
FIG. 168 schematically illustrates another perspective view of a charging bracket.

As noted above, the chair assembly can be arranged such that when it comes to rest at the location of a charging pad 410, a mechanism in the chair assembly can interact with the charging pad 410 to initiate charging of the onboard battery. Such a mechanism, a charging bracket 442, is illustrated in FIGS. 167-168. The charging bracket 442 includes a pair of charging terminals 444 separated by a gap. The charging bracket 442 includes a pair of apertures 446 through which screws can be passed to secure the charging bracket 442 to the back section of the chair assembly. Additionally, when the charging bracket 442 is secured to the back section of the chair assembly, the charging terminals 444 are in electrical communication with the onboard battery such that if the charging terminals 444 are in contact with an electrical circuit, the onboard battery will recharge. It will be appreciated that the gap between the charging terminals 444 is sized to accommodate the housing 426 of the charging pad 410 such that when the housing 426 of the charging pad 410 is located within the gap, the charging terminals 444 are placed in contact with the contacting strips 428 and move the contacting strips 428 inward. Such inward movement causes the contacting strips 428 to each contact a respective contacting rod 432, which closes a circuit and facilitates the flow of electricity from a power cable of the stair lift system, through the charging pad 410, through the charging bracket 442, and on to the onboard battery. The charging bracket 442 can also include an aperture 448 that can accommodate a beacon (not shown) that can align with the beacon 434 of the charging pad 410. The alignment of the two beacons can send a signal to an onboard computer that initiates the recharging of the onboard battery.

Figure 169:
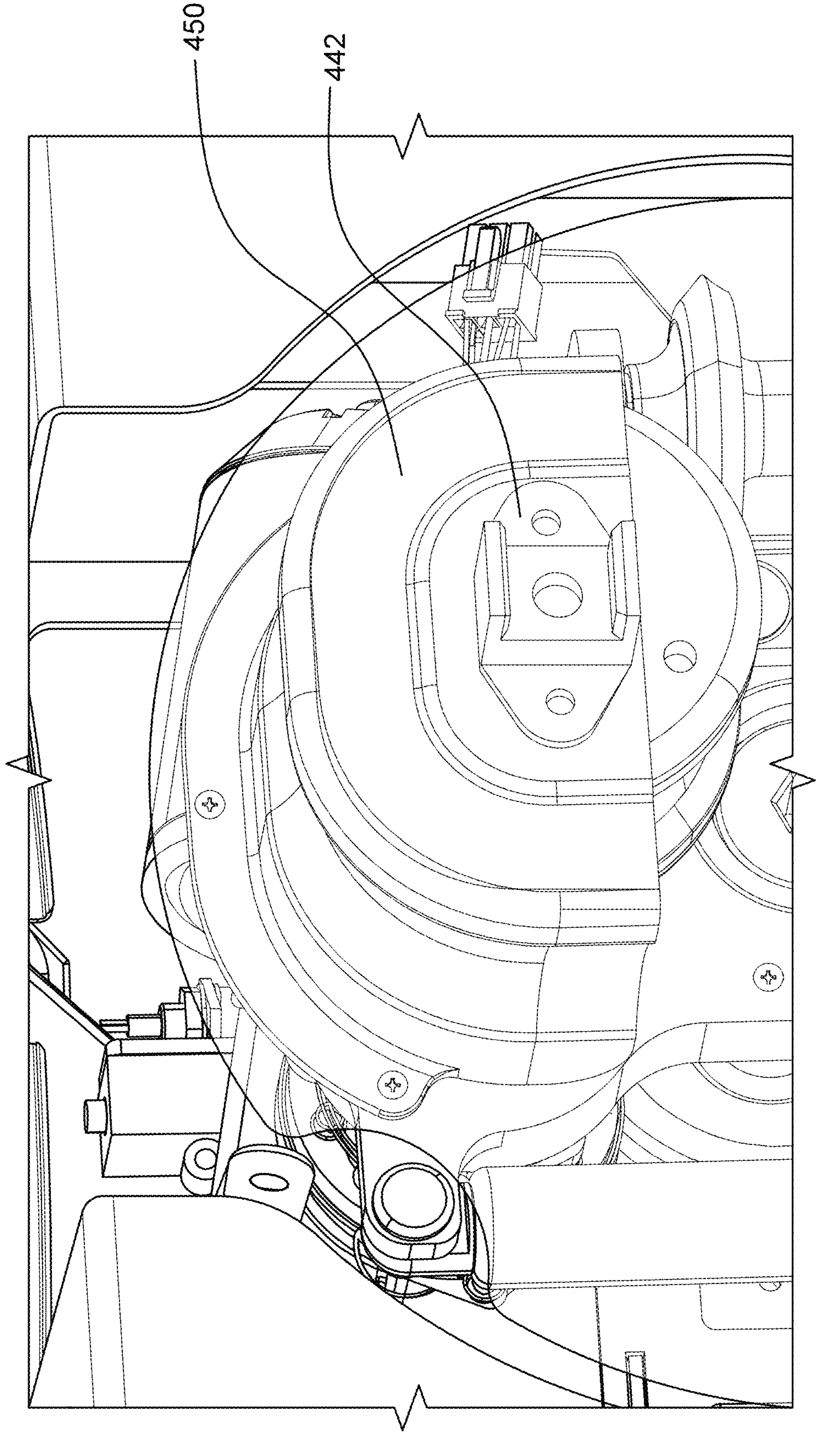
FIG. 169 schematically illustrates a perspective view of a wheel cover and a charging bracket attached to the back side of a chair.

FIG. 169 illustrates one embodiment of the charging bracket 442 assembled to the back portion of a chair assembly. The charging bracket 442 is secured to a wheel cover 450. The wheel cover 450 protects the drive mechanism of the stair lift system. The drive mechanism is coupled to the modular rail assembly and moves along the path of the modular rail assembly. The wheel cover 450 is arranged to rotate to follow the path of the modular rail assembly, and thus, the charging bracket 442 also rotates to follow the modular rail assembly. In such an arrangement, the charging bracket 442 will always be aligned with charging pad 410, which is installed to match the angle of the modular rail system.

Figure 170:
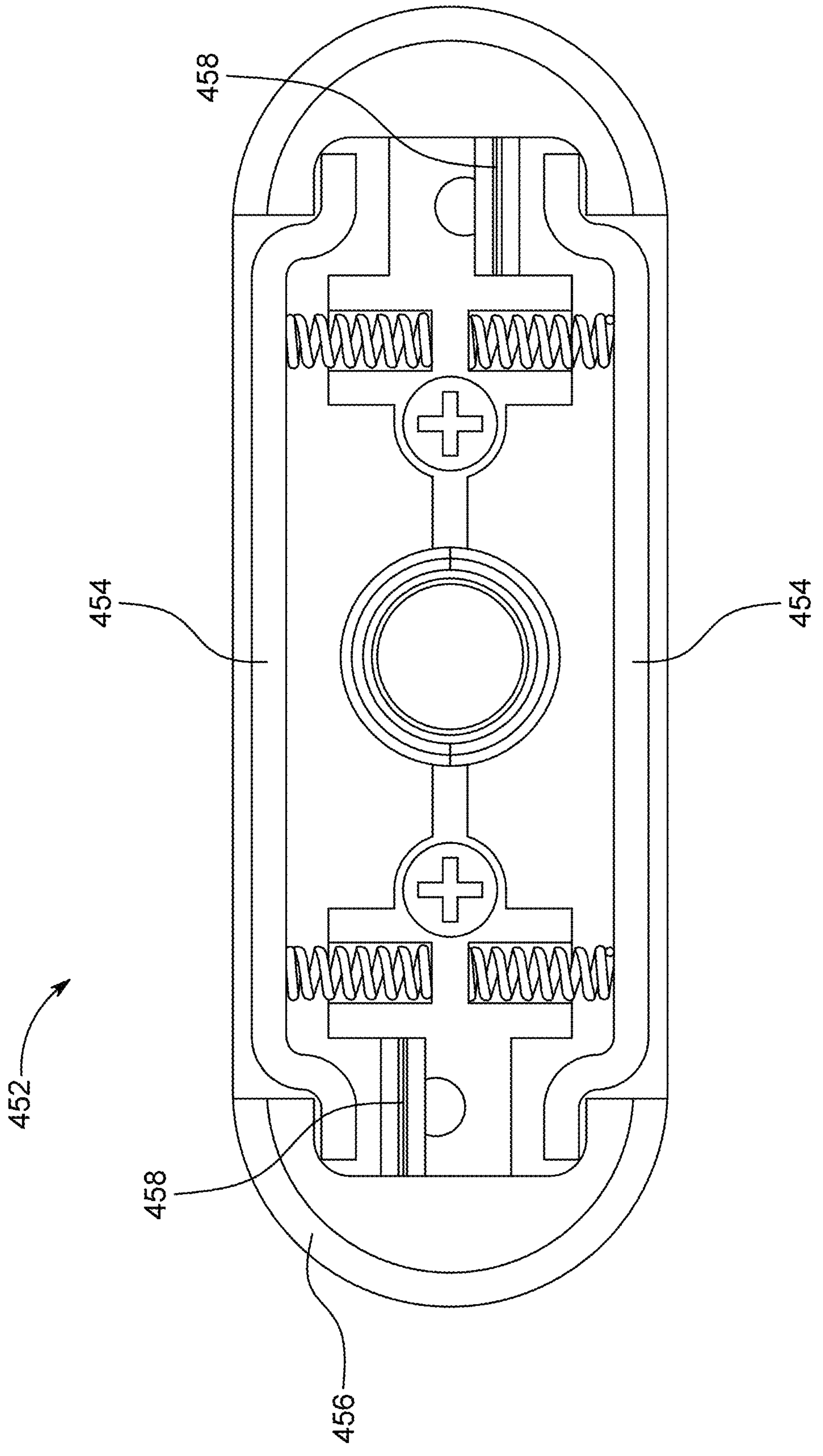
FIG. 170 schematically illustrates a top plan view of another embodiment of a charging pad with the cover removed.
Figure 171:
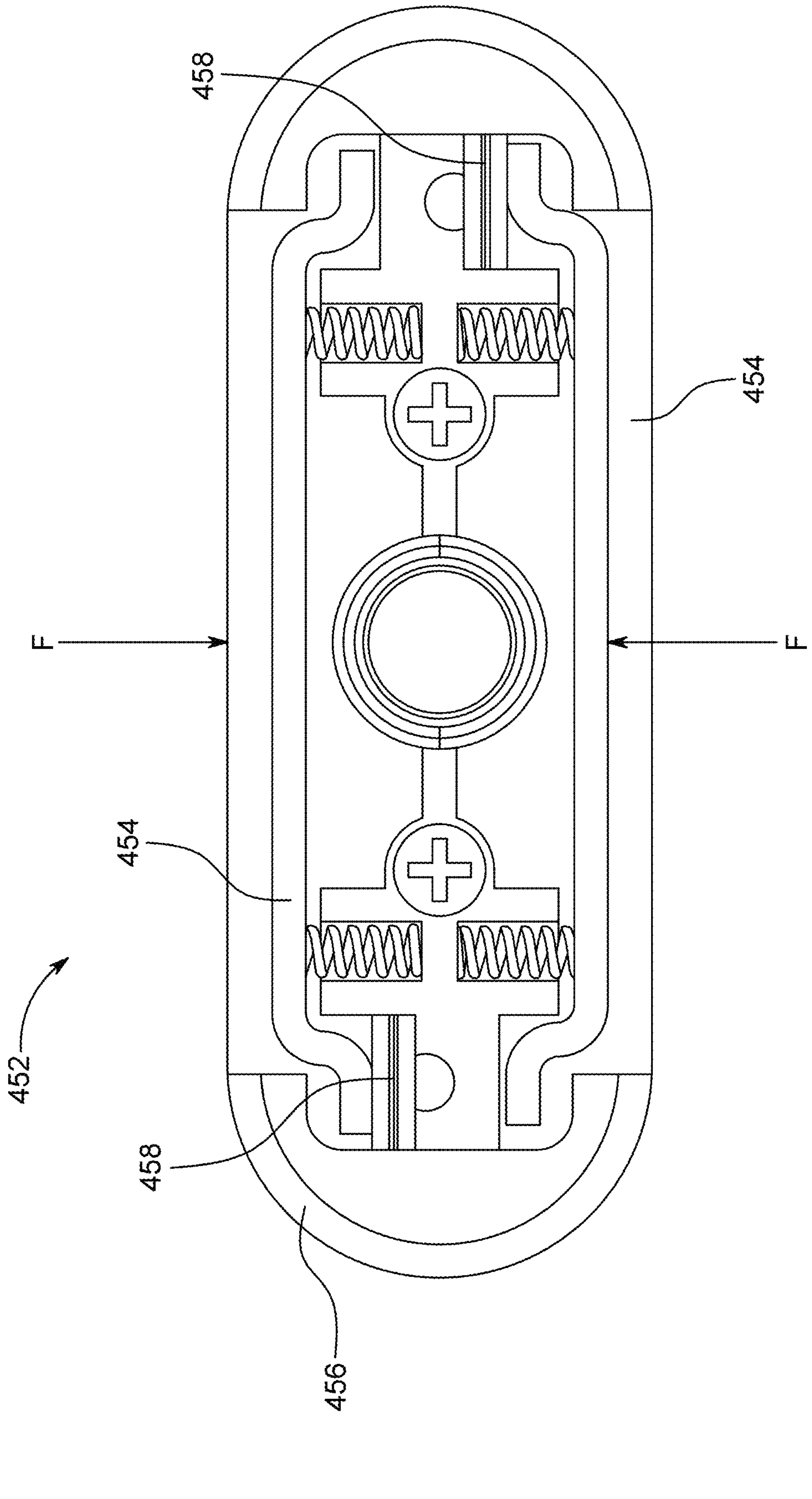
FIG. 171 schematically illustrates a top plan view of a charging pad with the cover removed and the contacting strips depressed.
Figure 172:
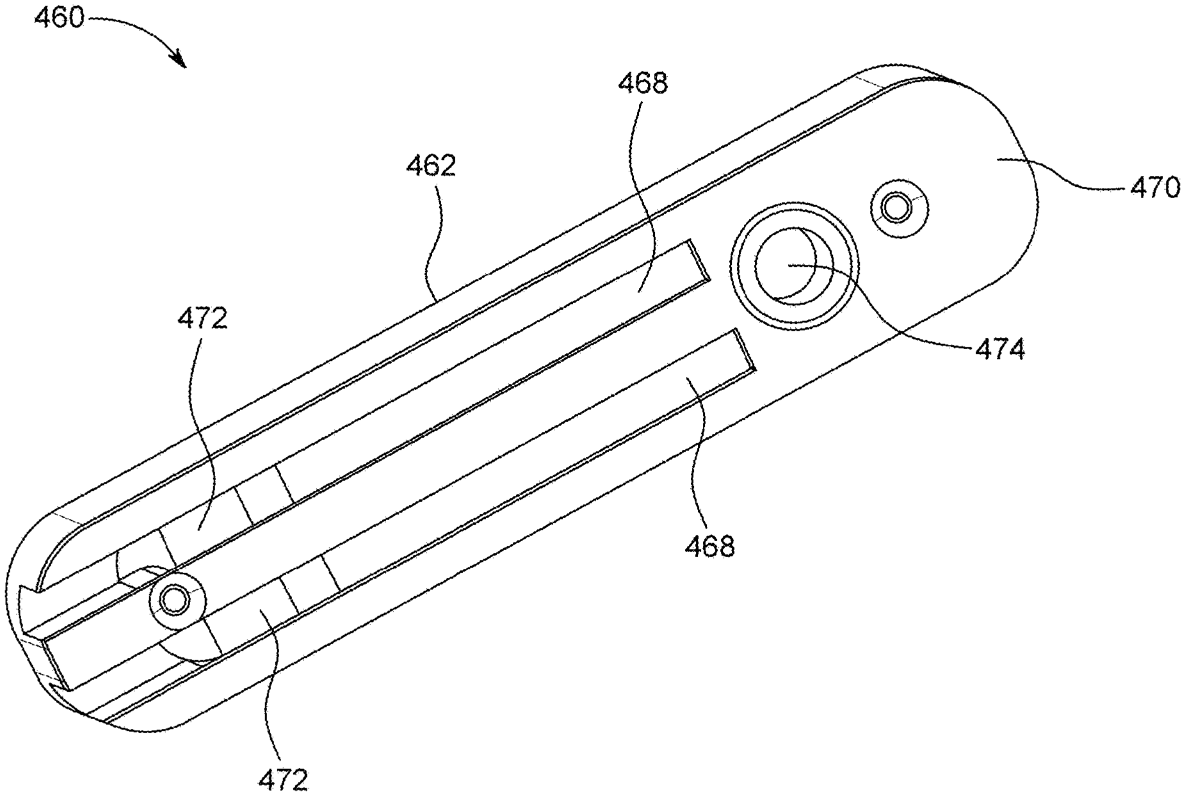
FIG. 172 schematically illustrates a perspective view of another embodiment of a charging pad.

FIGS. 170 and 171 schematically illustrate another embodiment of a charging pad 452, which is a variation of the charging pad 410 of FIGS. 162-166. In this embodiment of the charging pad 452, the contacting strips 454 are recessed when in the non-charging position such that the contacting strips 454 do not extend past the edges of the body 456 of the charging pad 452 (as illustrated in FIG. 170). Once a force is applied to the contacting strips 454 (as illustrated in FIG. 171), the contacting strips 454 are moved inward until the contacting strips 454 contact the contacting rods 458 to complete the circuit. To facilitate the depression of the contacting strips 454 in this embodiment of the charging pad 452, a charging bracket can be modified to include a spring biased mechanism that retracts when it encounters the leading edge of the body of the charging pad 452, but as it moves past the leading edge of the body and engages the contacting strips 454, it applies an appropriate downward force on the contacting strips 454 to move the contacting strips 454 inwards and into contact with the contacting rods 458.

FIGS. 172-175 illustrate another embodiment of a charging pad 460. The charging pad 460 has a generally low profile and can be attached directly to a rail segment. The charging pad 460 includes a main body 462, that includes a pair of slots 464 position next to and parallel to each other. There are two contacting rods 466, with one contacting rod 466 positioned inside each slot 464. As illustrated in FIG. 173, when the contacting rods 466 are positioned in a slot 464, a portion of the contacting rod 466 extends through the backside of the charging pad 460. The charging pad 460 includes a pair of contacting strips 468. Each contacting strip 468 is a thin sheet of metal that is arranged to deflect when a force is applied. The contacting strips 468 are positioned in the slots 464 such that when there are no external forces applied to the contacting strips 468, each contacting strip 468 is suspended above a contacting rod 466. This is to say that there is a gap between each contacting strip 468 and its applicable contacting rod 466. The charging pad 460 includes a cover 470 that is used to secure the contacting rods 466 and contacting strips 468 inside the body 462. The cover 470 includes two slits 472 which expose the contacting strips 468 to contact from outside the charging pad 460.

Similar to earlier descriptions of charging pads, when the contacting strips 468 are deflected and placed into contact with the contacting rods 466, a circuit is completed and electricity can flow through the charging pad 460. The portions of the contacting rods 466 that extend from the backside of the charging pad 460 can be coupled to the power cable located within the modular rail assembly. Because the charging pad is secured directly to a rail segment, only minor modifications are required to connect the power cable to the contacting rods 466. The chair assembly can include a mechanism that engages a metal member with the contacting strips 468 through the slits 472 in the cover 470 and deflects the contacting strips 468 until they are in contact with the contacting rods 466. In such an arrangement, electrical current can be channeled from the power cable to the charging pad 460 and through the metal member of the chair assembly to the onboard battery to recharge the battery. The charging pad 460 can also include a beacon positioned in an aperture 474 in the cover 470, which can pair with a beacon on the chair assembly to send a signal to start charging the onboard battery when the circuit is completed.

The charging station 460 can be arranged to be child safe, this is to say, the charging station 460 can be arranged so as to meet recommendations for avoiding child finger entrapment with regard to the charging pad 460. One such recommendation is that any openings are smaller than 0.21 inches in width. Another recommendation is that the spring force required to form an electrical connection should be at least 40 newtons (or about 9 lbs.). In the design of the charging station 460, the only exposed openings are the slits 472 in the cover 470, which are each smaller than 0.21 inches in width. Additionally, the contacting strips 468 require a force of greater than 40 newtons to deflect sufficiently to make contact with the contacting rods 466.

The stair lift systems described above are generally applicable to staircases that include a curve or turn. A stair lift system can also be arranged to accommodate a straight staircase. Such arrangements can be modular but include a limited number of components and are relatively inexpensive to produce and install. FIGS. 176-216 [maybe 195?] illustrate a first such embodiment of a stair lift system 500. The stair lift system 500 includes a chair 502 mounted on a straight rail 504. As illustrated in FIGS. 177-180, the chair 502 includes a seat 506, a back 508, and a pair of armrests 510. The chair 502 further includes a chassis 512 enclosed by a housing 514 and located at the bottom rear of the chair 502, and a footrest assembly 516. The straight rail 504 of the stair lift system 500 is illustrated in FIGS. 181-183. As illustrated in FIG. 182, this embodiment of the straight rail 504 is an extruded component with multiple internal channels. As illustrated in FIG. 183, the straight rail 504 is attached to the staircase using a bracket assembly 518. While only one bracket assembly 518 and only a portion of the straight rail 504 are illustrated in FIG. 183, it will be understood that a number of bracket assemblies 518 are used along the straight rail 504 to secure the stair lift system 500 to a staircase. The bracket assembly 518 includes upper part 520, which attaches to the straight rail 504, and a lower part 522, which attaches to a tread of the staircase. The lower part 522 is secured to the edge of a tread of the stair case by multiple fasteners 524 such as screw. A carriage bolt 528 secures the upper part 520 to the lower part 522 such that there may be some rotational movement between the upper part 520 and lower part 522 to facilitate adjustments during installation. The chair 502 is secured to the straight rail 504 though engagement of the chassis 512 and the straight rail 504. The chassis 512 is illustrated in FIGS. 184-186. The chassis 512 includes three roller assemblies—a single multi-composite upper roller 532, a first lower roller assembly 534 consisting of four individual wheels, and a second lower roller assembly 536 consisting of four individual rollers. The first lower roller assembly 534 and the second lower roller assembly 536 are essentially the same structure, but in mirror image. This is to say that while structurally the same, the first lower roller assembly 534 is arranged to be assembled on one side of the straight rail 504 and the second lower roller assembly 536 is arranged to be assembled on the opposite side of the straight rail 504. As illustrated in FIGS. 185 and 186, the upper roller assembly 532 directly engages a top portion of an upper section of the straight rail 504, the first lower roller assembly 534 engages a first channel 538 of a lower section of the straight rail 504, and the second lower roller assembly 536 engages a second channel 540 of the lower section of the straight rail 504. As with the first 534 and second 536 roller assemblies, the first channel 538 and second channel 540 are essentially the same structurally but arranged as mirror images to one another.

In such an arrangement, the upper roller assembly 532 and the first lower roller assembly 534 are generally aligned in a direction that is perpendicular to the central axes of the wheels of the upper roller assembly 532 and first lower roller assembly 534, and the first lower roller assembly 534 and second lower roller assembly 536 are generally aligned along the central axes of the wheels of the first 534 and second 536 lower roller assemblies. As will be appreciated, such an arrangement provides stability for the chair 502 when the chair 502 is secured to the straight rail 504. The engagement of the upper roller assembly 532 and lower roller assemblies 534, 536 with the straight rail 504 forms a friction drive system that propels the chair 502 along the straight rail 504 during operation. The upper roller assembly 532 is attached to a motor 542 that provides power to rotate the upper roller assembly 532 during operation. The upper roller assembly 532 and lower roller assemblies 534, 536 are arranged to apply a force on the straight rail 504 so that the rotation of upper roller assembly 534 results in linear movement of the chair 502 along the straight rail 504, where the motion is transferred by the friction between the upper roller assembly 534 and the straight rail 504.

The upper roller assembly 532 can be formed from multiple materials including, but not limited to nylon, polyurethane, aluminum, and stainless steel, and the straight rail 504 can be formed by an extrusion method from a metal, for example, aluminum. In one embodiment, the extruded aluminum can be anodized. In another embodiment, the extruded aluminum can be coated or treated to achieve a rough surface to enhance the coefficient of friction between the upper roller assembly 532 and straight rail 504 to efficiently transform the rotational movement of the upper roller assembly 532 into linear movement of the chair 502.

FIG. 187 illustrates an exploded view of an upper roller assembly 534. As illustrated, the upper roller assembly 534 is a multi-component assembly that includes a core 544, a tire 546, a pair of side rings 548, 550, and a pair of outside flanges 552 and 554. The core 544 can be formed from a metal alloy, such as stainless steel. The tire 546 can be formed from an engineered composite, such as a rubber, polyurethane, or other polymer, and over-molded onto the core 544. The core 544 can also be internally threaded section 556 on one side of the core 544, for example, the side facing the outside flange labeled as reference number 554 in FIG. 187. This outside flange 554 can have a corresponding threaded stud that matches the thread profiles of the core 554 to secure the outside flange 554 to the core 544. The opposing outside flange 552 can be secured to the core 544 using one or more fastener or other securing mechanism. The side rings 548, 550 can be fabricated from nylon and tapered. One side ring 548, 550 can be positioned one each side of the tire 546 and between the tire 546 and one of the outside flanges 552, 554. The side rings 548, 550 assist in aligning the upper roller assembly 532 to make sure that there is sufficient contact area between the upper roller assembly 532 and the straight rail 504. The side rings 548, 550 can be formed from an engineered composite or a polymer, such as oil-impregnated nylon, to minimize friction within the upper roller assembly 532.

FIG. 188 schematically illustrates a first lower roller assembly 534. As noted above, the structure of the first 534 and second 536 lower wheel assemblies are the same; thus, the description of the structure of the first lower roller assembly 534 applies equally to the second lower wheel assembly 536. The first lower roller assembly 534 includes two vertical wheels 558, 560 and two horizontal wheels 562, 564, each secured to a bracket 566. When the first lower roller assembly 534 is positioned in the first channel 538 of the rail, with reference to FIG. 185, the two vertical wheels 558, 560 are engaged with the upper surface 568 and lower surface 570 of the first channel 538 and the two horizontal wheels 562, 564 are engaged with the inner surface 572 of the first channel 538. As will be appreciated, when the first lower roller assembly 534 and second lower roller assembly 536 are positioned as described above (along with the upper roller assembly 532 and the structural components that attach the first 534 and second 536 lower roller assemblies to the chassis 512), the chair 502 is coupled to the straight rail 504 in a secure manner that provides for a user of the stair lift system 500 to traverse the straight rail 504 safely. As illustrated in FIGS. 189-190, the straight rail 504 further includes an endcap 574 that seals each end of the straight rail 504.

The stair lift system 500 further includes an emergency brake assembly 576 and a movement and position sensor assembly 578 to facilitate safe operation of the stair lift system 500. FIGS. 191-193 schematically illustrate the emergency brake assembly 576, and FIGS. 194-195 schematically illustrate the movement and position sensor assembly 578. The emergency brake assembly 576 and a movement and position sensor assembly 578 are positioned within the chassis 512 and work cooperatively to provide for the chair 502 traversing the straight rail 504 safely.

The emergency brake mechanism 576 includes a stationary member 580 that includes a continuous rack of teeth 582 and a moveable assembly 584 that travels with the chair 502 as the chair 502 moves along the straight rail 504. The stationary member 580 is generally sized to match the length of the straight rail 504 and is secured to the straight rail 504. The moveable assembly 584 includes a wedge 586 with a second set of teeth 588 that are arranged to engage with the continuous rack of teeth 582 of the stationary member 580. The moveable assembly 584 also includes a plunger 590 arranged to vertically move the wedge 586 between a position where the two sets of teeth 582, 588 are engaged and a position where the two sets of teeth 582, 588 are disengaged. FIG. 191 illustrates the emergency brake assembly 576 in an engaged arrangement, FIG. 192 illustrates the emergency brake assembly 576 in a disengaged arrangement, and FIG. 193 illustrates an exploded view of the moveable assembly 584. As will be appreciated, when the chair 502 is moving along the straight rail 504 during its normal course of operation, the emergency brake assembly 576 is generally disengaged. However, when the chair 502 needs to come to a stop along the straight rail 504. The emergency brake assembly 576 is engaged.

As the chassis 512 travels along the straight rail 504, the movement and position sensor assembly 578 tracks the speed, direction, and position of the chair 502 relative to the straight rail 504. The movement and position sensor assembly 578 includes an idler gear 592 with a set of teeth 594 and a shaft 596 secured to the idler gear 594 with a clip 598. The shaft 596 is rotationally supported by a bearing housing 600 on one end of the movement and position sensor assembly 578, a bearing fastener 602 on the opposite end of the movement and position sensor assembly 578, and a bearing bracket 604 positioned between the bearing housing 600 and the idler gear 592. An encoder 606 is coupled to the shaft 596 and positioned within the bearing housing 600. As illustrated in FIG. 195, the teeth 594 of the idler gear 592 are engaged with the continuous rack of teeth 582 of the stationary member 580 of the emergency braking mechanism 576. As the chair 502 moves along the straight rail 504, the idler gear 592 rotates, and such rotation can be used to ascertain the actual speed, direction, and position of the chair 502 along the straight rail 504. In one example the encoder 606 is arranged to sense the rotation of the shaft 596, which rotates along with the idler gear 592. The encoder 606 gathers information on the direction of rotation of the idler gear 592 and the speed of the rotation of the idler gear 592 in the form of an electrical signal. The electrical signal can be sent to a control unit (not illustrated). The control unit can be built into a PC board or can be a standalone control unit and located within the chassis 512 or elsewhere on the stair lift system 500. The control unit can be arranged to analyze the signal to determine the direction that chair 502 is traveling and the speed it is traveling. By knowing an initial position, the control unit can use the direction and speed to determine the location of the chair 502 relative to the end point of the straight rail 504. In other embodiments, the encoder can be a quadrature encoder that is arranged to only detect the direction of rotation of the idler gear 592 (and shaft 596) and the speed of travel. The position information can then be calculated by the control unit using the rotational speed and direction of the idler gear 592, along with the time interval of the idler gear's 592 motion. In other embodiments, a detector and sensors can be incorporated into the stair lift system 500 to determine or confirm the position of the chair 504.

A safe operational speed range is determined for a stair lift system 500. In one example, the operational speed is set to 0-20 feet per minute. While the chair 02 is traveling within the operational speed range, the emergency brake system 576 is in the retracted and disengaged position as illustrated in FIG. 192. With the emergency brake system 576 in such a position, the chair 502 can freely move along the straight rail 504. However, when the actual speed of the stair lift system 500 exceeds the operational speed range, the emergency brake system 576 is deployed such that the teeth 588 of the wedge 586 engage with the continuous rack of teeth 582 of the stationary member 580 as illustrated in FIG. 191. Such engagement stops the travel of the stair lift system 500 to protect the user. The emergency braking assembly 576 is initiated by the actuation of the plunger 590 through, for example, a "power-off" solenoid. Such a solenoid deploys (i.e., causes the wedge 586 to move downward to engage with the stationary member 580) when electrical power to the solenoid is ceased. When electrical power is sent to the solenoid, the wedge 586 is retracted and moves upward and disengages from stationary member 580. The supply of power can be determined by the control unit, which can calculate the actual speed based on the signal received from the encoder 606. If the actual speed is within the operational range, power to the solenoid is continued, and if the actual speed is above the operation range, power to the solenoid is shut off and the emergency brake assembly 576 is actuated to stop the movement of the chair 502. This arrangement also provides for safe storage of the chair 502 when the stair lift system 500 is not operating, such as when there is no user seated in the chair 502 or while a user is exiting or seating themselves in the chair 502. In such scenarios, the power is discontinued and the emergency brake assembly 576 is engaged. The emergency brake assembly 576 automatically retracts and disengages when the stair lift system 500 is turned on and electrical power is supplied to the solenoid so that the user can selectively traverse up and down the straight rail 504. When the chair 502 nears either end of the straight rail 504 during normal operation, the emergency brake assembly 576 remains retracted and disengaged, with other mechanism slowing down the chair 502 as it approaches the end of its travel up or down the staircase.

FIGS. 196-208 illustrate an alternative emergency braking system 608. As with other braking systems described herein, the braking system 608 is mechanical in nature and does not need any electrical power in order to operate as intended. The emergency braking system 608 initiates emergency braking when forces generated by the speed of the chair cause certain components to move and engage other components to stop the movement of the chair relative to the rail system.

The emergency braking system 608 includes the stationary member 580 with a continuous rack of teeth 582 as described above. The emergency braking system 608 further includes an idler gear 610, a shaft 612, a flywheel 614, a link arm 616, a base 618, and a support plate 620. The idler gear 610 engages with the continuous rack of teeth 682 and rotates as the chair moves up and down the rail system. The shaft 612 connects the idler gear 610 to the flywheel 614 such that the flywheel 614 also rotates when the chair moves up and down the rail system. As will be appreciated, the rotational speed of the flywheel 614 is proportional to the linear speed of the chair.

The base 618 includes a pair of apertures 622 that provide for securing the base to a bracket that moves along with the chair. The base 618 is also arranged to rotationally support the shaft 612. The support plate 620 is attached to a bracket that moves along with the chair and supports the link arm 616. The link arm 616 is attached to the plate 620 by a bolt 624 and is rotatable about the bolt 624. A torsion spring 626 engages the link arm 616 to keep the link arm 616 perpendicular to the inclined angle of the staircase and the rail system. The link arm 616 includes a prong 628 extending toward the flywheel 614. The flywheel 614 includes a groove 630. The groove 630 is arranged as a continuous circuitous path. Along this path there are four pairs of extended nodes 632 that deviate from the continuous path. As is illustrated in FIG. 203, each pair of extended nodes 632 are positioned on opposite sides of the groove 630. The groove 630 also includes four abrupt turns 634, each located near a pair of extended nodes 632. When the emergency braking system 608 is assembled, the prong 628 of the link arm 616 is positioned within the groove 630 of the flywheel 614 such that when the chair moves up and down the rail system, the prong 628 follows the path of the groove 630.

Figure 206:
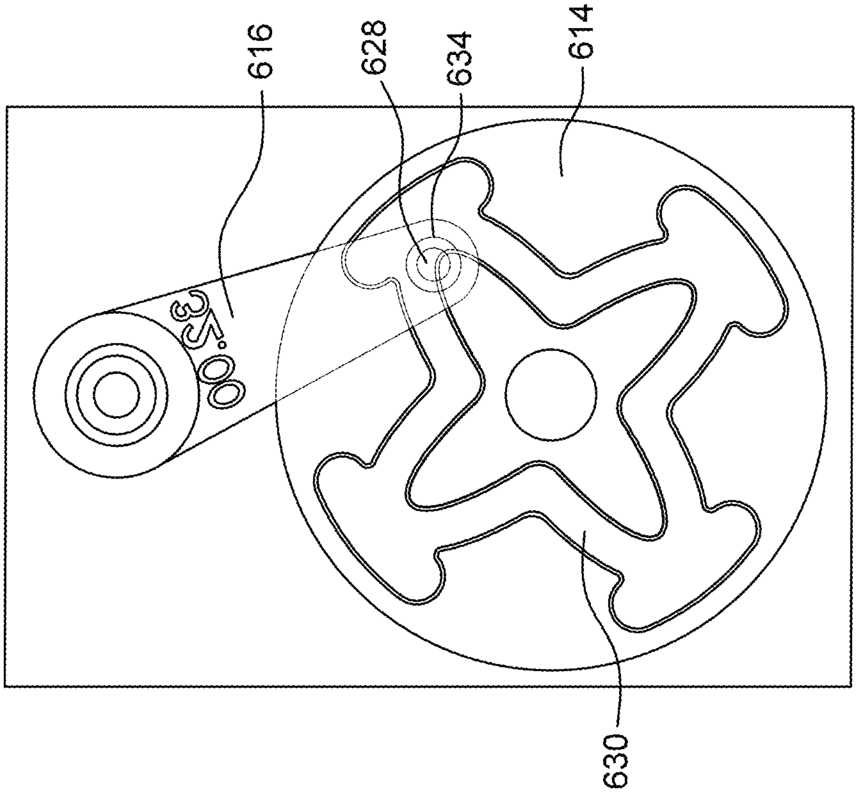
Figure 205:
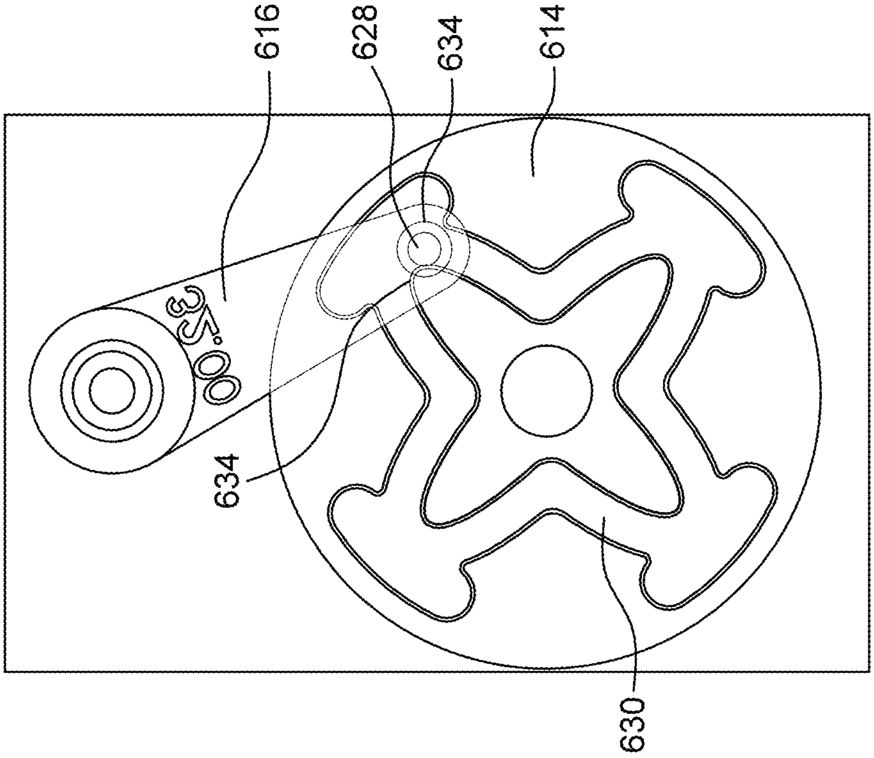
Figure 208:
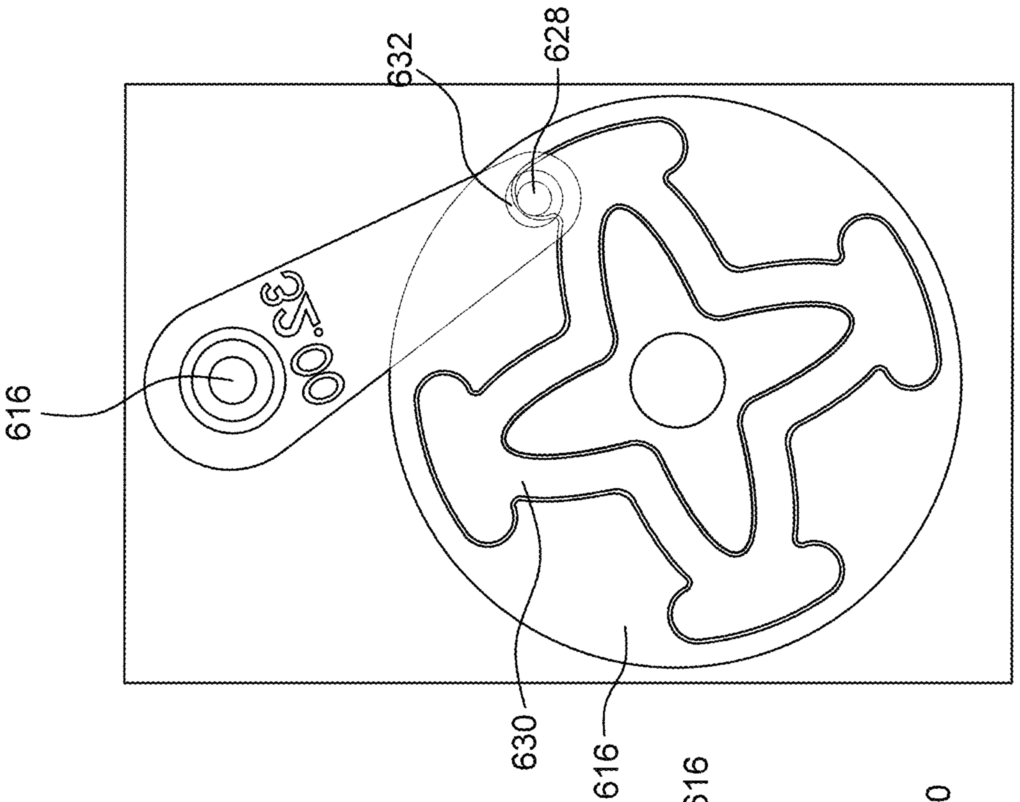
Figure 207:
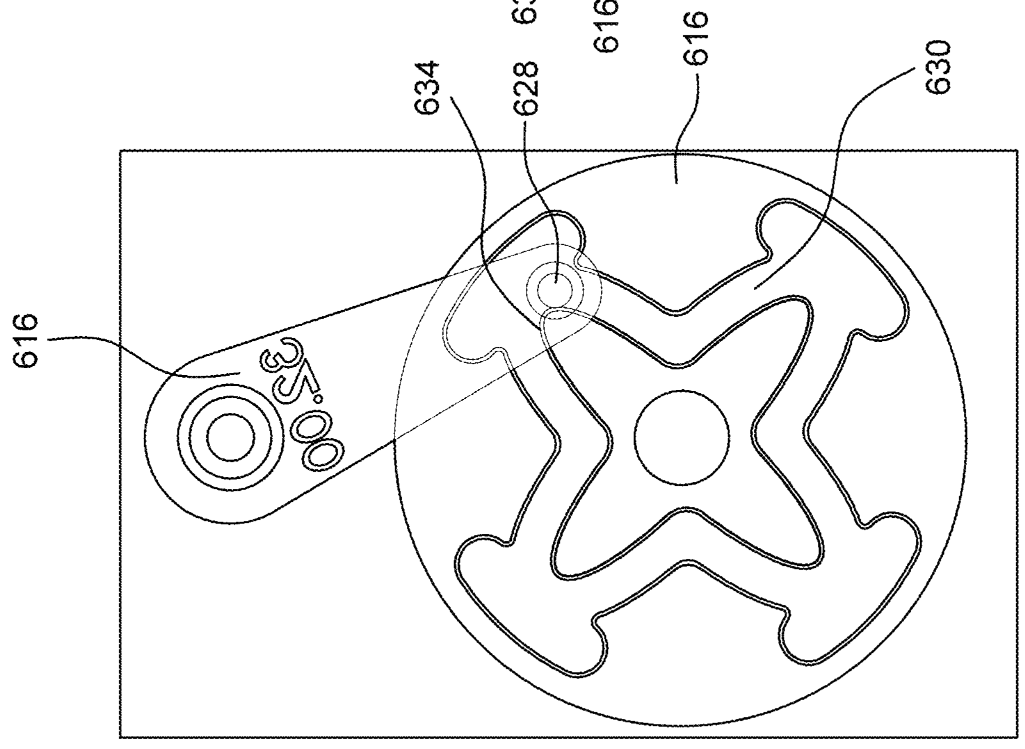

During normal operation of the stairlift system with the chair moving within the approved speed range, the prong 628 follows the continuous circuitous path of the groove 630. As illustrated in FIGS. 205 and 206, at normal operational speeds (with the flywheel 614 rotating clockwise), when the prong 628 reaches an abrupt turn 634 in the continuous circuitous path of the groove 630, the prong 628 successfully navigates the abrupt turn 634 and continues along the continuous circuitous path. However, as illustrated in FIGS. 207 and 208, when the chair exceeds a preset allowable speed, as the prong 628 follows the groove 630 (with the flywheel 614 rotating clockwise), when the prong 628 reaches an abrupt turn 634 in the continuous circuitous path, the prong 628 deviates from the continuous circuitous path and moves in a generally straight path to an extended node 632, where the prong lodges in the extended node 632. This change in behavior is caused by the additional centrifugal forces caused by the higher rotational speed of the flywheel 614. When the prong 628 is lodged in an extended node 632, the rotation of the flywheel 614 is stopped, which stops the rotation of the idle gear 610, resulting in the movement of the chair stopping relative to the rail system. Once the chair is moved in the opposite direction of its original path of travel, the prong 628 will dislodge from the extended node 632 and free movement of the chair is restored. It will be appreciated that because there are a pair of extended nodes 632 near each abrupt turn 634, the emergency braking system 608 is fully operational regardless if the stair lift system is installed on the left side of a staircase or a right side of a staircase.

The emergency braking system 608 illustrated in FIGS. 196-208 can be used with any variation of stair lift system disclosed herein. This includes use with a stair lift system with a straight rail system and use with a stair lift system with a curved rail system.

FIGS. 209-210 illustrate an exemplary footrest assembly 516 for use with the stair lift system 500. The footrest assembly 516 includes a platform 636 for users to rest their feet on during use of the stair lift system 500 and a pair of gears 638, 640 that are useful in deploying and retracting the platform 636. As will be appreciated, when the stair lift system 500 is in use, the platform 636 is deployed (i.e., positioned parallel to the ground) so that a user seated in the chair 502 can use the footrest 516. However, when the stair lift system 500 is not in use, the platform 636 can be retracted (i.e., positioned perpendicular to the ground and up against the chair 502) to minimize the profile of the stair lift system 500, which makes it easier for other traversing the staircase on foot. The platform 516 can be moved between the deployed and retracted positions by the pair of gears 638, 640, which can be coupled to a motor and a controller (not illustrated) to initiate the movement between the retracted and deployed positions. In one embodiment, a panel 642 can be incorporated into one of the armrests 510. The panel 642 can include one or more buttons or other actuatable features to control different functions of the stair lift system 500. For example, as illustrated in FIGS. 211 and 212, a panel 642 can include a footrest button 644 that can be conveniently depressed by a user to move the footrest 516 between the deployed and retracted positions. As illustrated in FIG. 212, the button 644 can include an icon that indicates the purpose of the button 644.

The panel 642 can include one or more additional buttons or other mechanisms to control other functions. For example, as further illustrated in FIGS. 211 and 212, the panel 642 can include a second button 646 that can be depressed by a user to selectively swivel the chair 502 to the left or to the right. Such swivel functionality is useful when the stair lift system 500 is either at the top of the staircase or the bottom of the staircase, and the user swivels the chair 502 to either exit the chair 502 when done using the stair lift system 500 or to seat themselves in the chair 502 to prepare for using the stair lift system 500. The button 646 can include an icon that indicates the purpose of the button 646. In one embodiment, the direction of the swivel is predetermined during the setup stage of the initial installation. For example, when a stair lift system 500 is installed on the right side of a staircase (where right side is in reference to ascending the staircase), it is preferable to have the chair 502 swivel to the left at the bottom of the staircase and swivel to the right at the top of the staircase. It will be appreciated that such an arrangement provides for additional safety when the user is mounting or dismounting the chair 502 at the top and bottom of the staircase. Therefore, during installation, the stair lift system 500 can be programmed by the user or installer to swivel only to the left when the chair 502 is positioned at the bottom of the staircase and swivel only to the right when the chair is positioned at the top of the staircase. As will be understood, if the stair lift system 500 is installed on the left side of the staircase, the stair lift system 500 is programmed such that the chair 502 swivels to the right at the bottom of the staircase and swivels to the left at the top of the staircase. Additionally, for the safety of the user, the stair lift system 500 can be programmed not to swivel at all during travel of the chair 502 between the top and bottom of staircase. To facilitate such functionality, the stair lift system 500 can include a beacon arrangement where a controller and sensors are used to monitor the position of the chair 502 relative to the top and bottom of the staircase and allows the chair 502 to swivel only as described above.

In another example (illustrated in FIGS. 211 and 212), the panel 642 includes a lever 648 that can be manually actuated by a user that selectively initiates travel of the stair lift system 500 either up the staircase or down the staircase. The lever 648 can be arranged such that the user can control the direction and/or speed of the chair 502 through use of the lever 648. The lever 648 can be moved forward to move the chair 502 in a first direction and moved rearward to move the chair 502 in a second direction. Furthermore, as the user moves the lever 648 forward or rearward, the speed of the chair 502 proportionally increases.

FIGS. 213-216 illustrate a gas spring assembly 650 that provides height adjustment to accommodate various heights and body types of different users as well as cushioning as the user enters and exits the chair, is seating him or herself in the chair 502, and using the chair to traverse the staircase. The gas spring assembly 650 includes a sealed cylinder 652 and a post 654. The post is releasably secured to the sealed cylinder through a securing mechanism (not illustrated). The post 654 is coupled on one end to the bottom of the chair 502 and on the other end is coupled to a piston (not illustrated) positioned at or near the top of the sealed cylinder 652. The user can adjust the height of the chair 502 using an adjustment mechanism that includes a handle 656 (illustrated in FIGS. 215 and 216) secured to a cable (not shown) that is useful in temporarily disengage the post 654 from a securing mechanism to adjust the position of the post 654 relative to the sealed cylinder 652. The relative position of the sealed cylinder 652 to the post 654 is fixed during regular operation of the stair lift system 500 by the securing mechanism. The adjustment mechanism can be utilized by the user to disengage the securing mechanism and temporarily allow the post 654 to move relative to the sealed cylinder 652, with the relative position of the sealed cylinder 652 to the post 654 again fixed once the user releases the handle 656 to reengage the securing mechanism. As is described below, the sealed cylinder 652 applies upward force on the post 654 such that when the securing mechanism is disengaged, the force of the sealed cylinder 652 encourages the chair 502 to rise in height. However, this upward force can be counteracted by the weight of the user. Thus, to raise the height of the chair 502, a user can pull upwards on the handle 656 (the user is not seated in the chair 502 when raising the height) to disengage the securing mechanism. Because the weight of the user is not restraining the upward force, the chair 502 will rise. When the chair 502 reaches the desired height, the user releases the handle 656 and the securing mechanism is reengaged, fixing the height of the chair 502. To lower the height of the chair 502, the user sits on the chair 502 to apply a downward force and pulls the handle 656 upwards to disengage the securing mechanism. The weight of the user forces the post 654 downward relative to the sealed cylinder 652 to lower the height of the chair 502. When the desired height of the chair 502 is reached, the user releases the handle 565 to reengage the securing mechanism to again fix the position of the chair 502. It will be understood that when the handle 656 is at its resting position, the post 654 is secured relative to the sealed cylinder 652 and effectively transfers force downward from the chair 502 to the piston.

The sealed cylinder 652 encloses and holds a pressurized gas that offers a graduated resistance to downward movement of the piston. This is to say that the greater the force applied by the piston to the pressurized gas, the greater the resistance to downward movement of the piston. During operation, the piston moves downward as force is transferred through the post 654 to the piston and stops downward movement when the upward forced applied by the compressed gas equals the downward force of the weight of the chair 502. In other embodiments, a similar mechanism may be used, but instead a sealed gas providing resistance, a mechanical spring or other alternative components can be used.

The swivel functionality of the stair lift system 500 has been previously generally discussed. FIG. 216 illustrates an exemplary swivel mechanism 658 to facilitate such swivel functionality. The swivel mechanism 658 includes a pair of gears 660, 662 and a swivel post 664. A first gear 660 is rotatably secured to the post swivel 664 and engaged with a second gear 662, which is statically secured to the top of the chassis 512. A motor (not illustrated) is arranged to provide a drive force to the first gear 660 that rotates the first gear 660. The engagement of the first gear 660 with the second gear 662 and the application of a drive force to rotate the first gear 660 results in the chair 502 swiveling left of right. In the embodiment illustrated, when the first gear 660 rotates clockwise, the chair 502 rotates to the right (relative to FIG. 216), and when the first gear 660 rotates counterclockwise, the chair 502 rotates to the left (relative to FIG. 216). The direction of the swivel can be selected by the user by using the swivel button 646 illustrated in FIG. 212 or, as previously described, can be pre-determined by the installer based on which side of the staircase the stair lift system 500 is installed. When depressed, the swivel button 646 transmits a signal that results in the actuation of the first gear 660 to swivel the chair 502 in the desired direction.

FIGS. 217-245 illustrate a second embodiment of a modular stair lift system 500 for use with a straight staircase. The modular stair lift system 700 is arranged to provide a number of advantageous features such as a modular design that facilitates the installation of the stair lift system 700 in any number of staircase arrangements; a novel angle adjustment system that provides for precise angular positioning of the chair to accommodate a variety of inclined staircases; a sleek profile that maintains all parts of the stair lift system to within 9.5 inches of one of the walls of the staircase during operation and storage of the stair lift system; provides for 90 degree swivel of the chair despite its sleek profile; and a novel rack and pinion drive system for smooth and secure travel of the chair along the rail.

The stair lift system 700 includes a chair assembly 702, a number of modular components that form a straight rail assembly 704, and a chassis assembly 706 to secure the chair assembly 702 to the straight rail assembly 704. One exemplary embodiment of a stair lift system 700 is illustrated in FIGS. 217-219. FIG. 217 illustrates the stair lift system 700 with the chair assembly 702 at one end of the straight rail assembly 704, which in this instance is at the bottom of a straight staircase. In such an arrangement, the user can easily and safely mount or dismount from the chair assembly 702 at the bottom of the straight staircase. It will be appreciated that het chair assembly 702 can be similarly situated at the top of the straight staircase so that the user can easily and safely mount or dismount from the chair assembly 702 at the top of the straight staircase. FIG. 217 illustrates the stair lift system 700 arranged during normal operation for moving a user up and down a straight staircase. In this arrangement, the chair assembly 702 is configured (and the user is seated) such that the user remains seated and secured in a plumb and level position during operation. FIG. 219 illustrates the chair assembly 702 in an alternative arrangement at the bottom of the staircase. In this embodiment, the chair assembly 702 is rotated 90 degrees as compared to FIG. 217. For certain users, this arrangement may facilitate easier and safer mounting and dismounting of the user from the chair assembly 702. The orientation of the chair assembly 702 relative to the straight rail assembly 704 will vary from application to application based on a particular application's staircase inclination.

FIGS. 220 and 221 illustrate two perspective views of the chair assembly 702, and FIGS. 222 and 223 illustrate two perspective views of portions of the chair assembly 702, including a seat 708, a chair back 710, a pair of armrests 712, 714, and a chair back support 716. The chair back support 716 couples the chair back 710 to the remainder of the chair assembly 702 and provides support for the user seated in the chair assembly 702. The chair assembly 702 also includes a footrest 718 and a mounting assembly 720 (as illustrated in FIGS. 220 and 221). The mounting assembly 720 is arranged to couple the footrest 718 to the remainder of the chair assembly 702 and to couple the chair assembly 702 to the chassis assembly 706.

The seat 708, chair back 710, chair back support 716, and armrests 712, 714 are arranged to accommodate a wide variety of users and body types. The contoured seat 708, chair back 710, and armrests 712, 714 (and underlying support bars 722, 724) provide for a comfortable and ergonomic environment for a user seated in the chair assembly 702. As illustrated in FIGS. 220-221, the manner in which the chair back support 716 couples the chair back 710 to the remainder of the chair assembly 702 results in a sizable gap between the bottom of the chair back 710 and the seat 708. This gap is further enhanced by the outward curvature of the pair of support bars 722, 724 supporting the armrests 712, 714. The gap is arranged to accommodate users of all heights, weights, and sizes, including those with relatively small lower back and waist regions and those with relatively large lower back and waist regions.

As previously noted, the mounting assembly 720 is arranged to couple the chair assembly 702 to the chassis assembly 706. The manner of coupling the chair assembly 702 to the chassis assembly 706 facilitates precise and discrete incremental angular adjustment of the chair assembly 702 relative to the chassis assembly 706, which thereby, facilitates angular adjustment of the chair assembly 702 relative to the straight rail assembly 704. The mechanism for such angular adjustment is illustrated in FIGS. 224-227. The angular adjustment mechanism includes a partially splined shaft 726, a bracket plate 728 with an aperture 730 through the bracket plate 728 (where the bracket plate 728 is a part of the mounting assembly 720), a splined collar 732, a washer 734, and a bolt 736. As illustrated in FIG. 224, the partially splined shaft 726 is secured to the chassis assembly 706 (which is partially illustrated in FIG. 224). The partially splined shaft 726 includes a keyed feature 726A that engages with a cutout in the chassis plate (not illustrated) preventing rotation when being assembled in the chassis assembly 706. Furthermore, the partially splined shaft 726 includes a splined outer section 726B, an adjoining smooth outer section 726C, and a threaded inner bore 726D through the center of a portion of the partially splined shaft 726. The splined collar 732 includes a splined inner section 732A and a keyed feature 732B extending from the splined collar 732. The aperture 730 though the bracket plate 728 includes a notch 730A. As will be further explained, when the splined collar 732 is assembled with the bracket plate 728, the keyed feature 732B of the splined collar 732 engages with the notch 730A in the aperture 730 so that during assembly, the splined collar 732 does not rotate relative to the bracket plate 728, ensuring the final plumb and level orientation of the chair is consistent from one customer application to another during install.

As noted, the partially splined shaft 726 is secured to the chassis assembly 706, and the splined collar 732 is secured in aperture 730 of the bracket plate 728. The splined outer section 726B of the partially splined shaft 726 is arranged to engage with the splined inner section 732A of the splined collar 732. Thus, when the partially splined shaft 726 is inserted into the splined collar 732, the two components are interlocked and statically positioned relative to each other. In one embodiment, the splines of the partially splined shaft 726 and splined collar 732 are set at increments of about 2 degrees, so that the rotational position of the splined shaft 726 relative to the splined collar 732 can be adjusted clockwise and counterclockwise incrementally by 2 degrees. As illustrated in FIG. 227, when the splined collar 732 is assembled with the bracket plate 728 (i.e., by inserting the spined collar 728 into the aperture 730), a portion 738 of the aperture 730 remains uncovered, which exposes a smooth surface adjacent to the inner splined inner section 732A of the splined collar 732. As will be further explained, this smooth portion 738 of the aperture 730 facilitates the adjustment of the angle of the chair assembly 702 relative to the straight rail assembly 704. Furthermore, by not requiring to completely remove the footrest assembly 728, this arrangement facilitates such adjustment by a single person and eliminates the need for two or more persons to adjust the angle of the chair assembly 702.

As will be appreciated, when a straight rail assembly 704 is installed in a staircase, the angle of the straight rail assembly 704 relative to the ground is dictated by the rise of the staircase, which can vary from staircase to staircase. It is best for a user of the stair lift system 700 to be seated perpendicular and level to the ground when traversing up and down the staircase in the stair lift system 700. Thus, when the chair assembly 702 is secured to the straight rail assembly 704, the angle of the chair assembly 702 relative to the straight rail assembly 704 needs to be adjustable so that the chair assembly 702 can be positioned perpendicular and level to the ground regardless of the angle of the straight rail assembly 704 relative to the ground.

The angle adjustment mechanism described above facilitates such relative positioning of the chair assembly 702 to the straight rail assembly 704. The angle adjustment mechanism assist is the initial setting of the chair assembly 702 relative to the straight rail assembly 704 and any adjustments made after initial installation. The following description of steps are exemplary methods of initially setting the angle of the chair assembly 702 relative to the straight rail assembly 704 during installation and subsequently adjusting such angle as needed. During installation, the straight rail assembly 704 is secured to the staircase and the chassis assembly 706 is moveably coupled to the straight rail assembly 704. As noted above the partially splined shaft is incorporated into the chassis assembly 706. The chair assembly 702 is assembled except for a front plate 740 and the mounting assembly 720, which is left unassembled. This arrangement exposes the aperture 730 of the bracket plate 728 and the splined collar 732 that is positioned in the aperture 730. The mounting assembly 720 is then inserted by an installer(s) and coupled to the chassis assembly 706 by inserting the partially splined shaft 726 into the aperture 730 and splined collar 732. The partially splined shaft 726 is inserted into the aperture 730 and splined collar 732 such that the splined outer section 726B of the partially splined shaft 726 is positioned in the smooth portion 738 of the aperture 730. Such an arrangement allows the chair assembly 702 to rotate relative to the chassis assembly 706 and, thus, rotate relative to the straight rail assembly 704. The installer(s) then rotate the chair assembly 702 until the mounting assembly 720 is level (i.e., generally perpendicular to the ground). The mounting assembly 720 is then moved horizontally toward the chassis assembly 706 so that the splined outer section 726B of the partially splined shaft 726 engages with the splined inner section 732A of the splined collar 732, which locks the relative position of the chair assembly 702 to the chassis assembly 706 and straight rail assembly 704. The mounting assembly 720 then is fastened to the threaded portion 726D of the partially splined shaft 726 of chassis 706 by using a washer 734 and a bolt 736. The upper chair mount assembly 740 is then fastened to the mounting assembly 720. The washer 734 and bolt 736 are then used to secure the bracket plate 728 (and thus, the mounting assembly 720) to the chassis assembly 706. Finally, the upper chair mount assembly 740 is attached to the chair assembly 702, completing the installation.

After the initial installation, the chair assembly 702 may require additional adjustments. The method for making such adjustments includes the following steps. The chair assembly 702 and upper chair mount assembly 740 is removed, and the bolt 736 is loosened. The chair assembly 702 is pulled away from the chassis assembly 706 until the splined outer section 726B of the partially splined shaft 726 disengages with the splined inner section 732A of the splined collar 732 and is positioned in the smooth portion 738 of the aperture 730. The chair assembly 702 is rotated as necessary to make the angular adjustment. The chair assembly 702 is then moved horizontally toward the chassis assembly 706 so that the splined outer section 726B of the partially splined shaft 726 reengages with the splined inner section 732A of the splined collar 732, thus, locking the relative position of the chair assembly 702 to the chassis assembly 706 and straight rail assembly 704. The bolt 736 is retightened and the upper chair mount assembly 740 is reattached to the mounting assembly 720. Finally, the chair assembly 702 is fastened on top of the chair mount assembly 740 completing the adjustment.

FIGS. 228 through 242 illustrate the engagement of the chassis assembly 706 and the straight rail assembly 704. The combination of the chassis assembly 706 and the straight rail assembly 704 form a rack and pinion drive system that propels the chair assembly 702 along the straight rail assembly 704 to move a user up and down the staircase. The chassis assembly 706 includes a circular gear 742 that functions as the pinion and the straight rail assembly 704 includes a series of modular linear gears 744 that function as the rack. FIG. 228 and enhanced view 155 illustrate the rack and pinion system. The chassis assembly 706 illustrated in FIG. 228 is shown with a top cover removed to reveal inner mechanisms. It will be understood that when fully installed and ready for use, the stair lift system 700 includes many safety features, including covers over moving parts to facilitate safe operation of the stair lift system.

The circular gear 742 is attached to a motor 746 by a drive shaft (not illustrated) that rotates the circular gear 742, which facilitates motion along a series of adjoining linear gears 744. The circular gear 742 is fabricated from a polymer material or a polymeric composite material. The linear gear 744 is a composite component. As illustrated in FIGS. 232-234, the linear gear 744 includes an upper portion 748 that is molded onto a lower portion 750. The upper portion 748 includes a series of teeth, which provide the linear gear functionality, and the lower portion is arranged as an I-beam. The upper portion 748 is specifically molded over the top portion of the I-beam structure of the lower portion 750. The upper portion 748 is fabricated from a polymer material or a polymeric composite material, and the lower portion 750 is fabricated from a rigid material. In one embodiment, both the circular gear 742 and the upper portion 748 of the linear gear 744 are fabricated from glass filled nylon 6, and the lower portion of the linear gear 744 is fabricated from a metal alloy such as aluminum. In addition, the nylon 6 used to fabricate the circular gear 742 and the upper portion 748 can further be oil filled to eliminate the need for external greasing of the combination.

As illustrated in FIGS. 235-240, the straight rail assembly 704 includes the linear gear 744 and a frame 752. The frame 752 includes a channel 754 that is arranged to accommodate the bottom portion of the I-beam structure of the lower portion 750 of the linear gear 744. When the bottom portion of the I-beam structure of the lower portion 750 is positioned in the channel 754, the linear gear 744 is coupled to the frame 752 to form the straight rail assembly 704. In one embodiment, the frame is approximately 8 feet in length, and a linear gear 744 is approximately 6 inches in length. The frame 752 and linear gears 744 are constructed such that they can be cut into custom lengths using tools that are generally available to installers and users of the stair lift systems 700. In such an arrangement, straight rail assemblies 704 can be assembled in a variety of custom lengths to accommodate any staircase.

In one exemplary method, an installer measures a staircase to determine the length of straight rail assembly 704 needed to traverse the staircase. The installer assembles as many 8-foot sections of straight rail assembly 704 as needed by sliding 16 linear gears 744 into the channel 754 of the frame 752. If additional length is needed, the installer trims a frame 752 to the appropriate length and slides the appropriate number of linear gears 744 into the channel 754 of the frame 752, trimming the last linear gear 744 as required. As illustrated in FIGS. 239 and 240, if more than one straight rail assembly 704 has been prepared (i.e., the overall length required is greater than 8 feet), the straight rail assemblies are secured together using a first sleeve 756, a second sleeve 758, and a rod 760 inserted into additional channels (762, 764, 766) of the frame 752. Additionally, the straight rail assemblies are fastened together with two connection brackets 768 and a number of screws 770. Once the full straight rail assembly 704 is assembled, caps can be placed on the two ends of the straight rail assembly 704 to secure the linear gears 744 in the channel 754 of the frame 752.

With reference to FIGS. 241-242 the chassis assembly 706 is coupled to the straight rail assembly 704 by three guide roller assemblies. A first assembly is a vertical guide roller assembly 768. This vertical guide roller assembly 772 has the same structure as the earlier described first 534 and second 536 lower roller assemblies (illustrated in FIG. 185). The vertical guide roller assembly 772 includes a pair of vertical guide wheels 774 that are supported by a structural bracket 776 of the chassis assembly 706. On the same structural bracket 776, a pair of horizontal guide wheels (illustrated in FIG. 188 as reference numbers 562 and 564) are mounted perpendicular to vertical guide wheels 774. The vertical guide wheels 774 and horizontal guide wheels are positioned in a channel 776 of the frame 752 and couple the chassis assembly 706 to the straight rail assembly 704. The third assembly is an angled guide roller assembly 780 that includes two guide wheels 782 that are positioned on an angled surface 784 of the straight rail assembly 704 and is supported from above by the structural bracket (not illustrated) of the chassis assembly 706. The vertical guide roller assembly 772 and angled guide roller assembly 780 work cooperatively to transfer force from the user and chair assembly 702 to the straight rail assembly 704. The majority of the weight of the user and the chair assembly 702 is borne by the angled guide roller assembly 780, with a portion of the weight of the user and the chair assembly 702 borne by the vertical guide roller assembly 772. The vertical guide roller assembly 772 and angled guide roller assembly 780 are positioned such that only enough downward force is applied to the circular gear 742 as is necessary for the teeth of the circular gear 742 to effectively engage the teeth of the linear gear 744 to propel the chair assembly 702 using the rack and pinion drive system.

The arrangement of the angled guide roller assembly 780 on an angled surface 784 of the frame 752 counteracts any rotational force (i.e., moment) created by the chair assembly 702 being located off center of the straight rail assembly 704. This is to say, that the angle guide roller assembly 780 prevents the chair assembly 702 and user from tipping forward during use of the stair lift system 700. While the vertical guide roller assembly 772 and angled guide roller assembly 776 are arranged to bear most of the weight of the user and chair assembly 702, the circular gear 742 and linear gear 744 are arranged to bear a significant amount of force. For example, when the circular gear 742 and linear gear 744 are fabricated from glass-filled nylon 6, the circular gear 742 and linear gear 744 can bear a minimum of 450 lbs.

The stair lift system 700 is equipped with mechanisms to slow and ultimately stop the movement of the chair assembly 702 as the chair assembly 702 approaches and ultimately arrives at either end of the straight rail assembly 704. The stair lift system 700 includes a pair of end sensor assemblies 786 and a pair of ramps 788. FIG. 243 illustrates an end sensor assembly 786 engaging with a ramp 788, FIG. 244 illustrates an exploded view of an end sensor assembly 786, and FIG. 245 illustrates a ramp 788. One end sensor assembly 786 is secured at each opposite end of the chassis 706, and one ramp 788 is secured to each opposing end of the straight rail assembly 704. Each end sensor assembly 786 includes two plunger-type limit switches 790. The pair of plunger-type limit switches 790 are secured in a housing 792 with dowel pins 794. Once assembled, for each plunger-type limit switch 790, a plunger 796 extends below the housing 792 of the end sensor assembly 786. The end sensor assemblies 786 are positioned at the ends of the chassis 706 such that as the chair assembly 702 approaches the end of the straight rail assembly 704, the plungers 796 of the plunger-type limit switches 790 will engage the applicable ramp 788 at either end of the straight rail assembly 704. The ramp 788 includes two sections, a longer section 798 and a shorter section 800. As the chair assembly 702 travels and approaches one end of the straight rail assembly 704, the first of the pair of plunger-type limit switches 790 in the end sensor assembly 786 engages the longer portion 798 of the ramp 788. Such engagement causes the chair assembly 702 to slow down, for example, to half of its full speed. As the chair assembly 702 continues on towards the end of the straight rail assembly 704, the second of the pair of plunger-type limit switches 790 in the end sensor assembly 786 engages the shorter portion 800 of the ramp 788, and the chair assembly 702 is brought to a stop, which prevents the to continue traveling of the chair assembly 702 in the same direction.

Throughout this disclosure, reference has been made to various automated subsystems and automated control of such subsystems. In one embodiment, a stair lift system includes a central control system that controls any number of subsystems. For example, a central control system can (i) control the speed and direction of travel of the chair along a rail system; (ii) detect the speed and direction of travel of the chair along the rail system; (iii) control swivel functionality of the chair; (iv) control emergency braking of the chair; (v) monitor the state of the onboard battery of stair lift system; (vi) manage the charging of the onboard battery; (vii) deploy and retract the foot rest; (viii) manage the functionality of any panel with manual controls in the armrest of a chair; and (ix) keep the chair plum and level (i.e., perpendicular to the ground) during operation. In more specific examples, the central control system can monitor the speed and direction of the travel of the chair along the rail system and adjust the speed based on if the chair is near the top or bottom of the staircase or approaching or exiting a landing or a curve in the rail system. In a situation where emergency braking is required, the central control system can actuate braking when the speed of the chair reaches a preset limit. The central control system can allow swiveling of the chair only when it is at the top of a staircase, the bottom of a staircase, a flat landing of the staircase, or to give extra clearance when navigating a tight staircase, and such swiveling can be limited to only the direction that provides for safe ingress or egress from the chair. With regard to management of the onboard battery, the central control system can monitor the charge level of the battery and notify the user of a low battery level. Such notifications can take the form of a warning light, warning sound (such as a periodic beeping), or a communication sent to a user's (or user's caretaker's) device such as a text to a cellular phone or email. Additionally, the central control system can initiate charging of the onboard battery when the charge is low by directing the user to position the chair such that a charging pad is engaged with the battery. These are but a few examples of the functionality of a central control system.

The central control system can be in communication with a number of components on the stair lift system such as one or more motors and drive systems and any number of sensors, user operated buttons and levers, and other such feedback devices. The central control system can include a central processing unit (CPU) and/or a printed circuit board that communicates with other components either through wired or wireless communication. The CPU and/or board can receive and evaluate information received from sensors and user operated buttons and levers and transmit signals to certain subsystems based on pre-programed or programmable instructions. For example, when a user manipulates a lever that indicates the user's desired direction and speed of the chair, the CPU and/or board can receive a signal from the lever and transmit a responsive signal to the motor and/or drive system to propel the chair in the desired direction and desired speed. However, if the user manipulates the lever to indicate a direction that is not possible (i.e., if the chair is at the bottom of the staircase and the user accidentally moves the lever in the wrong direction) the CPU and/or board can use information about the position of the chair to emit an audible warning and prevent motion in the user indicated direction in this case.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A stair lift system for a staircase, the stair lift system comprising:

a modular rail system including, at least one modular rail assembly having a first end and an opposing second end, the modular rail assembly comprising:

a first rail component having a central aperture defined therethrough along a length of the first rail component, a second rail component having a central aperture defined therethrough along a length of the second rail component and coupled to the first rail component such that the central apertures of each of the first and second rail components are aligned, and a cable tensioning assembly having a tension cable disposed through the central apertures of each of the coupled first and second rail components, and affixed at opposing ends of the cable tensioning assembly to each of the first end and opposing second end of the modular rail assembly, the cable tensioning assembly configured to transfer tension forces applied to the tension cable into compressive force acting on opposing ends of the coupled first and second rail components, sufficient to maintain the coupling of the first and second rail components and provide structural support to the modular rail assembly;

a drive system engaged with the modular rail system, and configured to drive along an outer surface of the modular rail assembly;

a chair coupled to the drive system and configured to be propelled along modular the rail system by, and with, the drive system.

2. The stair lift system of claim 1, wherein the modular rail system comprises a pair of modular rail assemblies configured as:

an upper rail assembly; and a lower rail assembly.

3. The stair lift system of claim 2, wherein:

the upper rail assembly includes:

a plurality of first rail components that are straight components; and at least one second rail component that is a curved component; and the lower rail assembly includes:

a plurality of first rail components that are straight components; and at least one second rail component that is a curved component.

4. The stair lift system of claim 3, wherein each of the curved components of the upper rail assembly and lower rail assembly include:

a first coupling component with an interlocking feature;

a second coupling component with an interlocking feature; and a plurality of inter-engaging discs, each with:

a first face with a first interlocking feature; and a second face with a second interlocking feature.

5. The stair lift system of claim 4, wherein for each curved component:

the first interlocking feature of each disc is engaged with either the interlocking feature of the first coupling component or the second interlocking feature of another disc; and the second interlocking feature of each disc is engaged with either the interlocking feature of the second coupling component or the first interlocking feature of another disc.

6. The stair lift system of claim 5, wherein for each disc, the first face is disposed at a five degree angle relative to the second face.

7. The stair lift system of claim 6, wherein when fifteen discs are assembled with the first coupling component and the second coupling component, the resulting curved component curves ninety degrees from the first coupling component to the second coupling component.

8. The stair lift system of claim 4, wherein:

the first coupling component includes an aperture defined through the first component;

the second coupling component includes an aperture defined through the second component; and each disc includes an aperture defined through the disc.

9. The stair lift system of claim 8, wherein each aperture is teardrop shaped.

10. The stair lift system of claim 8, wherein each aperture is configured to accommodate therein the tension cable of the cable tensioning assembly disposed therethrough.

11. The stair lift system of claim 2, further comprising:

a first terminal post secured to a tread of the staircase proximate to the top of the staircase;

a second terminal post secured to a tread of the staircase proximate to the bottom of the staircase; and an intermediate post secured to a tread of the staircase between the top and bottom of the staircase.

12. The stair lift system of claim 11, wherein:

a height of the intermediate post is adjustable.

13. The stair lift system of claim 11, wherein:

the upper rail system is secured to the first terminal post, second terminal post, and the intermediate post; and the lower rail system is secured to the first terminal post, second terminal post, and the intermediate post.

14. The stair lift system of claim 13, wherein the drive system comprises:

a pair of upper rollers engaged with the upper rail system;

a pair of lower rollers engaged with the lower rail system; and a motor arranged to rotate the pair of upper rollers and lower rollers.

* * * * *